US011472552B2

(12) United States Patent
Gil et al.

(10) Patent No.: US 11,472,552 B2
(45) Date of Patent: *Oct. 18, 2022

(54) METHODS OF PHOTO MATCHING AND PHOTO CONFIRMATION FOR PARCEL PICKUP AND DELIVERY

(71) Applicant: United Parcel Service of America, Inc., Atlanta, GA (US)

(72) Inventors: Julio Gil, Veldhoven (NL); Jeffrey Cooper, Marietta, GA (US); Seth Bruckner, Atlanta, GA (US); Juan Perez, Milton, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 182 days.

This patent is subject to a terminal disclaimer.

(21) Appl. No.: 16/906,238

(22) Filed: Jun. 19, 2020

(65) Prior Publication Data
US 2020/0317340 A1    Oct. 8, 2020

Related U.S. Application Data

(63) Continuation of application No. 16/233,355, filed on Dec. 27, 2018, now Pat. No. 10,730,626, which is a
(Continued)

(51) Int. Cl.
*B64D 1/22* (2006.01)
*G06Q 10/08* (2012.01)
(Continued)

(52) U.S. Cl.
CPC ............... *B64D 1/22* (2013.01); *B60P 3/11* (2013.01); *B64C 39/024* (2013.01); *B64D 1/00* (2013.01);
(Continued)

(58) Field of Classification Search
CPC ... B64D 1/22; B64D 1/00; B64D 9/00; B64D 45/04; B60P 3/11; B64C 39/024;
(Continued)

(56) References Cited

U.S. PATENT DOCUMENTS 3,053,480 A    9/1962 Vanderlip
3,526,127 A    9/1970 Sarkis
(Continued)

FOREIGN PATENT DOCUMENTS

CN    101124842 A    2/2008
CN    101260908 A    9/2008
(Continued)

OTHER PUBLICATIONS

Non-Final Office Action received for U.S. Appl. No. 15/870,166, dated Feb. 3, 2021, 11 pages.
(Continued)

*Primary Examiner* — Richard M Camby
(74) *Attorney, Agent, or Firm* — Shook, Hardy & Bacon L.L.P.

(57) ABSTRACT

Systems and methods include UAVs that serve to assist carrier personnel by reducing the physical demands of the transportation and delivery process. A UAV generally includes a UAV chassis including an upper portion, a plurality of propulsion members configured to provide lift to the UAV chassis, and a parcel carrier configured for being selectively coupled to and removed from the UAV chassis. UAV support mechanisms are utilized to load and unload parcel carriers to the UAV chassis, and the UAV lands on and takes off from the UAV support mechanism to deliver parcels to a serviceable point. The UAV includes computing entities that interface with different systems and computing entities to send and receive various types of information.

18 Claims, 73 Drawing Sheets

Related U.S. Application Data continuation-in-part of application No. 15/870,187, filed on Jan. 12, 2018, now Pat. No. 10,202,192, which is a continuation of application No. 15/582,150, filed on Apr. 28, 2017, now Pat. No. 9,928,749.

(60) Provisional application No. 62/329,491, filed on Apr. 29, 2016.

(51) Int. Cl.

| | | |
|---|---|---|
| B64D 1/00 | (2006.01) | |
| B64C 39/02 | (2006.01) | |
| B64D 45/04 | (2006.01) | |
| B64D 9/00 | (2006.01) | |
| B64F 1/32 | (2006.01) | |
| B64F 1/10 | (2006.01) | |
| G08G 5/00 | (2006.01) | |
| E05F 15/77 | (2015.01) | |
| G08G 5/02 | (2006.01) | |
| B65G 1/04 | (2006.01) | |
| G01S 19/42 | (2010.01) | |
| H04W 4/70 | (2018.01) | |
| B65G 1/06 | (2006.01) | |
| B64F 1/22 | (2006.01) | |
| B60P 3/11 | (2006.01) | |
| G01S 19/15 | (2010.01) | |
| B64F 1/02 | (2006.01) | |
| H04L 67/55 | (2022.01) | |

(52) U.S. Cl.
CPC ............ *B64D 9/00* (2013.01); *B64D 45/04* (2013.01); *B64F 1/0299* (2020.01); *B64F 1/10* (2013.01); *B64F 1/22* (2013.01); *B64F 1/32* (2013.01); *B65G 1/0435* (2013.01); *B65G 1/06* (2013.01); *E05F 15/77* (2015.01); *G01S 19/15* (2013.01); *G01S 19/42* (2013.01); *G06Q 10/083* (2013.01); *G06Q 10/0832* (2013.01); *G06Q 10/0833* (2013.01); *G08G 5/006* (2013.01); *G08G 5/0069* (2013.01); *G08G 5/025* (2013.01); *H04L 67/55* (2022.05); *H04W 4/70* (2018.02); *B64C 2201/024* (2013.01); *B64C 2201/108* (2013.01); *B64C 2201/128* (2013.01); *B64C 2201/141* (2013.01); *B64C 2201/146* (2013.01); *B64C 2201/18* (2013.01); *B64C 2201/208* (2013.01); *B64C 2211/00* (2013.01)

(58) Field of Classification Search
CPC ........ B64C 2201/024; B64C 2201/108; B64C 2201/128; B64C 2201/141; B64C 2201/146; B64C 2201/18; B64C 2201/208; B64C 2211/00; B64F 1/0299; B64F 1/10; B64F 1/22; B64F 1/32; B65G 1/0435; B65G 1/06; E05F 15/77; G01S 19/15; G01S 19/42; G06Q 10/083; G06Q 10/0832; G06Q 10/0833; G08G 5/006; G08G 5/0069; G08G 5/025; H04L 67/26; H04W 4/70
See application file for complete search history.

(56) References Cited

U.S. PATENT DOCUMENTS

| | | |
|---|---|---|
| 3,591,310 A | 7/1971 | Mouille |
| 3,986,686 A | 10/1976 | Girard |
| 4,478,379 A | 10/1984 | Kerr |
| 4,493,136 A | 1/1985 | Groutage et al. |
| 4,542,928 A | 9/1985 | Fowler, Jr. |
| 4,553,719 A | 11/1985 | Ott |
| 4,609,167 A | 9/1986 | Dean et al. |
| 4,626,993 A | 12/1986 | Okuyama et al. |
| 4,773,011 A | 9/1988 | VanHoose |
| 4,777,416 A | 10/1988 | Georg et al. |
| 4,795,111 A | 1/1989 | Moller |
| 4,809,540 A | 3/1989 | Lackner et al. |
| 4,842,218 A | 6/1989 | Groutage et al. |
| 4,945,759 A | 8/1990 | Krofchalk et al. |
| 4,992,947 A | 2/1991 | Nimura et al. |
| 5,041,976 A | 8/1991 | Marko et al. |
| 5,060,156 A | 10/1991 | Vajgart et al. |
| 5,170,353 A | 12/1992 | Verstraete |
| 5,272,638 A | 12/1993 | Martin et al. |
| 5,470,233 A | 11/1995 | Fruchterman et al. |
| 5,474,259 A | 12/1995 | De Forges De Parny et al. |
| 5,491,631 A | 2/1996 | Shirane et al. |
| 5,544,061 A | 8/1996 | Morimoto et al. |
| 5,559,707 A | 9/1996 | DeLorme et al. |
| 5,587,911 A | 12/1996 | Asano et al. |
| 5,680,312 A | 10/1997 | Oshizawa et al. |
| 5,774,828 A | 6/1998 | Brunts et al. |
| 5,798,733 A | 8/1998 | Ethridge |
| 5,802,492 A | 9/1998 | DeLorme et al. |
| 5,815,093 A | 9/1998 | Kikinis |
| 5,831,860 A | 11/1998 | Foladare et al. |
| 5,874,905 A | 2/1999 | Nanba et al. |
| 5,887,269 A | 3/1999 | Brunts et al. |
| 5,890,441 A | 4/1999 | Swinso et al. |
| 5,896,968 A | 4/1999 | Bruntz |
| 5,928,291 A | 7/1999 | Jenkins et al. |
| 5,931,888 A | 8/1999 | Hiyokawa |
| 5,968,109 A | 10/1999 | Israni et al. |
| 5,987,381 A | 11/1999 | Oshizawa |
| 6,002,981 A | 12/1999 | Kreft |
| 6,056,237 A | 5/2000 | Woodland |
| 6,064,941 A | 5/2000 | Nimura et al. |
| 6,084,870 A | 7/2000 | Wooten et al. |
| 6,091,325 A | 7/2000 | Zur et al. |
| 6,092,021 A | 7/2000 | Ehlbeck et al. |
| 6,108,603 A | 8/2000 | Karunanidhi |
| 6,112,152 A | 8/2000 | Tuttle |
| 6,112,200 A | 8/2000 | Livshutz et al. |
| 6,115,669 A | 9/2000 | Watanabe et al. |
| 6,163,748 A | 12/2000 | Guenther |
| 6,178,377 B1 | 1/2001 | Ishihara et al. |
| 6,181,994 B1 | 1/2001 | Colson et al. |
| 6,201,544 B1 | 3/2001 | Ezaki |
| 6,232,915 B1 | 5/2001 | Dean et al. |
| 6,249,740 B1 | 6/2001 | Ito et al. |
| 6,253,129 B1 | 6/2001 | Jenkins et al. |
| 6,270,038 B1 | 8/2001 | Cycon et al. |
| 6,282,489 B1 | 8/2001 | Bellesfield et al. |
| 6,301,531 B1 | 10/2001 | Pierro et al. |
| 6,306,063 B1 | 10/2001 | Horgan et al. |
| 6,321,158 B1 | 11/2001 | DeLorme et al. |
| 6,324,659 B1 | 11/2001 | Pierro |
| 6,330,499 B1 | 12/2001 | Chou et al. |
| 6,336,073 B1 | 1/2002 | Ihara et al. |
| 6,338,152 B1 | 1/2002 | Fera et al. |
| 6,356,838 B1 | 3/2002 | Paul |
| 6,389,337 B1 | 5/2002 | Kolls |
| 6,411,891 B1 | 6/2002 | Jones |
| 6,421,605 B1 | 7/2002 | Steiner et al. |
| 6,424,157 B1 | 7/2002 | Gollomp et al. |
| 6,438,471 B1 | 8/2002 | Katagishi et al. |
| 6,456,933 B1 | 9/2002 | Messing |
| 6,459,969 B1 | 10/2002 | Bates et al. |
| 6,459,986 B1 | 10/2002 | Boyce et al. |
| 6,462,675 B1 | 10/2002 | Humphrey et al. |
| 6,463,343 B1 | 10/2002 | Emens et al. |
| 6,484,080 B2 | 11/2002 | Breed |
| 6,498,982 B2 | 12/2002 | Bellesfield et al. |
| 6,498,986 B1 | 12/2002 | Kurtzberg et al. |
| 6,509,749 B1 | 1/2003 | Buelna et al. |
| 6,525,672 B2 | 2/2003 | Chainer et al. |
| 6,549,833 B2 | 4/2003 | Katagishi et al. |
| 6,553,816 B1 | 4/2003 | Palanisamy et al. |
| 6,571,213 B1 | 5/2003 | Altendahl et al. |

(56) References Cited

U.S. PATENT DOCUMENTS

| | | |
|---|---|---|
| 6,577,937 B1 | 6/2003 | Shuman et al. |
| 6,581,004 B2 | 6/2003 | Mori et al. |
| 6,587,785 B2 | 7/2003 | Jijina et al. |
| 6,594,579 B1 | 7/2003 | Lowrey et al. |
| 6,598,748 B2 | 7/2003 | Mileaf et al. |
| 6,604,033 B1 | 8/2003 | Banet et al. |
| 6,609,051 B2 | 8/2003 | Fiechter et al. |
| 6,611,740 B2 | 8/2003 | Lowrey et al. |
| 6,636,790 B1 | 10/2003 | Lightner et al. |
| 6,651,034 B1 | 11/2003 | Hedlund et al. |
| 6,662,091 B2 | 12/2003 | Wilson et al. |
| 6,675,635 B2 | 1/2004 | Kasen et al. |
| 6,708,926 B2 | 3/2004 | Bonisch |
| 6,732,031 B1 | 5/2004 | Lightner et al. |
| 6,732,063 B2 | 5/2004 | Famili et al. |
| 6,735,504 B2 | 5/2004 | Katagishi et al. |
| 6,735,506 B2 | 5/2004 | Breed et al. |
| 6,738,697 B2 | 5/2004 | Breed |
| 6,741,927 B2 | 5/2004 | Jones |
| 6,741,938 B2 | 5/2004 | Berndorfer |
| 6,748,318 B1 | 6/2004 | Jones |
| 6,754,582 B1 | 6/2004 | Smith et al. |
| 6,763,299 B2 | 7/2004 | Jones |
| 6,775,642 B2 | 8/2004 | Remboski et al. |
| 6,804,606 B2 | 10/2004 | Jones |
| 6,812,888 B2 | 11/2004 | Drury et al. |
| 6,813,559 B1 | 11/2004 | Bodin et al. |
| 6,819,988 B2 | 11/2004 | Dietz et al. |
| 6,840,093 B2 | 1/2005 | Kasen et al. |
| 6,845,939 B1 | 1/2005 | Baldwin |
| 6,847,871 B2 | 1/2005 | Malik et al. |
| 6,850,824 B2 | 2/2005 | Breed |
| 6,857,262 B2 | 2/2005 | Rendahl et al. |
| 6,859,039 B2 | 2/2005 | Horie et al. |
| 6,859,722 B2 | 2/2005 | Jones |
| 6,904,359 B2 | 6/2005 | Jones |
| 6,911,830 B2 | 6/2005 | Heremans et al. |
| 6,920,779 B2 | 7/2005 | Carlstrom et al. |
| 6,937,992 B1 | 8/2005 | Benda et al. |
| 6,947,827 B2 | 9/2005 | Fuse et al. |
| 6,970,183 B1 | 11/2005 | Monroe |
| 6,975,938 B2 | 12/2005 | Odagawa et al. |
| 6,980,885 B2 | 12/2005 | Ye et al. |
| 6,988,026 B2 | 1/2006 | Breed et al. |
| 7,016,774 B2 | 3/2006 | Barber et al. |
| 7,050,897 B2 | 5/2006 | Breed et al. |
| 7,059,566 B2 | 6/2006 | Byers et al. |
| 7,075,421 B1 | 7/2006 | Tuttle |
| 7,082,359 B2 | 7/2006 | Breed |
| 7,089,099 B2 | 8/2006 | Shostak et al. |
| 7,089,110 B2 | 8/2006 | Pechatnikov et al. |
| 7,089,784 B2 | 8/2006 | Jakoby et al. |
| 7,103,460 B1 | 9/2006 | Breed |
| 7,133,804 B2 | 11/2006 | Tonack et al. |
| 7,146,264 B2 | 12/2006 | Bates et al. |
| 7,155,321 B2 | 12/2006 | Bromley et al. |
| 7,197,500 B1 | 3/2007 | Israni et al. |
| 7,212,976 B2 | 5/2007 | Scheer |
| 7,216,037 B2 | 5/2007 | Graulich et al. |
| 7,228,232 B2 | 6/2007 | Bodin et al. |
| 7,231,294 B2 | 6/2007 | Bodin et al. |
| 7,251,612 B1 | 7/2007 | Parker et al. |
| 7,257,396 B2 | 8/2007 | Olsen et al. |
| 7,286,913 B2 | 10/2007 | Bodin et al. |
| 7,295,924 B2 | 11/2007 | Smith et al. |
| 7,299,125 B2 | 11/2007 | Marks et al. |
| 7,313,467 B2 | 12/2007 | Breed et al. |
| 7,317,975 B2 | 1/2008 | Woolford et al. |
| 7,324,666 B2 | 1/2008 | Zoken et al. |
| 7,373,244 B2 | 5/2008 | Kreft |
| 7,376,497 B2 | 5/2008 | Chen |
| 7,378,940 B2 | 5/2008 | Jenney et al. |
| 7,379,800 B2 | 5/2008 | Breed |
| 7,383,125 B2 | 6/2008 | de Silva et al. |
| 7,400,954 B2 | 7/2008 | Sumcad et al. |
| 7,408,453 B2 | 8/2008 | Breed |
| 7,417,547 B2 | 8/2008 | Kennedy |
| 7,418,320 B1 | 8/2008 | Bodin et al. |
| 7,421,321 B2 | 9/2008 | Breed et al. |
| 7,444,210 B2 | 10/2008 | Breed et al. |
| 7,457,693 B2 | 11/2008 | Olsen et al. |
| 7,467,034 B2 | 12/2008 | Breed et al. |
| 7,469,183 B2 | 12/2008 | Bodin et al. |
| 7,480,551 B1 | 1/2009 | Lowrey et al. |
| 7,486,181 B2 | 2/2009 | Olsen et al. |
| 7,527,288 B2 | 5/2009 | Breed |
| 7,555,370 B2 | 6/2009 | Breed et al. |
| 7,573,386 B2 | 8/2009 | Lahiri |
| 7,575,197 B2 | 8/2009 | McCoskey et al. |
| 7,580,782 B2 | 8/2009 | Breed et al. |
| 7,587,345 B2 | 9/2009 | Mann et al. |
| 7,603,894 B2 | 10/2009 | Breed |
| 7,624,024 B2 | 11/2009 | Levis et al. |
| 7,630,802 B2 | 12/2009 | Breed |
| 7,633,379 B2 | 12/2009 | Jenney et al. |
| 7,643,797 B2 | 1/2010 | Ban et al. |
| 7,650,210 B2 | 1/2010 | Breed |
| 7,657,354 B2 | 2/2010 | Breed et al. |
| 7,660,577 B2 | 2/2010 | Radosta et al. |
| 7,660,666 B2 | 2/2010 | Finn et al. |
| 7,663,502 B2 | 2/2010 | Breed |
| 7,667,604 B2 | 2/2010 | Ebert et al. |
| 7,672,756 B2 | 3/2010 | Breed |
| 7,693,626 B2 | 4/2010 | Breed et al. |
| 7,706,937 B2 | 4/2010 | Hasegawa et al. |
| 7,715,961 B1 | 5/2010 | Kargupta |
| 7,734,390 B2 | 6/2010 | Chen |
| 7,737,857 B2 | 6/2010 | Ebert et al. |
| 7,760,080 B2 | 7/2010 | Breed et al. |
| 7,782,208 B2 | 8/2010 | Kennedy |
| 7,786,864 B1 | 8/2010 | Shostak et al. |
| 7,797,104 B2 | 9/2010 | Finn et al. |
| 7,880,594 B2 | 2/2011 | Breed et al. |
| 7,889,096 B2 | 2/2011 | Breed |
| 7,969,306 B2 | 6/2011 | Ebert et al. |
| 8,036,788 B2 | 10/2011 | Breed |
| 8,108,321 B2 | 1/2012 | Neal et al. |
| 8,131,301 B1 | 3/2012 | Ahmed et al. |
| 8,179,257 B2 | 5/2012 | Allen, Jr. et al. |
| 8,326,315 B2 | 12/2012 | Phillips et al. |
| 8,406,757 B1 | 3/2013 | Singh et al. |
| 8,442,682 B2 | 5/2013 | Wagner |
| 8,447,804 B2 | 5/2013 | Bai et al. |
| 8,510,043 B1 | 8/2013 | Whiton et al. |
| 8,511,606 B1 | 8/2013 | Lutke et al. |
| 8,515,580 B2 | 8/2013 | Taylor et al. |
| 8,571,781 B2 | 10/2013 | Bernstein et al. |
| 8,599,023 B2 | 12/2013 | Leggett, Jr. et al. |
| 8,639,543 B2 | 1/2014 | Boss et al. |
| 8,645,189 B2 | 2/2014 | Lyle |
| 8,670,933 B2 | 3/2014 | Schenken et al. |
| 8,686,841 B2 | 4/2014 | Macheca et al. |
| 8,738,423 B2 | 5/2014 | Lyle |
| 8,794,564 B2 | 8/2014 | Hutson |
| 8,897,953 B2 | 11/2014 | Olse et al. |
| 8,899,903 B1 | 12/2014 | Saad et al. |
| 8,909,391 B1 | 12/2014 | Peeters et al. |
| 8,930,044 B1 | 1/2015 | Peeters et al. |
| 8,948,935 B1 | 2/2015 | Peeters et al. |
| 8,950,698 B1 | 2/2015 | Rossi |
| 8,973,814 B2 | 3/2015 | Wilke et al. |
| 8,983,682 B1 | 3/2015 | Peeters et al. |
| 8,989,922 B2 | 3/2015 | Jones et al. |
| 9,004,396 B1 | 4/2015 | Colin et al. |
| 9,051,043 B1 | 6/2015 | Peeters et al. |
| 9,056,676 B1 | 6/2015 | Wang |
| 9,082,100 B2 | 7/2015 | Hurley et al. |
| 9,087,451 B1 | 7/2015 | Jarrell |
| 9,109,904 B2 | 8/2015 | Forstall et al. |
| 9,125,987 B2 | 9/2015 | Levien et al. |
| 9,139,310 B1 | 9/2015 | Wang |
| 9,146,557 B1 | 9/2015 | Ahmed et al. |
| 9,147,173 B2 | 9/2015 | Jones et al. |
| 9,147,260 B2 | 9/2015 | Hampapur et al. |

(56) References Cited

U.S. PATENT DOCUMENTS

| | | |
|---|---|---|
| 9,164,509 B2 | 10/2015 | Kim et al. |
| 9,170,117 B1 | 10/2015 | Abuelsaad et al. |
| 9,171,340 B2 | 10/2015 | Leggett, Jr. et al. |
| 9,174,733 B1 | 11/2015 | Burgess et al. |
| 9,174,738 B1 | 11/2015 | Roach et al. |
| 9,205,922 B1 | 12/2015 | Bouwer |
| 9,211,025 B1 | 12/2015 | Elhawwashy |
| 9,222,781 B2 | 12/2015 | Schenken et al. |
| 9,235,213 B2 | 1/2016 | Villamar |
| 9,244,147 B1 | 1/2016 | Soundararajan et al. |
| 9,245,183 B2 | 1/2016 | Haas et al. |
| 9,254,363 B2 | 2/2016 | Levien et al. |
| 9,256,852 B1 | 2/2016 | Myllymaki |
| 9,260,244 B1 | 2/2016 | Cohn |
| 9,262,929 B1 | 2/2016 | Roy et al. |
| 9,272,743 B2 | 3/2016 | Thielman |
| 9,273,981 B1 | 3/2016 | Downey et al. |
| 9,280,038 B1 | 3/2016 | Pan et al. |
| 9,284,062 B2 | 3/2016 | Wang |
| 9,310,518 B2 | 4/2016 | Haas et al. |
| 9,311,820 B2 | 4/2016 | Batla et al. |
| 9,317,659 B2 | 4/2016 | Balinski et al. |
| 9,321,531 B1 | 4/2016 | Takayama et al. |
| 9,323,895 B2 | 4/2016 | Balinski et al. |
| 9,346,547 B2 | 5/2016 | Patrick et al. |
| 9,354,296 B2 | 5/2016 | Ubhi et al. |
| 9,359,074 B2 | 6/2016 | Ganesh et al. |
| 9,363,008 B2 | 6/2016 | Boss et al. |
| 9,373,136 B2 | 6/2016 | Leggett et al. |
| 9,373,149 B2 | 6/2016 | Abhyanker |
| 9,376,208 B1 | 6/2016 | Gentry |
| 9,377,781 B1 | 6/2016 | Lee et al. |
| 9,384,668 B2 | 7/2016 | Raptopoulos et al. |
| 9,387,927 B2 | 7/2016 | Rischmuller et al. |
| 9,387,928 B1 | 7/2016 | Gentry et al. |
| 9,405,292 B2 | 8/2016 | Nagasawa |
| 9,412,279 B2 | 8/2016 | Kantor et al. |
| 9,412,280 B1 | 8/2016 | Zwillinger et al. |
| 9,420,562 B1 | 8/2016 | Cai et al. |
| 9,421,869 B1 | 8/2016 | Ananthanarayanan et al. |
| 9,421,972 B1 | 8/2016 | Davidsson et al. |
| 9,422,139 B1 | 8/2016 | Bialkowski et al. |
| 9,447,448 B1 | 9/2016 | Kozloski et al. |
| 9,448,562 B1 | 9/2016 | Sirang et al. |
| 9,452,820 B1 | 9/2016 | Wirth |
| 9,454,151 B2 | 9/2016 | Srivastava et al. |
| 9,454,157 B1 | 9/2016 | Hafeez et al. |
| 9,459,620 B1 | 10/2016 | Schatfalitzky |
| 9,459,622 B2 | 10/2016 | Abhyanker |
| 9,460,616 B1 | 10/2016 | Miyahira et al. |
| 9,463,875 B2 | 10/2016 | Abuelsaad et al. |
| 9,466,154 B2 | 10/2016 | Akselrod et al. |
| 9,467,839 B1 | 10/2016 | Nishimura et al. |
| 9,471,062 B1 | 10/2016 | Theobald |
| 9,471,064 B1 | 10/2016 | Boland et al. |
| 9,472,027 B2 | 10/2016 | Akselrod et al. |
| 9,481,458 B2 | 11/2016 | Casado Magana et al. |
| 9,481,460 B1 | 11/2016 | Kozloski et al. |
| 9,488,979 B1 | 11/2016 | Chambers et al. |
| 9,489,852 B1 | 11/2016 | Chambers et al. |
| 9,494,937 B2 | 11/2016 | Siegel et al. |
| 9,510,316 B2 | 11/2016 | Skaaksrud |
| 9,513,136 B2 | 12/2016 | Santilli et al. |
| 9,523,986 B1 | 12/2016 | Abebe et al. |
| 9,534,917 B2 | 1/2017 | Abuelsaad et al. |
| 9,561,852 B1 | 2/2017 | Beaman et al. |
| 9,567,081 B1 | 2/2017 | Beckman et al. |
| 9,576,482 B2 | 2/2017 | Yamamoto |
| 9,582,719 B2 | 2/2017 | Haas et al. |
| 9,584,977 B2 | 2/2017 | Yamamoto |
| 9,593,806 B2 | 3/2017 | Allen, Jr. et al. |
| 9,600,997 B1 | 3/2017 | Abrahams et al. |
| 9,613,274 B2 | 4/2017 | Stevens et al. |
| 9,623,969 B2 | 4/2017 | Nelson |
| 9,629,161 B2 | 4/2017 | Hopkins et al. |
| 9,637,233 B2 | 5/2017 | Bivens et al. |
| 9,646,493 B2 | 5/2017 | Yamamoto |
| 9,651,945 B1 | 5/2017 | Erickson et al. |
| 9,654,928 B2 | 5/2017 | Cai et al. |
| 9,659,502 B1 | 5/2017 | Abebe et al. |
| 9,659,503 B2 | 5/2017 | Gordon et al. |
| 9,665,992 B2 | 5/2017 | Akselrod et al. |
| 9,669,927 B2 | 6/2017 | Hodge et al. |
| 9,699,622 B1 | 7/2017 | Nishimura et al. |
| 9,702,830 B1 | 7/2017 | Akselrod et al. |
| 9,718,564 B1 | 8/2017 | Beckman et al. |
| 9,731,821 B2 | 8/2017 | Hoareau et al. |
| 9,734,684 B2 | 8/2017 | Bryson et al. |
| 9,734,725 B2 | 8/2017 | Gordon et al. |
| 9,773,398 B2 | 9/2017 | Abrahams et al. |
| 9,817,396 B1 * | 11/2017 | Takayama ............ G08G 5/0013 |
| 9,928,749 B2 | 3/2018 | Gil et al. |
| 9,957,048 B2 | 5/2018 | Gil |
| 9,969,495 B2 | 5/2018 | Gil |
| 9,981,745 B2 | 5/2018 | Gil |
| 10,131,428 B1 | 11/2018 | Sopper et al. |
| 10,202,192 B2 | 2/2019 | Gil et al. |
| 10,255,577 B1 | 4/2019 | Steves et al. |
| 10,453,022 B2 | 10/2019 | Gil |
| 10,460,281 B2 | 10/2019 | Gil |
| 10,706,382 B2 | 7/2020 | Gil |
| 10,706,384 B1 | 7/2020 | Bolton et al. |
| 10,730,626 B2 * | 8/2020 | Gil ....................... B64F 1/0299 |
| 10,775,792 B2 | 9/2020 | Cooper |
| 10,796,269 B2 | 10/2020 | Gil et al. |
| 10,860,971 B2 | 12/2020 | Gil et al. |
| 2002/0049535 A1 | 4/2002 | Rigo et al. |
| 2002/0052688 A1 | 5/2002 | Yofu |
| 2002/0165665 A1 | 11/2002 | Kim |
| 2002/0188392 A1 | 12/2002 | Breed et al. |
| 2003/0009270 A1 | 1/2003 | Breed |
| 2003/0020623 A1 | 1/2003 | Cao et al. |
| 2003/0055666 A1 | 3/2003 | Roddy et al. |
| 2003/0065771 A1 | 4/2003 | Cramer et al. |
| 2003/0093199 A1 | 5/2003 | Mavreas |
| 2003/0137426 A1 | 7/2003 | Anthony et al. |
| 2003/0208309 A1 | 11/2003 | Friphathi |
| 2004/0024502 A1 | 2/2004 | Squires et al. |
| 2004/0039509 A1 | 2/2004 | Breed |
| 2004/0044452 A1 | 3/2004 | Bauer et al. |
| 2004/0078125 A1 | 4/2004 | Woodard et al. |
| 2004/0130442 A1 | 7/2004 | Breed et al. |
| 2004/0152485 A1 | 8/2004 | Deeds |
| 2004/0158398 A1 | 8/2004 | Chen et al. |
| 2004/0167689 A1 | 8/2004 | Bromley et al. |
| 2004/0174264 A1 | 9/2004 | Reisman et al. |
| 2004/0215382 A1 | 10/2004 | Breed et al. |
| 2004/0243430 A1 | 12/2004 | Horstemeyer |
| 2004/0249519 A1 | 12/2004 | Frink |
| 2005/0038581 A1 | 2/2005 | Kapolka et al. |
| 2005/0051623 A1 | 3/2005 | Okuda et al. |
| 2005/0082421 A1 | 4/2005 | Perlo et al. |
| 2005/0101268 A1 | 5/2005 | Radosta et al. |
| 2005/0107993 A1 | 5/2005 | Cuthbert et al. |
| 2005/0125117 A1 | 6/2005 | Breed |
| 2005/0137789 A1 | 6/2005 | Furukawa |
| 2005/0192727 A1 | 9/2005 | Shostak et al. |
| 2005/0222723 A1 | 10/2005 | Estes et al. |
| 2005/0273218 A1 | 12/2005 | Breed et al. |
| 2006/0015503 A1 | 1/2006 | Simons et al. |
| 2006/0025897 A1 | 2/2006 | Shostak et al. |
| 2006/0031042 A1 | 2/2006 | Ogura et al. |
| 2006/0055564 A1 | 3/2006 | Olsen et al. |
| 2006/0069473 A1 | 3/2006 | Sumcad et al. |
| 2006/0142934 A1 | 6/2006 | Kim |
| 2006/0180371 A1 | 8/2006 | Breed et al. |
| 2006/0212193 A1 | 9/2006 | Breed |
| 2006/0212194 A1 | 9/2006 | Breed |
| 2006/0235739 A1 | 10/2006 | Levis et al. |
| 2006/0243043 A1 | 11/2006 | Breed |
| 2006/0244581 A1 | 11/2006 | Breed et al. |
| 2006/0270421 A1 | 11/2006 | Phillips et al. |
| 2006/0271246 A1 | 11/2006 | Bell et al. |
| 2006/0284839 A1 | 12/2006 | Breed et al. |

(56) References Cited

U.S. PATENT DOCUMENTS

| | | |
|---|---|---|
| 2007/0005202 A1 | 1/2007 | Breed |
| 2007/0057781 A1 | 3/2007 | Breed |
| 2007/0060084 A1 | 3/2007 | Thompson et al. |
| 2007/0075919 A1 | 4/2007 | Breed |
| 2007/0096565 A1 | 5/2007 | Breed et al. |
| 2007/0103284 A1 | 5/2007 | Chew et al. |
| 2007/0124040 A1 | 5/2007 | Chen |
| 2007/0126561 A1 | 6/2007 | Breed |
| 2007/0139216 A1 | 6/2007 | Breed |
| 2007/0156312 A1 | 7/2007 | Breed et al. |
| 2007/0173991 A1 | 7/2007 | Tenzer et al. |
| 2007/0174004 A1 | 7/2007 | Tenzer et al. |
| 2007/0205881 A1 | 9/2007 | Breed |
| 2007/0239346 A1 | 10/2007 | Hawkins et al. |
| 2007/0250264 A1 | 10/2007 | Sekine et al. |
| 2007/0271014 A1 | 11/2007 | Breed |
| 2007/0299587 A1 | 12/2007 | Breed et al. |
| 2008/0004764 A1 | 1/2008 | Chinnadurai et al. |
| 2008/0021604 A1 | 1/2008 | Bouvier et al. |
| 2008/0021642 A1 | 1/2008 | Furukawa |
| 2008/0032666 A1 | 2/2008 | Hughes et al. |
| 2008/0040005 A1 | 2/2008 | Breed |
| 2008/0042410 A1 | 2/2008 | Breed et al. |
| 2008/0046149 A1 | 2/2008 | Breed |
| 2008/0065290 A1 | 3/2008 | Breed et al. |
| 2008/0086240 A1 | 4/2008 | Breed |
| 2008/0114502 A1 | 5/2008 | Breed et al. |
| 2008/0129475 A1 | 6/2008 | Breed et al. |
| 2008/0140278 A1 | 6/2008 | Breed |
| 2008/0147265 A1 | 6/2008 | Breed |
| 2008/0147271 A1 | 6/2008 | Breed |
| 2008/0154458 A1 | 6/2008 | Brandstetter et al. |
| 2008/0161989 A1 | 7/2008 | Breed |
| 2008/0162034 A1 | 7/2008 | Breen |
| 2008/0174485 A1 | 7/2008 | Carani et al. |
| 2008/0214235 A1 | 9/2008 | Sagou et al. |
| 2008/0216567 A1 | 9/2008 | Breed |
| 2008/0221776 A1 | 9/2008 | McClellan |
| 2008/0284575 A1 | 11/2008 | Breed |
| 2008/0291022 A1 | 11/2008 | Amador et al. |
| 2009/0030999 A1 | 1/2009 | Gatzke et al. |
| 2009/0043441 A1 | 2/2009 | Breed |
| 2009/0051566 A1 | 2/2009 | Olsen et al. |
| 2009/0055045 A1 | 2/2009 | Biswas et al. |
| 2009/0100031 A1 | 4/2009 | Gilligan et al. |
| 2009/0102638 A1 | 4/2009 | Olsen et al. |
| 2009/0191849 A1 | 7/2009 | Fioretti et al. |
| 2009/0197584 A1 | 8/2009 | Snow et al. |
| 2009/0232358 A1 | 9/2009 | Cross |
| 2009/0243925 A1 | 10/2009 | Kellermeier et al. |
| 2009/0259358 A1 | 10/2009 | Andreasen |
| 2009/0271722 A1 | 10/2009 | Park |
| 2010/0009712 A1 | 1/2010 | Kodama |
| 2010/0023203 A1 | 1/2010 | Shibi |
| 2010/0030466 A1 | 2/2010 | Rogers et al. |
| 2010/0094688 A1 | 4/2010 | Olsen et al. |
| 2010/0094769 A1 | 4/2010 | Davidson et al. |
| 2010/0100315 A1 | 4/2010 | Davidson et al. |
| 2010/0100507 A1 | 4/2010 | Davidson et al. |
| 2010/0138701 A1 | 6/2010 | Costantino |
| 2010/0148947 A1 | 6/2010 | Morgan et al. |
| 2010/0174446 A1 | 7/2010 | Andreasen et al. |
| 2010/0207754 A1 | 8/2010 | Shostak et al. |
| 2010/0217480 A1 | 8/2010 | Link, II |
| 2010/0289644 A1 | 11/2010 | Slavin et al. |
| 2011/0025496 A1 | 2/2011 | Cova et al. |
| 2011/0084162 A1 | 4/2011 | Goossen et al. |
| 2011/0106362 A1 | 5/2011 | Seitz |
| 2011/0118932 A1 | 5/2011 | Singh et al. |
| 2011/0153645 A1 | 6/2011 | Hoover et al. |
| 2011/0224898 A1 | 9/2011 | Scofield et al. |
| 2011/0294521 A1 | 12/2011 | Freathy et al. |
| 2012/0030133 A1 | 2/2012 | Rademaker |
| 2012/0091259 A1 | 4/2012 | Morris et al. |
| 2012/0104151 A1 | 5/2012 | Mccann |
| 2012/0136743 A1 | 5/2012 | Mcquade et al. |
| 2012/0154579 A1 | 6/2012 | Hampapur et al. |
| 2012/0232743 A1 | 9/2012 | Singh |
| 2012/0239243 A1 | 9/2012 | Medwin et al. |
| 2012/0253548 A1 | 10/2012 | Davidson |
| 2012/0257519 A1 | 10/2012 | Frank et al. |
| 2013/0059626 A1 | 3/2013 | Hopkins et al. |
| 2013/0231130 A1 | 9/2013 | Cherian et al. |
| 2013/0240673 A1 | 9/2013 | Schlosser et al. |
| 2013/0304349 A1 | 11/2013 | Davidson |
| 2013/0325320 A1 | 12/2013 | Dimitriadis |
| 2013/0331127 A1 | 12/2013 | Sabatelli et al. |
| 2013/0345961 A1 | 12/2013 | Leader et al. |
| 2014/0032034 A1 | 1/2014 | Raptopoulos et al. |
| 2014/0061376 A1 | 3/2014 | Fisher et al. |
| 2014/0110527 A1 | 4/2014 | Sing |
| 2014/0121959 A1 | 5/2014 | Hurley et al. |
| 2014/0128103 A1 | 5/2014 | Joao et al. |
| 2014/0129059 A1 | 5/2014 | Scarlatti et al. |
| 2014/0143171 A1 | 5/2014 | Hurley et al. |
| 2014/0149244 A1 | 5/2014 | Abhyanker |
| 2014/0150806 A1 | 6/2014 | Hu et al. |
| 2014/0172194 A1 | 6/2014 | Levien et al. |
| 2014/0180914 A1 | 6/2014 | Abhyanker |
| 2014/0192667 A1 | 7/2014 | Kalapatapu et al. |
| 2014/0192737 A1 | 7/2014 | Belghoul et al. |
| 2014/0206400 A1 | 7/2014 | De Vries |
| 2014/0217230 A1 | 8/2014 | Helou, Jr. |
| 2014/0254896 A1 | 9/2014 | Zhou et al. |
| 2014/0280865 A1 | 9/2014 | Albertson et al. |
| 2014/0316243 A1 | 10/2014 | Niedermeyer |
| 2014/0358437 A1 | 12/2014 | Fletcher |
| 2014/0372025 A1 | 12/2014 | Yoshida |
| 2015/0006005 A1 | 1/2015 | Yu et al. |
| 2015/0012154 A1 | 1/2015 | Senkel et al. |
| 2015/0081587 A1 | 3/2015 | Gillen |
| 2015/0120094 A1 | 4/2015 | Kimchi et al. |
| 2015/0154540 A1 | 6/2015 | Skaaksrud |
| 2015/0154559 A1 | 6/2015 | Barbush et al. |
| 2015/0158599 A1 | 6/2015 | Sisko |
| 2015/0178649 A1 | 6/2015 | Furman et al. |
| 2015/0183528 A1 | 7/2015 | Walsh et al. |
| 2015/0189655 A1 | 7/2015 | Hopkins et al. |
| 2015/0259078 A1 | 9/2015 | Filipovic et al. |
| 2015/0284076 A1 | 10/2015 | Cacciaguera |
| 2015/0284079 A1 | 10/2015 | Matsuda |
| 2015/0286216 A1 | 10/2015 | Miwa |
| 2015/0305077 A1 | 10/2015 | Johnsson et al. |
| 2015/0307191 A1 | 10/2015 | Samuel et al. |
| 2015/0323932 A1 | 11/2015 | Paduano et al. |
| 2015/0336667 A1 | 11/2015 | Srivastava et al. |
| 2015/0360777 A1 | 12/2015 | Mottale |
| 2015/0363843 A1 | 12/2015 | Loppatto et al. |
| 2015/0370251 A1 | 12/2015 | Siegel et al. |
| 2015/0375398 A1 | 12/2015 | Penn et al. |
| 2016/0003637 A1 | 1/2016 | Andersen |
| 2016/0009392 A1 | 1/2016 | Korhonen et al. |
| 2016/0011592 A1 | 1/2016 | Zhang et al. |
| 2016/0016652 A1 | 1/2016 | Barrett |
| 2016/0016664 A1 | 1/2016 | Basuni |
| 2016/0023743 A1 | 1/2016 | Barrett |
| 2016/0027307 A1 | 1/2016 | Abhyanker et al. |
| 2016/0033966 A1 | 2/2016 | Farris et al. |
| 2016/0039541 A1 | 2/2016 | Beardsley et al. |
| 2016/0068264 A1 | 3/2016 | Ganesh et al. |
| 2016/0068265 A1 | 3/2016 | Hoareau et al. |
| 2016/0083110 A1 | 3/2016 | Pan et al. |
| 2016/0086494 A1 | 3/2016 | Anandayuvaraj et al. |
| 2016/0096622 A1 | 4/2016 | Richardson |
| 2016/0101874 A1 | 4/2016 | Mckinnon et al. |
| 2016/0107750 A1 | 4/2016 | Yates |
| 2016/0114887 A1 | 4/2016 | Zhou et al. |
| 2016/0115702 A1 | 4/2016 | Nordbruch et al. |
| 2016/0130000 A1 | 5/2016 | Rimanelli |
| 2016/0137293 A1 | 5/2016 | Santangelo |
| 2016/0137304 A1 | 5/2016 | Phan et al. |
| 2016/0137311 A1 | 5/2016 | Peverill et al. |
| 2016/0140496 A1 | 5/2016 | Simms et al. |
| 2016/0140851 A1 | 5/2016 | Levy et al. |

(56) References Cited

U.S. PATENT DOCUMENTS

| | | | |
|---|---|---|---|
| 2016/0144734 A1 | 5/2016 | Wang et al. |
| 2016/0144982 A1 | 5/2016 | Sugumaran |
| 2016/0157653 A1 | 6/2016 | Manitta |
| 2016/0159472 A1 | 6/2016 | Chan et al. |
| 2016/0163205 A1 | 6/2016 | Jenkins |
| 2016/0167778 A1 | 6/2016 | Meringer et al. |
| 2016/0178803 A1 | 6/2016 | Haas et al. |
| 2016/0185466 A1 | 6/2016 | Dreano, Jr. |
| 2016/0189101 A1 | 6/2016 | Kantor et al. |
| 2016/0189549 A1 | 6/2016 | Marcus |
| 2016/0191142 A1 | 6/2016 | Boss et al. |
| 2016/0196756 A1 | 7/2016 | Prakash et al. |
| 2016/0200207 A1 | 7/2016 | Lee et al. |
| 2016/0200438 A1 | 7/2016 | Bokeno et al. |
| 2016/0207627 A1 | 7/2016 | Hoareau et al. |
| 2016/0209839 A1 | 7/2016 | Hoareau et al. |
| 2016/0214713 A1 | 7/2016 | Cragg |
| 2016/0214714 A1 | 7/2016 | Sekelsky |
| 2016/0214717 A1 | 7/2016 | De Silva |
| 2016/0221186 A1 | 8/2016 | Perrone |
| 2016/0221683 A1 | 8/2016 | Roberts et al. |
| 2016/0225263 A1 | 8/2016 | Salentiny et al. |
| 2016/0229299 A1 | 8/2016 | Streett |
| 2016/0229534 A1 | 8/2016 | Hutson |
| 2016/0239798 A1 | 8/2016 | Borley et al. |
| 2016/0244162 A1 | 8/2016 | Weller |
| 2016/0244187 A1 | 8/2016 | Byers et al. |
| 2016/0253908 A1 | 9/2016 | Chambers et al. |
| 2016/0257401 A1 | 9/2016 | Buchmueller et al. |
| 2016/0257423 A1 | 9/2016 | Martin |
| 2016/0257424 A1 | 9/2016 | Stabler et al. |
| 2016/0257426 A1 | 9/2016 | Mozer |
| 2016/0272308 A1 | 9/2016 | Gentry |
| 2016/0272312 A1 | 9/2016 | Mallard |
| 2016/0272316 A1 | 9/2016 | Nelson |
| 2016/0280075 A1 | 9/2016 | McCrady |
| 2016/0280371 A1 | 9/2016 | Canavor et al. |
| 2016/0297521 A1 | 10/2016 | Cheatham et al. |
| 2016/0300493 A1 | 10/2016 | Ubhi et al. |
| 2016/0300496 A1 | 10/2016 | Cheatham et al. |
| 2016/0304198 A1 | 10/2016 | Jourdan |
| 2016/0304217 A1 | 10/2016 | Fisher et al. |
| 2016/0306355 A1 | 10/2016 | Gordon et al. |
| 2016/0307449 A1 | 10/2016 | Gordon et al. |
| 2016/0311529 A1 | 10/2016 | Brotherton-Ratclitfe et al. |
| 2016/0320773 A1 | 11/2016 | Skaaksrud |
| 2016/0325835 A1 | 11/2016 | Abuelsaad et al. |
| 2016/0364989 A1 | 12/2016 | Speasl et al. |
| 2016/0376004 A1 | 12/2016 | Claridge et al. |
| 2017/0025022 A1 | 1/2017 | Henry et al. |
| 2017/0081043 A1 | 3/2017 | Jones et al. |
| 2017/0084159 A1 | 3/2017 | Cai et al. |
| 2017/0096222 A1 | 4/2017 | Spinelli et al. |
| 2017/0121023 A1 | 5/2017 | High et al. |
| 2017/0129603 A1 | 5/2017 | Raptopoulos et al. |
| 2017/0132558 A1 | 5/2017 | Perez |
| 2017/0132562 A1 | 5/2017 | High et al. |
| 2017/0140655 A1 | 5/2017 | Erickson et al. |
| 2017/0160752 A1 | 6/2017 | Boland et al. |
| 2017/0176194 A1 | 6/2017 | Gordon et al. |
| 2017/0178500 A1 | 6/2017 | Miyahira et al. |
| 2017/0178501 A1 | 6/2017 | Miyahira et al. |
| 2017/0188545 A1 | 7/2017 | Bivens et al. |
| 2017/0190422 A1 | 7/2017 | Beaman et al. |
| 2017/0213084 A1 | 7/2017 | Akselrod et al. |
| 2017/0213455 A1 | 7/2017 | Yamamoto |
| 2017/0280678 A1 | 10/2017 | Jones et al. |
| 2017/0308850 A1 | 10/2017 | Roush et al. |
| 2017/0313421 A1 | 11/2017 | Gil |
| 2017/0313422 A1 | 11/2017 | Gil |
| 2017/0316375 A1 | 11/2017 | Gil |
| 2017/0316699 A1 | 11/2017 | Gil et al. |
| 2017/0316701 A1* | 11/2017 | Gil ................... G08G 5/0069 |
| 2017/0337510 A1 | 11/2017 | Shroff et al. |
| 2017/0337511 A1 | 11/2017 | Shroff et al. |
| 2018/0111683 A1 | 4/2018 | Di Benedetto et al. |
| 2018/0130017 A1* | 5/2018 | Gupte ................... G01N 33/00 |
| 2018/0155030 A1 | 6/2018 | Gil |
| 2018/0155032 A1 | 6/2018 | Gil et al. |
| 2018/0349840 A1 | 12/2018 | Gil et al. |
| 2018/0356823 A1 | 12/2018 | Cooper |
| 2019/0161190 A1 | 5/2019 | Gil et al. |

FOREIGN PATENT DOCUMENTS

| | | |
|---|---|---|
| CN | 104843408 A | 8/2015 |
| CN | 105008747 A | 10/2015 |
| CN | 204688411 U | 10/2015 |
| CN | 105015799 A | 11/2015 |
| CN | 105069595 A | 11/2015 |
| CN | 105314102 A | 2/2016 |
| CN | 105438472 A | 3/2016 |
| CN | 105508499 A | 4/2016 |
| CN | 105658519 A | 6/2016 |
| CN | 106163459 A | 11/2016 |
| CN | 205991133 U | 3/2017 |
| CN | 106576383 A | 4/2017 |
| DE | 112011103690 T5 | 9/2013 |
| EP | 1788495 A1 | 5/2007 |
| GB | 2530626 A | 3/2016 |
| GB | 2500839 B | 4/2017 |
| JP | 6095018 B2 | 3/2017 |
| KR | 10-2010-0022828 A | 3/2010 |
| WO | 2005/098282 A1 | 10/2005 |
| WO | 2010/027469 A1 | 3/2010 |
| WO | 2015/061008 A1 | 4/2015 |
| WO | 2015/076886 A2 | 5/2015 |
| WO | 2016/140988 A1 | 9/2016 |
| WO | 2016/203385 A1 | 12/2016 |
| WO | 2018/065977 A1 | 4/2018 |

OTHER PUBLICATIONS

Non-Final Office Action received for U.S. Appl. No. 15/870,180, dated Feb. 5, 2021, 20 pages.

Allen, David, "Fire Hydrant Maintenance Using GPS and GIS", Proceedings of the 19th Annual ERSI User Conference, Available online at: <http://proceedings.esri.com-library>, Accessed on Sep. 7, 2010, 5 pages.

"Bearing Straight", Forbes.com, Available online at: <http://www.forbes.com-forbes-life-magazine/1998/0504/096_print.html>, Accessed on Sep. 3, 2010, 3 pages.

Brusnighan et al., "Orientation Aid Implementing The Global Positioning System", Division of Rehabilitation, University of Illinois, IEEE, 1989, pp. 33-34.

"Car-Cameras-Mobile-Vehicle-Camera-Systems", Available online at: <http://www.spytechs.com/Car-Cameras/default.htm>, Aug. 12, 2011, 4 pages.

Ciulla, Vincent T., "Auto Repair: Flash Codes", Available online at: <http://autorepair.about.com/library/glossary/bldef-228.htm>, Accessed on Jun. 27, 2011, 1 page.

Davidson et al., "Unpublished U.S. Appl. No. 14/335,472, filed Jul. 18, 2014, titled "Systems and Methods for Service Notifications"", 63 pages.

Doherty et al., "Moving Beyond Observed Outcomes: Integrating Global Positioning Systems and Interactive Computer-Based Travel Behavior Surveys", Transportation Research Circular: Personal Travel: The Long and Short of it, Transportation Research Board, National Research Council, Washington, 1999, 15 pages.

Gerke et al., "Case Construction for Mining Supply Chain Processes", Springer, Berlin, Heidelberg, Available online at: <https://rd.springer.com/chapter/10.1007/978-3-642-01190-0_16>, 2009, pp. 181-192.

"In-Vehicle-Dash-Camera-Recording-System", Available online at: <http://www.truckercam.com/>, Accessed on Aug. 12, 2011, 1 page.

"Informal Summary of the Results of the First Phase of the ORION Validity Search", 2 pages.

"J1587 Protocol Stack Overview", Simma Software, Internet Archive, Available online at: <web.archive.org/web/20090419231206/http://lwww.simmasoftware.com/j1587.html>, Accessed on Apr. 19, 2009, 1 page.

(56) References Cited

OTHER PUBLICATIONS

LaPierre, Charles M., "Personal Navigation System for the Visually Impaired", A thesis submitted to the Faculty of Graduate Studies and Research in partial fulfillment of the requirements for the degree of Master of Engineering, Sep. 3, 1998, 30 pages.
Marmasse et al., "Location-aware information delivery with com-Motion", HUG 2000 Proceedings, MIT Media Laboratory, Springer-Verlag, 2000, pp. 157-171.
McNally, et al., "TRACER: In-vehicle, GPS-based, Wireless Technology for Traffic Surveillance and Management", University of California, Irvine, Jul. 2003, 80 pages.
"On-Board Diagnostics", Wikipedia, Available online at: <http://en.wikipedia.org/wiki/On-board_diagnostics>, Accessed on Jun. 24, 2011, 10 pages.
Phatak, Makarand, "Where on Earth am I? Don't Worry, GPS Satellites will Guide you", Resonance, vol. 3, No. 8, Sep. 1998, pp. 14-25.
Rogers et al., "Personalization of the Automotive Information Environment", Daimler-Benz Research and Technology Center and Computational Learning Laboratory, 1997, 6 pages.
"SAE International", Wikipedia, Available online at: <http://en.wikipedia.org/wiki/SAE_International>, Accessed on Jun. 24, 2011, 5 pages.
"SAE J 1857-2003 (SAE J1857-2003) Flywheel Dimensions for Truck and Bus Applications", American National Standards Institute, Standards Store, Available online at: <http://webstore.ansi.org/RecordDetail.aspx?sku=SAE+J+1857-2003+(SAE+J1857-2003)>, Accessed on Jun. 24, 2011, 1 page.
Shin et al., "1-1-9 Caller Location Information System", Proceedings of the 19th Annual ERSI User Conference, Available online at: <http://proceedings.esri.com-library>, Accessed on Sep. 3, 2010, 9 pages.
Staff, "Oil Lasts Longer in Diesels, Thanks to Novel Viscosity Sensor", MachineDesign.com, Available online at: <http://machinedesign.com/article/oil-lasts-longer-in-diesels-thanks-to-novel-viscosity-sensor-1214>, Dec. 14, 2006, pp. 1-3.
Stanfford et al., "A Handheld Data Logger with Integral GPS for Producing Weed Maps by Field Walking", Computers and Electronics in Agriculture 14, 1996, pp. 235-247.
"Telematics", Wikipedia, Available online at: <http://en.wikipedia.org/wiki/Telematics>, Accessed on Jun. 28, 2011, 6 pages.
LaPierre, Charles M., "Personal Navigation System for the Visually Impaired", Department of Electronics, Faculty at Engineering Carleton University, Senior Project, Sep. 3, 1998, 30 pages.
Non-Final Office Action received for U.S. Appl. No. 15/870,180, dated Feb. 7, 2022, 19 pages.
Non-Final Office Action received for U.S. Appl. No. 16/921,454, dated Mar. 11, 2022, 11 pages.
Notice of Allowance received for Chinese Patent Application No. 201780026272.0, dated Feb. 9, 2022, 8 pages (3 pages of English Translation and 5 pages of Official Copy).

\* cited by examiner

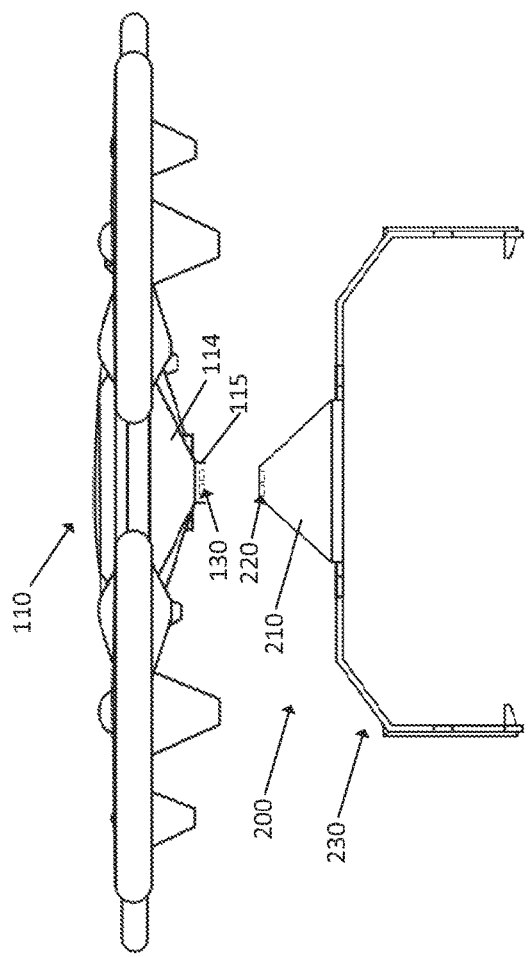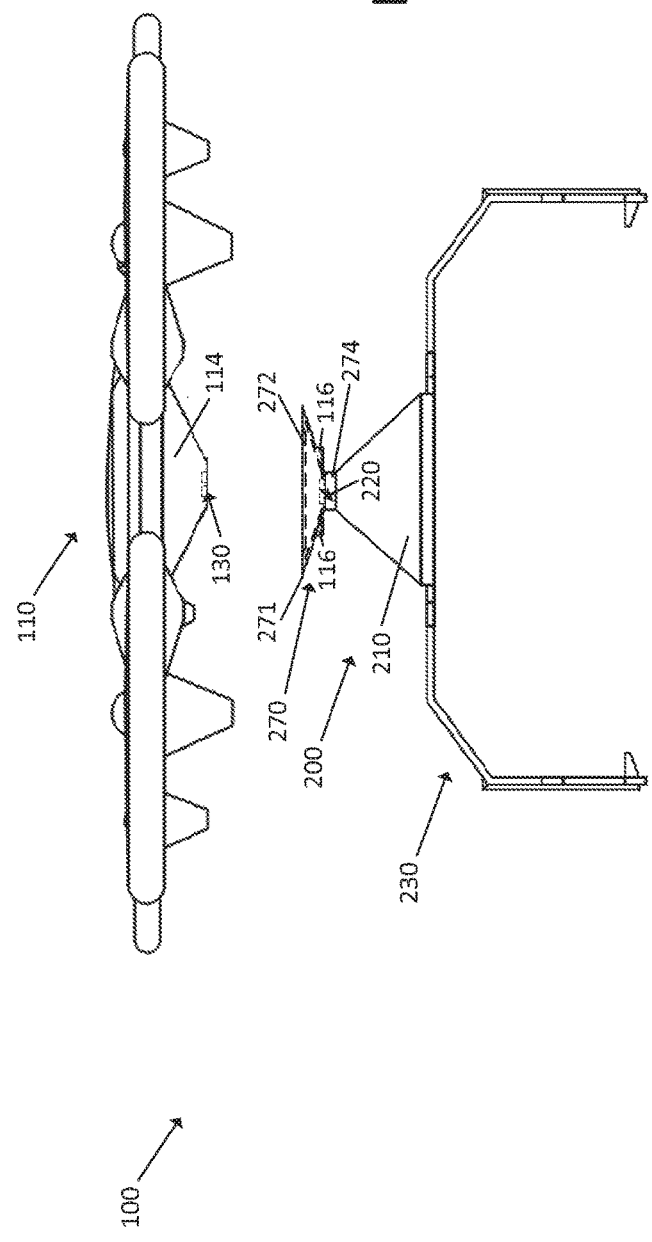

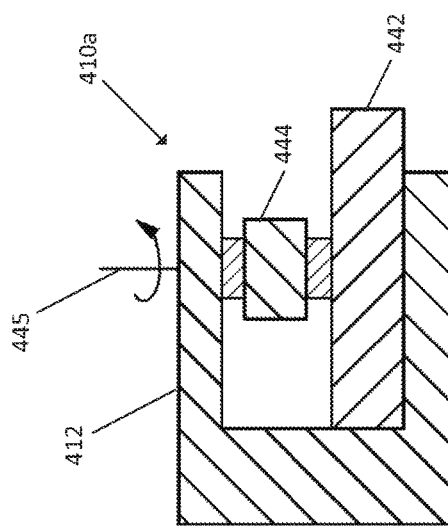
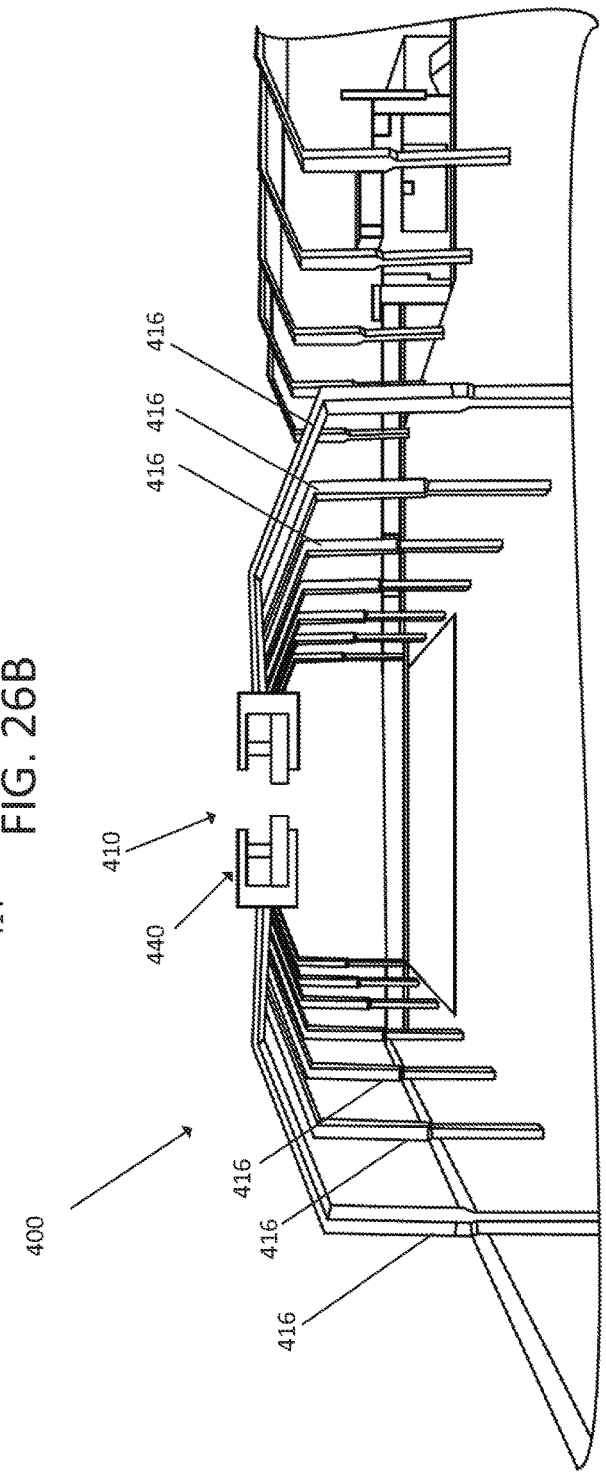
FIG. 26B
FIG. 26A

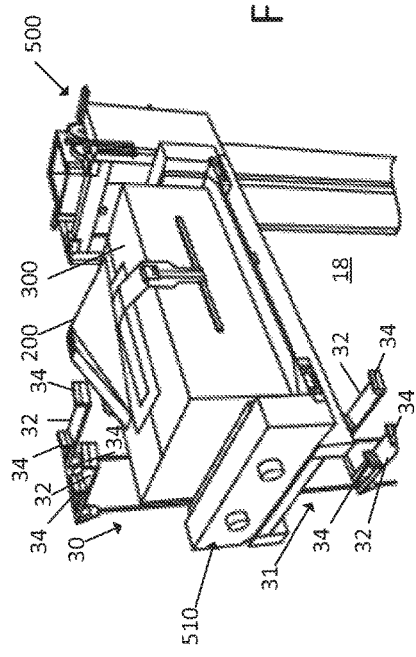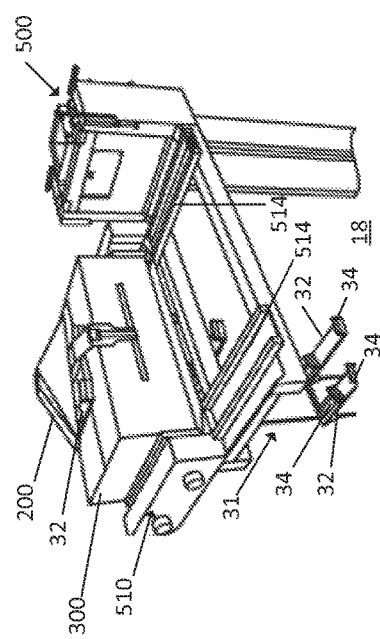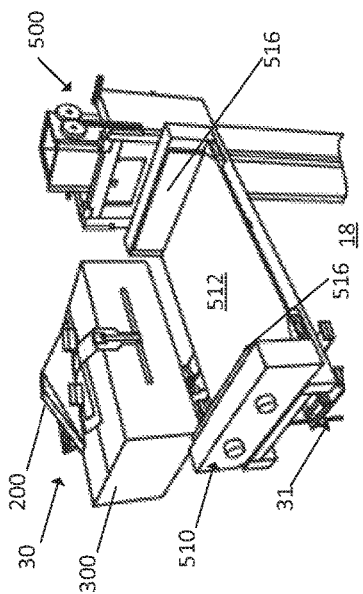

FIG. 67

| UAV ID | LAST FLIGHT HOURS (ACTUAL) | LAST FLIGHT HOURS (PLANNED) | FLIGHT HOURS SINCE LAST SERVICE | FAULT TYPE 1 | FAULT TYPE 2 |
|---|---|---|---|---|---|
| 1001 | 0.5 | 0.3 | 150 | 0 | 0 |
| 1002 | 0.4 | 0.2 | 27 | 0 | 0 |
| 1003 | 0.2 | 0.4 | 198 | 1 | 0 |

METHODS OF PHOTO MATCHING AND PHOTO CONFIRMATION FOR PARCEL PICKUP AND DELIVERY

CROSS REFERENCE TO RELATED APPLICATIONS

The present application is a continuation of co-pending U.S. application Ser. No. 16/233,355, filed on Dec. 27, 2018 and entitled "Methods of Photo Matching and Photo Confirmation for Parcel Pickup and Delivery," which is a continuation-in-part of U.S. application Ser. No. 15/870,187, filed on Jan. 12, 2018 and entitled "Methods for Picking Up a Parcel Via an Unmanned Aerial Vehicle," which is a continuation of U.S. Pat. No. 9,928,749, filed on Apr. 28, 2017 and entitled "Methods for Delivering a Parcel To a Restricted Access Area," which claims the benefit of priority of U.S. Provisional Application No. 62/329,491, filed on Apr. 29, 2016, the contents each of which are hereby incorporated in their entirety by reference.

BACKGROUND

Parcel transportation between an origin and a destination is traditionally a labor-intensive process. For short distance, "local" deliveries, an item (e.g., parcel) may be transported by a delivery person between the origin and the destination. For example, the delivery person may drive a vehicle to transport the item between the origin and the destination, and may ensure that the item is properly picked up and/or delivered according to delivery instructions. For longer-distance deliveries, transportation of an item may involve a number of delivery personnel, who may individually perform one or more steps for picking up an item, sorting the item one or more times, transporting the item from a final sort location to a final delivery destination, and/or delivering the item from the delivery vehicle to the final destination address (e.g., serviceable point). Because of the labor-intensive nature of this process, various attempts have been made to assist carrier personnel by reducing the physical demands required in the transportation and delivery process; however, prior attempts have faced substantial difficulties in ensuring that various aspects of the transportation and delivery process are properly performed. For example, attempts have been made to utilize unmanned vehicles, such as Unmanned Aerial Vehicles (UAVs) to transport items from a final sort location to an intended delivery destination. However, such concepts are generally limited by the effective range of the UAVs, as well as the number of available UAVs that may be utilized to deliver items to locations a substantial distance away from the final sort location.

Accordingly, a need exists for additional systems and methods to assist carrier personnel and thereby reduce the physical demands of the transportation and delivery process.

BRIEF SUMMARY

In one embodiment, a UAV for delivering a parcel includes a UAV chassis including an upper portion having a plurality of propulsion members configured to provide lift to the UAV chassis. The UAV chassis further includes a lower portion positioned below the upper portion in a vertical direction, the lower portion defining an internal cavity. A parcel carrier of the UAV is configured for being selectively coupled to and removed from the UAV chassis, the parcel carrier including an engagement housing configured for being at least partially inserted within the internal cavity of the lower portion of the UAV chassis and thereby secured to the UAV chassis. The parcel carrier has a parcel carrying mechanism coupled to and positioned below the engagement housing, where the parcel carrying mechanism is configured for engaging and holding the parcel.

In another embodiment, a UAV for delivering a parcel includes a UAV chassis including an upper portion including a plurality of propulsion members configured to provide lift to the UAV chassis. The UAV chassis further includes a lower portion positioned below the upper portion in a vertical direction. A parcel carrier is selectively coupled to and removable from the UAV chassis, the parcel carrier including an engagement housing configured for being secured to the lower portion of the UAV chassis. A parcel carrying mechanism of the parcel carrier is coupled to the engagement housing and positioned below the engagement housing, where the parcel carrying mechanism is configured to engage a parcel.

In yet another embodiment, a UAV for delivering a parcel includes a UAV chassis includes a plurality of propulsion members configured to provide lift to the UAV chassis and a UAV electrical interface electrically coupled to the plurality of propulsion members. The UAV further includes a parcel carrier selectively coupled to and removable from the UAV chassis, the parcel carrier including an engagement housing configured for being secured to the UAV chassis. The engagement housing includes a carrier electrical interface configured for being electrically coupled to the UAV electrical interface when the parcel carrier is coupled to the UAV chassis. A parcel carrying mechanism of the parcel carrier is coupled to the engagement housing, where the parcel carrying mechanism is configured to engage a parcel, and a power source of the parcel carrier is electrically coupled to the carrier electrical interface and configured for powering the plurality of propulsion members when the parcel carrier is coupled to the UAV chassis.

In one embodiment, an enhanced parcel delivery system includes a UAV having a UAV chassis including an upper portion and a plurality of propulsion members configured to provide lift to the UAV chassis. The UAV chassis includes a lower portion positioned below the upper portion in a vertical direction, the lower portion defining an internal cavity. A first parcel carrier is selectively coupled to and removable from the UAV chassis, the first parcel carrier including a first engagement housing configured to be at least partially inserted within the internal cavity of the lower portion of the UAV chassis. The first parcel carrier includes a first power source positioned within the first engagement housing and configured to be electrically coupled to the plurality of propulsion members. A first parcel carrying mechanism of the first parcel carrier is coupled to and positioned below the first engagement housing, where the first parcel carrying mechanism is configured to engage a first parcel. The system further includes a second parcel carrier selectively coupled to and removable from the UAV chassis, the second parcel carrier including a second engagement housing configured to be at least partially inserted within the internal cavity of the lower portion of the UAV chassis. The second parcel carrier includes a second power source positioned within the second engagement housing and configured to be electrically coupled to the plurality of propulsion members. A second parcel carrying mechanism of the second parcel carrier is coupled to and positioned below the second engagement housing, where the second parcel carrying mechanism is configured to engage a second parcel.

In another embodiment, a UAV for delivering a parcel includes a UAV chassis including an upper portion having an upper portion width evaluated in a lateral direction, where the upper portion includes a tapered shape such that the upper portion width decreases moving downward along the upper portion in the vertical direction. The UAV chassis includes a plurality of propulsion members configured to provide lift to the UAV chassis and a lower portion positioned below the upper portion in a vertical direction. The lower portion of the UAV chassis includes a lower portion width evaluated in the lateral direction, and the UAV chassis includes a reduced width portion positioned between the upper portion and the lower portion, the reduced width portion having a width evaluated in the lateral direction, where the width of the reduced width portion is less than the upper portion width and the lower portion width. The UAV further includes a parcel carrying mechanism coupled to the lower portion, where the parcel carrying mechanism is configured to engage a parcel.

In yet another embodiment, a UAV for delivering a parcel includes a UAV chassis including an upper portion having an upper portion width evaluated in a lateral direction and a plurality of propulsion members configured to provide lift to the UAV chassis. The UAV chassis further includes a reduced width portion positioned below the upper portion, the reduced width portion having a width evaluated in the lateral direction, where the width of the reduced width portion is less than the upper portion width. A parcel carrier of the UAV is selectively coupled to the UAV chassis, the parcel carrier including an engagement housing selectively coupled to the reduced width portion of the UAV chassis. A parcel carrying mechanism of the parcel carrier is coupled to the engagement housing, where the parcel carrying mechanism is configured to engage a parcel.

In yet another embodiment, an enhanced parcel delivery system for delivering parcels via a UAV includes a UAV support mechanism having a pair of opposing rails extending in a longitudinal direction, where the opposing rails are spaced apart from one another in a lateral direction that is transverse to the longitudinal direction. The opposing rails define a landing region, a takeoff region positioned opposite the landing region, a transport region positioned between the takeoff region and the landing region. The system further includes at least one UAV including a UAV chassis having an upper portion having an upper portion width evaluated in a lateral direction. A lower portion of the UAV chassis is positioned below the upper portion in a vertical direction, the lower portion having a lower portion width evaluated in the lateral direction. A reduced width portion of the UAV chassis is positioned between the upper portion and the lower portion, the reduced width portion having a width evaluated in the lateral direction. The width of the reduced width portion is less than the upper portion width and the lower portion width, and where the reduced width portion is configured to engage the pair of opposing rails of the UAV support mechanism.

In one embodiment, a primary delivery vehicle configured for delivering parcels via a UAV includes an interior compartment, and a roof panel defining a portal, where the interior compartment is accessible through the portal. The vehicle includes a UAV support mechanism positioned on the roof panel of the vehicle and configured for providing a landing surface for the UAV, the UAV support mechanism including a pair of opposing rails extending in a longitudinal direction and positioned above the portal, where the opposing rails are spaced apart from one another in a lateral direction that is transverse to the longitudinal direction. The opposing rails define a landing region, a takeoff region positioned opposite the landing region, and a transport region positioned between the takeoff region and the landing region.

In another embodiment, a primary delivery vehicle configured for delivering parcels via a UAV includes an interior compartment, a roof panel defining a supply portal and a return portal spaced apart from the supply portal, where the interior compartment is accessible through the supply portal and the return portal. The vehicle further includes a UAV support mechanism including a pair of opposing rails extending in a longitudinal direction, where the opposing rails are spaced apart from one another in a lateral direction that is transverse to the longitudinal direction. The opposing rails define a landing region, a supply region positioned over the supply portal of the roof panel, a return region positioned over the return portal of the roof panel, and a transport region positioned between the supply region and the return region.

In yet another embodiment, a primary delivery vehicle configured for delivering parcels via a UAV includes an interior compartment, a roof panel defining a supply portal, where the interior compartment is accessible through the supply portal, a loading robot positioned within the interior compartment. The loading robot includes a robot controller including at least one processor and at least one memory including program code, the at least one memory and the program code configured to, with the processor, cause the loading robot to at least engage a parcel carrier, move the parcel carrier to a supply portal, and engage the parcel carrier with a UAV positioned above the supply portal.

In yet another embodiment, a primary delivery vehicle configured for delivering parcels via a UAV includes an interior compartment, and a roof panel defining a return portal, where the interior compartment is accessible through the return portal. A loading robot is positioned within the interior compartment, the loading robot including a robot controller including at least one processor and at least one memory including program code, the at least one memory and the program code configured to, with the processor, cause the loading robot to at least engage a parcel carrier coupled to a UAV positioned above the return portal, remove the parcel carrier from a UAV chassis of the UAV, move the parcel carrier from the return portal to a rack positioned in the interior compartment, and engage the parcel carrier with the rack of the interior compartment.

In yet another embodiment, a method for loading/unloading a parcel carrier to a UAV includes receiving a parcel to be delivered by a UAV and engaging a parcel carrying mechanism of a parcel carrier with the parcel, the parcel carrying mechanism being configured to engage and secure the parcel to the parcel carrier. The method further includes moving the parcel carrier and parcel toward a UAV chassis of the UAV, and securing an engagement housing of the parcel carrier to the UAV chassis of the UAV, where the engagement housing of the parcel carrier is coupled to and positioned above the parcel carrying mechanism of the parcel carrier.

In one embodiment, a method for loading/unloading a parcel carrier to a UAV includes engaging a parcel with a parcel carrier, the parcel carrier including an engagement housing and a parcel carrying mechanism coupled to and positioned below the engagement housing, where the parcel is engaged with the parcel carrying mechanism. The method further includes moving the parcel carrier toward a UAV chassis positioned on a UAV support mechanism, moving an engagement member of the UAV chassis from an extended position into a retracted position, engaging the engagement housing of the parcel carrier with a UAV chassis. The method further includes moving the engagement member of the UAV chassis from the retracted position into the extended position, securing the engagement housing to the UAV chassis.

In yet another embodiment, a method for delivering parcels via a UAV includes securing a first parcel to a first parcel carrier, and at a loading point, securing the first parcel carrier to a chassis of a UAV for delivery of the first parcel. The method further includes navigating the UAV from the loading point to a serviceable point, and at the serviceable point, releasing the first parcel from a parcel carrying mechanism of the first parcel carrier. The method further includes navigating the UAV from the serviceable point to the loading point, and at the loading point, removing the first parcel carrier from the UAV chassis and securing a second parcel carrier that is coupled to a second parcel to the chassis of the UAV for delivery of the second parcel.

In another embodiment, a method for accessing a restricted access area by a UAV includes electronically storing, by a computing entity of the UAV, an access code associated with a restricted access area, where (a) the restricted access area is at a serviceable point, (b) a user computing entity at the serviceable point is configured to selectively allow access to the restricted access area in response to receipt of the access code, and (c) the UAV includes the UAV computing entity. The method further includes, after navigation of the UAV proximate the restricted access area at the serviceable point, communicating, by the computing entity of the UAV, the access code to the user computing entity, where (a) a parcel is selectively coupled to a UAV chassis of the UAV, and (b) the user computing entity allows entry into the restricted access area responsive to receiving the access code. After the user computing entity allows entry into the restricted access area, the method further includes navigating, by the computing entity of the UAV, the UAV into the restricted access area of the serviceable point.

In yet another embodiment, a UAV computing entity includes at least one processor and at least one memory including program code, the at least one memory and the program code configured to, with the processor, cause the UAV computing entity to at least electronically store an access code associated with a restricted access area, where (a) the restricted access area is at a serviceable point, (b) a user computing entity at the serviceable point is configured to selectively allow access to the restricted access area in response to receipt of the access code, and (c) a UAV includes the UAV computing entity. After navigation of the UAV proximate the restricted access area at the serviceable point, the UAV computing entity is configured to communicate the access code to the user computing entity, where (a) a parcel is selectively coupled to a UAV chassis of the UAV, and (b) the user computing entity allows entry into the restricted access area responsive to receiving the access code. After the user computing entity allows entry into the restricted access area, the UAV computing entity is configured to navigate the UAV into the restricted access area of the serviceable point.

In one embodiment, a method for picking up a parcel via a UAV includes navigating a UAV to a serviceable point, the UAV including a UAV chassis, a parcel carrier coupled to the UAV chassis, the parcel carrier including an engagement housing selectively coupled to the UAV chassis, and parcel carrying arms positioned below the engagement housing. The method further includes detecting a parcel at the serviceable point with a camera of the UAV, navigating the UAV to a position over the parcel and reducing power to propulsion members of the UAV to descend the UAV over the parcel. The method further includes depressing a ground probe of the parcel carrier, engaging the parcel carrying arms of the parcel carrier with the parcel, and navigating the UAV from the serviceable point to a UAV support mechanism.

In another embodiment, a method for picking up a parcel via a UAV includes navigating a UAV to a serviceable point, the UAV including a UAV chassis, a parcel carrier coupled to the UAV chassis, the parcel carrier including an engagement housing selectively coupled to the UAV chassis, and a parcel carrying mechanism positioned below the engagement housing. The method further includes landing the UAV at the serviceable point and turning off propulsion members of the UAV, receiving, via a UAV computing entity, a notification that a parcel is engaged with the engagement housing of the parcel carrier, and engaging the propulsion members of the UAV and navigating the UAV from the serviceable point to a UAV support mechanism.

In yet another embodiment, an enhanced parcel delivery system for delivering parcels via a UAV includes a primary delivery vehicle, a UAV support mechanism coupled to the primary delivery vehicle, the UAV support mechanism configured for supporting one or more UAVs. A plurality of UAVs of the system each include a UAV chassis including a plurality of propulsion members configured to provide lift to the UAV chassis, and a parcel carrier including an engagement housing configured for being secured to the UAV chassis. Each parcel carrier includes a parcel carrying mechanism coupled to and positioned below the engagement housing, where the parcel carrying mechanism is configured for engaging and holding a parcel for delivery.

In yet another embodiment, a method for providing a notification regarding delivery of a parcel by a UAV including after navigating a UAV to a serviceable point, establishing, via a UAV computing entity, a direct communications link between the UAV computing entity and a user computing entity, where (a) a UAV includes the UAV computing entity, a UAV chassis, and a parcel carrier coupled to the UAV chassis, (b) the parcel carrier includes an engagement housing selectively coupled to the UAV chassis, (c) a parcel carrying mechanism is engaged with and securing a parcel to the engagement housing, and (d) the user computing entity is associated with the serviceable point. The method further includes releasing the parcel from the parcel carrying mechanism of the parcel carrier, and after releasing the parcel from the parcel carrying mechanism of the parcel carrier, providing, via the UAV computing entity, a notification to the user computing entity through the direct communications link, where the notification includes information indicative of the release of the parcel at the serviceable point.

In one embodiment, a UAV computing entity includes at least one processor and at least one memory including program code, the at least one memory and the program code configured to, with the processor, cause the UAV computing entity to at least, after navigating a UAV to a serviceable point, establish a communication link between the UAV computing entity and a user computing entity, where (a) a UAV includes the UAV computing entity, a UAV chassis, and a parcel carrier coupled to the UAV chassis, (b) the parcel carrier includes an engagement housing selectively coupled to the UAV chassis, (c) a parcel carrying mechanism is engaged with and securing a parcel to the engagement housing, and (d) the user computing entity is associated with the serviceable point, release the parcel from the parcel carrying mechanism of the parcel carrier. After releasing the parcel from the parcel carrying mechanism of the parcel carrier, the UAV computing entity is configured to provide a notification to the user computing entity through the communication link, where the notification includes information indicative of the release of the parcel at the serviceable point.

In another embodiment, a method for landing an unmanned aerial (UAV) on a UAV support mechanism includes navigating a UAV toward a UAV support mechanism, receiving a signal from a guidance array of the UAV support mechanism, and navigating the UAV to a landing region of a UAV support mechanism. The method further includes guiding a reduced width portion of the UAV between opposing rails of the UAV support mechanism and engaging the UAV with the UAV support mechanism, and moving the UAV from the landing region toward a return region of the UAV support mechanism.

In one embodiment, a method for initiating delivery of a parcel via an unmanned aerial vehicle includes, for each of a first plurality of parcels to be delivered by a carrier, electronically storing parcel data including (a) a first logical grouping identifier corresponding to a first logical grouping with which each of the first plurality of parcels is associated and (b) a respective parcel identifier for each of the first plurality of parcels. The method further includes, for each of a second plurality of parcels to be delivered by the carrier, electronically storing parcel data including (a) a second logical grouping identifier corresponding to a second logical grouping with which each of the second plurality of parcels is associated and (b) a respective parcel identifier for each of the second plurality of parcels. The method further includes electronically setting a current logical grouping identifier to the first logical grouping identifier, responsive to receiving an indication that a first parcel from the second plurality of parcels is to be delivered by the carrier, determining whether the logical grouping identifier for the first parcel is the same as the current logical grouping identifier, and responsive to determining the logical grouping identifier for the first parcel is not the same as the current logical grouping identifier, initiating delivery of a second parcel from the second plurality of parcels by an unmanned aerial vehicle.

In another embodiment, a system includes at least one processor and at least one memory including program code, the at least one memory and the program code configured to, with the processor, cause the system to at least, for each of a first plurality of parcels to be delivered by a carrier, electronically store parcel data including (a) a first logical grouping identifier corresponding to a first logical grouping with which each of the first plurality of parcels is associated and (b) a respective parcel identifier for each of the first plurality of parcels. For each of a second plurality of parcels to be delivered by the carrier, the system is further configured to electronically store parcel data including (a) a second logical grouping identifier corresponding to a second logical grouping with which each of the second plurality of parcels is associated and (b) a respective parcel identifier for each of the second plurality of parcels. The system is further configured to electronically set a current logical grouping identifier to the first logical grouping identifier, responsive to receiving an indication that a first parcel from the second plurality of parcels is to be delivered by the carrier, determine whether the logical grouping identifier for the first parcel is the same as the current logical grouping identifier. Responsive to determining the logical grouping identifier for the first parcel is not the same as the current logical grouping identifier, the system is further configured to initiate delivery of a second parcel from the second plurality of parcels by an unmanned aerial vehicle.

BRIEF DESCRIPTION OF THE SEVERAL VIEWS OF THE DRAWINGS

Reference will now be made to the accompanying drawings, which are not necessarily drawn to scale, and wherein:

FIG. 23A schematically depicts a front view of another UAV chassis and parcel carrier according to one embodiment shown and described herein;

FIG. 23B schematically depicts a front view of another UAV chassis and parcel carrier according to one embodiment shown and described herein;

FIG. 26A schematically depicts a section view of the UAV support mechanism of FIG. 25 along section 26A-26A according to one embodiment shown and described herein;

FIG. 26B schematically depicts an enlarged section view of the UAV support mechanism of FIG. 26A according to one embodiment shown and described herein;

FIG. 35A schematically depicts a perspective view of a robot loading a parcel and parcel carrier to the rack of FIG. 29 according to one embodiment shown and described herein;

FIG. 35B schematically depicts a perspective view of a robot loading a parcel and parcel carrier to the rack of FIG. 29 according to one embodiment shown and described herein;

FIG. 35C schematically depicts a perspective view of a robot loading a parcel and parcel carrier to the rack of FIG. 29 according to one embodiment shown and described herein;

FIG. 67 schematically depicts a table of data stored in the central computing entity of FIG. 47 according to one embodiment shown and described herein;

DETAILED DESCRIPTION

Figure 1:
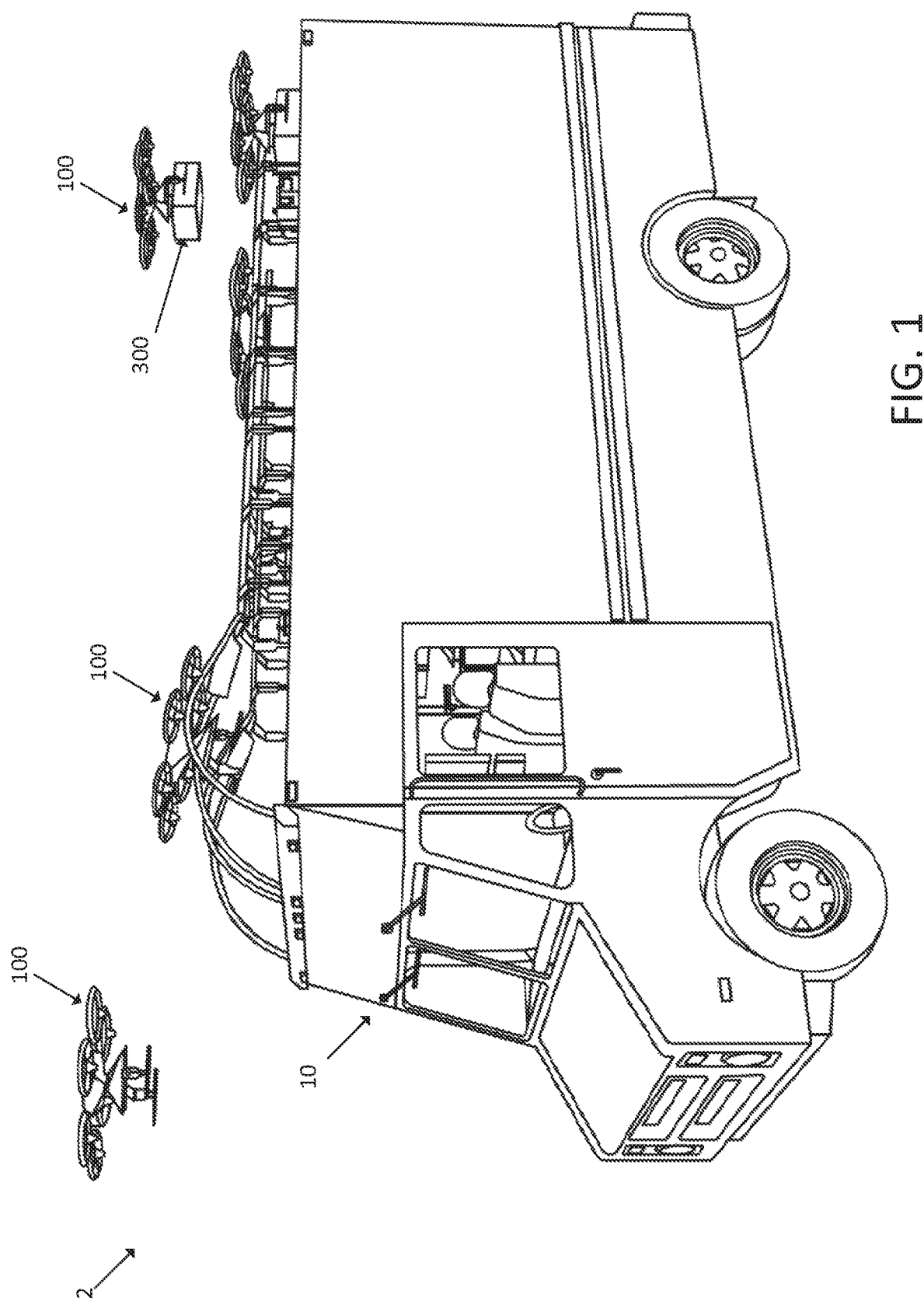
FIG. 1 schematically depicts a vehicle and a plurality of associated UAVs according to one embodiment shown and described herein.

Various embodiments now will be described more fully hereinafter with reference to the accompanying drawings, in which some, but not all embodiments are shown. Indeed, these inventions described herein may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. And terms are used both in the singular and plural forms interchangeably. Like numbers refer to like elements throughout.

Many modifications and other embodiments of the inventions set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein, the vertical direction (e.g., the +/−Z-direction as depicted) refers to the upward/downward direction of various components described herein. The longitudinal direction (e.g., the +/−X-direction as depicted) refers to the forward/rearward direction of the components described herein and is transverse to the vertical direction. The lateral direction (e.g., the +/−Y-direction as depicted) refers to the cross-wise direction of the components described herein and is transverse to the vertical direction and the longitudinal direction. Similarly, the terms pick-up and delivery can be used interchangeably. That is, while many embodiments are described in the delivery context, the same or similar features and functionality may apply to the pick-up context.

As used herein, the term "parcel" may include any tangible and/or physical object. In one embodiment, a parcel may be or be enclosed in one or more parcels, envelopes, parcels, bags, containers, loads, crates, parcels banded together, vehicle parts, pallets, drums, the like, and/or similar words used herein interchangeably. Such parcels may include the ability to communicate (e.g., via a chip (e.g., an integrated circuit chip), RFID, NFC, Bluetooth, Wi-Fi, and any other suitable communication techniques, standards, or protocols) with one another and/or communicate with various computing entities for a variety of purposes. In this regard, in some example embodiments, a parcel may communicate send "to" address information/data, received "from" address information/data, unique identifier codes, and/or various other information/data.

1. OVERVIEW

Various embodiments of the present invention are directed to an enhanced parcel delivery system for efficiently delivering parcels in a variety of environments. As described in detail herein, the enhanced parcel delivery system is generally comprised of a primary parcel delivery vehicle, such as a conventional parcel delivery truck, and a plurality of auxiliary delivery vehicles, such as unmanned aerial vehicles ("UAVs" or "drones"). As described in relation to particular embodiments, a parcel delivery vehicle is adapted to act as a mobile hub for a fleet of UAVs configured for delivering parcels from the delivery vehicle to a delivery point/location (e.g., a home address or business). In particular, the parcel delivery vehicle is configured both for storing parcels to be delivered via a UAV and for providing a takeoff (e.g., launch) and landing platform for the UAVs to depart from and return to the delivery vehicle. To facilitate delivery of parcels by the UAVs from the delivery vehicle, a number of novel systems have been developed, including—as just some examples—systems for securing parcels to the UAVs and releasing parcels from the UAVs, systems for powering the UAVs, systems for managing parcels within the delivery vehicle for delivery by a UAV, and systems for guiding, controlling, and managing UAV-based deliveries. Each of these novel systems, among various other improvements, are described in greater detail herein.

As will be appreciated from the present disclosure, the various embodiments of the enhanced parcel delivery system offer a number of advantages. For example, the use of UAVs to deliver packages from a mobile hub in form of a delivery vehicle offers greatly enhanced flexibility in the delivery of parcels in a variety of environments. In particular, UAV scan traverse various geographic areas quickly and more efficiently than a road-going vehicles. Moreover, the enhanced parcel delivery system enables multiple deliveries by multiple UAVs to occur simultaneously.

The use of UAVs launched from a common delivery vehicle also conserves fuel, particular in embodiments where the UAVs are battery powered. Moreover, UAV-based deliveries improve the efficiency of human resources, enabling, for example, a single driver or delivery person to manage the delivery or more parcels in less time. UAVs-based deliveries, particularly from a mobile hub in the form of a delivery vehicle, enable greater flexibility in package routing and fleet management.

Likewise, convenience for parcel users (e.g., consignees) is also enhanced. As described herein, the consignee of a UAV-delivered parcel can set particular locations and times for delivery and receive up-to-date and interactive information relating to the delivery process. Various embodiments of the enhanced parcel delivery system will now be described in detail with reference to the figures provided herein.

2. ENHANCED PARCEL DELIVERY SYSTEM

FIG. 1 shows an enhanced parcel delivery system 2 according to one embodiment. In the embodiment of FIG. 1, the parcel delivery system 2 comprises a primary parcel delivery vehicle 10 and a plurality of UAVs 100 configured to deliver parcels 300 from the vehicle 10. According to various embodiments, the UAVs 100 are configured to be dispatched from the vehicle 10, deliver parcels 300 to consignee locations, and return to the vehicle 10.

In the illustrated embodiment of FIG. 1, the primary parcel delivery vehicle 10 is a parcel delivery truck configured to be manually driven by a parcel delivery driver. Alternatively, in some embodiments, the parcel delivery vehicle 10 may be autonomous, as will be described in greater detail herein. The delivery vehicle 10 defines an interior package cabin for storing a plurality of parcels to be delivered by the UAVs 100. As will be recognized, although the primary parcel delivery vehicle 10 is described as a terrestrial vehicle, the primary parcel delivery vehicle 10 may be a manned or an unmanned terrestrial vehicle, aerial vehicle, nautical vehicle, and/or the like. For example, such vehicles may include a tractor, a truck, a car, a motorcycle, a moped, a Segway, a bicycle, a golf cart, a hand truck, a cart, a trailer, a tractor and trailer combination, a van, a flatbed truck, a vehicle, a drone, an airplane, a helicopter, a barge, a boat, and/or any other form of object for moving or transporting people and/or items (e.g., one or more packages, parcels, bags, containers, loads, crates, items banded together, vehicle parts, pallets, drums, the like, and/or similar words used herein interchangeably). The primary parcel delivery vehicle 10 may be a hybrid vehicle for standard, manual deliveries by a driver and UAV deliveries, helping the driver handle deliveries along a route. Alternatively, the primary parcel delivery vehicle 10 may be a manned or unmanned delivery vehicle dedicated solely to UAV deliveries.

In an embodiment, the delivery vehicle's roof panel includes UAV support mechanisms 400 that serve as parcel loading points and which are configured to enable the UAVs 100 to takeoff from, and land on, the delivery vehicle 10. As will be explained in further detail, the delivery vehicle 10 is configured such that parcels stored in the delivery vehicle's interior package cabin can be secured to one of the UAVs 100 in an automated fashion, such that the UAV to which a particular parcel is secured can then take off from the roof panel of the vehicle 10, deliver the parcel to a delivery location, and return to the vehicle 10 for landing on the roof panel. In this way, the delivery vehicle 10 functions as a mobile hub for UAV-based parcel deliveries. Alternatively, in some embodiments, the UAVs 100 may take off from, and may return to and land on a building or other structure, such as a warehouse.

Various components and features of the enhanced parcel delivery system 2 will now be described in turn in greater detail.

A. Parcel Delivery UAV & Parcel Carrier

Figure 2:
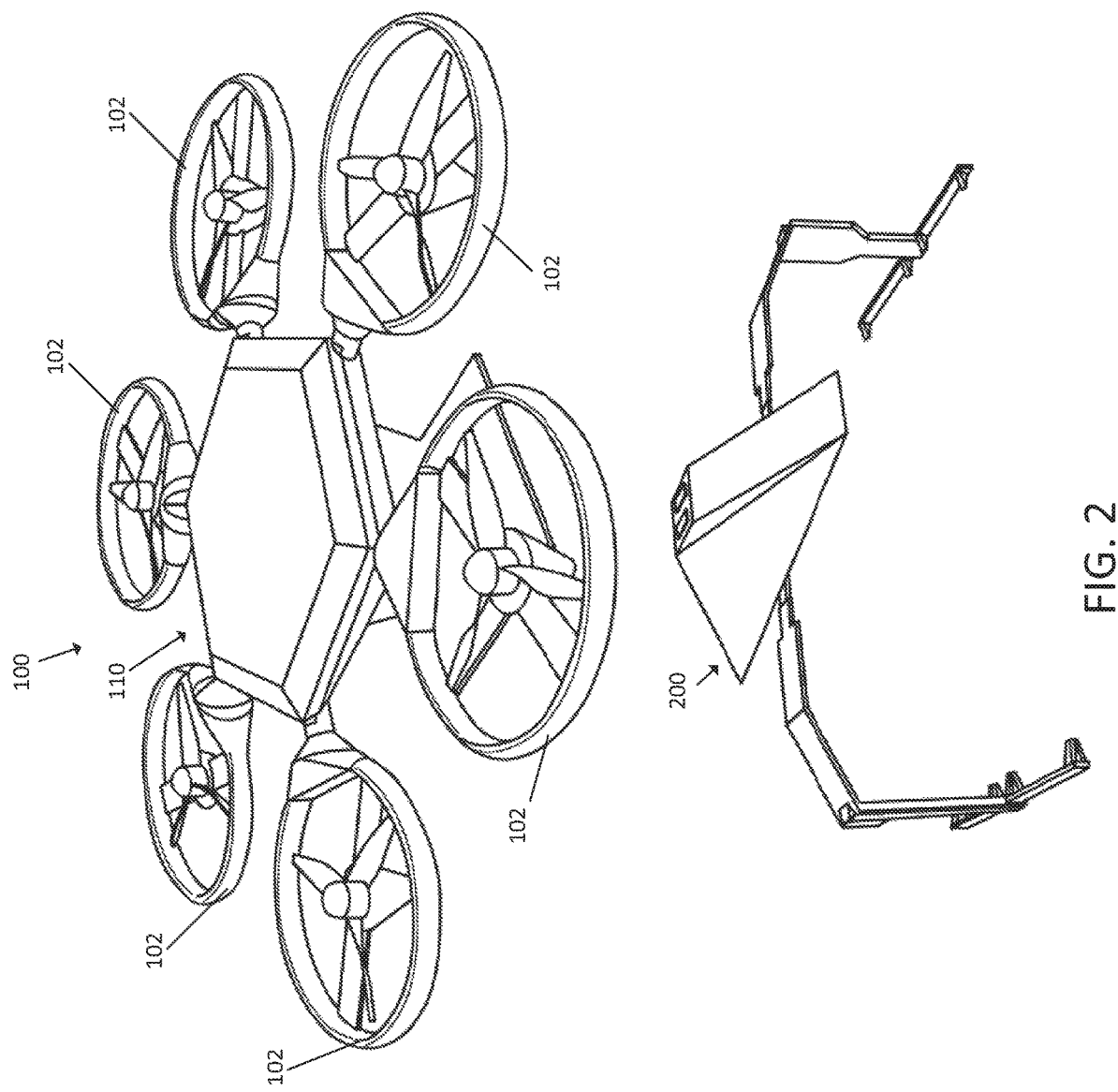
FIG. 2 schematically depicts a perspective view of the UAV of FIG. 1 and associated parcel carrier according to one embodiment shown and described herein.

FIG. 2 shows a perspective view of a parcel delivery UAV 100 and a parcel carrier 200, which is configured to be coupled to the UAV 100 and to engage a parcel to enable UAV-based delivery of the parcel. As will be discussed in greater detail herein, the parcel carrier 200 is configured for being removably secured to the UAV 100 for transporting a parcel 300 (FIG. 1) and may include a power supply configured to power the UAV 100 when the parcel carrier 200 is engaged with the UAV 100.

i. Parcel Delivery UAV

As shown in FIG. 2, the parcel delivery UAV 100 generally comprises a UAV chassis 110 and a plurality of propulsion members 102 extending outwardly from the UAV chassis. The UAV chassis 110 generally defines a body of the UAV 100, which the propulsion members 102 are configured to lift and guide during flight. The propulsion members 102 may be operable between an "on" configuration, in which the propulsion members 102 provide lift to the UAV 100, and an "off" configuration, in which the propulsion members are stationary and/or do not provide lift to the UAV 100. According to various embodiments, the UAV chassis 110 may be formed from any material of suitable strength and weight (including sustainable and reusable materials), including but not limited to composite materials, aluminum, titanium, polymers, and/or the like, and can be formed through any suitable process.

In the embodiment depicted in FIG. 2, the UAV 100 is a hexacopter and includes six separate propulsion members 102, each extending outwardly from the UAV chassis 110. However, as will be appreciated from the description herein, the UAV 100 may include any number of propulsion members suitable to provide lift and guide the UAV 100 during flight.

Figure 3:
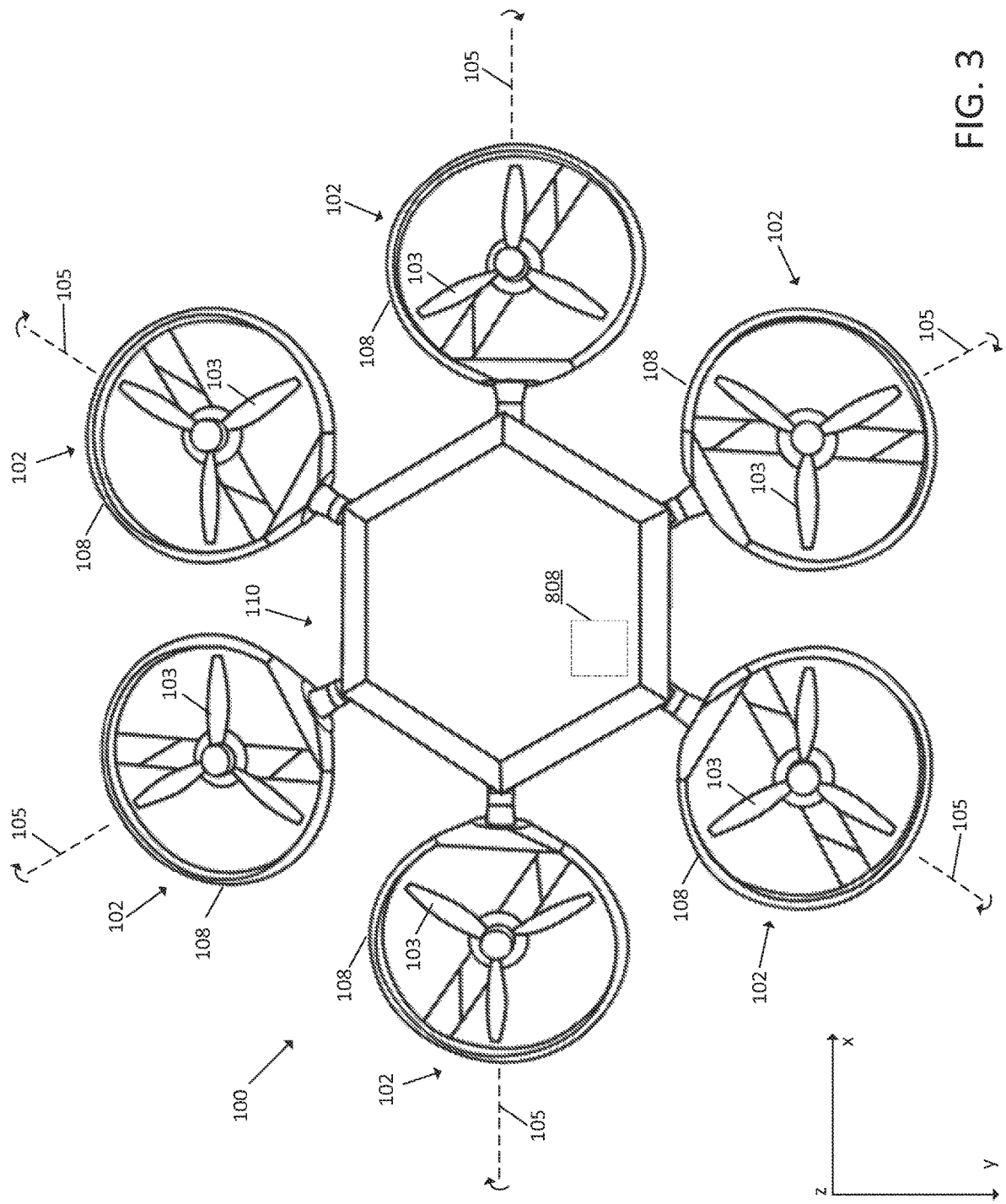
FIG. 3 schematically depicts a top view of the UAV of FIG. 1 according to one embodiment shown and described herein.

FIG. 3 shows a top view of the UAV 100, in which the propulsion members 102 are again shown extending outwardly from the perimeter of the UAV chassis 110. In the illustrated embodiment of FIG. 3, each of the plurality of propulsion members 102 includes a propeller 103 that is positioned within a propeller guard 108. Each propeller 103 is comprised of a plurality of blades that are configured to rotate within the propeller guard 108 to provide lift and facilitate flight of the UAV 100. In the illustrated embodiment, the propeller guards 108 circumscribe the propellers 103 as the propellers 103 rotate, which may assist in preventing inadvertent contact between the propellers 103 and various objects that the UAV 100 may encounter during flight. While the embodiment depicted in FIG. 3 depicts the propellers 103 as including three blades that are configured to rotate within the propeller guards 108, it should be understood that the propellers 103 may include any suitable number of blades configured to rotate within the propeller guards 108 and provide sufficient lift to the UAV 100.

In the illustrated embodiment, the propulsion members 102 are electrically powered (e.g., by an electric motor that controls the speed at which the propellers 103 rotate). However, as will be recognized, the propulsion members 102 may be powered by internal combustion engines driving an alternator, hydrogen fuel-cells, and/or the like. Each of the propulsion members 102 is pivotally coupled to the UAV chassis 110 at a motorized joint 104, such that each of the propulsion members 102 may rotate with respect to the UAV chassis 110. In particular, as shown in FIG. 3, each of the motorized joints 104 defines a joint axis 105 about which its respective propulsion member 102 rotates relative to the UAV chassis 110. By rotating with respect to the UAV chassis 110 about the axis 105, the propulsion members 102 may direct their respective lift forces to maneuver the UAV 100 during flight. Moreover, as described in greater detail herein, the ability of the propulsion members 102 to pivot relative to the UAV chassis 110 enables the propulsion members to maintain the UAV chassis 110 in a constant or near constant orientation relative to the parcel carrier 200 and parcel 300 to prevent undesirable movement of goods positioned within the parcel 300.

Figure 4:
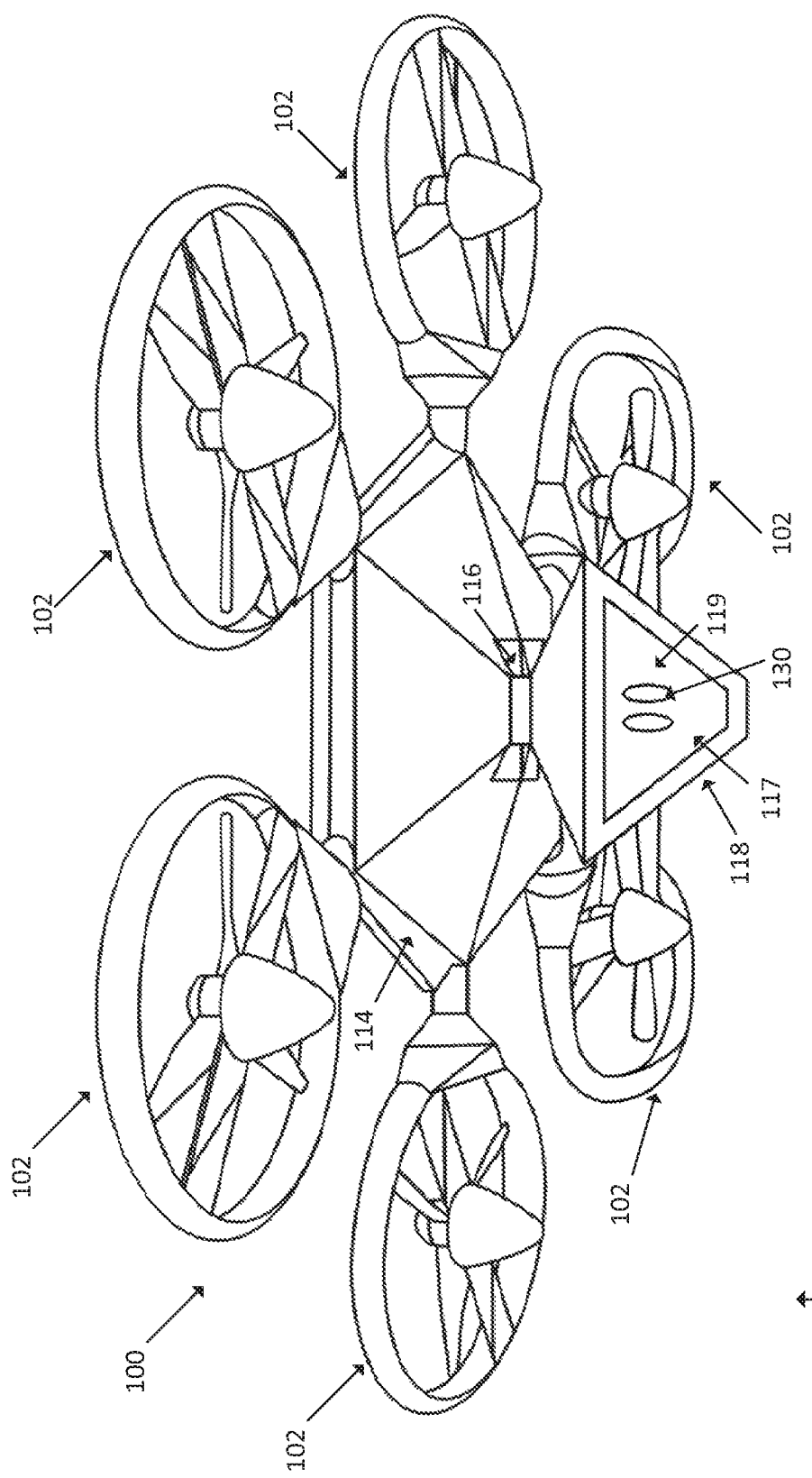
FIG. 4. Schematically depicts a bottom perspective view of the UAV chassis of the UAV of FIG. 1 according to one embodiment shown and described herein.

FIG. 4 shows a bottom perspective view of the UAV 100. As shown in FIG. 4, the UAV chassis 110 generally defines an upper portion 114, a lower portion 118 (positioned below the upper portion 114), and a reduced width portion 115 (positioned vertically between the upper portion 114 and the lower portion 118). In the illustrated embodiment, the propulsion members 102 are coupled to and extend around a perimeter of the upper portion 114 of the UAV chassis 110. Additionally, as described in greater detail herein, the UAV chassis' upper portion 114 houses the UAV's control system 150.

The lower portion 118 of the UAV chassis 110 is configured to receive and engage the parcel carrier 200 (FIG. 2). As such, the lower portion 118 may alternatively be referred to herein as the "carrier receiving portion" of the UAV 100. In the illustrated embodiment, the lower portion 118 extends downwardly from the UAV chassis' upper portion 114 and resembles a hollow, oblique pyramid-shaped member. The lower portion 118 defines an internal cavity 119 that extends upward into the lower portion 118. The internal cavity 119 defines a bottom opening 117 through which the internal cavity 119 may be accessed. As will be described in greater detail herein, at least a portion of the parcel carrier 200 (FIG. 2) may be inserted through the opening 117 and into the internal cavity 119 in order to selectively couple the parcel carrier 200 to the UAV chassis 110.

As shown in FIG. 4, the UAV 100 also includes at least one UAV electrical interface 130 positioned within the lower portion's internal cavity 119. The electrical interface 130 comprises an electrical terminal, electrical contact, and/or the like, that is electrically coupled to the propulsion members 102. In the illustrated embodiment, the UAV electrical interface 130 provides an electrical connection to a power source (e.g., located in the parcel carrier 200) to provide electrical power to the propulsion members 102, as will be described in greater detail herein.

Figure 5:
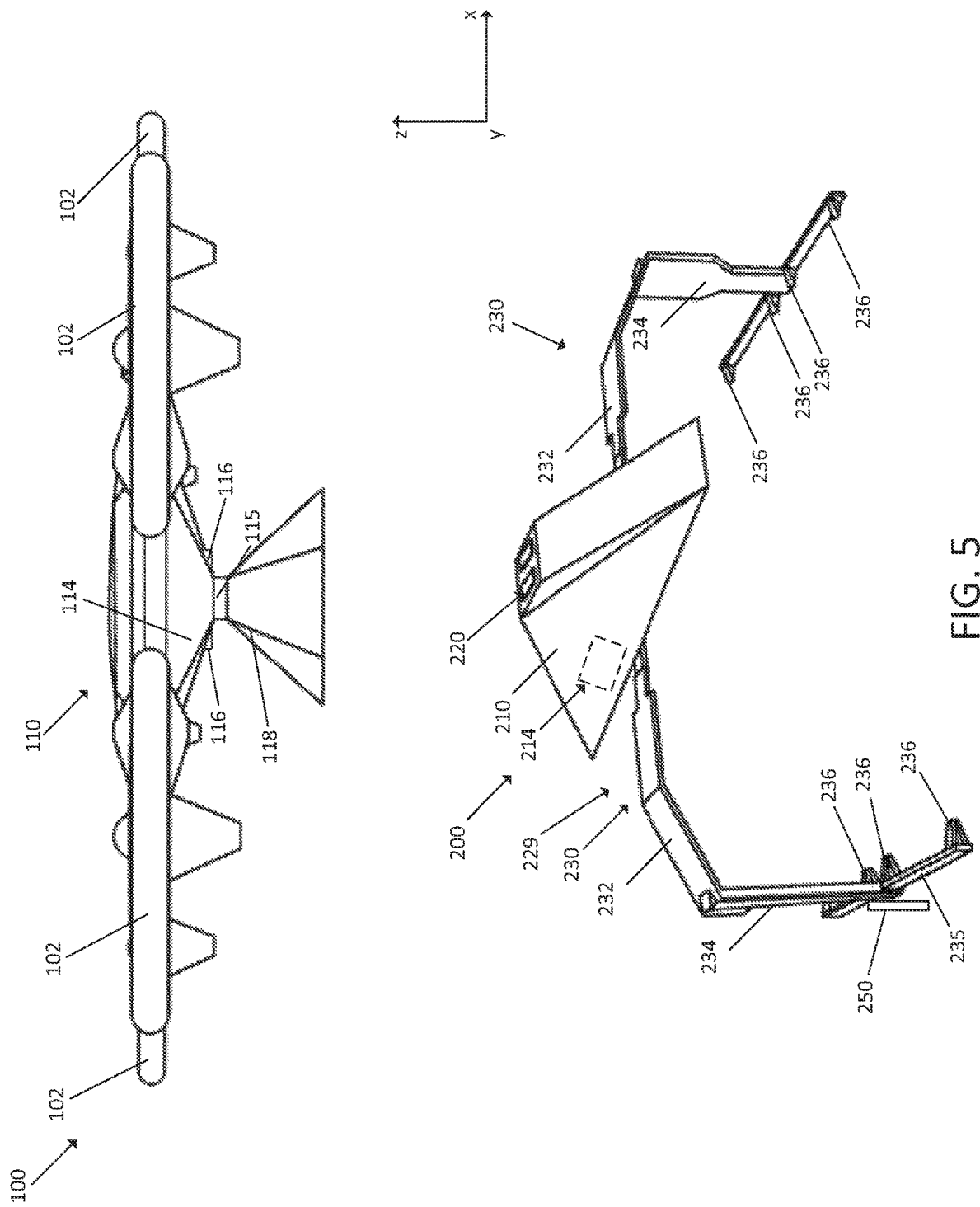
FIG. 5 schematically depicts an exploded perspective view of the UAV and parcel carrier of FIG. 2 according to one embodiment shown and described herein.

FIG. 5 shows a side-view of the UAV 100 and a perspective view of the parcel carrier 200. In the illustrated embodiment, the UAV chassis' upper portion 114, lower portion 118, and reduced width portion 115 define a generally hourglass shape. In particular, the upper portion 114 and the lower portion 118 have a greater width (evaluated in the lateral and/or the longitudinal direction) as compared to the reduced width portion 115. In the embodiment depicted in FIG. 5, the width of the upper portion 114 is tapered in the downward direction, such that the width of the upper portion 114 gradually reduces as it meets the reduced width portion 115. Similarly, the width of the lower portion 118 is tapered in the upward direction, such that the width of the lower portion 118 gradually increases away from the reduced width portion 115. As will be described in greater detail herein, the hourglass-profile of the UAV chassis 110 enables it to engage the UAV support mechanism 400 provided on the roof panel of the parcel delivery vehicle 10, thereby enabling takeoff from and landing on the vehicle's roof. The UAV support mechanism 400 may secure the UAV chassis 110 to the vehicles roof such that the UAV chassis 110 may remain secured to the vehicle 10 as the vehicle 10 moves.

As shown in FIGS. 4 and 5, the UAV 100 further includes landing gear 116. In the illustrated embodiment, the landing gear 116 are provided on an underside or downward-facing side of the upper portion 114 of the UAV chassis. In the illustrated embodiment, the landing gear 116 comprise a pair of rollers oriented to face downward in the vertical direction. In some embodiments, the rollers of the landing gear 116 may be powered such that the landing gear 116 may propel the UAV chassis along the UAV support mechanism 400. As will be described in greater detail herein, the landing gear 116 are configured to engage opposing rails of the UAV support mechanism 400 positioned on the vehicle 10 (FIG. 1) as the UAV 100 takes off and lands to the vehicle 10.

In various other embodiments, the landing gear 116 may also be positioned on opposite sides of the reduced width portion 115 of the UAV chassis in the lateral direction such that the landing gear 116 straddle the reduced width portion 115. Furthermore, in various other embodiments, the landing gear 116 may comprise other devices configured for engaging the opposing rails of the UAV support mechanism 400, such as bearings, casters, and/or the like, that rotate with respect to the UAV chassis 110, which may assist in moving the UAV chassis 110 with respect to opposing rails of the vehicle 10 (FIG. 1). Alternatively, in some embodiments, the landing gear 116 may include skids or pads coupled to the UAV chassis 110 which are configured to engage and slide along the pair of opposing rails of the vehicle 10 (FIG. 1), as will be described in greater detail herein. In embodiments, the landing gear 116 may be formed from a resilient material that may elastically deform when the UAV 100 is engaged with the opposing rails of the vehicle 10 (FIG. 1).

ii. Parcel Carrier

As shown in FIG. 5, the parcel carrier 200 comprises an engagement housing 210 and a parcel carrying mechanism 229 including a pair of parcel carrying arms 230 extending outwardly from the engagement housing 210. According to various embodiments, the parcel carrier's engagement housing 210 defines a shape that is generally complimentary and corresponds to the interior cavity 119 of the lower portion 118 of the UAV chassis 110. In the illustrated embodiment of FIG. 5, the engagement housing 210 defines a generally oblique pyramid-shape that is complementary to the UAV chassis' inner cavity 119. As a result, the engagement housing 210 may be inserted into the cavity 119 of the lower portion 118 of the UAV chassis 110 in order to selectively secure the parcel carrier 200 to the UAV 100 (as discussed further in relation to FIG. 7 herein). As shown in FIG. 5, the engagement housing 210 defines a greater width (evaluated in the lateral direction) at its bottom portion as compared to its width at its top portion.

In the illustrated embodiment, the parcel carrier's engagement housing 210 includes a power supply 214 configured to power the UAV 100 and parcel carrier 200. In particular, the power supply 214 is configured to power the UAV 100 and parcel carrier 200 when the engagement housing 210 is engaged within the inner cavity 119 of the UAV chassis' lower portion 118. In the illustrated embodiment, the power supply 214 comprises a battery. However, as will be appreciated from the description herein, the power supply 214 may comprise any suitable device for providing electrical power to the UAV 100 and parcel carrier 200 (e.g., a hydrogen fuel cell, and/or the like).

As shown in FIG. 5, the parcel carrier 200 includes at least one carrier electrical interface 220 positioned on an upper surface of its engagement housing 210. The carrier electrical interface 220 includes an electrical terminal, electrical contact, and/or the like that is electrically coupled to the power supply 214. In particular, the at least one carrier electrical interface 220 is configured to interface with UAV electrical interface 130 (FIG. 4) when the parcel carrier 200 is secured to the UAV 100, thereby electrically coupling the power supply 214 to the UAV chassis 110 and providing power to the propulsion members 102.

As explained in greater detail herein, the propulsion members 102 provide lift to the UAV 100, expending electrical energy and depleting the charge and/or power of the power supply 214. As the engagement housing 210, and accordingly the power supply 214, is removable from the UAV chassis 110, engagement housings 210 with depleted power supplies 214 may be replaced with engagement housings 210 having charged power supplies 214. By periodically replacing the power supply 214, the UAV 100 may be provided with continuously sufficient power to perform repeated deliveries. According to certain embodiments, as the power supply 214 is included within the engagement housing 210—which is configured to be selectively coupled to a parcel 300 (FIG. 9)—the power supply 214 may be replaced to the UAV 100 each time a parcel 300 is delivered, as will be described in greater detail herein.

As shown in FIG. 5, the parcel carrier's pair of parcel carrying arms 230 extend outwardly from lateral sides of the engagement housing 210. In particular, in the illustrated embodiment of FIG. 5, the parcel carrying arms 230 extend outwardly from a lower portion of the engagement housing 210. As discussed in greater detail herein, this leaves the engagement housing 210 substantially unencumbered in order to permit engagement with the lower portion 118 of the UAV housing 110.

Figure 9:
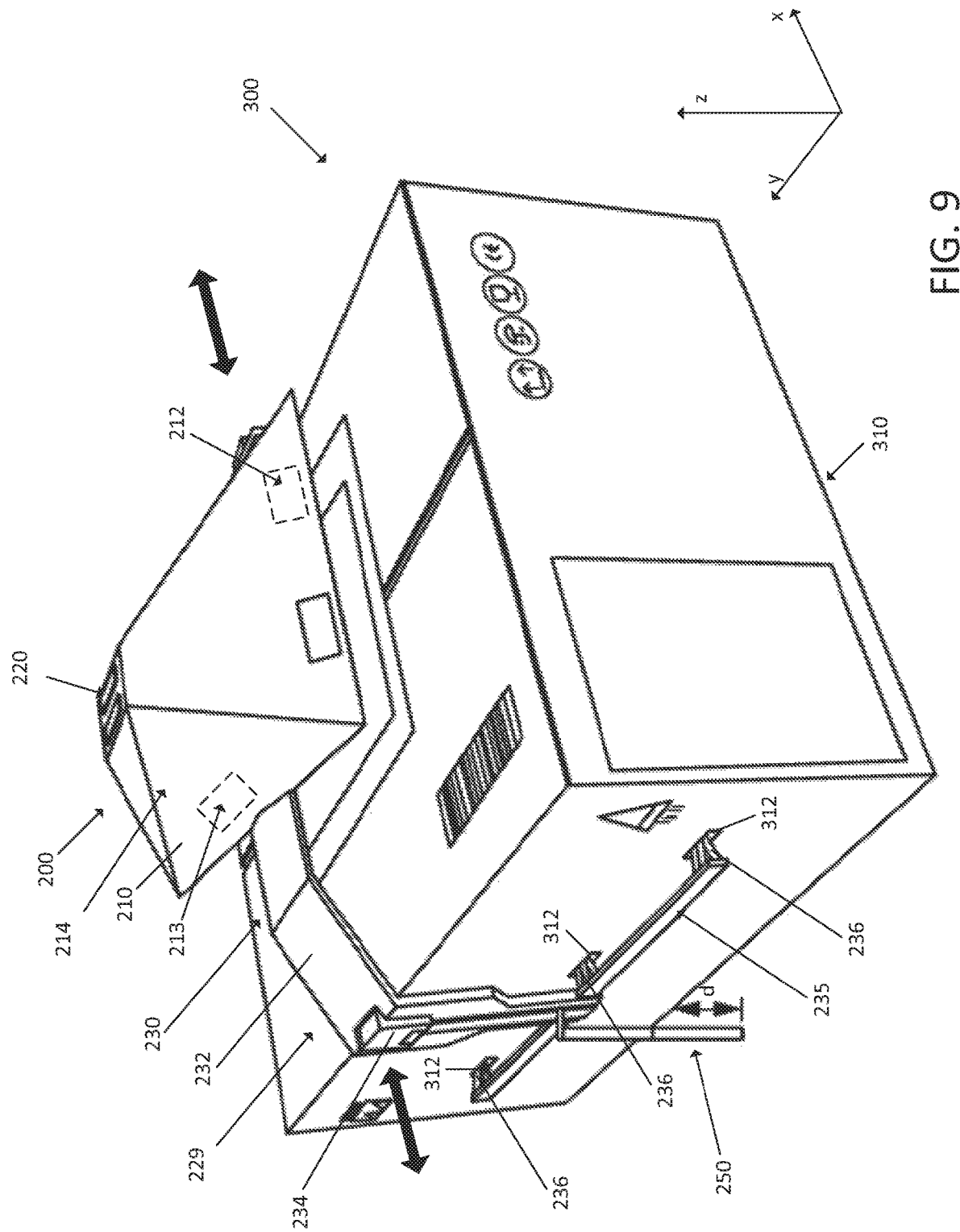
FIG. 9 schematically depicts a perspective view of the parcel carrier of FIG. 5 and a parcel according to one embodiment shown and described herein.

In the illustrated embodiment, the parcel carrier 200 is substantially symmetrical and the parcel carrying arms 230 on the opposite sides engagement housing 210 are substantially the same. As shown in FIG. 5, the parcel carrying arms 230 each include an upper portion 232 extending laterally outward from the engagement housing 210, a lower portion 234 that extends downward from the upper portion 232, and parcel rails 235 that are positioned on the bottom portion of the lower portion 234 and that are oriented transverse to the lower portion 234. A plurality of pins 236 extend inward from the parcel rails 235 toward the parcel 300 in the lateral direction, and are selectively positioned to engage corresponding apertures 312 defined by the parcel 300 (FIG. 9). The parcel carrying arms 230 and the plurality of pins 236 may be formed of any suitable material to support the parcel 300, such as metal, composites, and/or the like, and may be formed by any suitable manufacturing process, such as casting, forging, and/or the like.

Each of the parcel carrying arms 230 are slidably coupled to the engagement housing 210 such that the parcel carrying arms 230 are movable in the lateral direction with respect to the engagement housing 210. In particular, the parcel carrying arms 230 are repositionable between an inward, engaged position (e.g., in which the parcel carrying arms 230 are engaged with a parcel 300) and an outward, disengaged position (e.g., in which the parcel carrying arms are moved further outward and disengaged from a parcel 300). Alternatively, in various other embodiments, the parcel carrying arms 230 are pivotally coupled to the engagement housing 210 such that the parcel carrying arms 230 are movable in the lateral direction with respect to the engagement housing 210, such as by pivoting about an axis that is parallel with the longitudinal direction as depicted.

In embodiments, the parcel carrying arms 230 may be inwardly biased in the lateral direction, such that the parcel carrying arms 230 are biased toward the parcel 300 (FIG. 9) in the lateral direction. The parcel carrying arms 230 may be inwardly biased by a biasing member, such as a tension spring, a torsion spring, a compression spring, and/or the like. In this way, the parcel carrying arms 230 may be biased into the engaged position, in which the plurality of pins 236 are positioned within the apertures 312 (FIG. 9) of the parcel 300. To move the parcel carrying arms 230 from the engaged position to the disengaged position, the parcel carrying arms 230 are coupled to a motor 213 that is configured to overcome the inward bias of the parcel carrying arms 230, moving the parcel carrying arms 230 outward in the lateral direction into the disengaged position. The motor 213 may be communicatively coupled to a parcel carrier controller 212 that controls operation of the motor 213, and may command the motor 213 to move the parcel carrying arms 230 from the engaged position into the disengaged position. By biasing the parcel carrying arms 230 in an inward lateral direction, the parcel carrying arms 230 may engage parcels 300 having different widths evaluated in the lateral direction.

The parcel carrier 200 further includes a ground probe 250 that extends downward from the engagement housing 210. In the embodiment depicted in FIG. 5, the ground probe 250 is coupled to the engagement housing 210 through the parcel carrying arms 230. Alternatively, the ground probe 250 may be directly coupled to the engagement housing 210, or may be directly coupled to the parcel 300.

iii. Engagement of the UAV & Parcel Carrier

Figure 6:
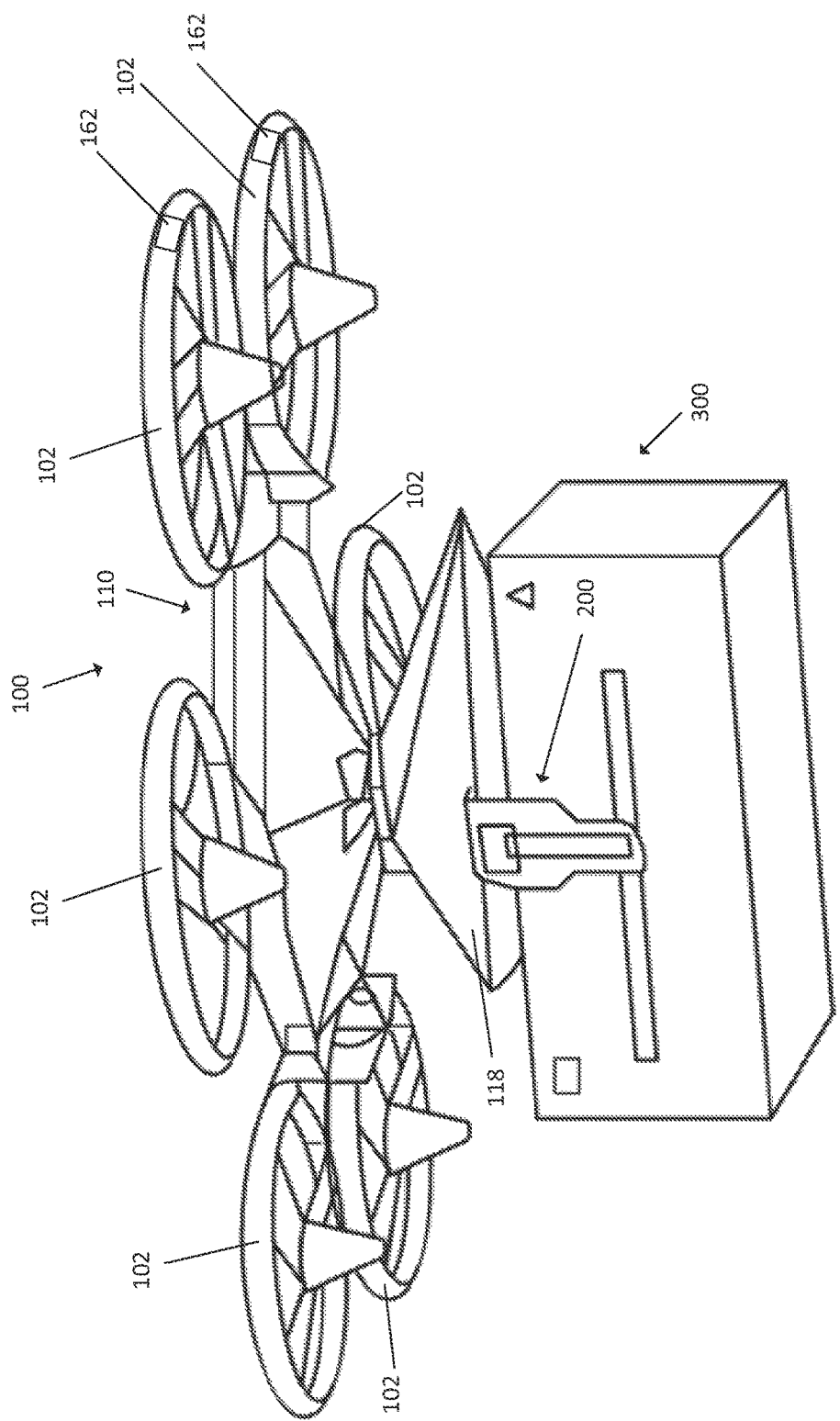
FIG. 6 schematically depicts a bottom perspective view of the UAV and parcel carrier of FIG. 2 according to one embodiment shown and described herein.
Figure 7:
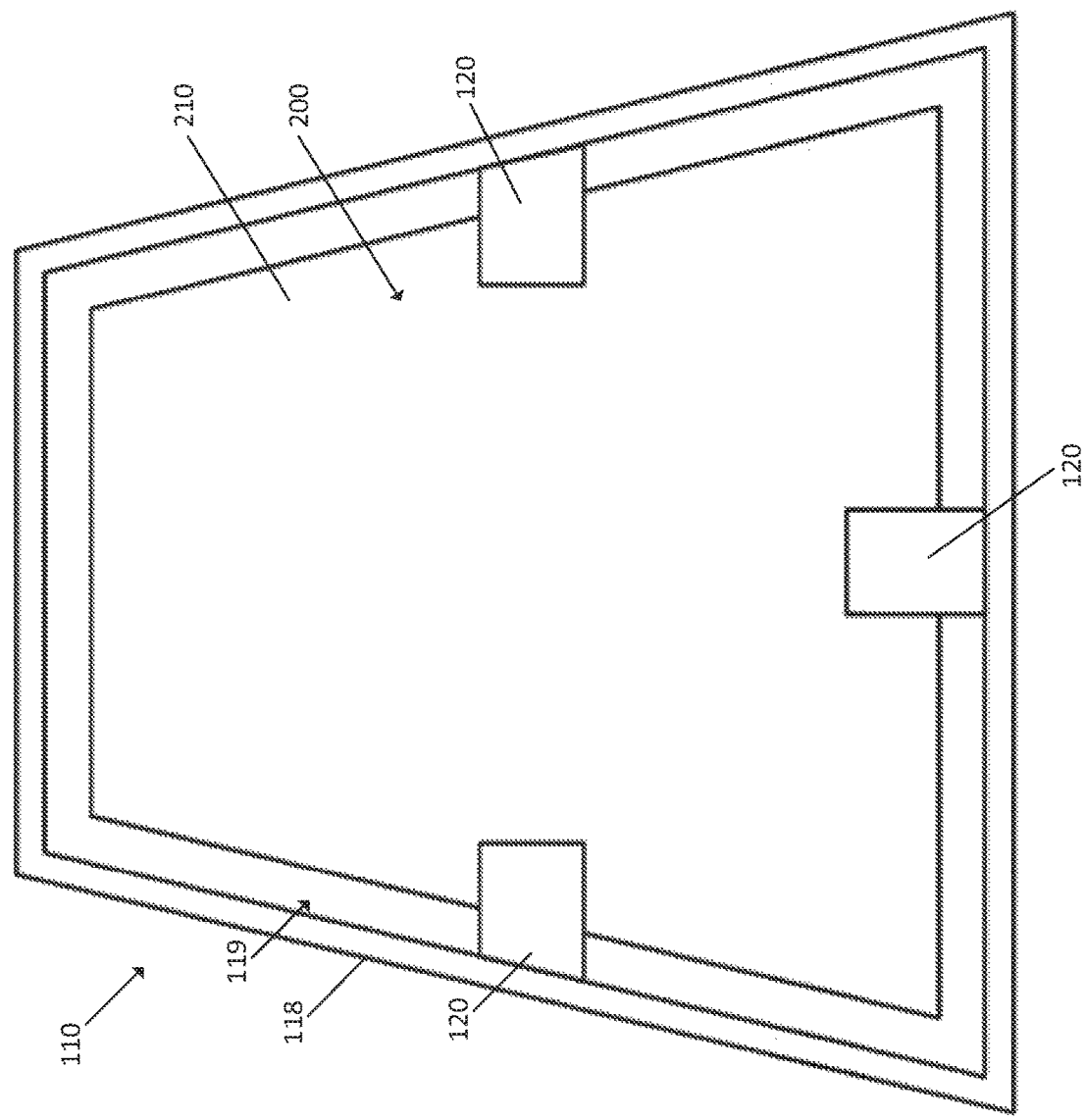
FIG. 7 schematically depicts a bottom view of the UAV chassis and parcel carrier of FIG. 2 according to one embodiment shown and described herein.

FIG. 6 shows a perspective view of the view the parcel carrier 200 coupled to the UAV 100. As shown in FIG. 6, when the parcel carrier 200 is installed to the UAV chassis 110, the engagement housing 210 is retained within the inner cavity 119 (FIG. 4) of the lower portion 118 of the UAV chassis 110. In the illustrated embodiment, the engagement housing 210 is retained within the inner cavity 119 by retaining members 120. In particular, FIG. 7 shows an underside view of the UAV's lower portion 118 and inner cavity 119 with the engagement housing 210 inserted therein. As shown in FIG. 7, the retaining members 120 extend inward into the inner cavity 119 of the UAV chassis 110 in the lateral and/or the longitudinal directions, thereby extending beneath the lower surface of the engagement housing 210 and retaining the engagement housing 210 within the inner cavity 119 through mechanical interference. As described above, the engagement housing 210 and the inner cavity 119 of the UAV chassis 110 include complementary shapes. When the engagement housing 210 is installed to the inner cavity 119, the engagement housing 210 may fit partially or entirely within the inner cavity 119, and once positioned within the inner cavity 119, may be retained within the inner cavity by the one or more retaining members 120.

Figure 8:
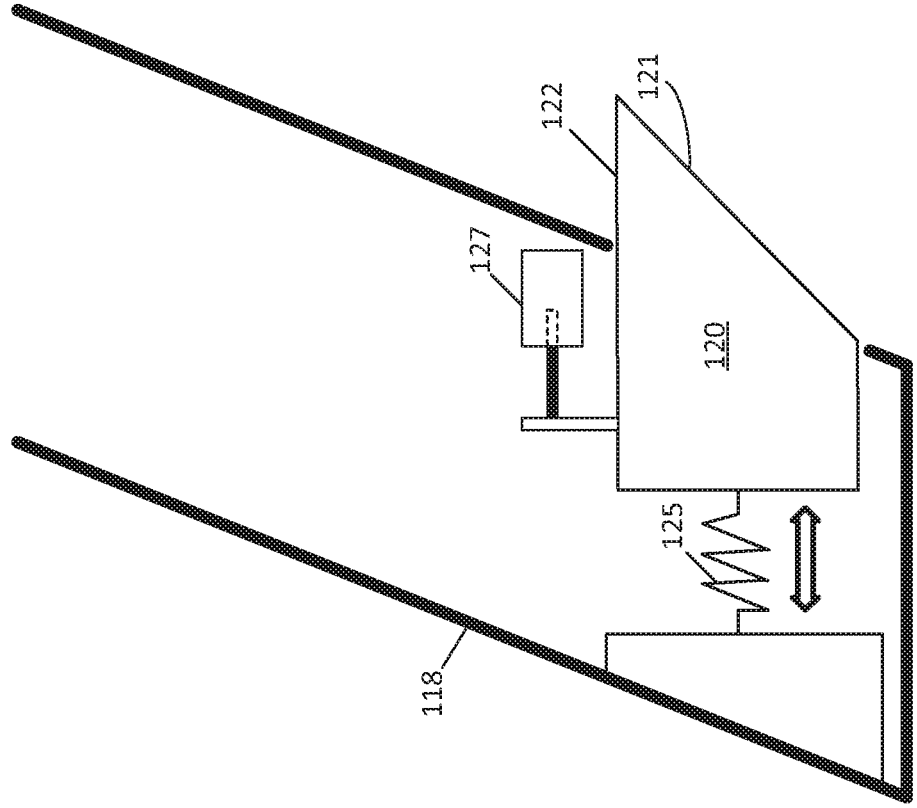
FIG. 8 schematically depicts a cross-sectional view of the UAV chassis' retaining member assembly according to one embodiment shown and described herein.

The retaining members 120 are movable with respect to the inner cavity 119 of the UAV chassis 110 such that each of the retaining members 120 move inward into and outward from the inner cavity 119. FIG. 8 provides a cross-sectional side view of one of the UAV chassis' retaining members 120 according to one embodiment. As shown in FIG. 8, the retaining member 120 is provided as part of a retaining member assembly comprising the retaining member 120, a biasing spring 125, and a solenoid actuator 127. In the illustrated embodiment, the retaining member 120 defines a sloped sidewall 121 and an upper wall 122. The retaining member 120 is mounted substantially within a wall of the UAV chassis' lower portion 118 and is configured for lateral movement relative to the wall. In particular, the retaining member's ability to move laterally enables to extend inwardly into the lower portion's inner cavity 119 (in an extended orientation) or be recessed into the lower portion wall (in a retracted orientation).

In the illustrated embodiment of FIG. 8, the retaining member 120 is biased to its extended orientation by a spring 125. In this orientation, the retaining member's sloped sidewall 121 and top wall 122 each extend into the inner cavity 119. When the parcel carrier's engagement housing 210 is inserted into the UAV's inner cavity 119, the engagement housing 210 will contact the retaining member's sloped sidewall 121 and push the retaining member 120 laterally into its retracted orientation. Once the bottom edge of the engagement housing 210 is inserted past the plane of the retaining member's top wall 122, the spring 125 will push the retaining member 120 back into its extended orientation. In this configuration, the retaining member 120 will extend back into the inner cavity 119 such that the engagement housing's bottom edge rests on the retaining member's top wall 122, thereby securing the engagement housing 210 within the UAV chassis' inner cavity 119.

When the engagement housing 210 is to be released from the UAV chassis 110, the UAV control system 150 actuates the solenoid 127, which is configured to push the retaining member 120 in a lateral direction back into its retracted orientation (overcoming the force of the biasing spring 125). This movement retracts the retaining member's top wall 122 into the wall of the UAV chassis' lower portion 118, leaving the engagement housing 210 an unobstructed path to be disengaged from the lower portion's inner cavity 119. According to various embodiments, a plurality of retaining member assemblies of the type shown and described in relation to FIG. 8 may be provided around the inner perimeter of the UAV chassis' lower portion 118. Moreover, as will be appreciated from the description herein, any suitable method of actuating the retaining members 120 between an extended and retracted orientation may be implemented to enable retention of the engagement housing 210 within the UAV chassis' lower portion 118.

iv. Engagement of the Parcel Carrier with a Parcel

FIG. 9 shows a parcel 300 secured to the parcel carrier 200. As described above, the parcel carrier 200 includes parcel carrying arms 230 that extend outward from the engagement housing 210. In FIG. 9, the parcel carrying arms 230 are shown in their inward, engaged position and are securing the parcel 300 to the parcel carrier 200. While one of the parcel carrying arms 230 is obscured by the parcel 300 in the embodiment depicted in FIG. 9, it should be understood that the parcel carrier 200 is substantially symmetrical and the parcel carrying arms 230 on the opposite sides of the parcel 300 are substantially the same.

In the embodiment depicted in FIG. 9, the parcel carrying arms' plurality of pins 236 extend inward from the parcel rails 235 toward the parcel 300 in the lateral direction, and are selectively positioned to engage corresponding apertures 312 defined on the parcel 300.

In the illustrated embodiment, the apertures 312 are pre-formed into the sides of the parcel 300 at locations that correspond to the placement of the pins 236 on the rails 235. However, in alterative embodiments, the plurality of pins 236 may be configured to puncture the side of the parcel 300 during engagement of the parcel 300 in order to form apertures to grip and secure the parcel 300 via the plurality of pins 236. In some embodiments, the apertures 312 are pre-formed into the sides of the parcel 300, and in some embodiments, the apertures 312 may be reinforced to support the weight of the parcel 300 when engaged with the plurality of pins 236. Alternatively, in some embodiments, the plurality of pins 236 may form the apertures within the parcel 300 when the plurality of pins 236 engage the parcel 300. In other words, the pins 236 may pierce the parcel 300 to form the apertures 312. In still other embodiments, the parcel 300 may include perforations or reduced thickness regions that may be pierced by the pins 236 to form the apertures 312.

The parcel carrying arms 230 selectively engage the parcel 300 through engagement between the plurality of pins 236 and the apertures 312, such that the parcel 300 may be selectively coupled to the UAV 100 (FIG. 6) when the parcel carrier 200 is coupled to the UAV chassis 110. Alternatively, in some embodiments, the parcel 300 may include a plurality of pins that may be selectively inserted into apertures defined on the parcel carrying arms' rails 235.

The ground probe 250 is configured to extend downward from a bottom surface 310 of the parcel by a distance 'd' evaluated between the end of the ground probe 250 and the bottom surface 310. The ground probe 250 is configured to detect when the parcel 300 is placed on a landing surface, such as when the parcel 300 is delivered to a destination by the UAV 100 (FIG. 5), and may be communicatively coupled to the parcel carrier controller 212.

When the parcel 300 is positioned on a surface, such as when the parcel 300 is delivered to a destination by the UAV 100 (FIG. 5), the ground probe 250 may contact the surface prior to a bottom surface 310 of the parcel 300. As the parcel 300 is lowered toward the surface, such as the ground, the ground probe 250 may contact the surface and deflect and/or elastically deform in the vertical direction. Alternatively, in some embodiments, the ground probe 250 may be a telescoping probe that is collapsible in the vertical direction, and the ground probe 250 may collapse in the vertical direction upon contact with the surface, such as the ground. As the ground probe 250 makes contact with the surface, the ground probe 250 sends a signal to the parcel carrier controller 212, which then commands the motor 213 to reposition the parcel carrying arms 230 from the engaged position into the disengaged position, such that the parcel 300 is decoupled from the parcel carrier 200. In this way, the ground probe 250 may assist in ensuring that the parcel 300 is not released from the parcel carrier 200 until the parcel 300 is positioned on or proximate to a surface, such as a landing surface where the parcel 300 is to be delivered. By ensuring that the parcel is positioned on or proximate to a surface, damage to the parcel 300 may be minimized, as compared to when the parcel is released from the parcel carrier 200 from a height above a landing surface. While the ground probe 250 is described herein as including a probe extending downward from the parcel carrying arms 230, it should be understood that the ground probe 250 may include any suitable sensor for detecting a distance between the bottom surface 310 of the parcel and a surface, for example and without limitation, a proximity sensor, a LIDAR sensor, a SONAR sensor and/or the like.

v. UAV Control System

In various embodiments, the UAV 100 includes a UAV control system 150 that includes a plurality of sensing devices that assist in navigating the UAV 100 during flight. The plurality of sensing devices are configured to detect objects around the UAV 100 and provide feedback to a UAV computing entity 808 to assist in guiding the UAV 100 in the execution of various operations, such as takeoff, flight navigation, and landing, as will be described in greater detail herein.

Figure 10:
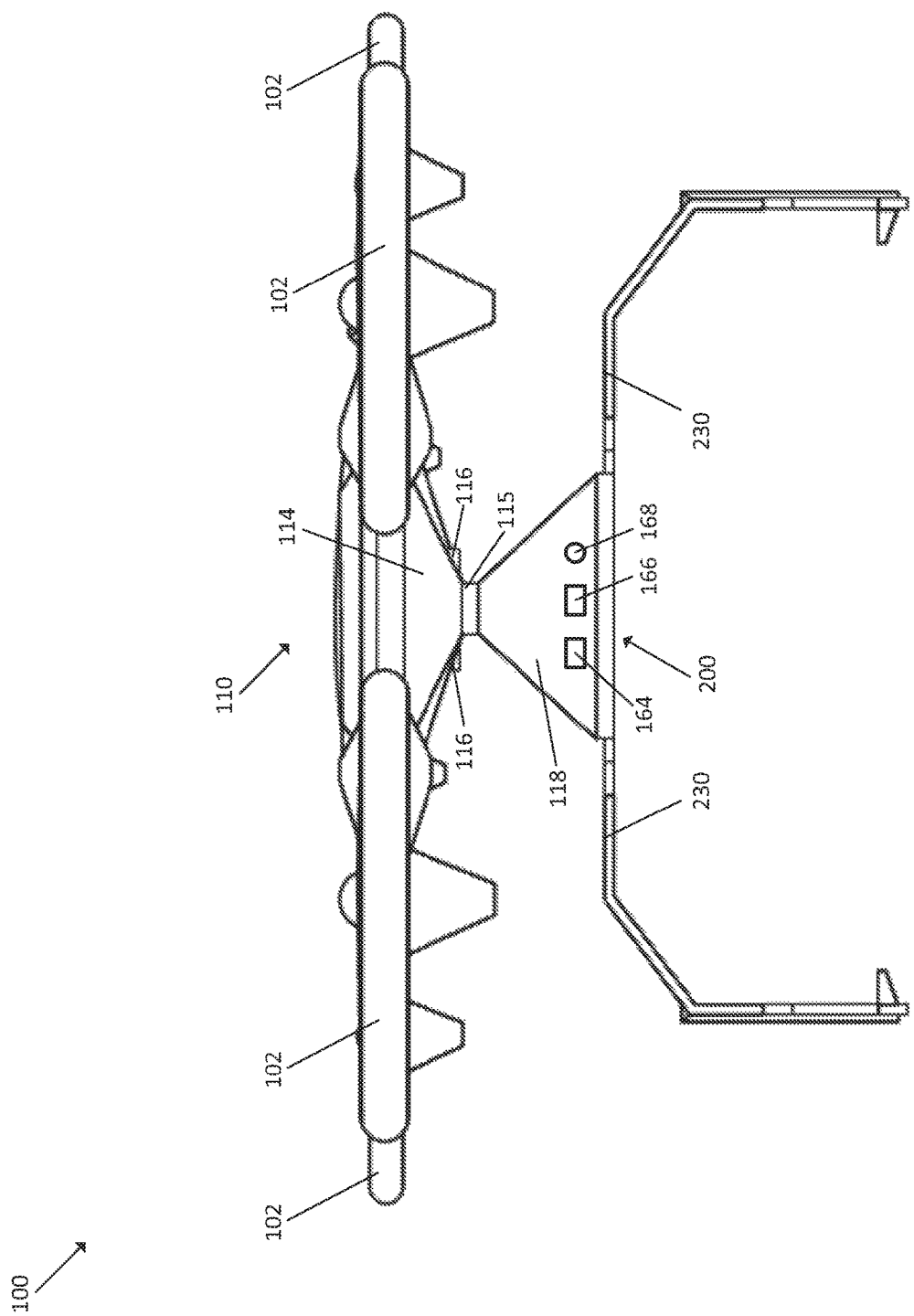
FIG. 10 schematically depicts a front view of the UAV of FIG. 1 and various sensors according to one embodiment shown and described herein.
Figure 11:
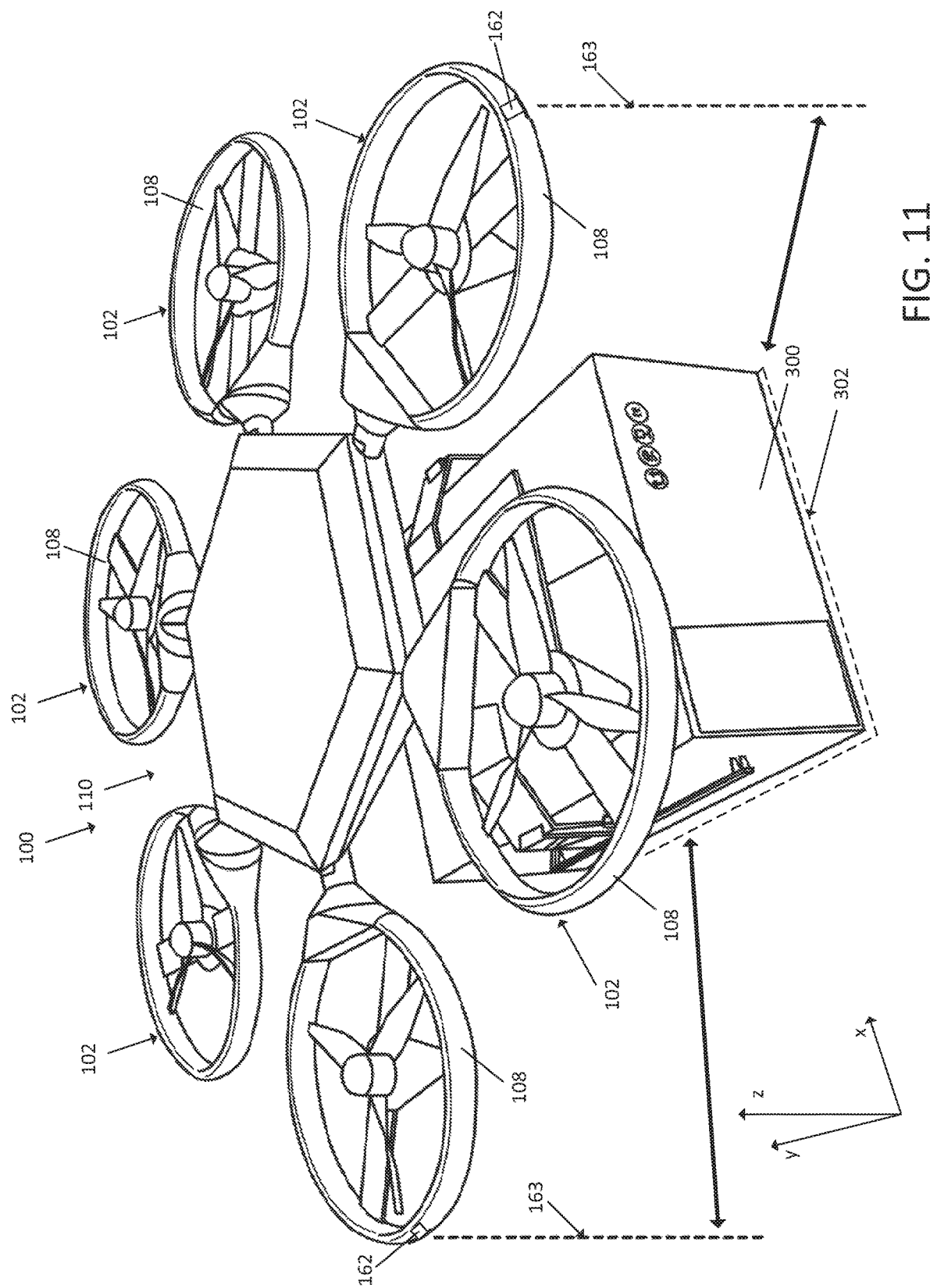
FIG. 11 schematically depicts a top perspective view of the UAV of FIG. 1 and ground landing sensors according to one embodiment shown and described herein.

FIGS. 10 and 11 show the parcel carrier 200 secured to a parcel 300 and further secured to the UAV 100 for delivery. In the illustrated embodiment, the UAV 100 includes a plurality of sensors, including ground landing sensors 162, vehicle landing sensors 164, flight guidance sensors 166, and one or more cameras 168. The vehicle landing sensors 164 are positioned on the lower portion 118 of the UAV chassis 110 and assist in landing the UAV 100 on a vehicle 10 (FIG. 1) as will be described in greater detail herein. The vehicle landing sensors 164 may include one or more cameras (e.g., video cameras and/or still cameras), one or more altitude sensors (e.g., Light Detection and Ranging (LIDAR) sensors, laser-based distance sensors, infrared distance sensors, ultrasonic distance sensors, optical sensors and/or the like). Being located on the lower portion 118 of the UAV chassis 110, the vehicle landing sensors 164 are positioned below the propulsion members 102 and have a line of sight with the opposing rails of the delivery vehicle's UAV support mechanism 400 (FIG. 1) when the UAV 100 approaches the vehicle 10 (FIG. 1) during landing, as will be described in greater detail herein.

The UAV's one or more cameras 168 are also positioned on the lower portion 118 of the UAV chassis 110, on propeller guards 108, on ground probes 250, and/or the like. The one or more cameras 168 may include video and/or still cameras, and may capture images and/or video of the flight of the UAV 100 during a delivery process, and may assist in verifying or confirming delivery of a parcel 300 to a destination, as will be described in greater detail herein. Being located on the lower portion 118 of the UAV chassis 110, the one or more cameras 168 are positioned below the propulsion members 102 and have an unobstructed line of sight to view the flight of the UAV 100.

The UAV's flight guidance sensors 166 are also positioned on the lower portion 118 of the UAV chassis 110. The flight guidance sensors 166 may include LIDAR, LiDAR, LADAR, SONAR, magnetic-field sensors, RADAR sensors, and/or the like and may be configured to "sense and avoid" objects that the UAV 100 may encounter during flight. For example the flight guidance sensors 166 may be configured to detect objects positioned around the UAV 100 such that the UAV 100 may determine an appropriate flight path to avoid contact with the objects. By positioning the flight guidance sensors 166 on the lower portion 118 of the UAV chassis 110, the flight guidance sensors 166 are positioned below the propulsion members 102 and may have an unobstructed line of sight to view the flight of the UAV 100.

Referring in particular to FIG. 11, the UAV's ground landing sensors 162 are coupled to the upper portion 114 of the UAV chassis 110. In the embodiment depicted in FIG. 11, the ground landing sensors 162 are coupled to the propulsion members 102 at their outer perimeter on their respective propeller guards 108. According to various embodiments, the ground landing sensors 162 are generally configured to detect a distance between the UAV and surfaces positioned within a line of sight 163 of the ground landing sensors 162. For example, during flight, the ground landing sensors 162 may detect a distance between the UAV and a landing surface, such as the ground or the roof of the parcel delivery vehicle 100. By detecting a distance between the UAV 100 and a landing surface, the ground landing sensors 162 may assist in the takeoff and landing of the UAV 100. According to various embodiments, the ground landing sensors 162 may include SONAR sensors, LIDAR sensors, IR-Lock sensors, infrared distance sensors, ultrasonic distance sensors, magnetic-field sensors, RADAR sensors, and/or the like.

In certain embodiments, the ground landing sensors 162 may be pivotally coupled to the propeller guards 108, such that the ground landing sensors 162 may rotate with respect to the propeller guards 108. As noted above, the propulsion members 102 may pivot with respect to the UAV chassis 110. Thus, the ground landing sensors 162 may pivot with respect to the propeller guards 108, such that when the propeller guards 108 pivot with respect to the UAV chassis 110, the ground landing sensors 162 may maintain the line of sight 163 downward toward a landing surface.

In the embodiment depicted in FIG. 11, the ground landing sensors 162 are positioned outside of a maximum parcel envelope 302 in which the parcel 300 is positioned. In particular, the maximum parcel envelope 302 defines a maximum region in which the parcel 300 is positioned when the parcel is selectively coupled to the UAV 100. When the ground landing sensors 162 are coupled to the propulsion members 102, the ground landing sensors 162 are positioned outside of the maximum parcel envelope 302 defined by the parcel 300, each of the ground landing sensors 162 may maintain an unobstructed line of sight 163 to the landing surface. For example, the ground landing sensors 162 are positioned such that they are outside of the maximum parcel envelope 302 acceptable by the parcel carrier's carrying arms 230.

Figure 12:
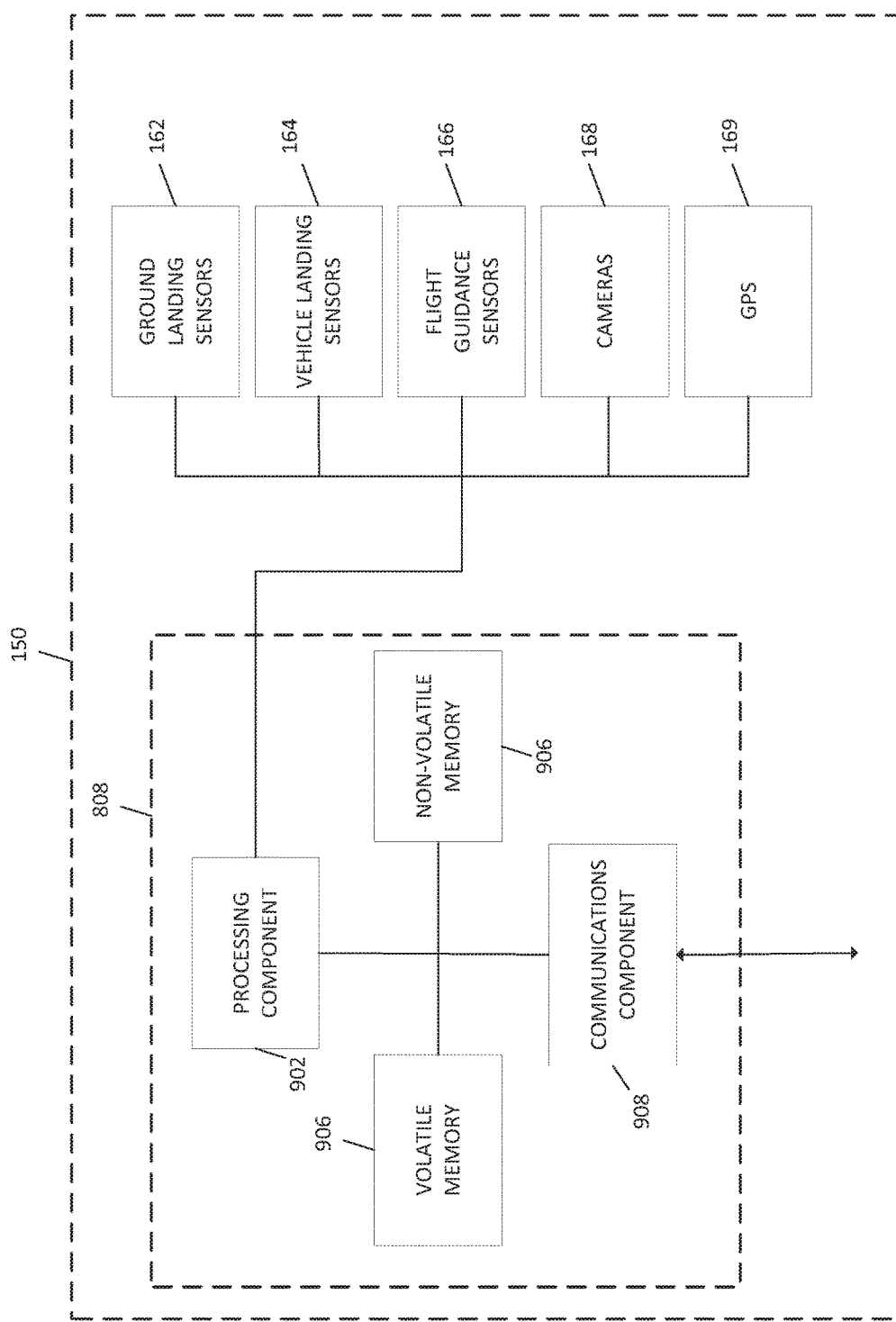
FIG. 12 schematically depicts a UAV control system according to one embodiment shown and described herein.

Referring to FIGS. 3 and 12 collectively, the UAV 100 includes a UAV control system 150. The UAV control system includes a UAV computing entity 808 that is communicatively coupled to one or more sensing elements. In general, the terms computing entity, computer, entity, device, system, and/or similar words used herein interchangeably may refer to, for example, one or more computers, computing entities, desktop computers, tablets, phablets, notebooks, laptops, distributed systems, servers or server networks, blades, gateways, switches, processing devices, processing entities, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on information/data, content, information, and/or similar terms used herein interchangeably.

Figure 13:
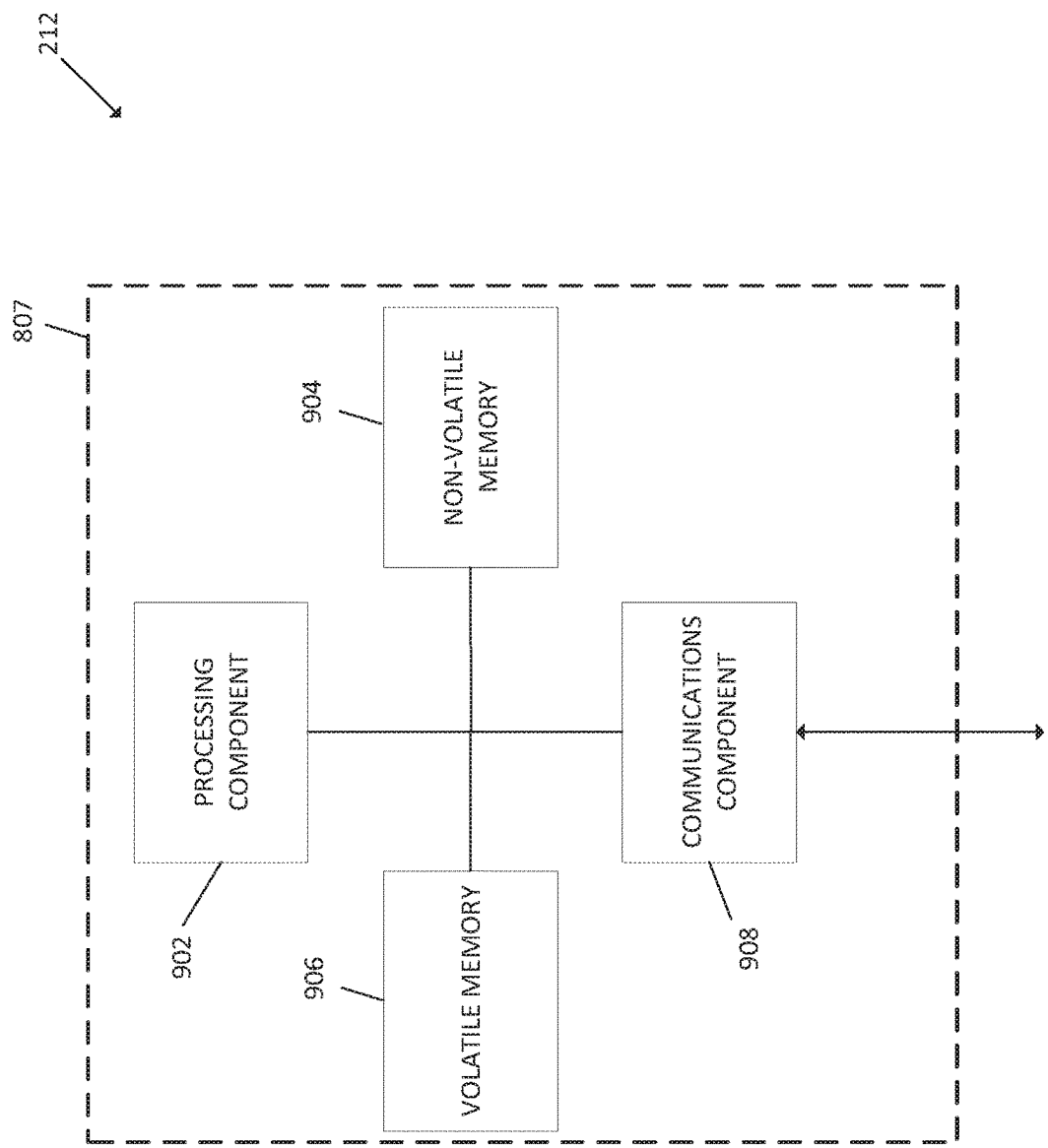
FIG. 13 schematically depicts a parcel earner controller according to one embodiment shown and described herein.

As shown in FIG. 13, in one embodiment, the UAV computing entity 808 may include or be in communication with one or more processing elements/components 902 (also referred to as processors, processing circuitry, processing device, and/or similar terms used herein interchangeably) that communicate with other elements/components within the UAV computing entity 808 via a bus, for example. As will be understood, the processing elements/components 902 may be embodied in a number of different ways. For example, the processing element/component 902 may be embodied as one or more complex programmable logic devices (CPLDs), "cloud" processors, microprocessors, multi-core processors, coprocessing entities, application-specific instruction-set processors (ASIPs), microcontrollers, and/or controllers. Further, the processing element/component 902 may be embodied as one or more other processing devices or circuitry. The term circuitry may refer to an entirely hardware embodiment or a combination of hardware and computer program products. Thus, the processing element/component 902 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element/component 902 may be configured for a particular use or configured to execute instructions stored in volatile or non-volatile media or otherwise accessible to the processing element/component 902. As such, whether configured by hardware or computer program products, or by a combination thereof, the processing element/component 902 may be capable of performing steps or operations according to embodiments of the present invention when configured accordingly.

In one embodiment, the UAV computing entity 808 may further include or be in communication with memory components/elements-such as non-volatile media (also referred to as non-volatile storage, memory, memory storage, memory circuitry and/or similar terms used herein interchangeably). In one embodiment, the non-volatile storage or memory may include one or more non-volatile storage or memory media 904, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, information/data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer readable storage medium using one or more database models, such as a hierarchical database model, network model, relational model, entity-relationship model, object model, document model, semantic model, graph model, and/or the like.

In one embodiment, the memory components/elements may further include or be in communication with volatile media (also referred to as volatile storage, memory, memory storage, memory circuitry and/or similar terms used herein interchangeably). In one embodiment, the volatile storage or memory may also include one or more volatile storage or memory media 906, including but not limited to random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. As will be recognized, the volatile storage or memory media may be used to store at least portions of the databases, database instances, database management systems, information/data, applications, programs, program modules, scripts, source code, object code, byte code, compiled code, interpreted code, machine code, executable instructions, and/or the like being executed by, for example, the processing element/component 902. Thus, the databases, database instances, database management systems, information/data, applications, programs, program modules, scripts, source code, object code, byte code, compiled code, interpreted code, machine code, executable instructions, and/or the like may be used to control certain aspects of the operation of the UAV computing entity 808 with the assistance of the processing element/component 902 and operating system.

As indicated, in one embodiment, the central computing entity 802 may also include one or more communications components/elements 908 for communicating with various computing entities, such as by communicating information/data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the central computing entity 802 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

In embodiments, each of the ground landing sensors 162, the vehicle landing sensors 164, the flight guidance sensors 166, and the one or more cameras 168 are communicatively coupled to a UAV computing entity 808, and in particular the processing component 902 of the UAV computing entity 808. The UAV computing entity 808 may send signals to and receive signals from the ground landing sensors 162, the vehicle landing sensors 164, the flight guidance sensors 166, and the one or more cameras 168. The UAV computing entity 808 is also communicatively coupled to the propulsion members 102 and may command the propulsion members 102 to rotate, and/or may command the motorized joints 104 to pivot the propulsion members 102 to rotate about the joint axis 105.

Moreover, the UAV 100 may include GPS sensors and/or other satellite system sensors for detecting a current location of the UAV relative to an intended travel destination (e.g., a destination location and/or a vehicle). In various embodiments, the UAV control system 150 may comprise a communications port (e.g., 3G, 4G, 5G communication ports) such that the UAV control system 150 may communicate with one or more additional computing entities.

Referring to FIGS. 9 and 13, collectively the parcel carrier controller 212 is schematically depicted. The parcel carrier controller 212 generally includes parcel carrier computing entity 807 comprising a processing component 902, a volatile memory 906, a non-volatile memory 904, and a communications component 908, as described above with respect to the UAV computing entity 808. As described above, the parcel carrier controller 212 is communicatively coupled to the motor 213 of the parcel carrier 200, for example via the communications component 908, and controls operation of the motor 213 to move the parcel carrying arms 230 between the engaged position and the disengaged position. The parcel carrier controller 212 is also communicatively coupled to the ground probe 250, for example via the communications component 908, and may receive signals from the ground probe 250 indicating that the ground probe 250 has contacted a surface, such as a landing surface. Furthermore, the parcel carrier computing entity 807 may communicate with the UAV computing entity 808 via the communications component 908 and may exchange data/information with the UAV computing entity 808, for example, a state of charge of the power supply 214 of the parcel carrier 200.

As described above, the communications component 908 may include for communicating with various computing entities, such as by communicating information/data, content, information, and/or similar terms used herein interchangeably that can be transmitted, received, operated on, processed, displayed, stored, and/or the like. Such communication may be executed using a wired data transmission protocol, such as FDDI, DSL, ATM, frame relay, DOCSIS, or any other wired transmission protocol. Similarly, the central computing entity 802 may be configured to communicate via wireless external communication networks using any of a variety of protocols, such as GPRS, UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR protocols, NFC protocols, Wibree, Bluetooth protocols, wireless USB protocols, and/or any other wireless protocol.

vi. Further Embodiments of the UAV, Parcel Carrier, and Parcel

As can be understood, various modifications and changes to the UAV 100, the parcel carrier 200, and the parcel 300 as described above in FIGS. 1-13 are contemplated. Description will now be made to various alternative embodiments for the UAV 100, the parcel carrier 200, and the parcel 300.

In some embodiments, the UAV 100 may include an independent UAV power source that provides power to the propulsion members 102, and the parcel carrier 200 is used to couple the parcel 300 to the UAV chassis 110. In other words, in some embodiments, the parcel carrier 200 may not include the power supply 214 and/or the power supply 214 may not provide power to the propulsion members 102, and the propulsion members 102 of the UAV 100 may be powered by the UAV power source. Furthermore, when the UAV 100 includes an independent UAV power source, in some embodiments, the power supply 214 of the parcel carrier 200 may provide power to a refrigeration unit of the parcel 300 and may remain with the parcel 300 upon delivery, as will be described in greater detail herein.

Figure 14:
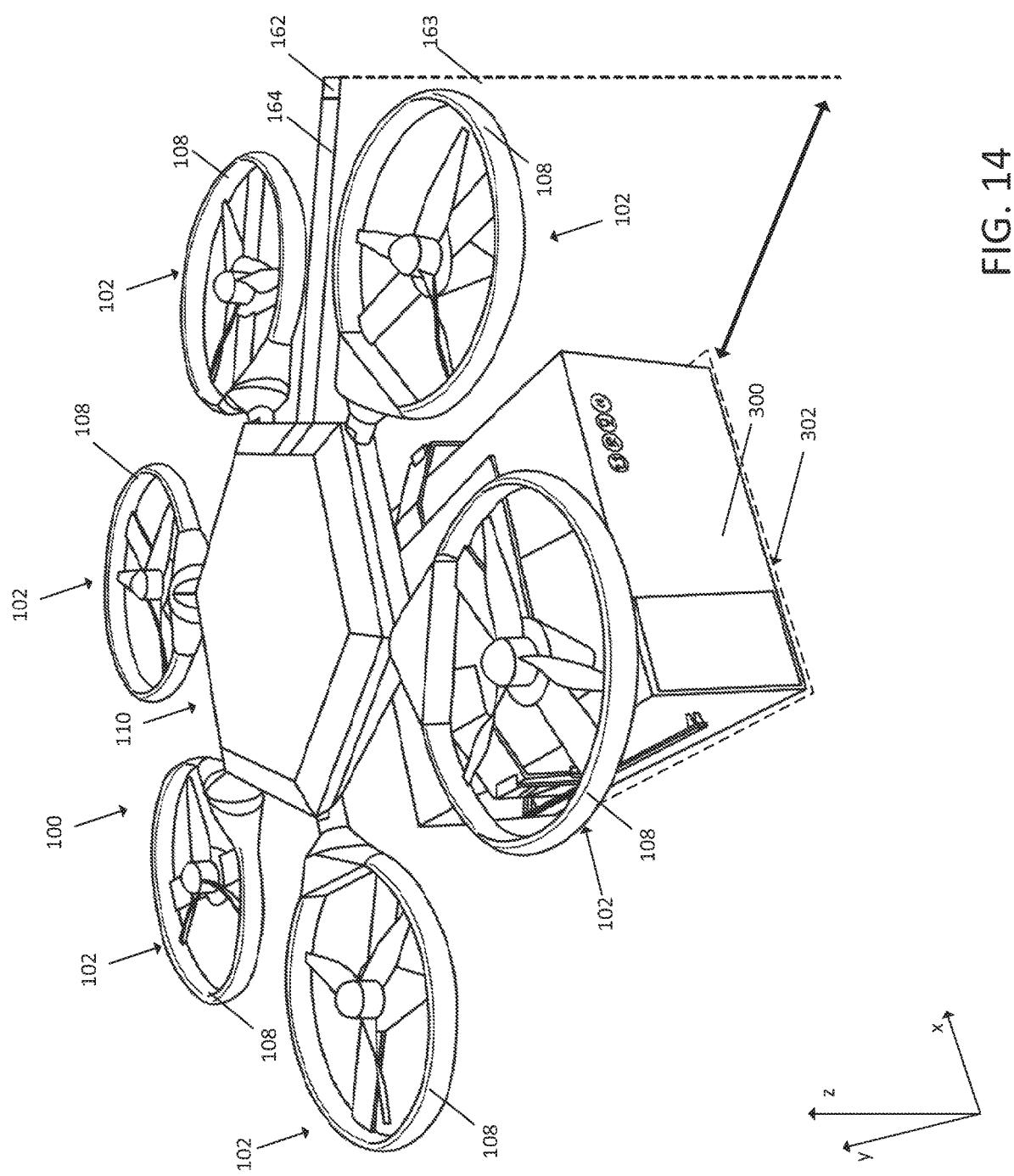
FIG. 14 schematically depicts a top perspective view of the UAV of FIG. 1 and ground landing sensors according to one embodiment shown and described herein.

FIG. 14 shows an alternative configuration of the ground landing sensor 162. Similar to the embodiment described above and depicted in FIG. 11, the ground landing sensor 162 is configured to detect a distance between the ground landing sensor 162 and surfaces positioned within a line of sight 163 of the ground landing sensor 162. For example, during flight, the ground landing sensors 162 may detect a distance between the ground landing sensors 162, and accordingly the UAV 100, and a landing surface, such as the ground. By detecting a distance between the UAV 100 and a landing surface, the ground landing sensors 162 may assist in the takeoff and landing of the UAV 100. The ground landing sensors 162 may include SONAR sensors, LIDAR sensors, IR-Lock sensors, infrared distance sensors, ultrasonic distance sensors, magnetic-field sensors, RADAR sensors, and/or the like.

In the embodiment depicted in FIG. 14, the ground landing sensor 162 is coupled to a support member 164 that extends outside of the maximum parcel envelope 302 in which the parcel 300 is positioned. The ground landing sensor 162 is coupled to the support member 164 such that the ground landing sensor 162 is positioned outside of the maximum parcel envelope 302. Similar to the embodiment described above in FIG. 11, by positioning the ground landing sensor 162 outside of the maximum parcel envelope 302, the ground landing sensor 162 may maintain an unobstructed line of sight 163 with the landing surface as the UAV 100 maneuvers. Further, the ground landing sensor 162 may be pivotally coupled to the support member 164 and/or the support member 164 may be pivotally coupled to the UAV chassis 110 such that the ground landing sensor 162 maintains the line of sight 163 with the landing surface as the UAV 100 maneuvers during flight.

Figure 15:
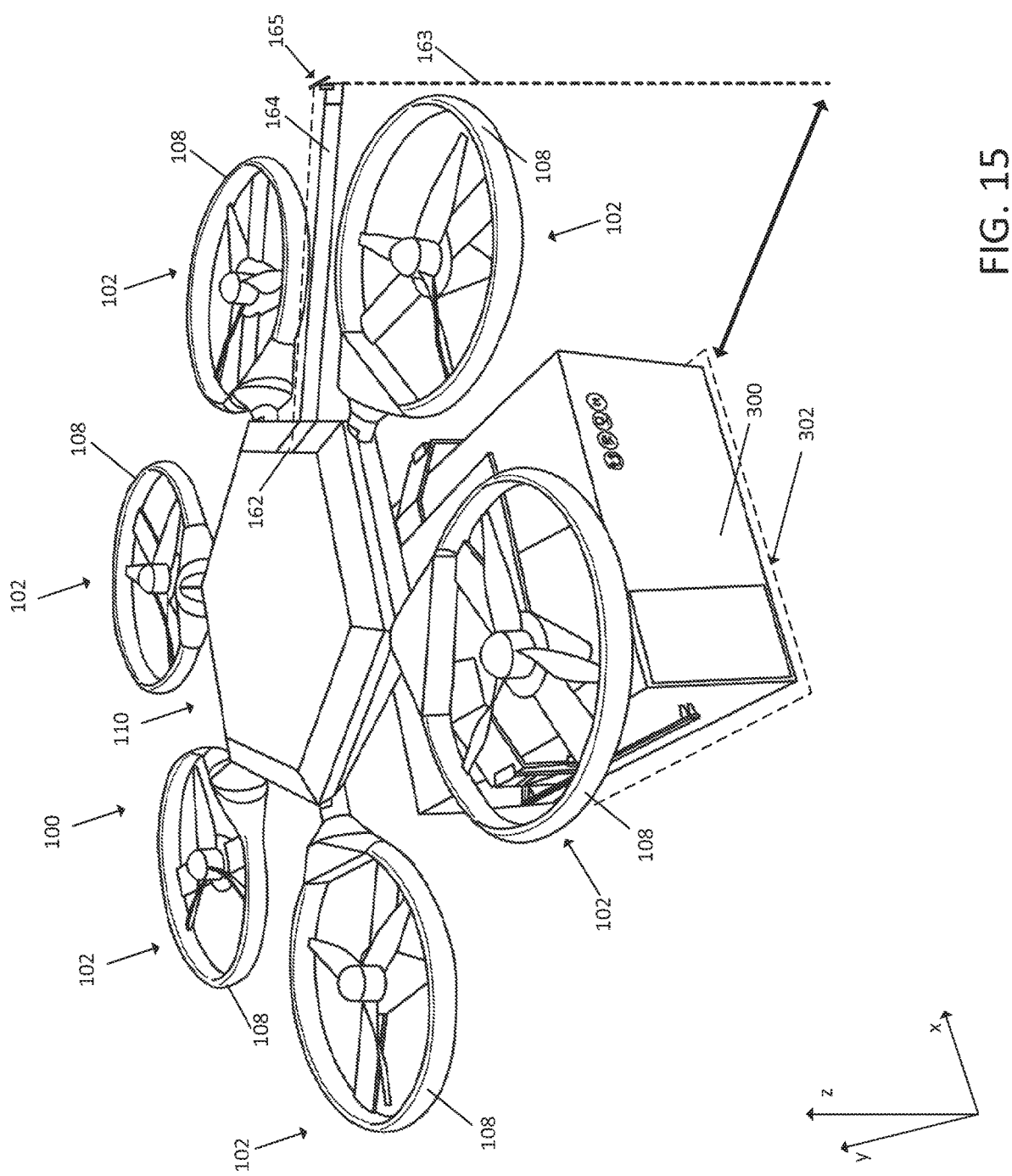
FIG. 15 schematically depicts a top perspective view of the UAV of FIG. 1 and ground landing sensors according to one embodiment shown and described herein.

Referring to FIG. 15, another configuration of the ground landing sensor 162 is schematically depicted. Similar to the embodiment described above and depicted in FIG. 14, the UAV 100 includes the support member 164 extending outward from the UAV chassis 110. However, in the embodiment depicted in FIG. 15, a reflective member 165 is coupled to the support member 164, and the ground landing sensor 162 is coupled to the UAV chassis 110. The ground landing sensor 162 has a line of sight 163 that initially extends outward from the UAV chassis 110 and is redirected downward by the reflective member 165. The ground landing sensor 162 is configured to detect a distance between the landing sensor 162 and surfaces positioned within a line of sight 163 of the landing sensors 162. For example, during flight, the ground landing sensors 162 may detect a distance between the ground landing sensors 162, and accordingly the UAV 100, and a landing surface, such as the ground. By detecting a distance between the UAV 100 and a landing surface, the ground landing sensors 162 may assist in the takeoff and landing of the UAV 100. The ground landing sensors 162 may include SONAR sensors, LIDAR sensors, IRLock sensors, infrared distance sensors, ultrasonic distance sensors, magnetic-field sensors, RADAR sensors, and/or the like.

In the embodiment depicted in FIG. 15, the reflective member 165 is coupled to the support member 164, which extends outside of the maximum parcel envelope 302. The reflective member 165 is coupled to the support member 164 such that the reflective member 165 is positioned outside of the maximum parcel envelope 302. As the ground landing sensor 162 is coupled to the UAV chassis 110 and the line of sight 163 is reflected off of the reflective member 165 positioned at the end of the support member 164, the distance that the support member 164 extends outward from the UAV chassis 110 may be considered when estimating the position of the UAV 100 with respect to a landing surface. By positioning the reflective member 165 outside of the maximum parcel envelope 302, the reflective member 165 may redirect the line of sight 163 of the ground landing sensor 162 such that the line of sight 163 is directed downward in the vertical direction and positioned outside of the maximum parcel envelope 302. Further, the reflective member 165 may be pivotally coupled to the support member 164 and/or the support member 164 may be pivotally coupled to the UAV chassis 110 such that the ground landing sensor 162 maintains the line of sight 163 with the landing surface.

As will be recognized, according to various embodiments, the UAV 100 and parcel carrier 200 (FIG. 5) may be utilized to carry parcels 300 of different sizes and shapes.

Figure 16:
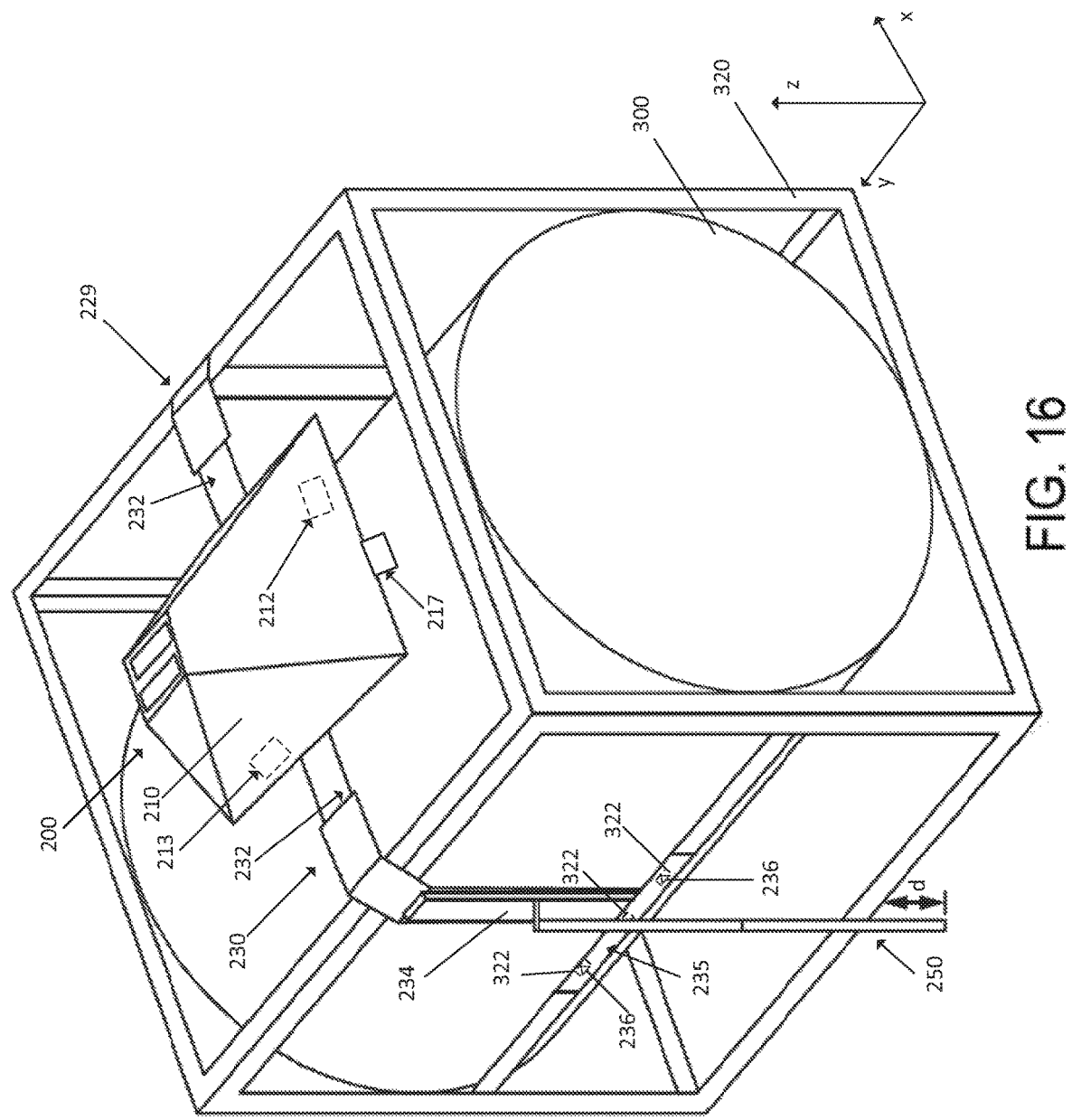
FIG. 16 schematically depicts perspective view of a parcel according to one embodiment shown and described herein.

Referring to FIG. 16, another embodiment of the parcel 300 is schematically depicted. In the embodiment depicted in FIG. 16, the parcel 300 includes a generally cylindrical shape. The shape of the parcel 300 may be adapted to the particular specifications of the goods being transported, and while the embodiment depicted in FIG. 16 includes a generally cylindrical shape, it should be understood that the parcel 300 may include any one of a number of irregular shapes, including, but not limited to, a spherical shape, a triangular prism shape, a conical shape, and/or the like. For example, in some applications, such as when the goods being transported within the parcel 300 are refrigerated or cooled, the parcel 300 may be shaped to minimize heat exchange between the interior of the parcel 300 and the surrounding environment. Furthermore, in some embodiments, the power supply 214 may be configured to remain with the parcel 300 to provide power to a refrigeration unit 217. In other embodiments, the refrigeration unit 217 may include a separate power source positioned within the refrigeration unit 217 that provides power to the refrigeration unit 217.

In the embodiment depicted in FIG. 16, the parcel 300 is positioned within a rectangular frame 320. The parcel 300 depicted in FIG. 16 is configured to be used with the same parcel carrier 200 described above and depicted in FIG. 9. In the embodiment depicted in FIG. 16, the plurality of pins 236 extend inward from the parcel rails 235 toward the parcel frame 320 in the lateral direction, and are selectively positioned to engage corresponding apertures 322 defined by the parcel frame 320. The parcel carrying arms 230 selectively engage the parcel frame 320 through engagement between the plurality of pins 236 and the apertures 322, such that the parcel 300 may be selectively coupled to the UAV 100 (FIG. 6) when the parcel carrier 200 is coupled to the UAV chassis 110. Alternatively, in some embodiments, the parcel frame 320 may include a plurality of pins that may be selectively inserted into apertures defined by the parcel carrying arms.

As described above with respect to FIG. 9, each of the parcel carrying arms 230 are movable in the lateral direction with respect to the parcel 300 and the parcel frame 320 such that the plurality of pins 236 are selectively positioned within the apertures 322 defined by the parcel frame 320.

The parcel carrying arms 230 are repositionable between an engaged position, in which the plurality of pins 236 are positioned within the apertures 322 of the parcel frame 320, and a disengaged position, in which the plurality of pins 236 are spaced apart from the apertures 322 of the parcel frame 320. As described above with respect to FIG. 9, the parcel carrying arms 230 may be inwardly biased, and the parcel carrying arms 230 are moved between the disengaged position and the engaged position by the motor 213.

The parcel carrier 200 further includes the ground probe 250 that extends downward from the engagement housing 210. The ground probe 250 is configured to extend downward from a bottom surface 324 of the parcel frame 320 by a distance 'd' evaluated between the end of the ground probe 250 and the bottom surface 324. As described above with respect to FIG. 9, the ground probe 250 is configured to detect when the parcel frame 320, and accordingly, the parcel 300, is placed on a surface, such as when the parcel 300 is delivered to a destination by the UAV 100 (FIG. 5), and is communicatively coupled to the parcel carrier controller 212.

Figure 17:
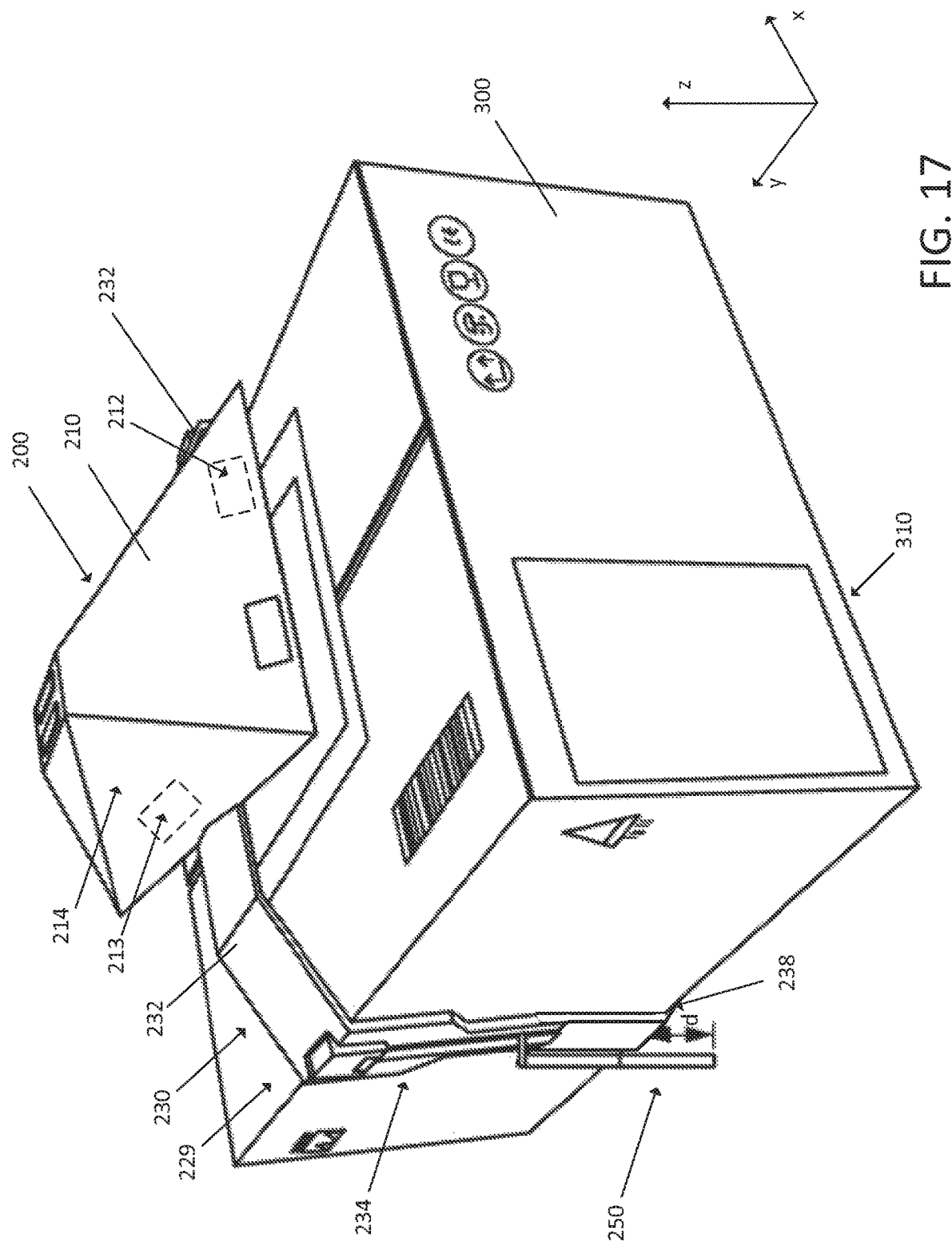
FIG. 17 schematically depicts a perspective view of a parcel carrier and a parcel according to one embodiment shown and described herein.

Referring to FIG. 17, a perspective view of alternative embodiment of the parcel carrier 200 is schematically depicted. In the illustrated embodiment of FIG. 17, the parcel carrier 200 includes parcel carrying arms 230 that extend outward from the engagement housing 210. However, in the embodiment depicted in FIG. 17, the parcel carrier 200 includes a pair of support flanges 238 that extend underneath the bottom surface 310 of the parcel. While one of the parcel carrying arms 230 is obscured by the parcel 300 in the embodiment depicted in FIG. 17, it should be understood that the parcel carrier 200 is substantially symmetrical and the parcel carrying arms 230 on the opposite sides of the parcel 300 are substantially the same. In the embodiment depicted in FIG. 17, the parcel carrying arms 230 include an upper portion 232 extending laterally outward from the engagement housing 210, a lower portion 234 that extends downward from the upper portion 232, and the support flange 238 that extends laterally inward from the lower portion 234. The support flange 238 may be coated with a material having a relatively high coefficient of friction (e.g., high-grip rubber), thereby reducing the likelihood that the parcel 300 may rotate about the lateral direction with respect to the parcel carrier 200. Alternatively, the support flange 238 may extend at least partially in the longitudinal direction to support the parcel 300, thereby reducing the likelihood that the parcel 300 may rotate about the lateral direction with respect to the parcel carrier 200.

In the embodiment of FIG. 17, the parcel carrier's housing 210, upper portion 232, lower portion 234, and ground probe 250 are substantially the same as the embodiment described above with respect to FIG. 9. Accordingly, each of the parcel carrying arms 230 are movable in the lateral direction with respect to the parcel 300 such that the support flanges 238 are selectively positioned beneath the bottom surface 310 of the parcel 300. In particular, the parcel carrying arms 230 may include an inward bias and are repositionable between an engaged position, in which the support flanges 238 are positioned beneath the bottom surface 310 of the parcel 300, and a disengaged position, in which the support flanges 238 are spaced apart from the bottom surface 310 of the parcel 310.

Figure 18:
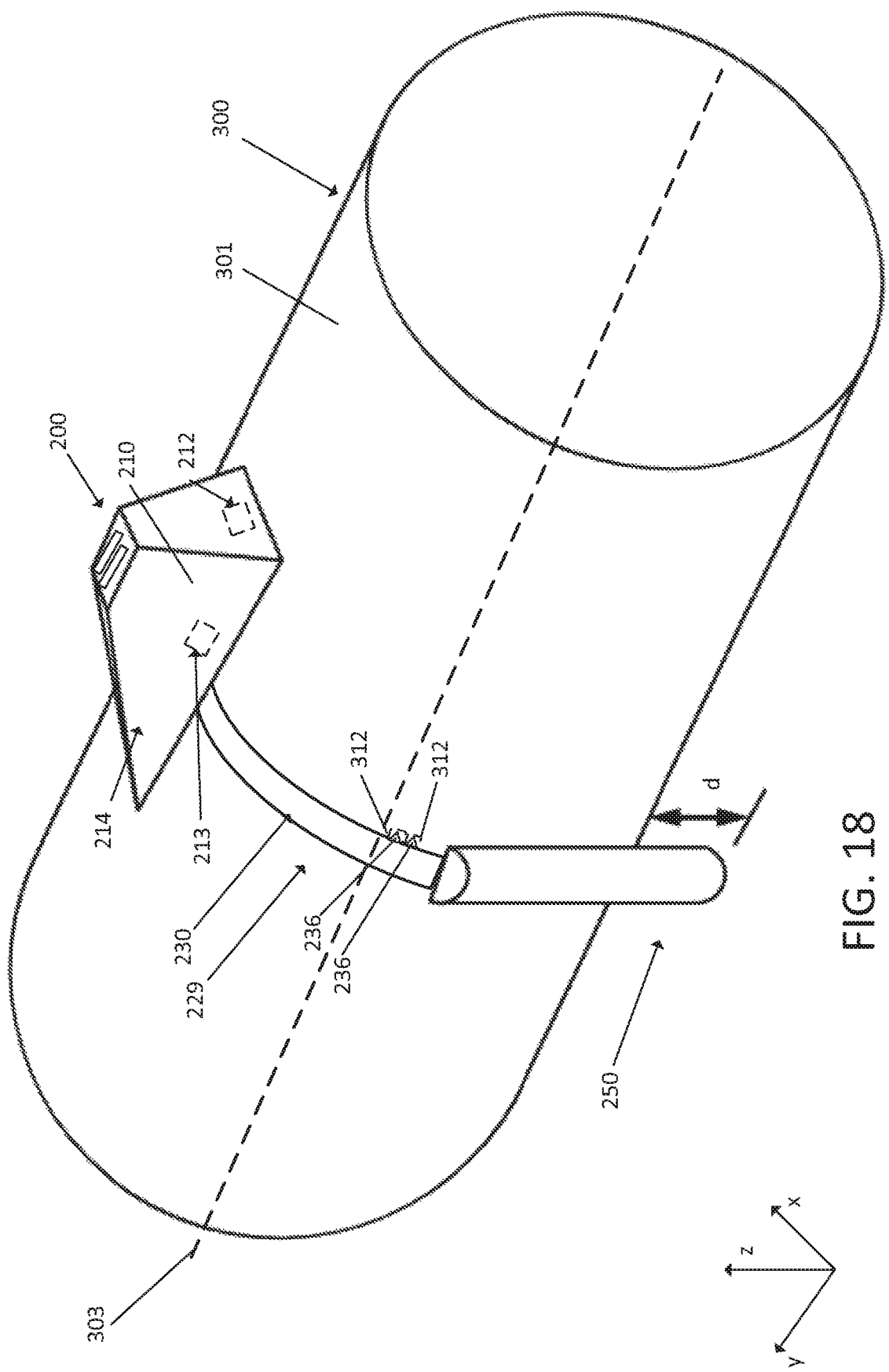
FIG. 18 schematically depicts a perspective view of a parcel carrier and a parcel according to one embodiment shown and described herein.

[Referring to FIG. 18, further embodiments of the parcel carrier 200 and parcel 300 are schematically depicted being secured to one another. As shown in FIG. 18, the parcel 300 includes a generally cylindrical shape. In the embodiment depicted in FIG. 18, the parcel carrying arms 230 directly engage the parcel 300. In the illustrated embodiment, the parcel carrying arms 230 extend around the perimeter 301 of the parcel such that the parcel carrying arms 230 extend below a centerline 303 that bisects the parcel 300 in the vertical direction to support the parcel 300. In other embodiments, such as embodiments in which the parcel carrying arms 230 do not extend below the centerline 303, the parcel carrying arms 300 may support the parcel 300, such as by friction and/or mechanical interference between the parcel carrying arms 230 and the perimeter 301 of the parcel 300. In the embodiment depicted in FIG. 18, the pins 236 of the parcel carrying arms 230 engage with apertures 312 defined by the parcel 300. Alternatively, in some embodiments, the parcel 300 may include a plurality of pins that may be selectively inserted into apertures defined by the parcel carrying arms.

As described above, the shape of the parcel 300 may be adapted to the particular specifications of the goods being transported, and while the embodiment depicted in FIG. 18 includes a generally cylindrical shape, it should be understood that the parcel 300 may include any one of a number of irregular shapes, including, but not limited to, a spherical shape, a triangular prism shape, a conical shape, and/or the like. In some embodiments, the In the embodiment depicted in FIG. 18, the parcel carrying arms 230 include a radius of curvature that is configured to extend at least partially around the perimeter 301 of the parcel 300. While one of the parcel carrying arms 230 is obscured by the parcel 300 in the embodiment depicted in FIG. 18, it should be understood that the parcel carrier 200 is substantially symmetrical and the parcel carrying arms 230 on the opposite sides of the parcel 300 are substantially the same. The parcel carrying arms 230 may be formed from a material having a relatively high coefficient of friction between the parcel carrying arms 230 and the parcel 300, thereby reducing the likelihood that the parcel 300 may rotate about the lateral direction with respect to the parcel carrier 200. Alternatively, the parcel carrying arms 230 may extend at least partially in the longitudinal direction to support the parcel 300, thereby reducing the likelihood that the parcel 300 may rotate about the lateral direction with respect to the parcel carrier 200.

Each of the parcel carrying arms 230 are movable in the lateral direction with respect to the parcel 300 such that parcel carrying arms 230 are selectively positioned around the perimeter 301 of the parcel 300. Similar to the embodiment described above with respect to FIG. 9, the parcel carrying arms 230 may be slidably or pivotally coupled to the parcel housing 210. The parcel carrying arms 230 are repositionable between an engaged position, in which the parcel carrying arms 230 are positioned at least partially around the perimeter 301 of the parcel 300, and a disengaged position, in which the parcel carrying arms 230 are spaced apart from the perimeter 301 of the parcel in the lateral and/or the longitudinal directions. Similar to the embodiment described above with respect to FIG. 9, the parcel carrying arms 230 may be inwardly biased, and the parcel carrying arms 230 are moved between the disengaged position and the engaged position by the motor 213.

The parcel carrier 200 includes the ground probe 250 which is coupled to the parcel carrying arms 230 and extends downward from the perimeter 301 of the parcel 300 by a distance "d." Similar to the embodiment described above with respect to FIG. 9, the ground probe 250 communicates with the motor 213 to selectively release the parcel 300 from the parcel carrier 200.

Figure 19:
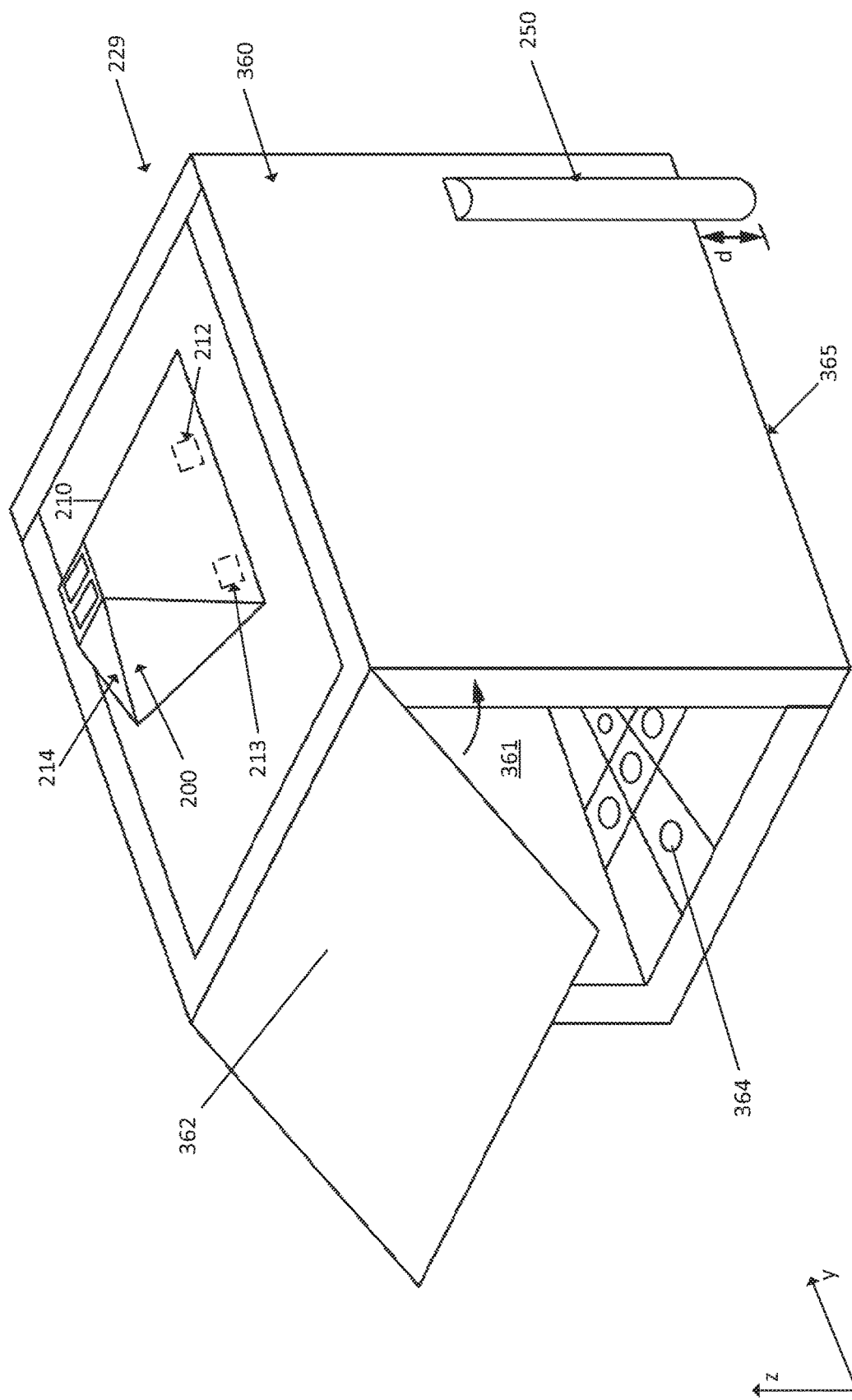
FIG. 19 schematically depicts a perspective view of a parcel carrier and a parcel housing according to one embodiment shown and described herein.

Referring to FIG. 19, another embodiment of the parcel earner 200 is schematically depicted. Similar to the embodiments described above, the parcel carrier 200 includes the engagement housing 210 and the power source 214. However, in the embodiment depicted in FIG. 19, the parcel carrier 200 is coupled to a parcel carrying mechanism 229 including a parcel housing 360, into which parcels may be positioned for delivery. The parcel housing 360 generally defines an enclosed housing having an opening 361 positioned on a side of the parcel housing 360. The opening 361 is selectively covered by a door 362 that is pivotably connected to the housing 360 and adjustable between an open position, in which the interior of the parcel housing 360 is accessible through the opening 361, and closed position, in which the interior of the parcel housing 360 is enclosed. In various embodiments, the door 362 is moved between the open position and the closed position by the parcel carrier's motor 213, which is controlled by the parcel carrier controller.

The parcel housing 360 further includes bearing rails 364 positioned on a floor of the parcel housing 360, which reduce friction between the parcel 300 (FIG. 17) and the floor of the parcel housing 360, such that the parcel 300 may be easily moved into and out of the interior of the parcel housing 360 through the opening 361.

The parcel carrier 200 further includes the ground probe 250 that extends downward from the engagement housing 210. In the embodiment depicted in FIG. 19, the ground probe 250 is coupled to the engagement housing 210 through the parcel housing 360. Alternatively, the ground probe 250 may be directly coupled to the engagement housing 210. The ground probe 250 is configured to extend downward from the bottom surface 365 of the parcel housing 360 by a distance 'd' evaluated between the end of the ground probe 250 and the bottom surface 365 of the parcel housing 360. The ground probe 250 is configured to detect when the parcel housing 360 is placed on a surface, such as when the parcel housing 360 delivers a parcel and the ground probe 250 is communicatively coupled to the parcel carrier controller 212.

When the parcel housing 360 is positioned on a surface, such as when the parcel 300 is delivered to a destination by the UAV 100 (FIG. 5), the ground probe 250 may contact the surface prior to a bottom surface 365 of the parcel housing 360. As the parcel housing 360 is lowered toward the landing surface, such as the ground, the ground probe 250 may contact the landing surface and deflect and/or elastically deform in the vertical direction. Alternatively, in some embodiments, the ground probe 250 may be a telescoping probe that is collapsible in the vertical direction, and the ground probe 250 may collapse in the vertical direction upon contact with the surface, such as the ground. As the ground probe 250 makes contact with the surface, the ground probe 250 sends a signal to the parcel carrier controller 212, which then commands the motor to move the door 362 to move from the closed position into the open position. In this way, the ground probe 250 assists in ensuring that the parcel 300 is not released from the parcel housing 360 until the parcel housing 360 is positioned on or proximate to a surface. By ensuring that the parcel housing 360 is positioned on or proximate to a surface, damage to the parcel 300 may be minimized, as compared to when the parcel is released from the parcel housing 360 from a height.

Once the door 362 is in the open position, the parcel 300 (FIG. 17) be manually removed from the interior of the parcel housing 360 via the opening 361 by a parcel consignee. In particular, in some embodiments, when the door 362 is moved into the open position, the UAV 100 (FIG. 5) may maneuver such that the parcel housing 360 is tilted and the parcel 300 moves along the bearing rails 364 and out of the parcel housing 360.

Figure 20:
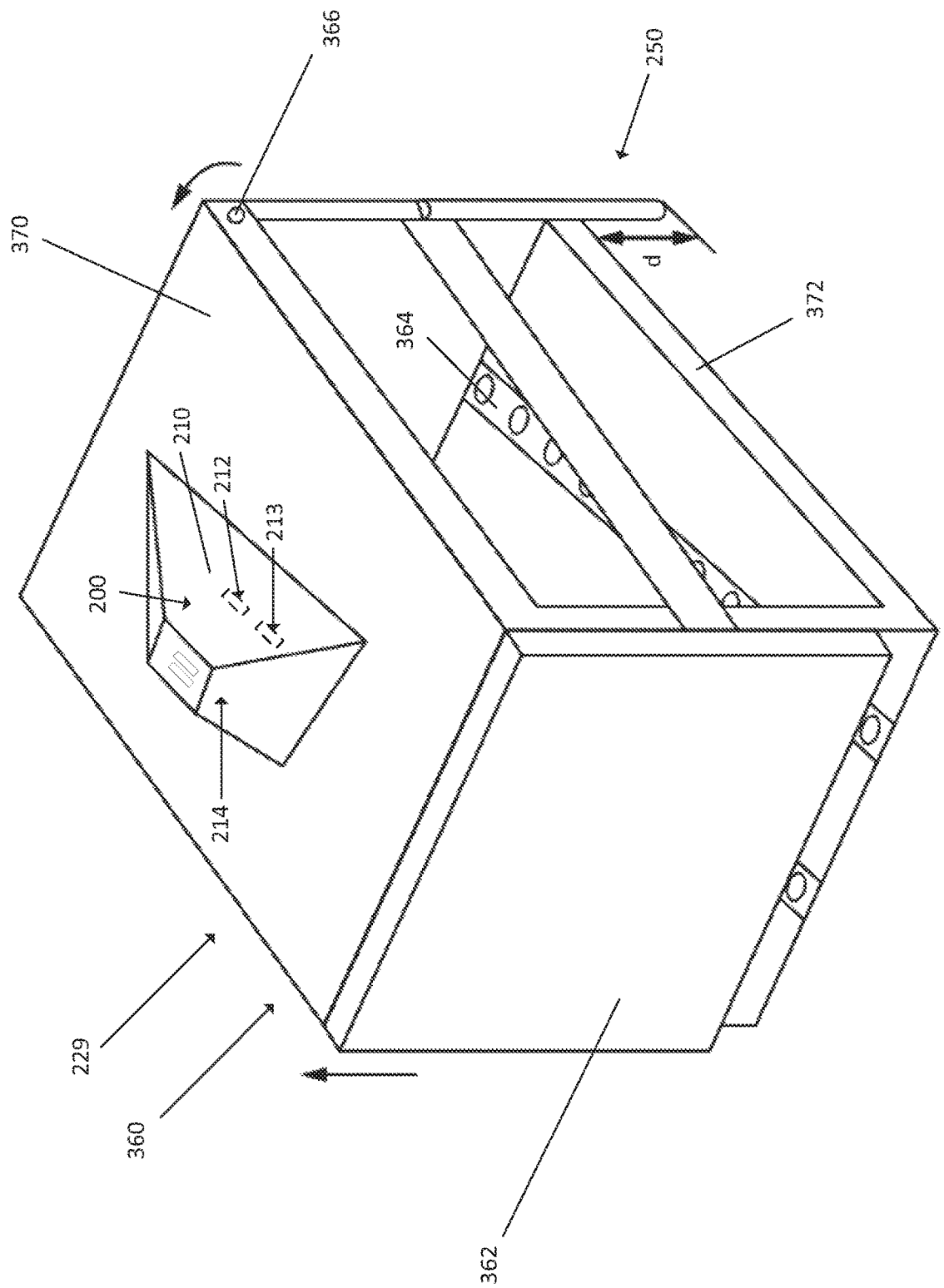
FIG. 20 schematically depicts a perspective view of a parcel carrier and another parcel housing according to one embodiment shown and described herein.
Figure 21B:
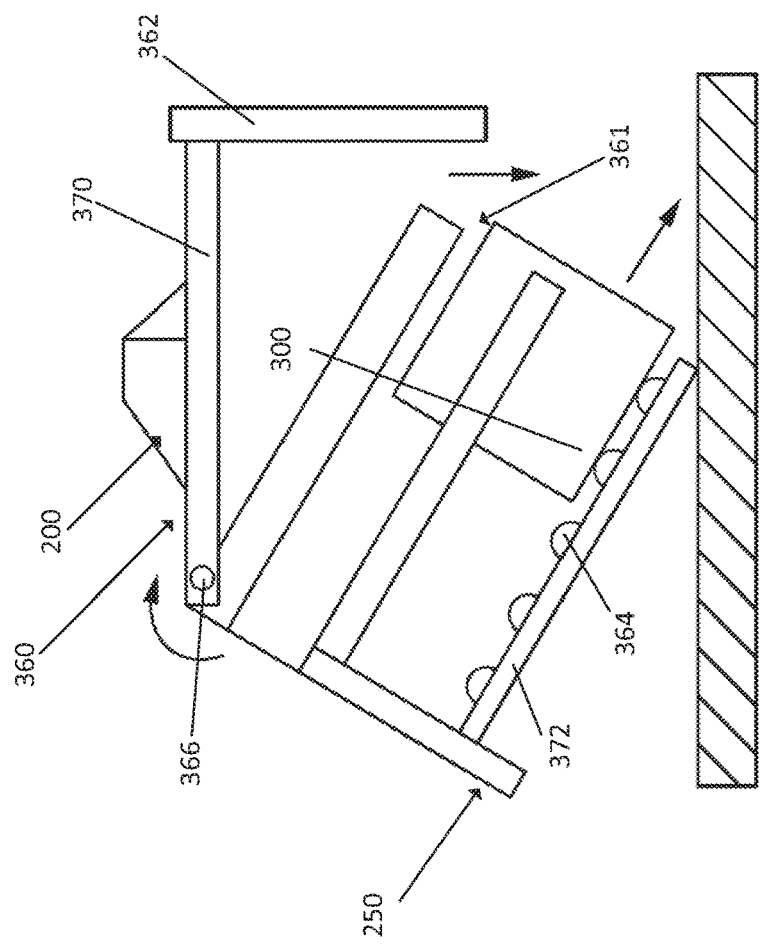
FIG. 21B schematically depicts a side view of the parcel housing of FIG. 20 in a closed position according to one embodiment shown and described herein.
Figure 21A:
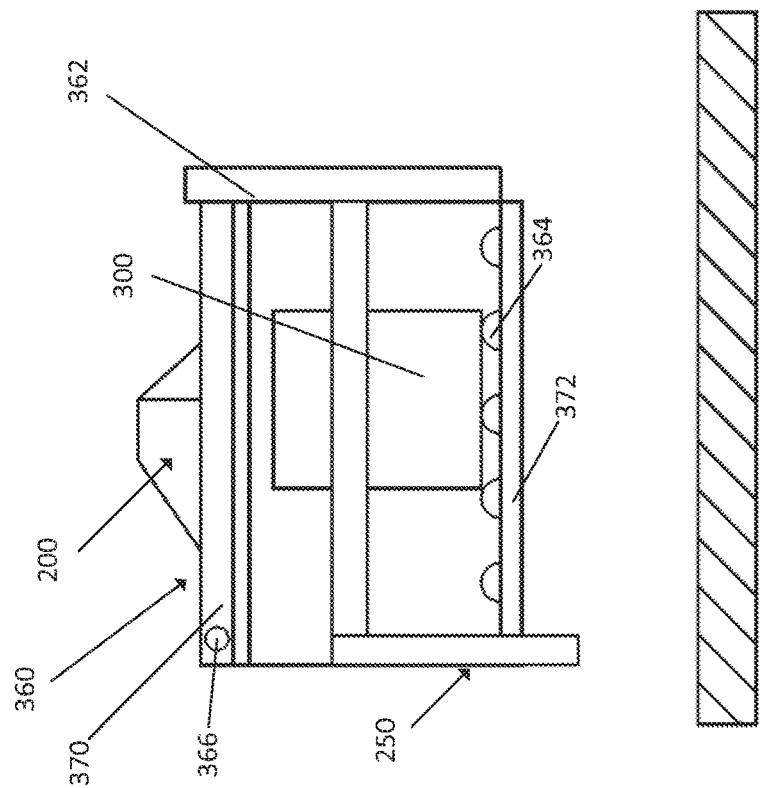
FIG. 21A schematically depicts a side view of the parcel housing of FIG. 20 in a closed position according to one embodiment shown and described herein.

Referring collectively to FIGS. 20, 21A, and 21B, yet another embodiment of the parcel carrier 200 is schematically depicted. In the illustrated embodiment, the parcel housing 360 generally defines and enclosed housing 360 having an opening 361 positioned on a side of the parcel housing 360. The opening 361 is selectively covered by a door 362 and the parcel housing 360 is repositionable between an open position, in which the interior of the parcel housing 360 is accessible through the opening 361, and closed position, in which the interior of the parcel housing 360 is enclosed by the door 362. In the embodiment depicted in FIGS. 20, 21A, and 21B, the parcel housing 360 includes an upper portion 370 that is pivotally coupled to a lower portion 372 at a pivot joint 366.

Referring in particular to FIGS. 21A and 21B, the parcel housing 360 is depicted in a closed position and an open position, respectively. In the closed position, the lower portion 372 is engaged with the upper portion 370 of the parcel housing 360 such that the door 362 covers the opening 361 of the parcel housing 360. In the open position, the lower portion 372 pivots with respect to the upper portion 370 about the pivot joint 366, such that the opening 361 is spaced apart from the door 362 in the vertical direction and the interior of the parcel housing 360 may be accessed through the opening 361. In particular, as the lower portion 372 pivots with respect to the upper portion 370, the door 362 may remain stationary with respect to the upper portion 370 such that the lower portion 362 and the opening 361 of the parcel housing 360 move downward with respect to the door 362 in the vertical direction. As the lower portion 372 pivots, the lower portion 372 may become tilted with respect to a landing surface, such as the ground, such that gravity may induce the parcel 300 to move downward and out of the parcel housing 360.

The parcel housing 360 further includes bearing rails 364 positioned on a floor of the parcel housing 360, which may reduce friction between a parcel 300 and the floor of the parcel housing 360, such that the parcel 300 may be easily moved into and out of the interior of the parcel housing 360 through the opening 361.

The parcel carrier 200 further includes the ground probe 250 that extends downward from the engagement housing 210. In the embodiment depicted in FIGS. 20, 21A, 21B, the ground probe 250 is coupled to the engagement housing 210 through the parcel housing 360. Alternatively, the ground probe 250 may be directly coupled to the engagement housing 210. The ground probe 250 is configured to extend downward from the bottom surface 365 of the parcel housing 360 by a distance 'd' evaluated between the end of the ground probe 250 and the bottom surface 365 of the parcel housing 360. The ground probe 250 is configured to detect when the parcel housing 360 is placed on a surface, such as when the parcel housing 360 delivers a parcel and the ground probe 250 is communicatively coupled to the parcel carrier controller 212.

When the parcel housing 360 is positioned on a surface, such as when the parcel 300 is delivered to a destination by the UAV 100 (FIG. 5), the ground probe 250 may contact the surface prior to a bottom surface 365 of the parcel housing 360. As the parcel housing 360 is lowered toward the surface, such as the ground, the ground probe 250 may contact the surface and deflect and/or elastically deform in the vertical direction. Alternatively, in some embodiments, the ground probe 250 may be a telescoping probe that is collapsible in the vertical direction, and the ground probe 250 may collapse in the vertical direction upon contact with the surface, such as the ground. As the ground probe 250 makes contact with the surface, the ground probe 250 sends a signal to the parcel carrier controller 212. Upon receiving a signal from the ground probe 250, the parcel carrier controller 213 may command the motor 213 to move the lower portion 372 from the closed position in to the open position, such that the parcel 300 will slide out of the parcel carrier's housing 360 through the opening 361. In some embodiments, the motor 213 may rotate the lower portion 372 from the closed position to the open position. Alternatively, in some embodiments, movement of the lower portion 372 with respect to the upper portion 370 about the pivot joint 366 may be unpowered, and may be induced by gravitational forces. In this way, the ground probe 250 may assist in ensuring that the parcel 300 is not released from the parcel housing 360 until the parcel housing 360 is positioned on or proximate to a surface. By ensuring that the parcel housing 360 is positioned on or proximate to a surface, damage to the parcel 300 may be minimized, as compared to when the parcel is released from the parcel housing 360 from a height.

Figure 22:
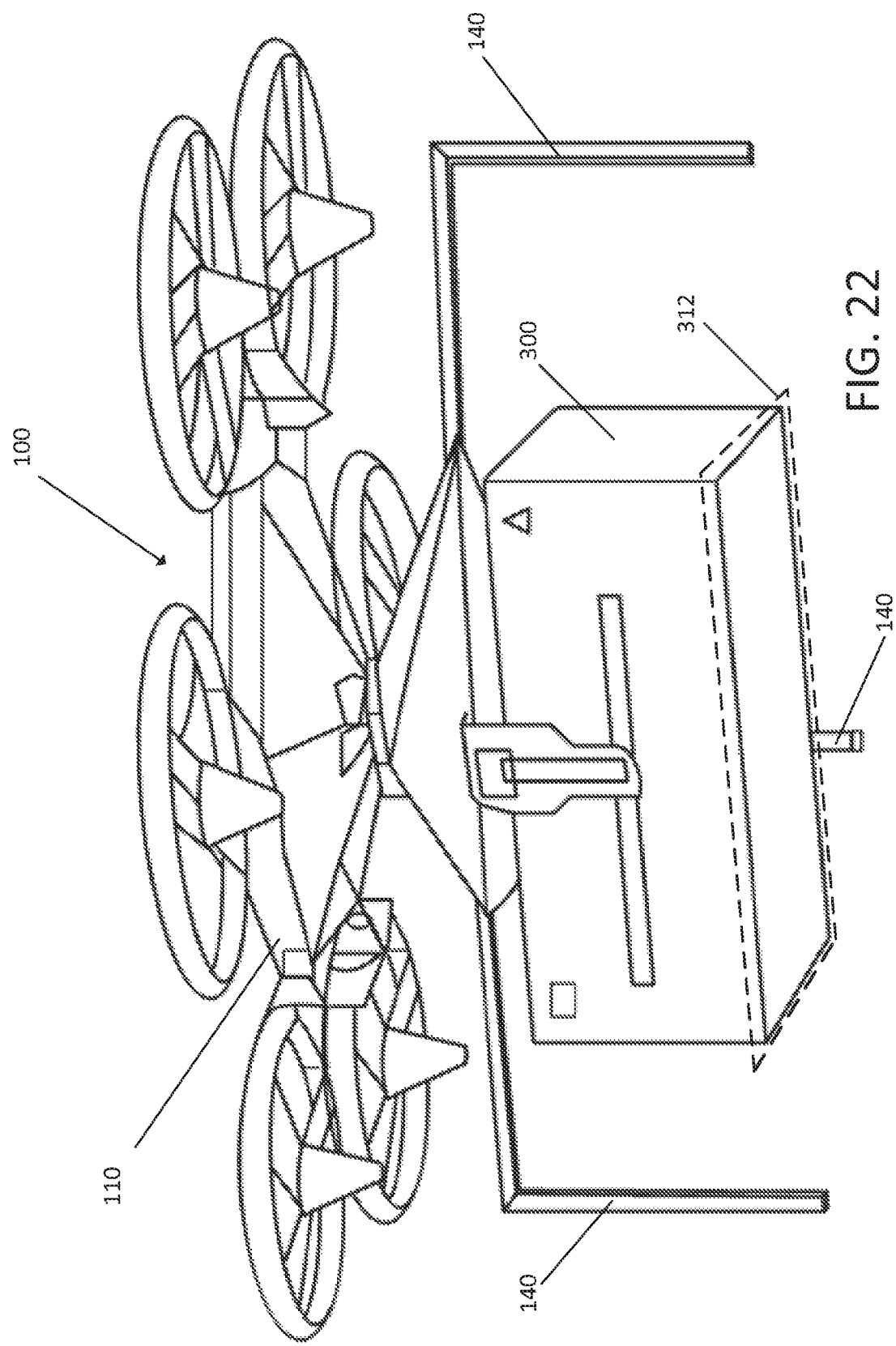
FIG. 22 schematically depicts a bottom perspective view of a UAV including landing arms according to one embodiment shown and described herein.

Referring to FIG. 22 a perspective view of another embodiment of the UAV chassis 110 is schematically depicted. In the embodiment depicted in FIG. 22, landing arms 140 are coupled to and extend downward from the UAV chassis 110 in the vertical direction. The landing arms 140 are configured to extend outward from the maximum parcel envelope 312 of the parcel 300 in the lateral and the longitudinal directions, and the landing arms 140 are configured to extend downward below the parcel 300. The landing arms 140 may support the UAV chassis 110 when the UAV 100 is positioned on a surface, such as during landing and takeoff The landing arms 140 may be relatively flexible, such that the landing arms 140 may elastically deform when supporting the weight of the UAV chassis 110, which may assist in slowing vertical movement of the UAV chassis 110 during landing. Alternatively, in some embodiments, the landing arms 140 may be relatively rigid such that the landing arms 140 do not deform when supporting the weight of the UAV chassis 110. In the embodiment show in FIG. 3, three landing arms 140 are coupled to the UAV chassis 110, however, it should be understood that the UAV 100 may include any suitable number of landing arms 140 to support the UAV chassis 110 on a surface.

Referring to FIG. 23A, a perspective view of another UAV chassis 110 and a parcel carrier 200 is schematically depicted. In the embodiment depicted in FIG. 23A, the UAV chassis 110 includes the upper portion 114 and the reduced width portion 115, and the parcel carrier 200 includes the parcel carrier housing 210. However, in the embodiment depicted in FIG. 23A, the UAV chassis 110 does not include the lower portion, and the parcel carrier housing 210 is directly coupled to the reduced width portion 115 of the UAV chassis 110. Accordingly, the parcel carrier housing 210 of the parcel carrier 200, and the reduced width portion 115 and the upper portion 114 of the UAV chassis 110 form the tapered or hourglass shape that is configured to engage a pair of opposing rails on the vehicle 10 (FIG. 1) as the UAV 100 takes off and lands to the vehicle 10. In particular, the upper portion 114 and the parcel carrier housing 210 may have a greater width evaluated in the lateral and/or the longitudinal direction as compared to the reduced width portion 115. In the embodiment depicted in FIG. 23A, the width of the upper portion 114 evaluated in the lateral direction decreases moving downward along the upper portion 114 toward the reduced width portion 115. The width of the parcel carrier housing 210, evaluated in the lateral direction, decreases moving downward along the parcel carrier housing 210, giving the UAV 100 a tapered or hourglass shape when the parcel carrier housing 210 is coupled to the UAV chassis 110.

In the embodiment depicted in FIG. 23A, the UAV electrical interface 130 is positioned on the reduced width portion 115 and is positioned to align with the carrier electrical interface 220 when the parcel carrier 200 is coupled to the UAV chassis 110. The UAV chassis 110 may include the retaining members 120 (FIG. 7) that may selectively engage the parcel carrier housing 210 to couple the parcel carrier 200 to the UAV chassis 110. Alternatively, in some embodiments, the parcel carrier housing 210 may be coupled to the UAV chassis 110 in any suitable manner, such as an electromagnet and/or the like.

Referring to FIG. 23B, a perspective view of another UAV chassis 110 and parcel carrier 200 is schematically depicted. In the embodiment depicted in FIG. 23B, the UAV chassis 110 includes the upper portion 114, and the parcel carrier 200 includes a receiving portion 270 positioned above the parcel carrier housing 210. The receiving portion 270 includes an upper portion 271 and reduced width portion 274 positioned below the upper portion 271. The upper portion 271, the reduced width portion 274, and the parcel carrier housing 210 form the tapered or hourglass shape that is configured to engage a pair of opposing rails on the vehicle 10 (FIG. 1) as the UAV 100 takes off and lands to the vehicle 10. In the embodiment depicted in FIG. 23B, the width of the upper portion 271 evaluated in the lateral direction decreases moving downward along the upper portion 271 toward the reduced width portion 274. The width of the parcel carrier housing 210, evaluated in the lateral direction, increases moving downward along the parcel carrier housing 210 from the reduced width portion 274, giving the parcel carrier housing 210 and receiving portion 270 an hourglass or tapered shape.

The receiving portion 270 includes an upper portion 271 that defines a cavity 272 which is configured to receive the upper portion 114 of the UAV chassis 110. In particular, when the parcel carrier 200 is coupled to the UAV chassis 110, the upper portion 114 of the UAV chassis 110 may be at least partially inserted into the cavity 272 of the upper portion 271 of the receiving portion 270. The UAV chassis 110 may include the retaining members 120 (FIG. 7) that may selectively engage the receiving portion 270 to couple the parcel carrier 200 to the UAV chassis 110. In the embodiment depicted in FIG. 23B, the UAV electrical interface 130 is positioned on the upper portion 114 of the UAV chassis 110 and the carrier electrical interface 220 is positioned within the cavity 271 of the receiving portion 270 of the parcel carrier 200. The UAV electrical interface 130 is positioned to align with the carrier electrical interface 220 when the parcel carrier 200 is coupled to the UAV chassis 110. Additionally, in the embodiment depicted in FIG. 23A, the landing gear 116 may be positioned on the upper portion 271 of the receiving portion 270, such that the landing gear are positioned on the parcel carrier 200 as compared to the UAV chassis 110.

B. Primary Parcel Delivery Vehicle & UAV Support Mechanism

Figure 24:
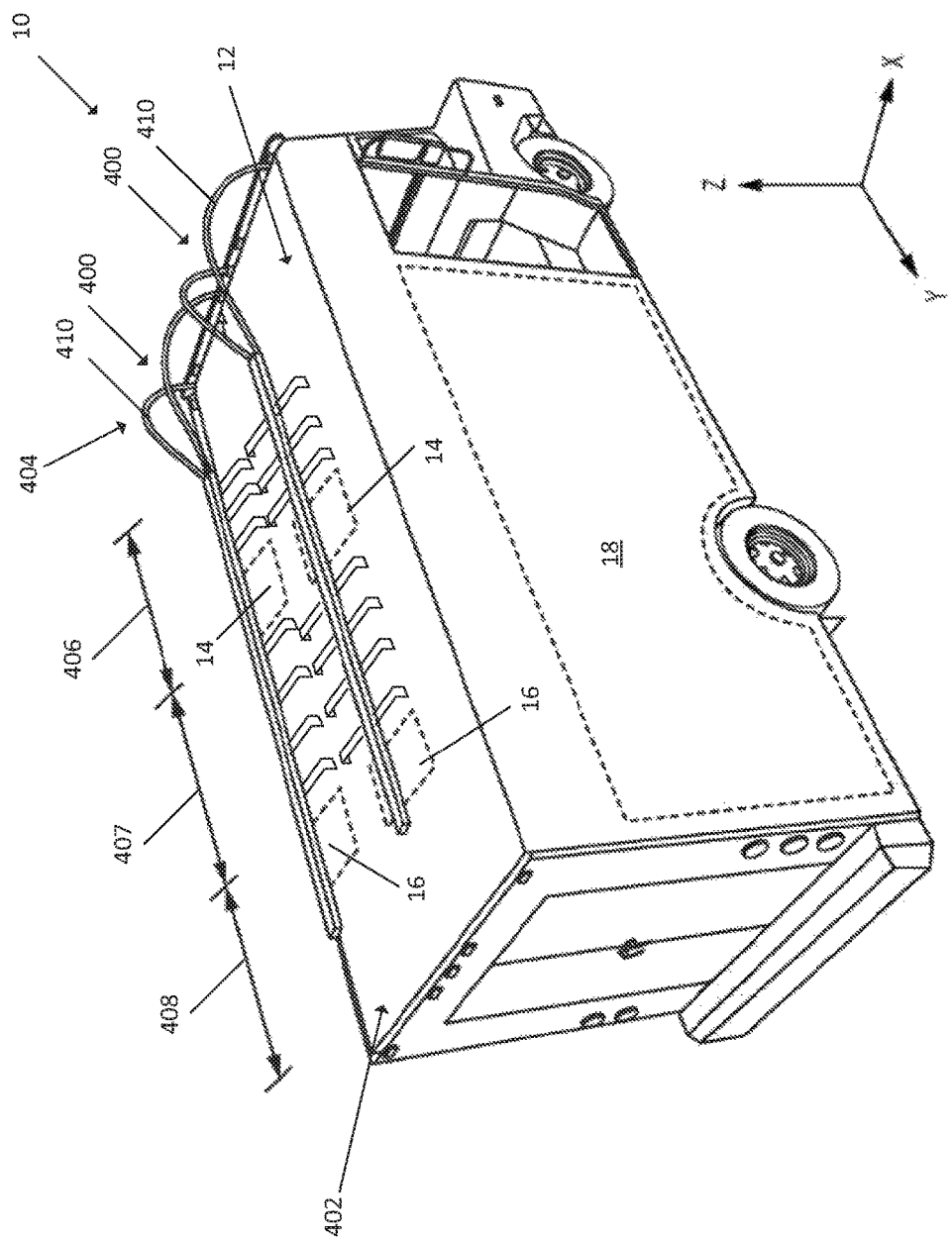
FIG. 24 schematically depicts a rear perspective view of the vehicle of FIG. 1 including a UAV support mechanism according to one embodiment shown and described herein.

FIG. 24 illustrates a perspective view of the primary parcel delivery vehicle 10. In the illustrated embodiment, the primary parcel delivery vehicle is a stepvan (e.g., Workhorse Range-Extended E-Gen truck, Freightliner MT55, or the like). As shown in FIG. 24, the vehicle 10 includes a roof panel 12, which supports a pair of UAV support mechanisms 400. As explained in greater detail herein, the UAV support mechanisms 400 are configured to enable a fleet of UAVs 100 to be dispatched from, and returned to, the vehicle 10 as part of a UAV-based parcel delivery system. In the embodiment depicted in FIG. 24, the vehicle 10 includes two UAV support mechanisms 400, however, it should be understood that the vehicle 10 may include a single UAV support mechanism 400, or any suitable number of UAV support mechanisms 400 to dispatch UAVs 100 (FIG. 1) from the vehicle 10.

As shown in FIG. 24, each UAV support mechanism 400 generally defines a takeoff end 402 and a landing region 404 that is positioned opposite the takeoff end 402. In general, UAVs 100 (FIG. 1) may take off from the vehicle 10 from the takeoff end 402, and may return and land on the vehicle 10 at the landing region 404. In the embodiment depicted in FIG. 24, the takeoff end 402 is positioned at the rear end of the vehicle 10, and the landing region 404 is positioned at the front end of the vehicle 10, however, it should be understood that the takeoff end 402 may be positioned at the front end of the vehicle 10 and the landing region 404 may be positioned at the rear end of the vehicle 10. Additionally, in some embodiments, the takeoff end 402 and the landing region 404 of the support mechanism may be positioned at the same end of the vehicle 10. While the embodiments described herein include one or more UAV support mechanisms 400 positioned on a vehicle 10, it should be understood that UAV support mechanisms 400 may be provided on, and may be utilized to dispatch UAVs 100 from, any suitable structure, for example, a stationary building, structure, movable cargo pod, and/or the like.

Figure 25:
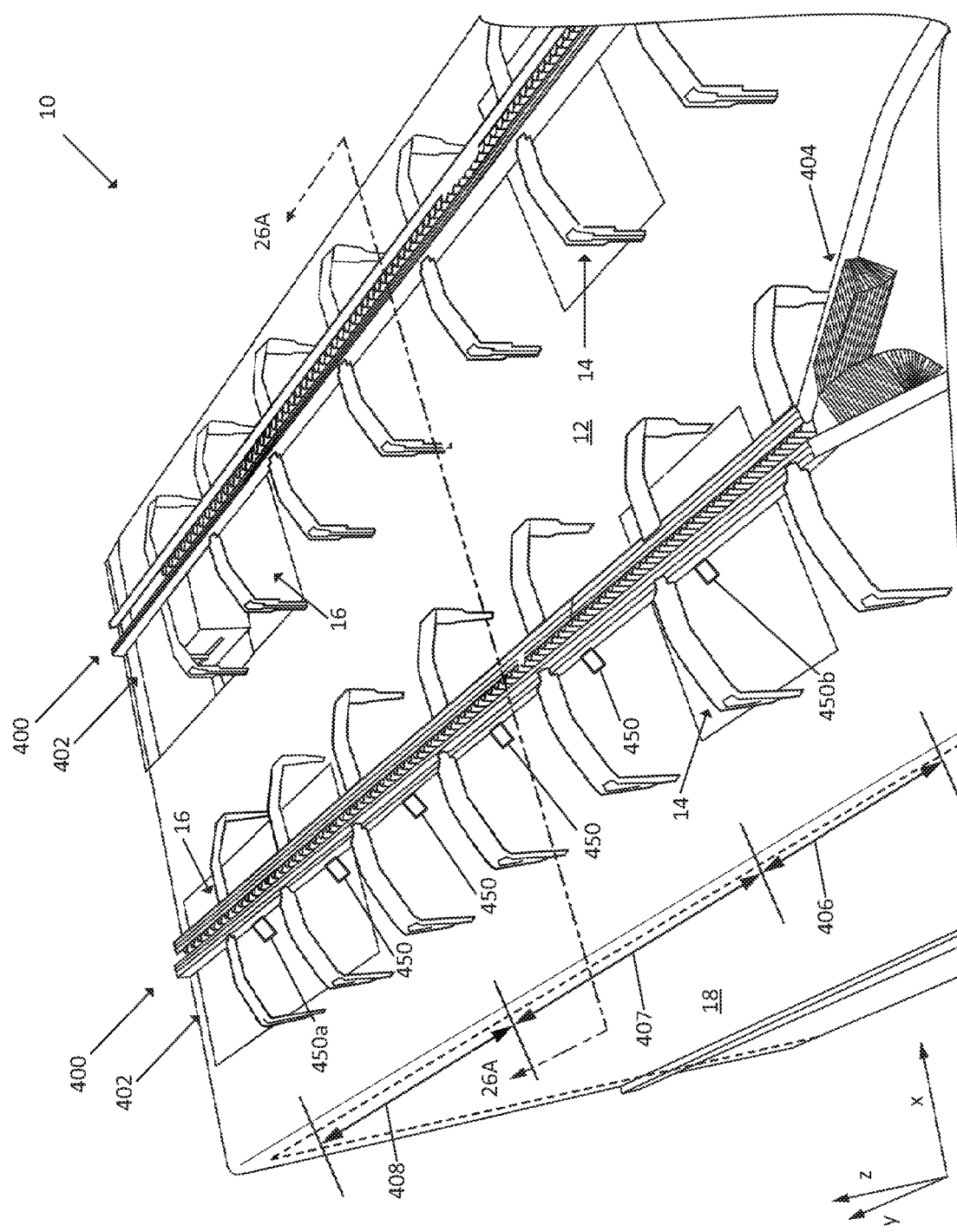
FIG. 25 schematically depicts a perspective view of the UAV support mechanism of FIG. 24 according to one embodiment shown and described herein.

Referring to FIG. 25, a perspective view of the UAV support mechanisms 400 on the roof panel 12 of the vehicle 10 are schematically depicted. Each of the UAV support mechanisms 400 include a pair of opposing rails 410 that extend along the roof panel 12 of the vehicle 10, and the opposing rails 410 are configured to engage the UAV chassis 110 (FIG. 4), as will be described in greater detail herein. The opposing rails 410 are generally symmetrical to one another, and extend along the roof panel 12 in the longitudinal direction. Between the landing region 404 and the takeoff end 402, the UAV support mechanisms 400 define a return region 406, a transport region 407, and a supply region 408.

The roof panel 12 of the vehicle 10 generally defines portals or openings through which an interior compartment 18 of the vehicle 10 may be accessed. In particular, in the embodiment depicted in FIG. 25, the roof panel 12 defines a return portal 14 and a supply portal 16. The return portal 14 is positioned within the return region 406 of the opposing rails 410 and the supply portal 16 is positioned within the supply region 408 of the opposing rails 410. In operation, when a UAV 100 (FIG. 1) is engaged with the opposing rails 410, an empty parcel carrier 200 (FIG. 2) may be released from the UAV chassis 110 (FIG. 2) and may be deposited within the interior compartment 18 of the vehicle 10 through the return portal 14. A new parcel carrier 200 and parcel 300 (FIG. 9) may be provided to the UAV chassis 110 (FIG. 3) from the interior compartment 18 of the vehicle 10 through the supply portal 16, as will be described in greater detail herein.

Referring to FIG. 26A, a section view of the UAV support mechanism 400 is schematically depicted along section 26A-26A of FIG. 25. As described above, the UAV support mechanism 400 includes the opposing rails 410 that extend along the roof panel 12 in the longitudinal direction. The opposing rails 410 are coupled to a plurality of support arms 416 that extend upward from the roof panel 12 and the opposing rails 410 are positioned above the roof panel 12 in the vertical direction. By positioning the opposing rails 410 above the roof panel 12 in the vertical direction, a parcel 300 (FIG. 9) may pass beneath the opposing rails 410 when the parcel 300 is coupled to a UAV chassis 110 (FIG. 2), as will be described in greater detail herein.

Referring collectively to FIGS. 25-26B a perspective view and section views of the return region 406, the transport region 407, and the supply region 408 are schematically depicted. In the return region 406, the transport region 407, and the supply region 408, the UAV support mechanism 406 includes a conveyor 440 that is configured to move a UAV 100 (FIG. 1) along the opposing rails 410 between the return region 406 and the supply region 408. The conveyor 440 generally includes a plurality of rollers 442 that are positioned within a c-shaped profile 410a of the opposing rails 410. The c-shaped profile 410a generally defines an upper rail surface 412 that is oriented to face upward in the vertical direction and a lower rail surface 414 that is oriented to face downward in the vertical direction. The upper rail surface 412 and the lower rail surface 414 may engage the upper portion 114 and the lower portion 118 of the UAV chassis 110 (FIG. 2), restricting movement of the UAV chassis 110 in the vertical direction, as will be described in greater detail herein. In some embodiments, the upper rail surface 412 may include a communication connection that may be communicatively coupled to the UAV computing entity 808 when the UAV chassis 110 is in the UAV support mechanism 400, allowing notifications/messages to be sent and received from the UAV computing entity 808 to a vehicle computing entity 810, as will be described in greater detail herein.

The rollers 442 rotate with respect to the c-shaped profile 410a and may engage the UAV chassis 110 (FIG. 2) to move the UAV chassis 110 from the supply region 408 to the return region 406. In embodiments, the rollers 442 may be operatively coupled to a belt 444 that causes the rollers 442 to rotate about a roller axis 445. The belt 444 may be operatively coupled to a conveyor controller 460 that selectively moves the belt 444 to rotate the plurality of rollers 442.

In embodiments, the conveyor 440 further includes a plurality of includes a plurality of position sensors 450 positioned along the opposing rails 410. The position sensors 450 are configured to detect the position of a UAV chassis 110 (FIG. 2) on the conveyor 440, and may include a plurality of proximity sensors, such as capacitive sensors, inductive sensors, hall-effect sensors, and/or the like. The position sensors 450 are communicatively coupled to the conveyor controller 460 and may send signals to the conveyor controller 460, such as signals indicative of a UAV chassis 110 (FIG. 2) being positioned proximate to one or more of the position sensors 450. In embodiments, the position sensors 450 include a supply position sensor 450a positioned within the supply region 408 and a return position sensor 450b positioned within the return region 406. The supply position sensor 450a is configured to detect when the UAV chassis 110 (FIG. 2) is positioned over the supply portal 16. Similarly, the return position sensor 450b is configured to detect when the UAV chassis 110 (FIG. 2) is positioned over the return portal 14.

Figure 27:
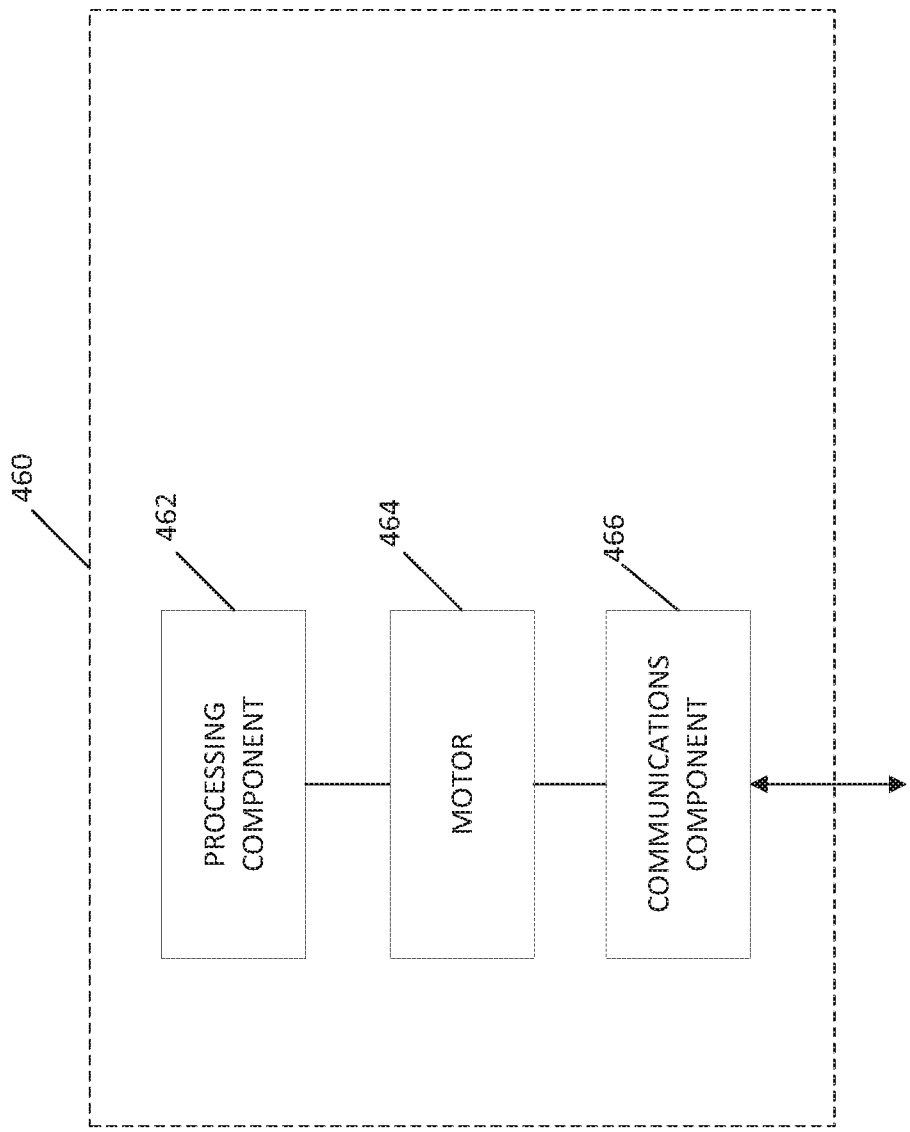
FIG. 27 schematically depicts a conveyor controller according to one embodiment shown and described herein.

Referring to FIG. 27, the conveyor controller 460 is schematically depicted. The conveyor controller 460 generally includes one or more processing elements/components 462, a motor 464, and one or more communications elements/components 466. The motor 464 of the conveyor controller 460 may be operatively coupled to the belt 444 (FIG. 26B) such that the motor 464 drives the belt 444. The conveyor controller may also be communicatively coupled to the plurality of position sensors 450 and may be communicatively coupled to one or more computing entities via the communications device 466. In particular, the communications device 466 is configured for communicating with various computing entities, such as by communicating information/data, content, information, and/or similar terms used herein interchangeably that can be transmitted, received, operated on, processed, displayed, stored, and/or the like. Such communication may be executed using a wired data transmission protocol, such as FDDI, DSL, ATM, frame relay, DOCSIS, or any other wired transmission protocol. Similarly, the central computing entity 802 may be configured to communicate via wireless external communication networks using any of a variety of protocols, such as GPRS, UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR protocols, NFC protocols, Wibree, Bluetooth protocols, wireless USB protocols, and/or any other wireless protocol.

Figure 28:
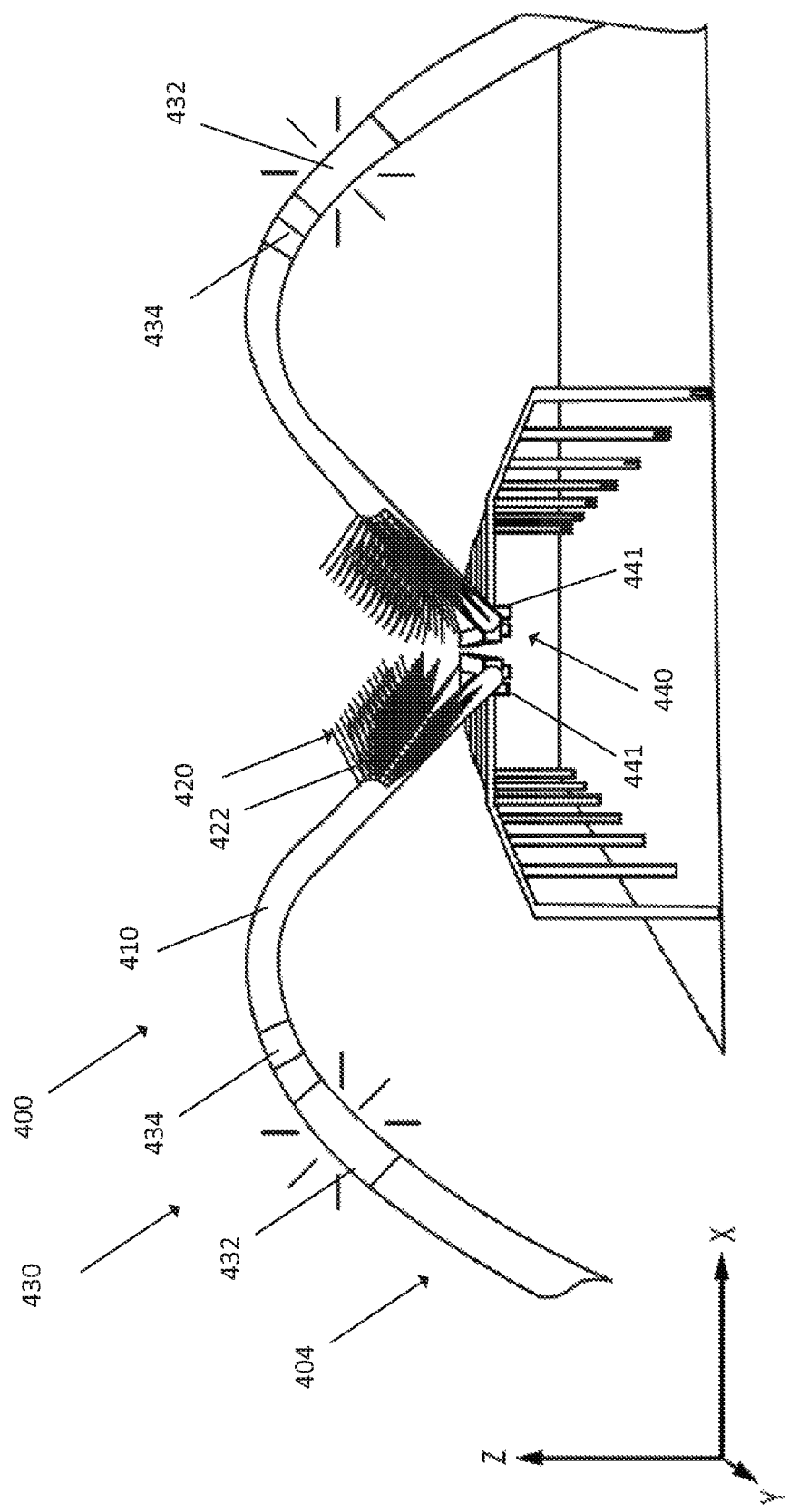
FIG. 28 schematically depicts a front view of opposing rails of the UAV support mechanism of FIG. 24 according to one embodiment shown and described herein.

Referring to FIG. 28, a front view of the landing region 404 of the UAV support mechanism 400 is schematically depicted. The opposing rails 410 converge in the lateral direction moving from the landing region 404 to the return region 406 and a width between the opposing rails 410 is greater in the landing region 410 as compared to the return region 406 and the transport region 407. By converging in the lateral direction, the opposing rails 410 may assist in guiding the UAV chassis 110 (FIG. 2) as the UAV 100 (FIG. 1) lands to the vehicle 10. Each of the opposing rails 410 include a damper 420 positioned at the landing region 404 of the opposing rails 410. The damper 410 generally includes flexible brushes 422 that elastically deform when contacted by a UAV chassis 110 (FIG. 2). In particular, as a UAV 100 lands to the vehicle 10, moving along the landing region 404 to the return region 406, the UAV chassis 110 (FIG. 2) contacts the damper 410. As the UAV chassis 110 (FIG. 2) contacts the damper 410, the forward motion (e.g., motion in the y direction) of the UAV 100 (FIG. 1) will be slowed by the damper 410.

Figure 29:
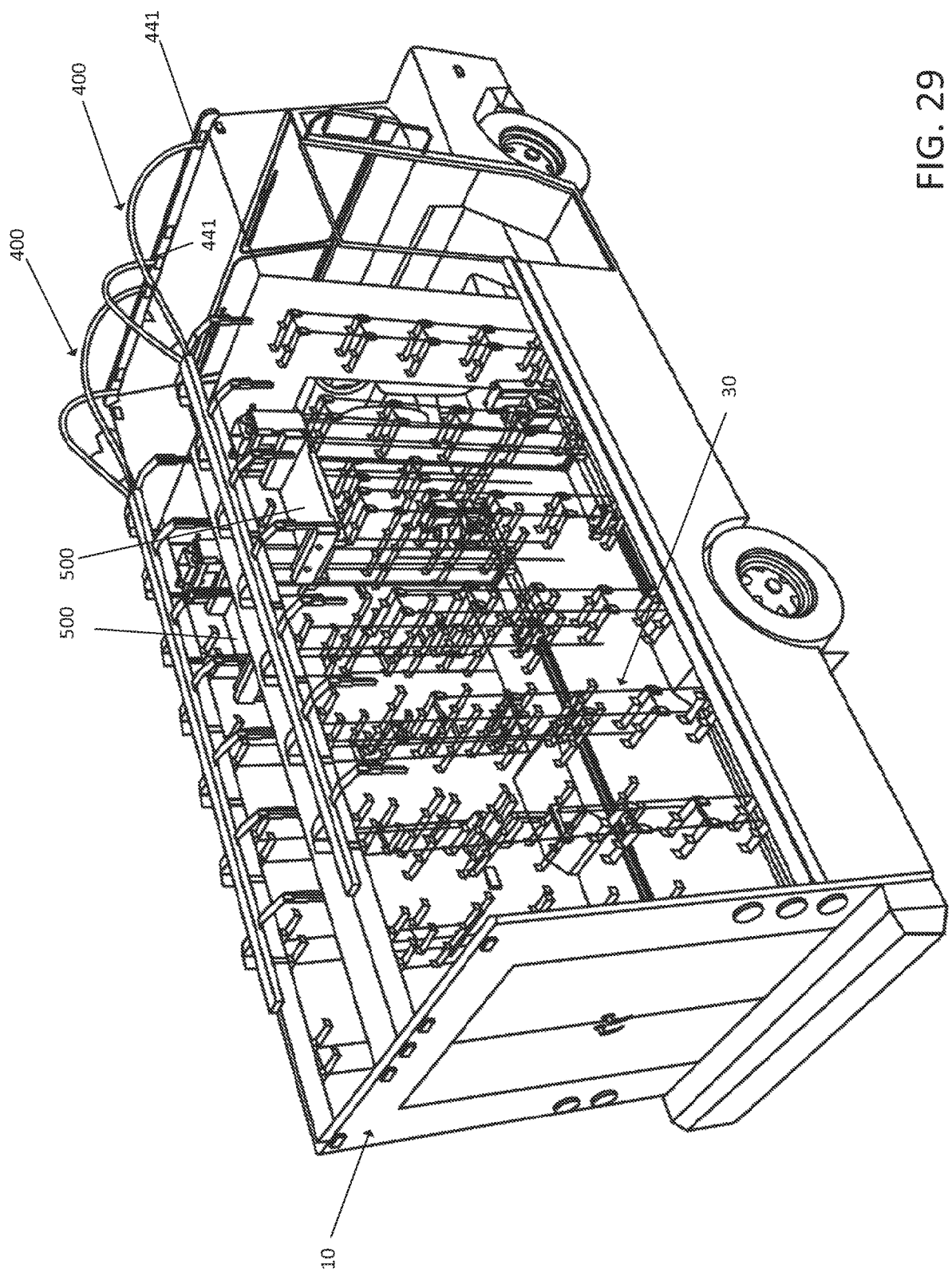
FIG. 29 schematically depicts a rear perspective view of the vehicle of FIG. 1 including racks according to one embodiment shown and described herein.

Referring to FIGS. 28 and 29, in embodiments the opposing rails 410 may be moveable in the vertical direction and/or the lateral direction at the landing region 404. In particular, the opposing rails 410 may be operatively coupled a power source, such as a hydraulic pump and/or the like that allows the landing to move in the vertical direction and/or the lateral direction. By moving the opposing rails 410 in the vertical and/or the lateral direction, the opposing rails 410 may move to match a route/flight path of a UAV 100, such that the UAV 100 may land to the opposing rails 410. In some embodiments, the opposing rails 410 at the landing region 404 are hingedly coupled to the vehicle 10 and/or the conveyor 440 at hinges 441.

Referring again to FIG. 28, the opposing rails 410 include a guidance array 430 positioned in the landing region 404. The guidance array 430 generally includes various devices that may assist in guiding a UAV 100 (FIG. 1) to land on the vehicle 10. In the embodiment depicted in FIG. 28, the guidance array 430 includes a visual indicator 432 and a positioning beacon 434. Each of the opposing rails 410 include a visual indicator 432, which may include a light, LED, and/or the like that emits a light (e.g., radiation on the visual spectrum), which may be detected by the vehicle landing sensors 164 and/or the cameras 168 (FIG. 10) to assist the UAV 100 (FIG. 1) in accurately locating the UAV support mechanism 400 when landing to the vehicle 10, as will be described in greater detail herein.

The positioning beacon 434 may emit a signal that may be detected by the vehicle landing sensors 164 (FIG. 10) to assist the UAV 100 (FIG. 1) in accurately locating the UAV support mechanism 400 when landing to the vehicle 10. In embodiments, the positioning beacon 434 may include such technologies may include iBeacons, Gimbal proximity beacons, BLE transmitters, Near Field Communication (NFC) transmitters, and/or the like. While the embodiment depicted in FIG. 28 includes a positioning beacon 434 positioned on each of the opposing rails 410, it should be understood that the positioning beacon 434 may include a single beacon or any suitable number of beacons positioned at any suitable location on the opposing rails 410 to assist the UAV 100 (FIG. 1) in accurate locating the UAV support mechanism 400.

i. Vehicle

Referring to FIG. 29, a rear perspective of the vehicle 10 is schematically depicted with certain panels removed for clarity. As described above, the vehicle 10 includes a pair of UAV support mechanisms 400 positioned on the roof panel 12 of the vehicle 10. Positioned within the interior of the vehicle 10 is one or more parcel carrier support racks 30. The racks 30 support multiple parcel carriers 200 (FIG. 9), as will be described in greater detail herein. Two loading robots 500 are positioned within the interior compartment 18 of the vehicle 10. The loading robots 500 assist in moving parcel carriers 200 (FIG. 9) within the interior compartment 18 of the vehicle 10, and each of the loading robots 500 may be associated with one of the UAV support mechanisms 400. The racks 30 are generally positioned along the sides of the vehicle 10, however, the racks 30 may be positioned at any suitable location within the vehicle 10, and racks 30 may be centrally positioned within the vehicle 10.

Referring to FIGS. 29 and 35A, the rear perspective of the vehicle 10 and an enlarged perspective view of one of the racks 30 is shown, respectively. The racks 30 each include outwardly extending arms 32 that extend outward from a base portion 31 of the rack 30. The racks 30 further include a plurality of flange ends 34 that extend upward from the outwardly extending arms 32. The outwardly extending arms 32 and the flange ends 34 of the racks 30 are configured to engage the engagement housing 210 of the parcel carrier 200 and restrain movement of the engagement housing 210 in the lateral and the longitudinal directions. In some embodiments, the racks 30 may also include one or more electrical contacts that may provide electrical charge to the power supply 214 when the engagement housing 210 is positioned in the racks 30, such that the power supply 214 may charge or re-charge when placed within the racks 30. By charging the power supplies 214, the racks 30 may assist in preparing a parcel carrier 200 with an expended power supply 214 for re-use.

Figure 30:
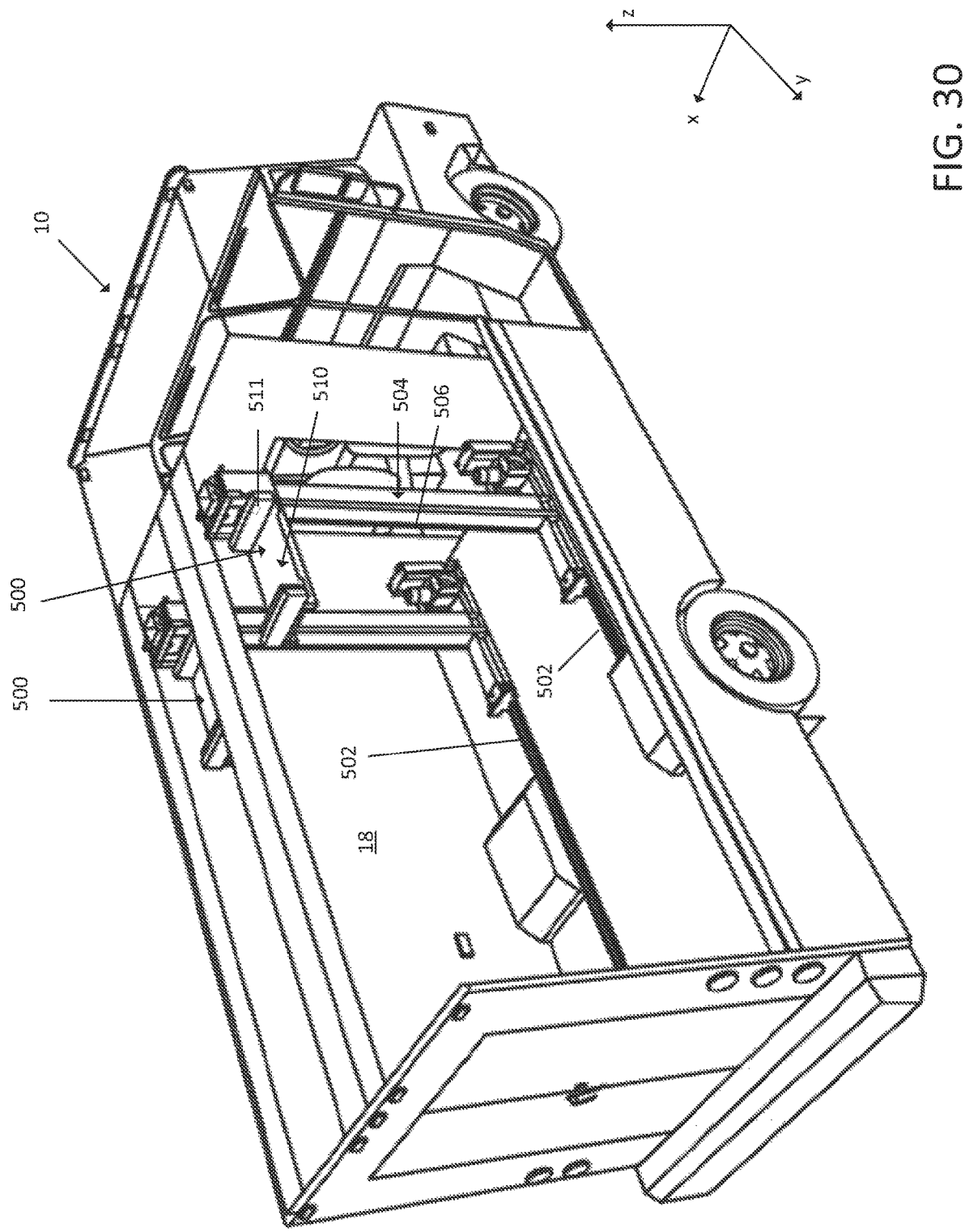
FIG. 30 schematically depicts a rear perspective view of the vehicle of FIG. 1 including robots according to one embodiment shown and described herein.

Referring to FIG. 30, a perspective view of the vehicle 10 is depicted with the racks 30 removed for clarity. The vehicle 10 includes two loading robots 500, each of which are associated with a UAV support mechanism 400 (FIG. 29). The loading robots 500 are each movable along a horizontal track 502 that extends along the interior of the vehicle 18 in the longitudinal direction. The loading robots 500 each include an upright member 504 operatively coupled to the horizontal track 502, and an end effector 510 coupled to the upright member 504. The upright member 504 extends upward in the vertical direction and generally defines a vertical track 506 extending along the upright member 504 in the vertical direction. The end effector 510 is movable along the upright member 504 in the vertical direction along the vertical track 504. Each of the robots 500 include a parcel identification unit 511 that is configured to scan, read, interrogate, receive, communicate with, and/or similar words used herein interchangeably a parcel identifier and/or a parcel carrier identifier, and the parcel identification unit 511 may be communicatively coupled to one or more computing entities, as will be described in greater detail herein.

Referring collectively to FIGS. 35A, 35B, and 35C, a perspective view of the end effector 510 is schematically depicted. The end effector 510 includes an end effector track 514, a platform 512 positioned on and movable along the end effector track 514, and clamping members 516 positioned on opposing ends of the platform 512. The platform 512 may generally support the parcel 300 and the clamping members 516 may be repositionable between an engaged position, in which the clamping members 516 contact opposing sides of the parcel 300, and a disengaged position, in which the clamping members 516 are spaced apart from the sides of the parcel 300. The clamping members 516 may retain the position of the parcel 300 on the platform 512 of the end effector 510 when the loading robot 500 moves the parcel 300 within the interior compartment 18 of the vehicle 10. In the embodiment depicted in FIGS. 35A, 35B, and 35C, the clamping members 516 are positioned on opposing ends of the platform 512 in the longitudinal direction, however, it should be understood that the clamping members 516 may be positioned at any suitable location of the end effector 510 to retain the position of the parcel 300 with respect to the platform 512 of the end effector 510. The clamping members 516 may be repositionable between the engaged position and the disengaged position in any suitable manner, including, but not limited to, electrical power, hydraulic power, and/or the like.

The platform 512 of the end effector 510 is also movable with respect to the upright member 504 in the lateral direction along the end effector track 514. Accordingly, the loading robots 500 are moveable within the interior compartment 18 of the vehicle 10 in the longitudinal direction (e.g., along the horizontal track 502), in the vertical direction (e.g., along the vertical track 504), and in the lateral direction (e.g., along the end effector track 514). While the loading robots 500 are generally described herein as including three axis robots, it should be understood that the loading robots 500 may include any suitable robot to move parcel carriers 200 (FIG. 9) within the interior compartment 18 of the vehicle, such as a six-axis robot, and/or the like.

Figure 31:
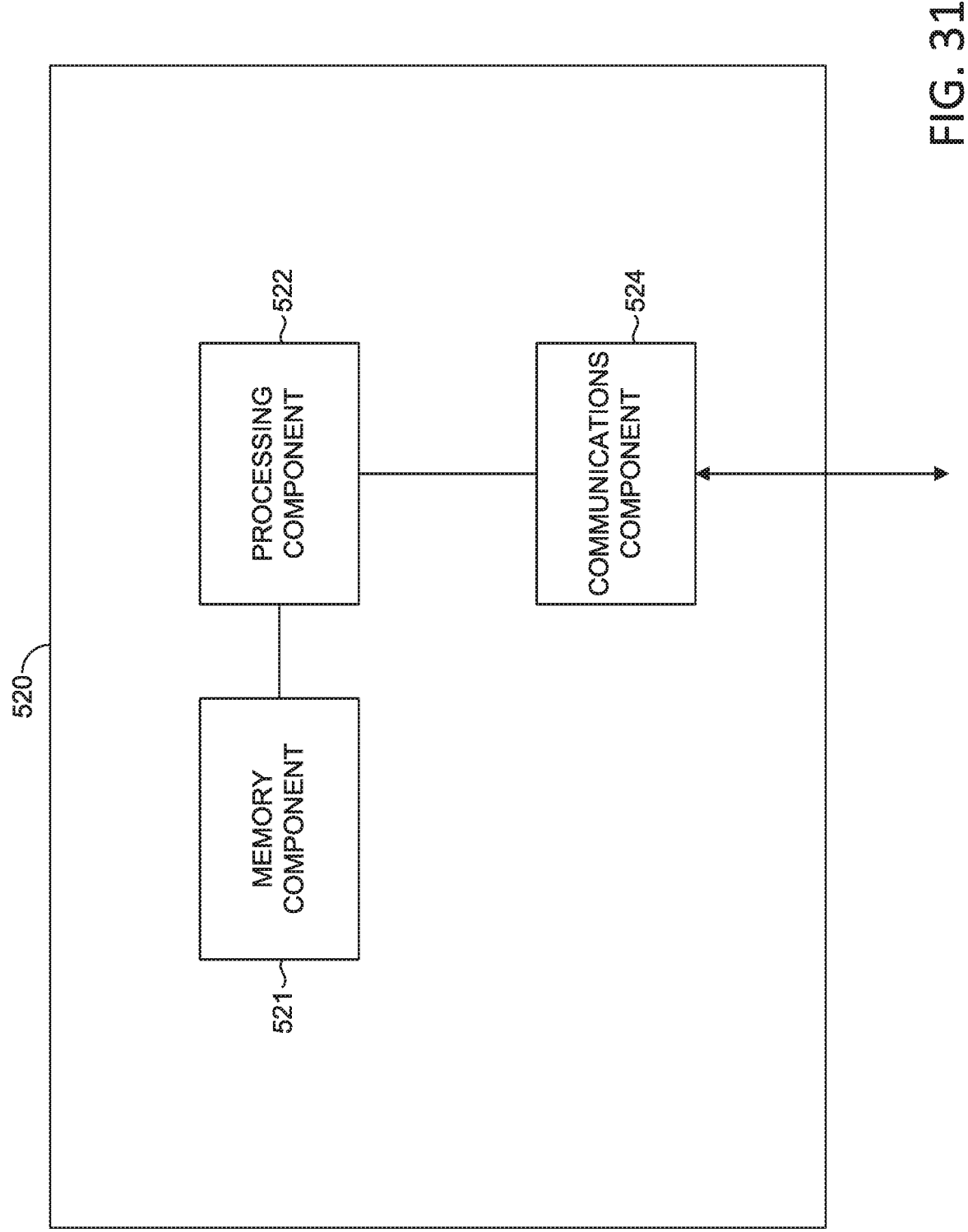
FIG. 31 schematically depicts a robot controller according to one embodiment shown and described herein.

Referring to FIG. 31, a schematic diagram of a loading robot controller 520 is schematically depicted. The loading robot controller 520 is communicatively coupled to various components of the loading robot 500 and generally controls the movement and function of the loading robot 500. The loading robot controller 520 generally includes one or more loading robot processing elements/components 522, one or more memory elements/components 521, and one or more loading robot communications elements/components 524. In embodiments, the loading robot controller 520 may be communicatively coupled to the conveyor controller 460 and/or to the positioning sensors 450 of the UAV support mechanism 400 such that the operation of the robot may be initiated based on signals received from the conveyor controller 460 and/or the positioning sensors 450. For example the loading robot controller 520 may initiate movement of the robot 500 when a UAV chassis 110 is detected over the supply portal 16 or the return portal 14, as will be described in greater detail herein. The communications device 524 is configured for communicating with various computing entities, such as by communicating information/data, content, information, and/or similar terms used herein interchangeably that can be transmitted, received, operated on, processed, displayed, stored, and/or the like. Such communication may be executed using a wired data transmission protocol, such as FDDI, DSL, ATM, frame relay, DOCSIS, or any other wired transmission protocol. Similarly, the central computing entity 802 may be configured to communicate via wireless external communication networks using any of a variety of protocols, such as GPRS, UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR protocols, NFC protocols, Wibree, Bluetooth protocols, wireless USB protocols, and/or any other wireless protocol.

ii. Loading Parcels/Parcel Carriers to Vehicle

Reference will now be made herein to the loading of parcels to the vehicle 10. As may be appreciated, a sender may send a parcel to a consignee through a carrier. The carrier may transport the parcel to one or more intermediate locations, such as processing centers and/or warehouses, in the process of delivering the parcel to the consignee. In delivery process involving UAVs, the parcels may be attached to a parcel carrier prior to loading the parcel and parcel carrier to a vehicle, as described below.

Figure 32:
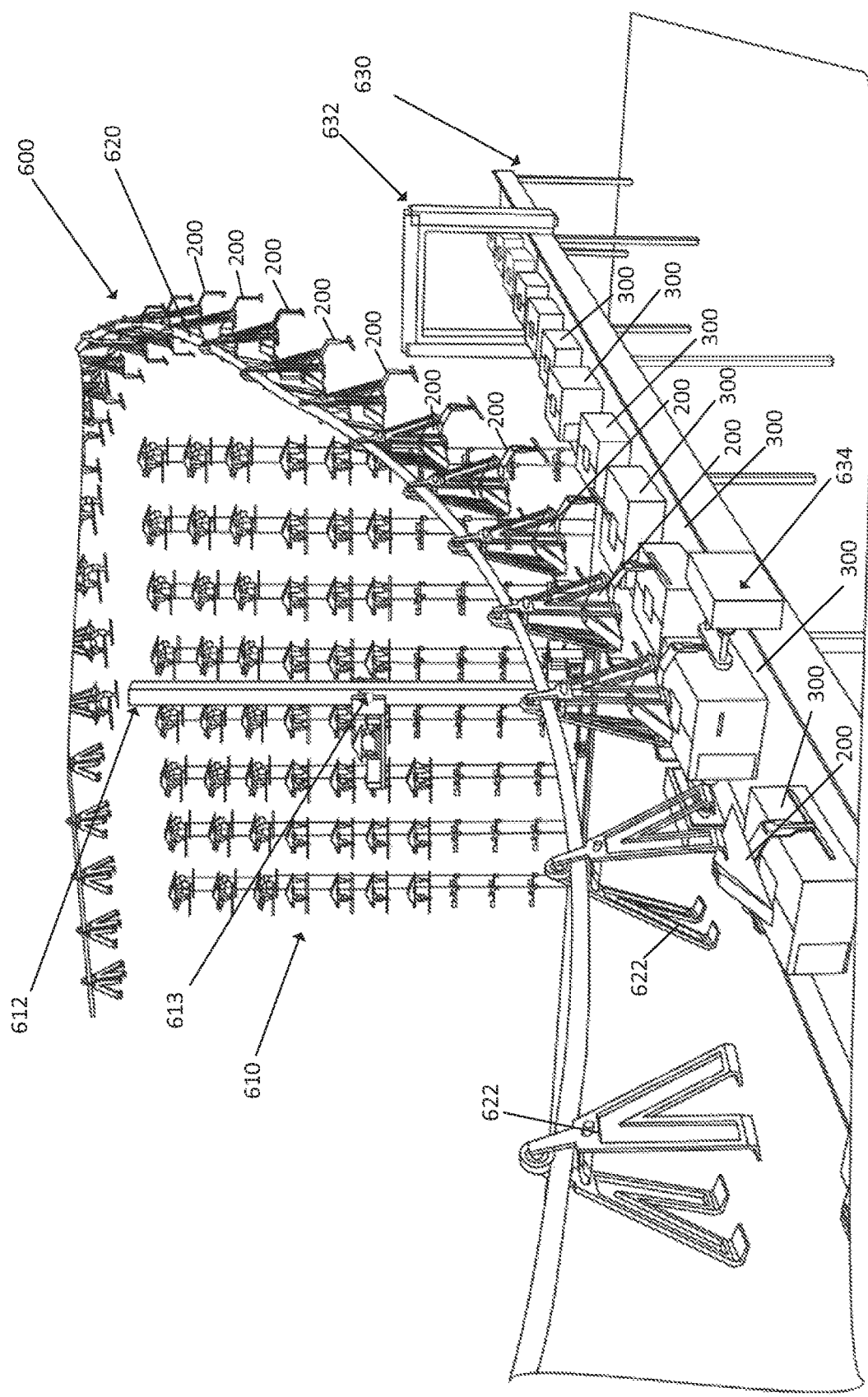
FIG. 32 schematically depicts a perspective view of an automated parcel carrier/parcel connection system according to one embodiment shown and described herein.

Referring to FIG. 32, a perspective view of a loading operation of parcel carriers 200 to parcels 300 is schematically depicted. An automated parcel/parcel carrier connection system 600 is positioned within an intermediate location 601. The intermediate location 601 may include a facility, such as a warehouse or distribution center, in which parcels 300 are sorted and dispatched as part of a delivery process. The connection system 600 includes racks 610 in which parcel carriers 200 are stored, a loading robot 612, a transport rail 620, a plurality of parcel carrier clamps 622 positioned on the transport rail 620, a conveyor belt 630, and an engagement clamping mechanism 634 positioned on the conveyor belt 630. The racks 610 may be substantially similar to the racks 30 described above and depicted in FIG. 29. In the embodiment depicted in FIG. 32, the racks 610 may also provide electrical charge to the parcel carriers 200, such as when the parcel carriers 200 include the power supply 214. By providing electrical charge to the power supply 214, the racks 610 may prepare individual parcel carriers 200 to deliver a parcel 300 via a UAV 100 (FIG. 1).

The loading robot 612 IS substantially similar to the robot 500 (FIG. 30) positioned in the vehicle 10, and is configured to retrieve parcel carriers 200 from the racks 610 and supply the retrieved parcel carriers 200 to the transport rail 620. Similar to the robots 500 (FIG. 30), the loading robot 612 may include a three-axis robot, or may include any suitable robot to move parcel carriers 200, such as a six-axis robot, and/or the like. The loading robot 612 may include a parcel carrier identification unit 613 that is configured to scan, read, interrogate, receive, communicate with, and/or similar words used herein interchangeably a parcel carrier identifier on each of the parcel carriers 200 and that may be communicatively coupled to one or more computing entities. For example, the parcel carrier 200 may include a parcel carrier identifier, such as an alphanumeric identifier or machine readable identifier. Such parcel carrier identifiers may be represented as text, barcodes, tags, character strings, Aztec Codes, MaxiCodes, Data Matrices, Quick Response (QR) Codes, electronic representations, and/or the like. A unique parcel identifier (e.g., 123456789) may be used by the carrier and may be associated with a parcel identifier and/or a UAV identifier to identify and track the parcel carrier as it moves through the carrier's transportation network. Further, such parcel carrier identifiers can be affixed to the parcel carriers by, for example, using a sticker (e.g., label) with the unique parcel carrier identifier printed thereon (in human and/or machine readable form) or an RFID tag with the unique parcel identifier stored therein.

The plurality of parcel carrier clamps 622 are operatively coupled to the transport rail 620, and the transport rail 620 may move the parcel carrier clamps 622 along the transport rail 620 to attach parcel carriers 200 to parcels 300 positioned on a conveyor belt 630. In particular, the loading robot 612 may insert a parcel carrier 200 to parcel carrier clamps 622 on the transport rail 620. The parcel carrier clamps 622 may be inwardly biased such that the parcel carrier 200 is retained within the parcel carrier clamps 622. The inward bias of the parcel carrier clamps 622 may be caused by a biasing member, such as a tension spring, a torsion spring, a compression spring, and/or the like.

The parcel carrier clamps 622, along with parcel carriers 200 that are selectively coupled to the parcel carrier clamps 622 move along the transport rail 620 toward the conveyor belt 630. In embodiments, the parcel carrier clamps 622 are positioned over the conveyor belt 630. The parcel carrier clamps 622 move downward to the conveyor belt 630, where the parcel carriers 200 are engaged with parcels 300 positioned on the conveyor belt 630.

The parcel carrier clamps 622 move downward toward the conveyor belt 630 at the engagement clamping mechanism 634. Upon reaching the engagement clamping mechanism 634, the engagement clamping mechanism 634 may mate the parcel carrier 200 to the parcel 300, such as by pressing the parcel carrying arms 230 inward into the parcel 300. Once the parcel carrier 200 is engaged with the parcel 300, the parcel carrier clamps 622 may disengage with the parcel carrier 200, and continue moving along the transport rail 620.

The parcel/parcel carrier connection system 600 may further include a parcel identification unit 632 that may communicate with a parcel identifier of the parcels 300 that are positioned on the conveyor belt 630. For example, each parcel 300 may include a parcel identifier, such as an alphanumeric identifier or machine readable identifier. Such parcel identifiers may be represented as text, barcodes, tags, character strings, Aztec Codes, Maxi Codes, Data Matrices, QR Codes, electronic representations, and/or the like. A unique parcel identifier (e.g., 123456789) may be used by the carrier to identify and track the parcel as it moves through the carrier's transportation network. Further, such parcel identifiers can be affixed to parcels by, for example, using a sticker (e.g., label) with the unique parcel identifier printed thereon (in human and/or machine readable form) or an RFID tag with the unique parcel identifier stored therein.

The parcel identification unit 632 may include a barcode scanner, a computer vision system, an RFID antenna and/or the like that is configured to read the parcel identifier of the parcel 300. The parcel identification unit 632 may be communicatively coupled to one or more computing entities, and the parcel identification unit may communicate information/data associated with the parcel identifier of each parcel 300 to the one or more computing entities, as will be described in greater detail herein.

Figure 33:
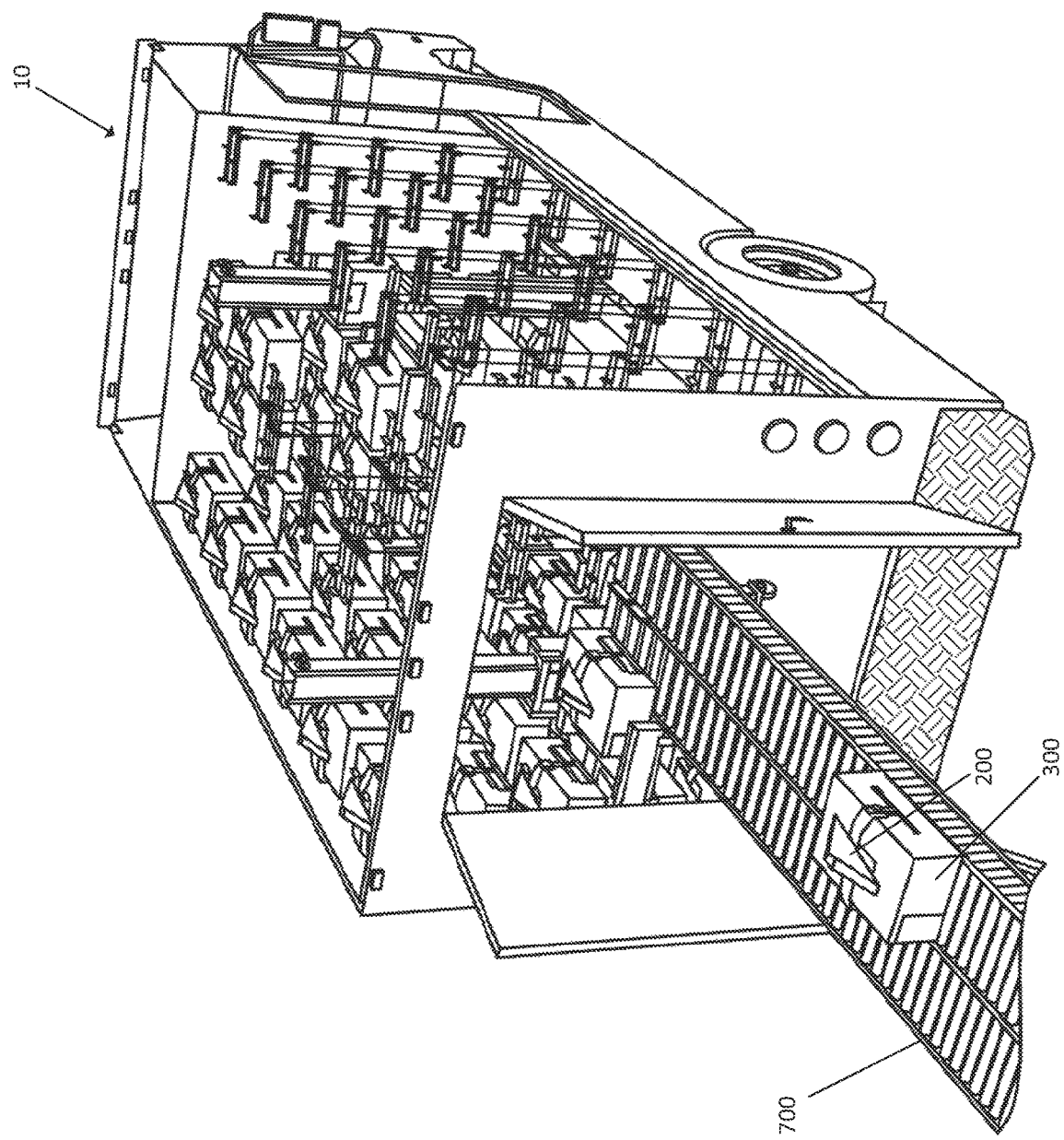
FIG. 33 schematically depicts a rear perspective view of the vehicle of FIG. 1 and a parcel conveyor according to one embodiment shown and described herein.
Figure 34:
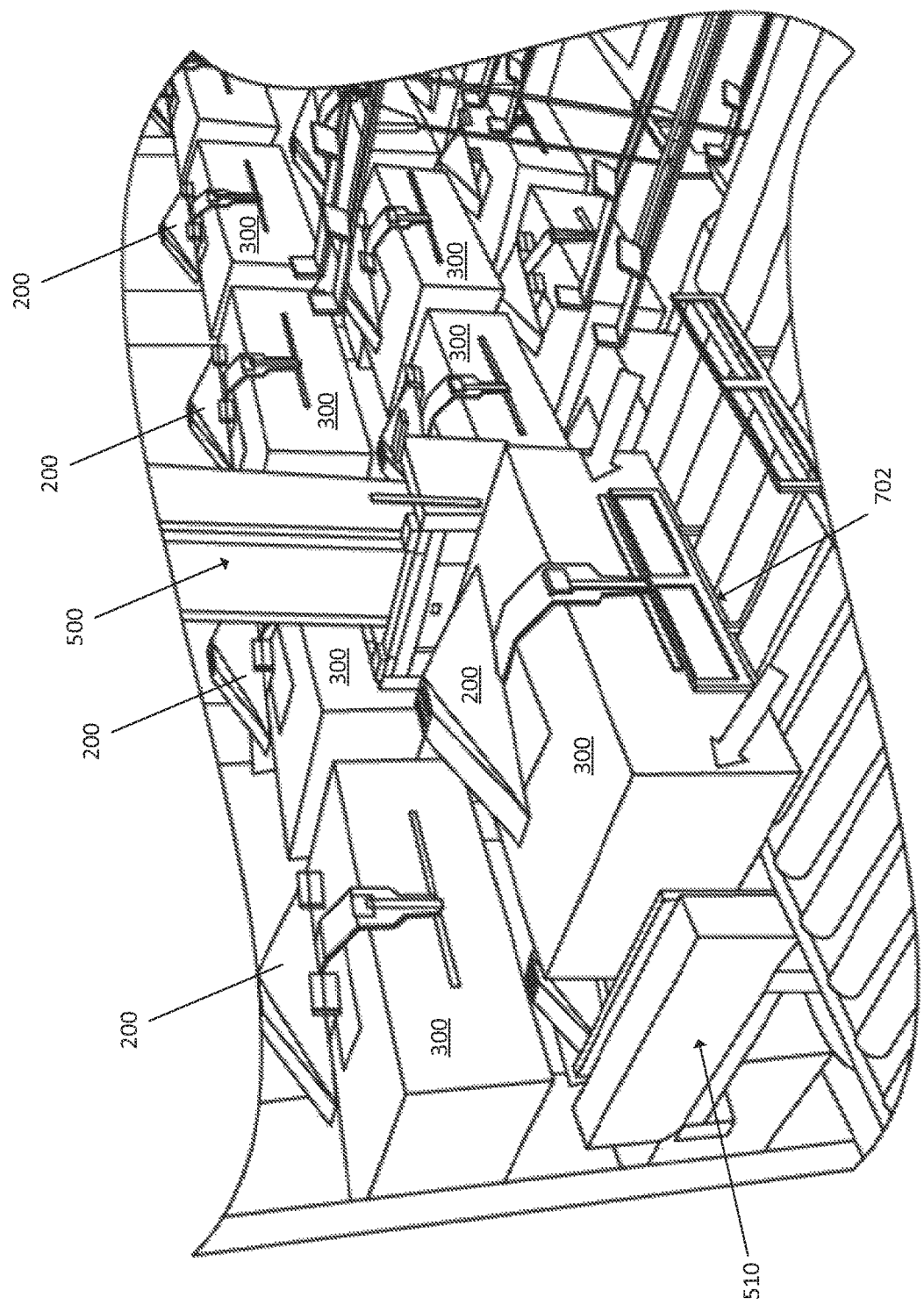
FIG. 34 schematically depicts the parcel conveyor of FIG. 33 and the robot of FIG. 30 according to one embodiment shown and described herein.

Referring to FIGS. 33 and 34, a perspective view of a vehicle 10 being loaded with parcels 300 is schematically depicted. In embodiments, the parcels 300 and attached parcel carriers 200 may be conveyed into a rear opening of the vehicle 10 by a parcel conveyor 700. The parcel conveyor 700 may include a conveyor belt, powered rollers, and/or the like that move parcels 300 and their attached parcel carriers 200 into the vehicle 10. The parcel conveyor 700 may include a pusher mechanism 702 that moves parcels 300 and their attached parcel carriers 200 from the parcel conveyor 700 onto the end effector 510 of the loading robot 500. In particular, the pusher mechanism 702 may move the parcel 300 and its attached parcel carrier 200 in the lateral direction, transferring the parcel 300 and parcel carrier 200 from the parcel conveyor 700 to the end effector 510 of the loading robot 500. Once the parcel 300 and parcel carrier 200 are positioned on the loading robot 500, the loading robot 500 moves the parcel 300 and the parcel carrier 200 to the rack 30 positioned within the vehicle 10.

For example and referring to FIG. 35A, the loading robot 500 may move the parcel 300 and the parcel carrier 200 proximate to an available pair of outwardly extending arms 32 of the rack 30 (e.g., a pair of outwardly extending arms 32 that are not engaged with a parcel carrier 200/parcel 300). The loading robot 500 may move the parcel 300 and attached parcel carrier 200 in the vertical direction such that an underside of the parcel carrier 200 is generally aligned with the outwardly extending arms 32 of the rack 30 in the vertical direction.

Referring to FIG. 35B, upon aligning the underside of the parcel carrier 200 with the outwardly extending arms 32 of the rack 30, the platform 512 of the loading robot 500 moves toward the outwardly extending arms 32 in the lateral direction along the end effector track 514. The loading robot 500 moves the platform 512 toward the outwardly extending arms 32 until the outwardly extending arms 32 are positioned between the parcel carrier 200 and the parcel 300 in the vertical direction.

Referring to FIG. 35C, once the outwardly extending arms 32 are positioned between the parcel carrier 200 and the parcel 300 in the vertical direction, the clamping members 516 of the end effector 510 move from the engaged position to the disengaged position, such that the clamping members 516 are spaced apart from the parcel 300 in the longitudinal direction. The parcel 300 and the parcel carrier 200 may be supported by the outwardly extending arms 32, and in particular, the bottom surface of the parcel carrier 200 may be positioned on the outwardly extending arms 32 with the parcel 300 positioned below the outwardly extending arms 32 in the vertical direction. Movement of the parcel carrier 200 and the parcel 300 with respect to the outwardly extending arms 32 may be restricted by the flange ends 34.

Once the parcel 300 and the parcel carrier 200 are positioned on the outwardly extending arms 32, the platform 512 moves along the end effector track 514 towards the upright member 504 of the loading robot 500, such that the loading robot 500 is prepared to retrieve another parcel 300 and parcel carrier 200 from the conveyor 700 (FIG. 34).

iii. Loading/Unloading to UAV Chassis

Once the vehicle 10 is loaded with parcels 300 their associated parcel carriers 200, the vehicle 10 may be dispatched to deliver the parcels 300, for example as part of a delivery route. When delivering the parcels 300, the UAVs 100 (FIG. 1) are loaded with parcels 300 and their associated parcel carriers 200, as described below.

Figure 36:
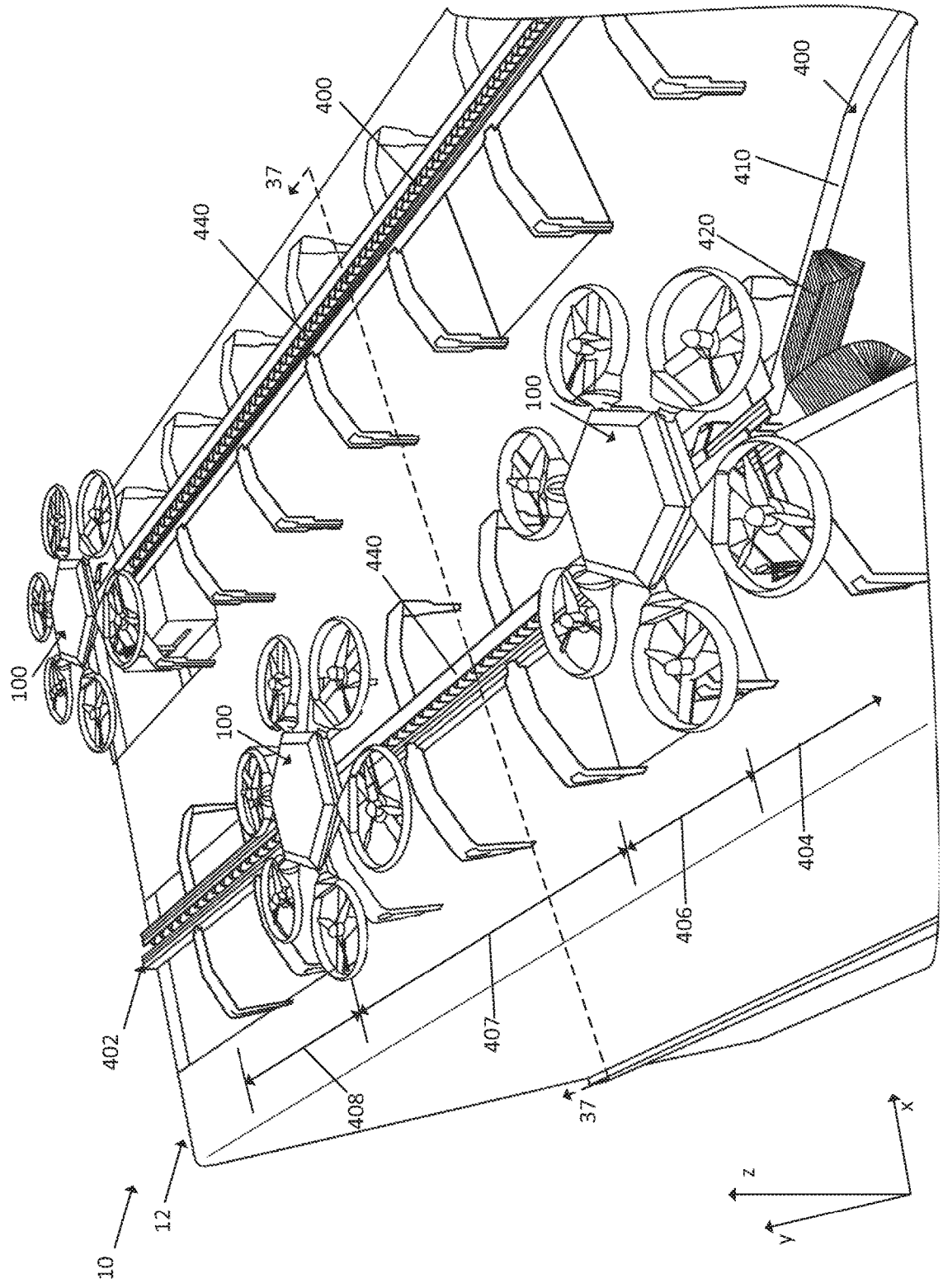
FIG. 36 schematically depicts a perspective view of the UAV support mechanism of FIG. 25 including UAVs according to one embodiment shown and described herein.
Figure 37:
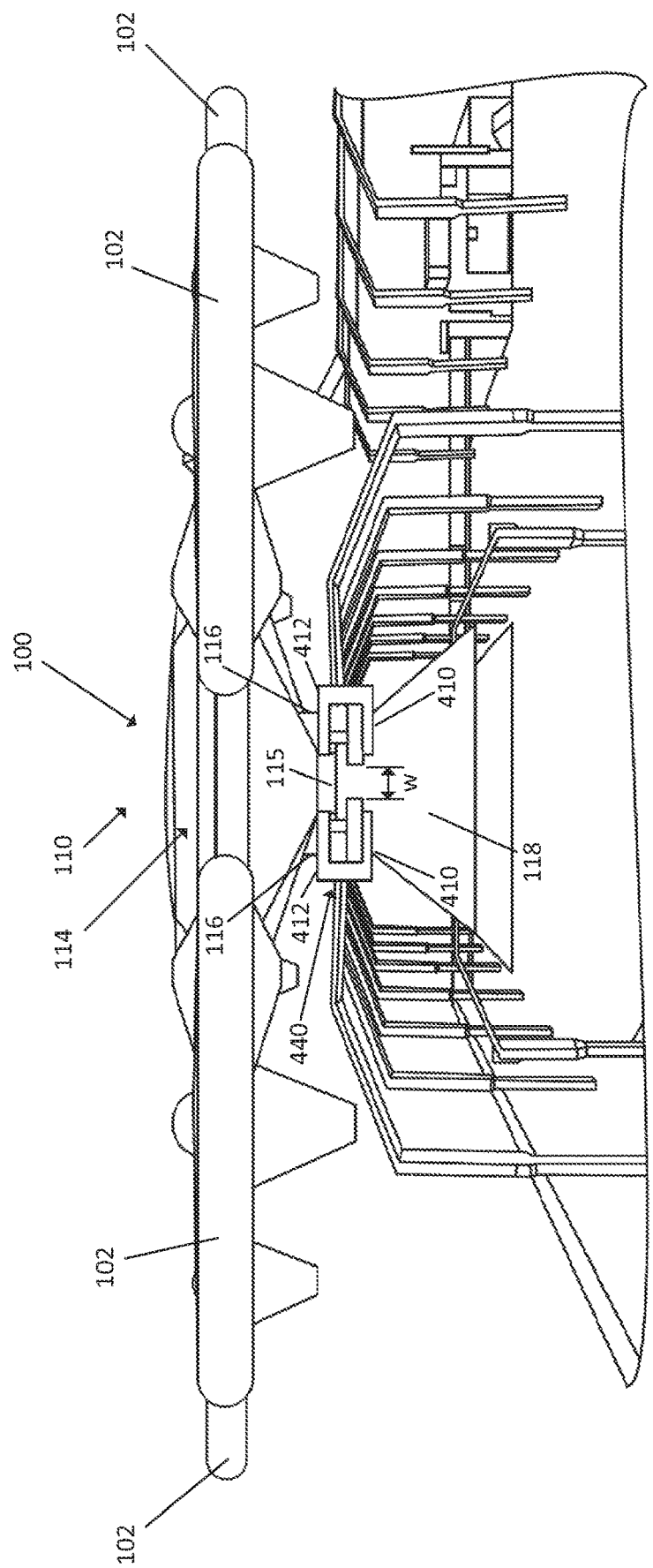
FIG. 37 schematically depicts a section view of the UAV support mechanism of FIG. 36 along section 37-37 according to one embodiment shown and described herein.

Referring collectively to FIGS. 36 and 37, UAV chassis 110 are positioned on the UAV support mechanisms 400 of the vehicle 10. Within the return region 406, the transport region 407, and the supply region 408, the UAV support mechanism 400, the UAV chassis 110 are engaged with the conveyor 440. In particular, the landing gear 116 contact and engage with the upper surface 412 of the opposing rails 410, and the reduced width portion 115 of the UAV chassis 110 is positioned between the opposing rails 410 in the lateral direction. Furthermore, the upper portion 114 of the UAV chassis 110 is positioned above the opposing rails 410 and the lower portion 118 of the UAV chassis 110 is positioned below the opposing rails 410. In embodiments, the width of the upper portion 114 and the width of the lower portion 118 evaluated in the lateral direction are both greater than a width 'w' between the opposing rails 410 evaluated in the lateral direction. As the upper portion 114 and the lower portion 118 of the UAV chassis 110 have a greater width than the width between the opposing rails 410, the UAV chassis 110, the UAV chassis 110 is restrained in the vertical direction when positioned in the conveyor 440.

The conveyor 440 moves the UAV chassis 110, such as through the rollers 442, (and/or the landing gear 116 when the landing gear 116 includes powered rollers) in the longitudinal direction through the transport region 407 and into the supply region 408 of the conveyor 440. Once in the supply region 408, the rollers 442 may stop rotating once the UAV chassis 110 is positioned over the supply portal 16. The conveyor controller 460 (FIG. 25) may detect when the UAV chassis 110 is positioned over the supply portal 16, such as through the supply position sensor 450a (FIG. 25). Once the UAV chassis 110 is positioned over the supply portal 16, a parcel 300 and attached parcel carrier 200 may be retrieved from the interior compartment 18 of the vehicle 10 and attached to the UAV chassis 110 to load the UAV chassis 110 for flight.

Figure 38A:
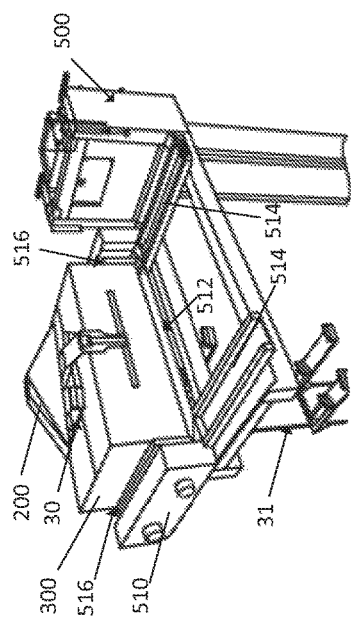
FIG. 38A schematically depicts a parcel being loaded to a UAV chassis with the robot of FIG. 30 according to one embodiment shown and described herein.

Referring to FIG. 38A, to retrieve a parcel 300 and associated parcel carrier 200 from the interior compartment 18 of the vehicle 10, the loading robot 500 positions the end effector 510 of the loading robot 500 below a parcel 300 on the rack 30. In particular, the platform 512 of the end effector 510 is positioned below the parcel 300, and the clamping members 516 may engage the sides of the parcel 300.

Figure 38B:
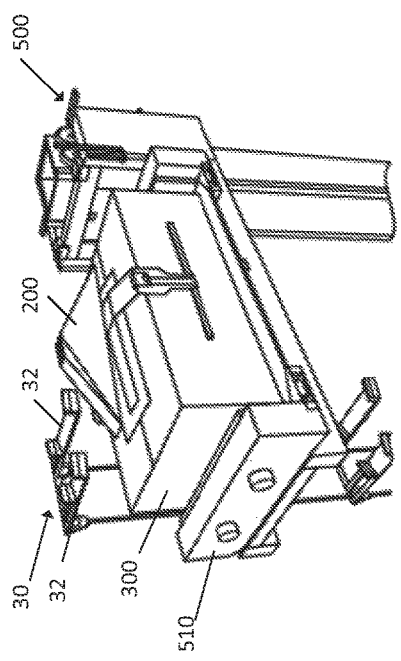
FIG. 38B schematically depicts a parcel being loaded to a UAV chassis with the robot of FIG. 30 according to one embodiment shown and described herein.

Referring to FIG. 38B, with the end effector 510 engaged with the parcel 300, the loading robot 500 lifts the parcel 300 and the attached parcel carrier 200 upward in the vertical direction, such that the parcel carrier 200 is disengaged from the rack 30.

Figure 38C:
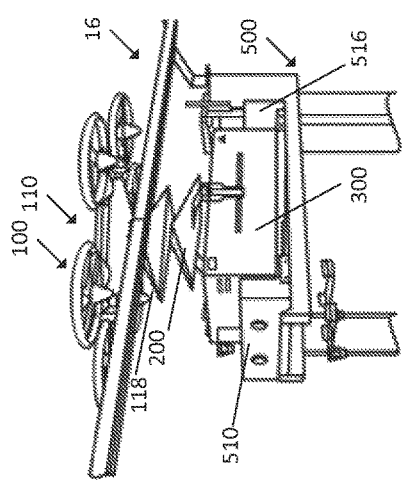
FIG. 38C schematically depicts a parcel being loaded to a UAV chassis with the robot of FIG. 30 according to one embodiment shown and described herein.

Referring to FIG. 38C, the loading robot 500 then moves the parcel 300 and attached parcel carrier 200 away from the rack 30, and moves the parcel 300 and attached parcel carrier 200 toward the supply portal 16. The loading robot 500 positions the parcel 300 and the parcel carrier 200 under the UAV chassis 110 such that the parcel carrier 200 may be inserted within the lower portion 118 of the UAV chassis 110. The loading robot 500 moves upward in the vertical direction and inserts the parcel carrier 200 within the lower portion 118 of the UAV chassis 110, and the parcel carrier 200 may be retained within the lower portion 118, such as by the retaining members 120 (FIG. 7). Upon inserting the parcel carrier 200 within the lower portion 118 of the UAV chassis 110, the clamping members 516 of the end effector 510 move into the disengaged position, and the end effector 510 may separate from the parcel 300.

Figure 39:
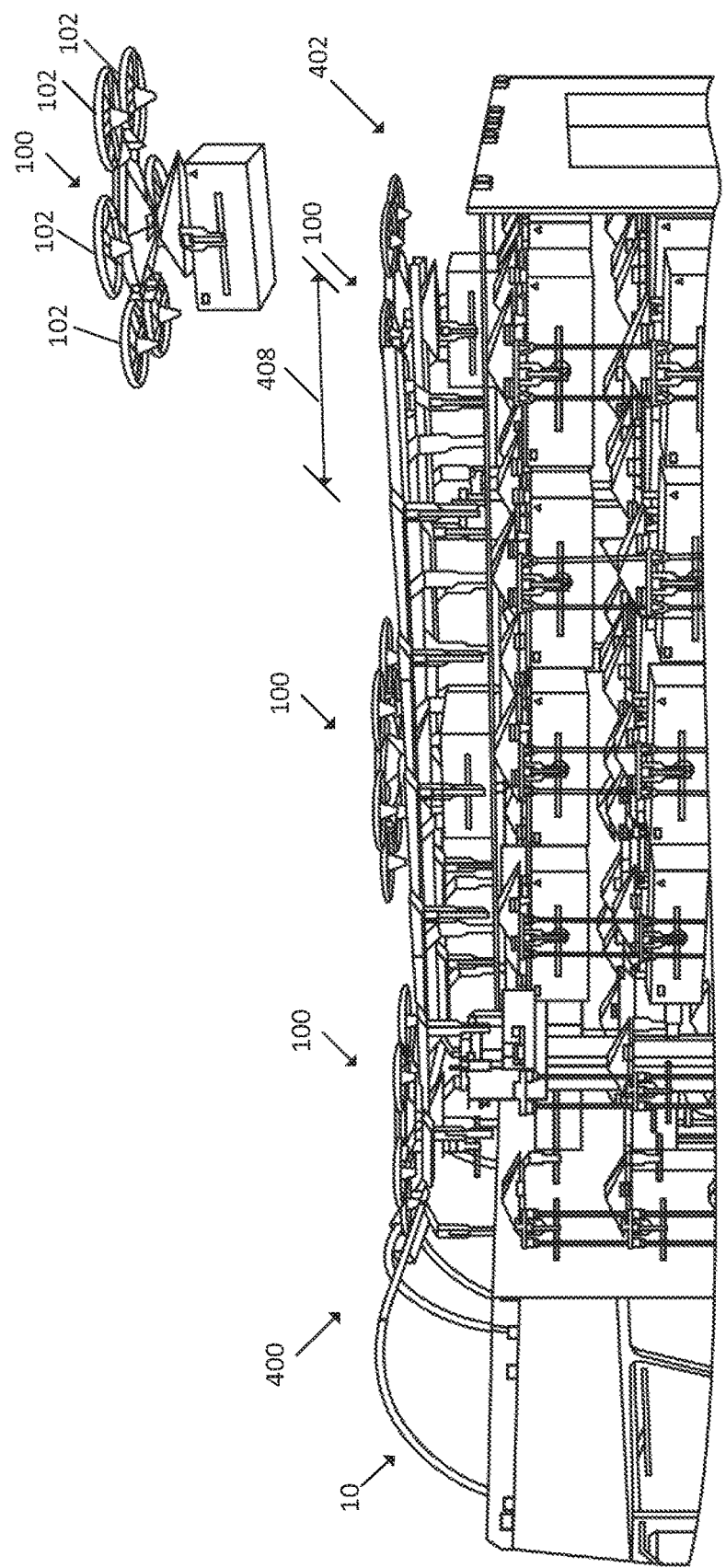
FIG. 39 schematically depicts a rear perspective view of the vehicle of FIG. 1 and the UAV support mechanism of FIG. 24 according to one embodiment shown and described herein.

Referring to FIG. 39, once the parcel 300 and the parcel carrier 200 are selectively coupled to the UAV chassis 110, the UAV 100 is prepared to deliver the parcel 300 to a destination, and the conveyor 440 moves the UAV 100 from the supply region 408 to the takeoff end 402. Once at the takeoff end 402, the propulsion members 102 of the UAV 100 may power up, and the propellers 103 of the propulsion members 102 begin to rotate such that the UAV 100 may take off from the takeoff end 402 to deliver the parcel 300 to a destination.

As will be described in greater detail herein, the UAV 100 may deliver the parcel 300 to a destination at a serviceable point 5901. Upon successful delivery of the parcel 300 to the destination at a serviceable point 5901, the UAV 100 returns to the vehicle 10 with the empty parcel carrier 200, where it may be re-supplied with another parcel 300 and parcel carrier 200. As will be recognized, the UAV 100 may also pick up one or more parcels 300 after delivery of one or more parcels 300 at one or more serviceable points 5901 (e.g., a multi-stop pick-up and/or delivery).

Figure 40:
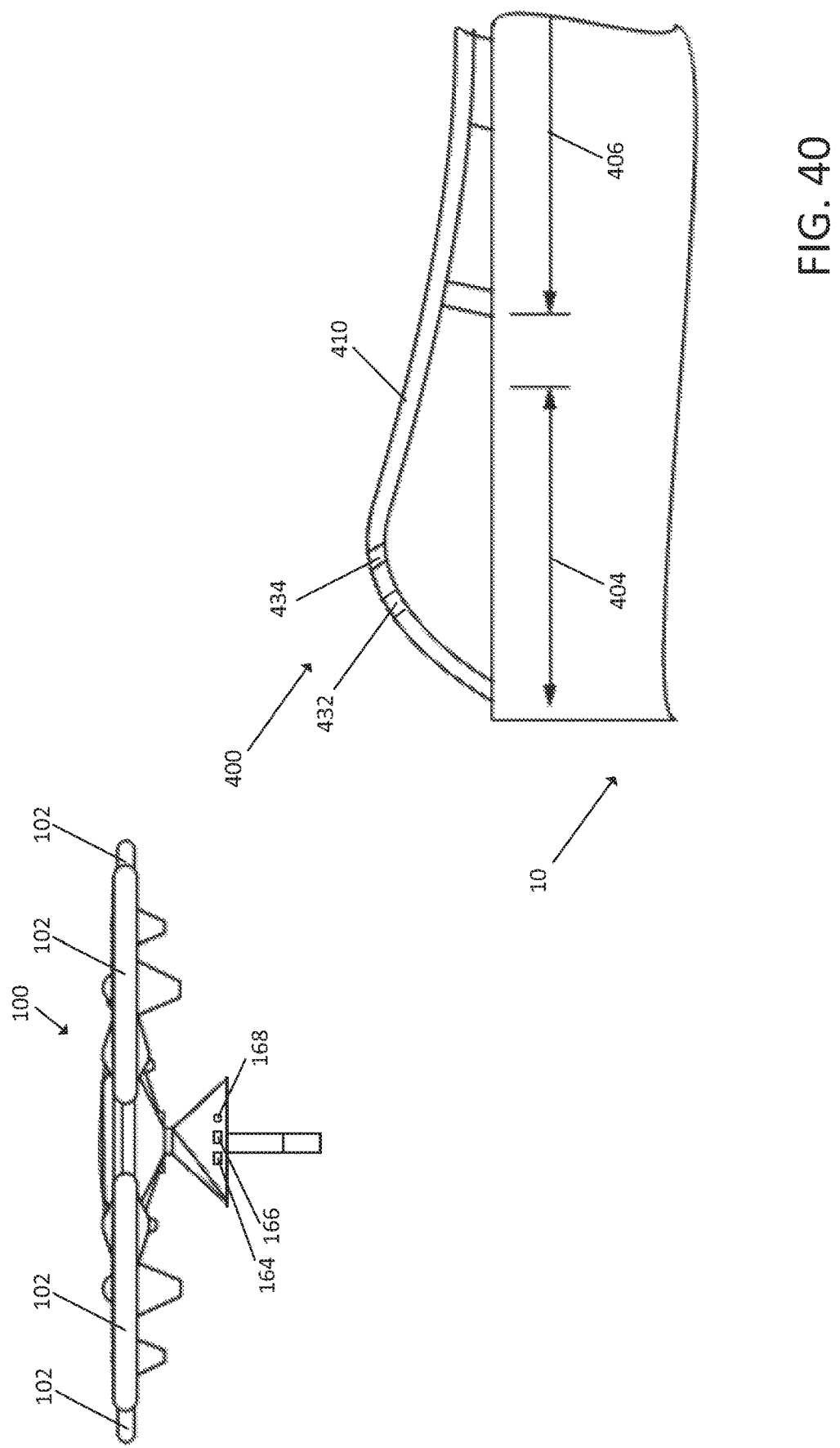
FIG. 40 schematically depicts a side view of the UAV and the UAV support mechanism of FIG. 24 according to one embodiment shown and described herein.

Referring to FIG. 40, a UAV 100 is depicted initiating a landing on the vehicle 10, such as when the UAV 100 is returning to the vehicle 10 after successful delivery of a parcel 300. In embodiments, the vehicle landing sensors 164 of the UAV 100 detect one or more components of the guidance array 430 such that the UAV 100 may locate the opposing rails 410 of the UAV support system 400. For example in some embodiments, the vehicle landing sensors 164 may detect the position of the visual indicator 432 and/or the positioning beacon 434 of the UAV support mechanism 400. By detecting the position of the visual indicator 432 and/or the positioning beacon 434, the vehicle landing sensors 164 may provide the UAV 100 with an accurate estimate of the position of the opposing rails 410 such that the UAV 100 may navigate toward the landing region 404 of the opposing rails 410.

In various embodiments, the UAV 100 may be configured to only land on the vehicle 10 while the vehicle 10 is stopped. For example, for human-operated vehicles, the UAV 100 may be incapable of predicting the movement of the vehicle 10, and accordingly the UAV 100 may only land to the UAV support mechanism 400 when the movement of the vehicle 10 can be accurately predicted, such as when the vehicle 10 is stationary. In such embodiments, the UAVs 100 may be configured to follow the vehicle 10 at a predetermined distance while it moves until the vehicle 10 comes to a stop.

In various embodiments, the UAV 100 may be configured to land on the vehicle 10 when the vehicle 10 is in motion. For example, when the vehicle 10 includes an autonomous vehicle, the vehicle 10 may predictably move along a predetermined/configurable route, such that the movement of the vehicle 10 can be accurately predicted. In these embodiments, the UAV 100 may land on the vehicle 10 while the vehicle 10 is in motion.

Figure 41:
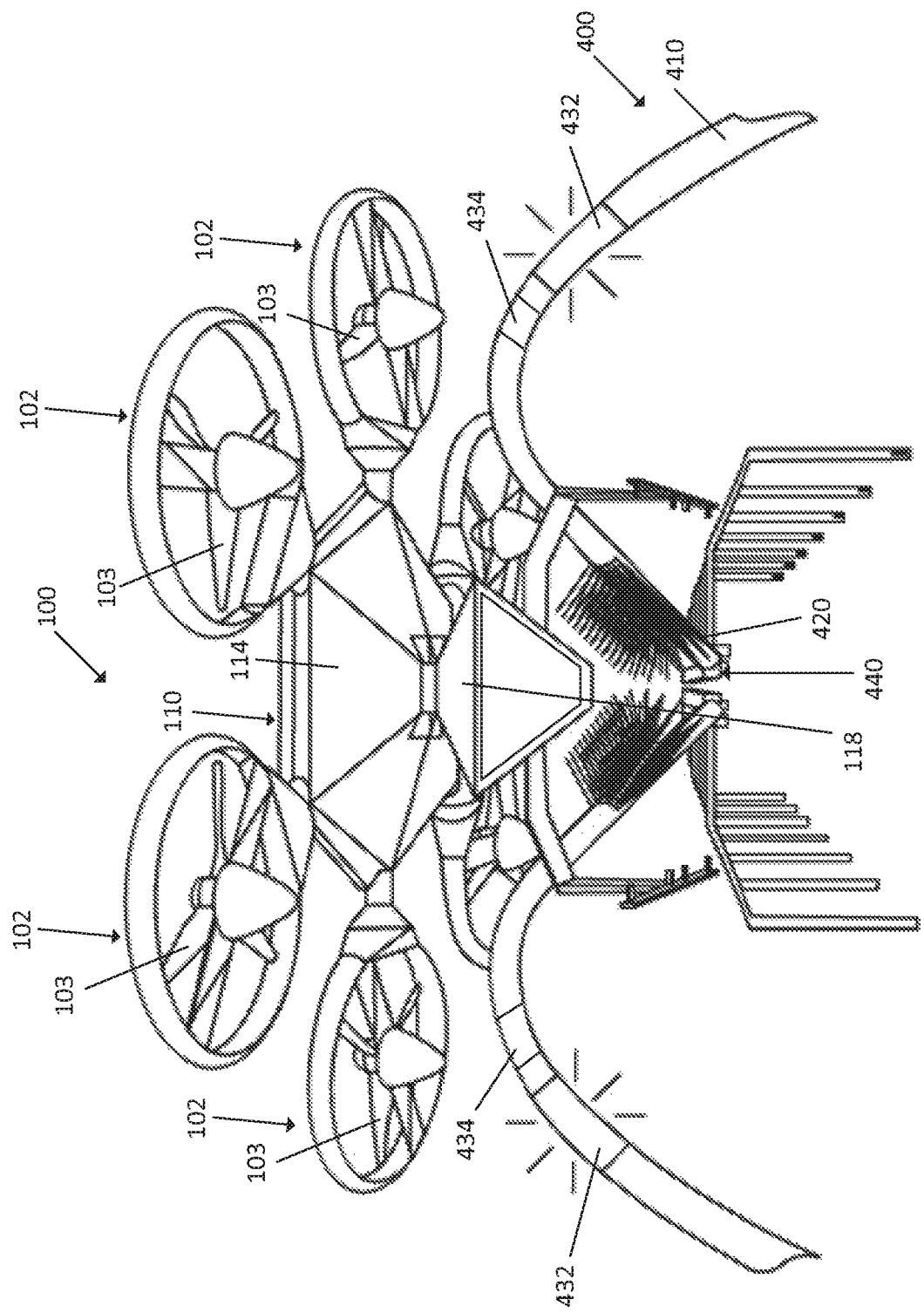
FIG. 41 schematically depicts a front view of the opposing rails of FIG. 28 and a UAV according to one embodiment shown and described herein.

Referring to FIG. 41, a perspective view of the UAV 100 landing on the UAV support mechanism 400. Upon accurately locating the opposing rails 410, such as through the guidance array 430, the UAV 100 navigates such that the upper portion 114 of the UAV chassis 110 is positioned above the opposing rails 410 and the lower portion 118 of the UAV chassis 110 is positioned below the opposing rails 410 in the vertical direction. The tapered shape of the upper portion 114 and the lower portion 118 of the UAV chassis 110 may assist in guiding the UAV 100 such that the upper portion 114 is positioned above the opposing rails 410 and the lower portion 118 is positioned below the opposing rails 410. With the upper portion 114 positioned above the opposing rails 410 and the lower portion 118 positioned below the opposing rails 410, the UAV 100 moves rearward in the longitudinal direction as the opposing rails 410 converge in the lateral direction. The UAV 100 may move rearward in the longitudinal direction under the power of the propulsion members 102 until the UAV 100 reaches the conveyor 440 positioned rearward of the landing region 404.

Once the UAV 100 has landed to the UAV support mechanism 400 and has engaged with the conveyor 440, the propulsion members 102 of the UAV may power down, such that the propellers 103 stop rotating. The conveyor 440 then may move the UAV 100 to the return region 406.

Figure 42:
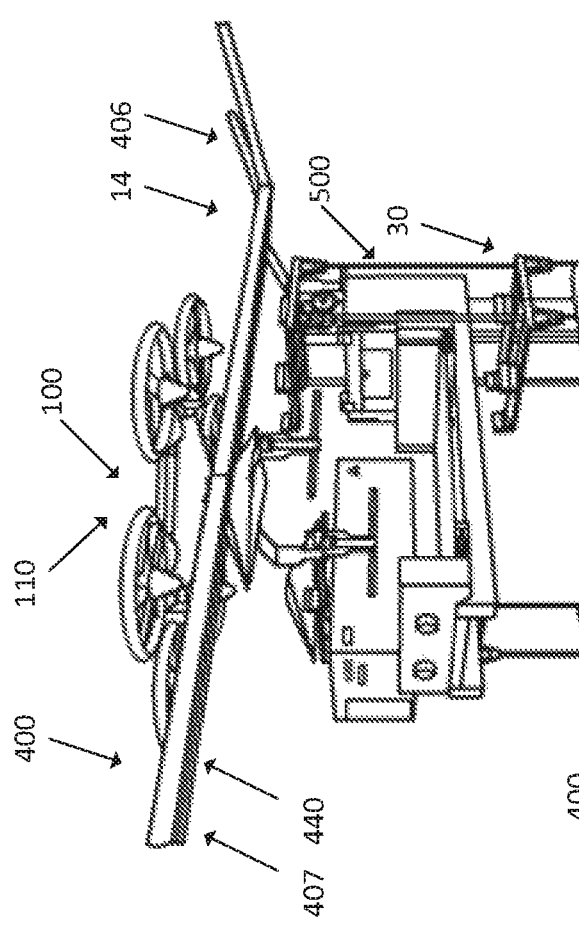
FIG. 42A schematically depicts a perspective view of the robot of FIG. 30 removing a parcel carrier from a UAV chassis and moving the parcel carrier to the rack according to one embodiment shown and described herein.
FIG. 42B schematically depicts a perspective view of the robot of FIG. 30 removing a parcel carrier from a UAV chassis and moving the parcel carrier to the rack according to one embodiment shown and described herein.

Referring to FIG. 42A, the conveyor 440 moves the UAV 100 to the return portal 14. The conveyor controller 460 (FIG. 25) may detect when the UAV chassis 110 is positioned over the return portal 14, such as through the return position sensor 450b (FIG. 25). At the return portal 14, the loading robot 500 may engage the now empty parcel carrier 200 with the end effector 510, and the parcel carrier 200 may be selectively de-coupled from the UAV chassis 110. Upon the parcel carrier 200 being de-coupled from the UAV chassis 110, the loading robot 500 may lower the end effector 510, and accordingly the parcel carrier from the UAV chassis 110.

Referring to FIG. 42B, the loading robot 500 may position the empty parcel carrier 200 from the UAV chassis 110 to the rack 30 within the interior compartment 18 of the vehicle 10. With the empty parcel carrier 200 removed from the UAV chassis 110, the conveyor 440 moves the UAV chassis 110 from the return region 406, and through the transport region 407 to the supply region 408 (FIG. 36), where the UAV chassis 110 may be re-supplied with a new parcel carrier 200 and parcel 300, as described above.

Figure 43:
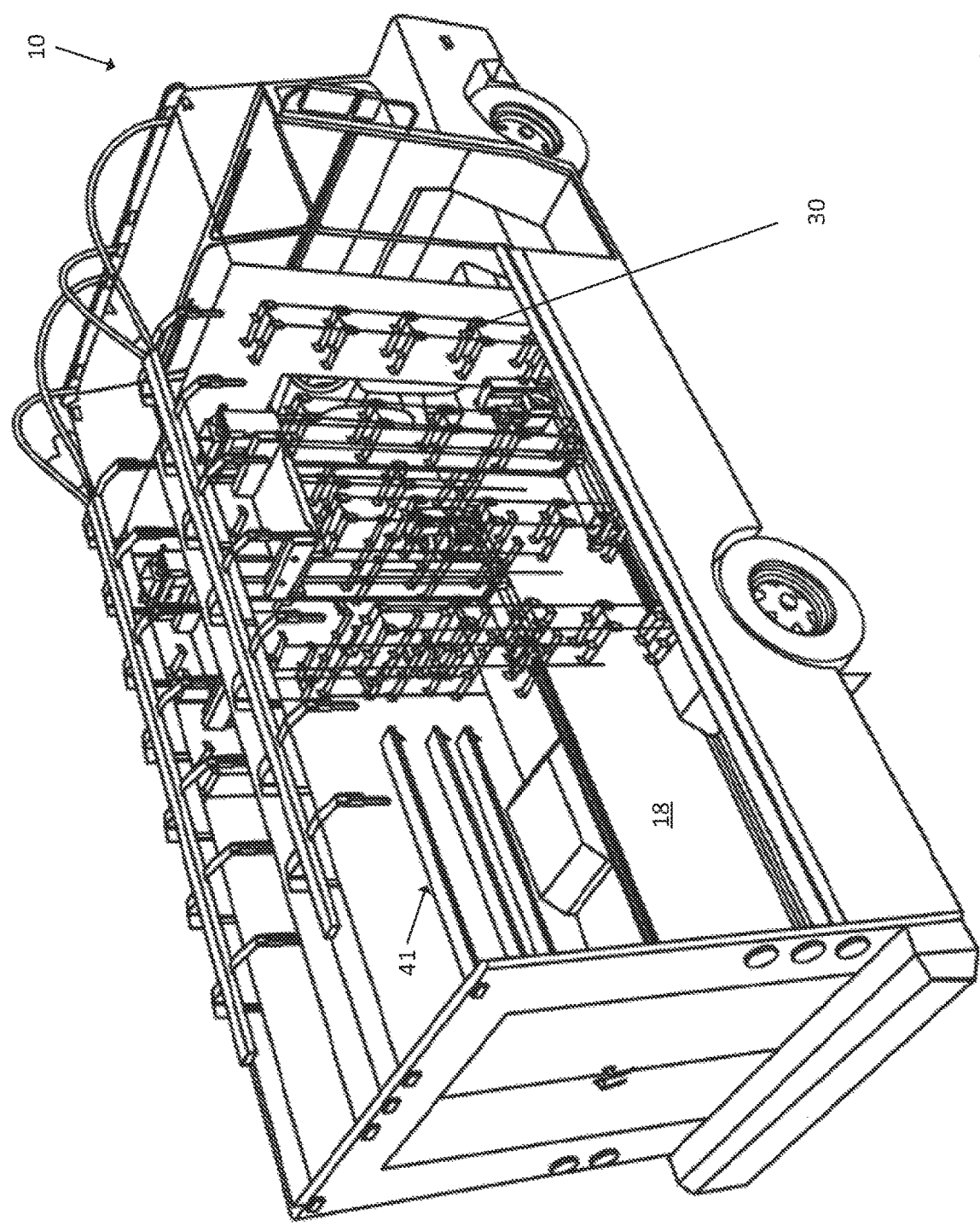
FIG. 43 schematically depicts a rear perspective view of another vehicle including racks according to one embodiment shown and described herein.

Referring now to FIG. 43, a perspective view of an alternative interior compartment 18 of the vehicle 10 is schematically depicted. In the embodiment depicted in FIG. 43, the interior compartment 18 of the vehicle 10 includes the racks 30 for use with the parcel carriers 200 (FIG. 17) configured to be delivered by UAV 100 (FIG. 1), as well as racks 41 for conventional parcels 300 that may be delivered manually by a delivery employee. In particular, in such embodiments, the vehicle 10 may deliver parcels 300 via UAV 100, while simultaneously delivering parcels 300 through conventional methods (e.g., by a delivery employee).

Figure 44:
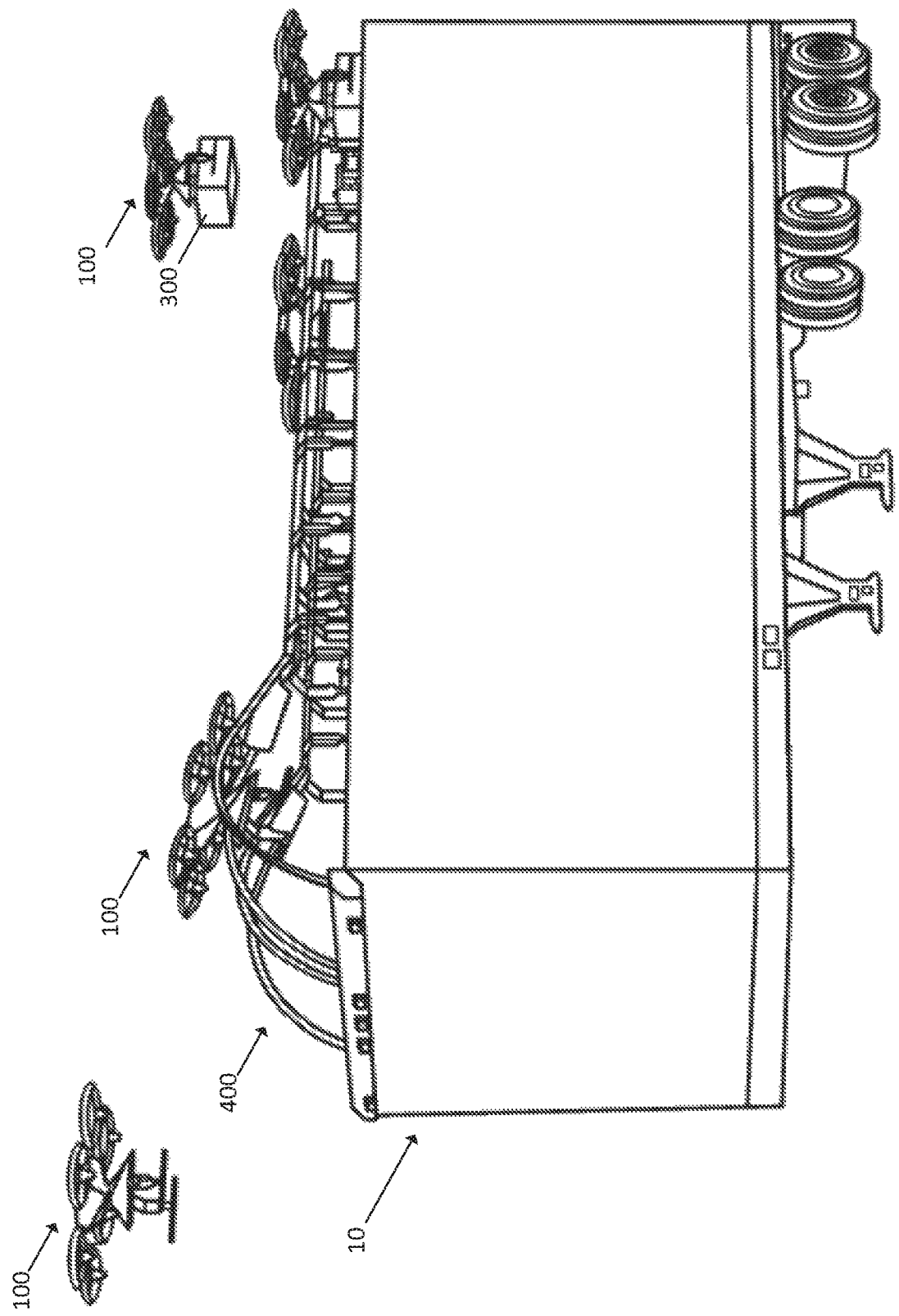
FIG. 44 schematically depicts a front perspective view of another vehicle including the UAV support mechanism of FIG. 24 according to one embodiment shown and described herein.

Referring to FIG. 44 a perspective view of an alternative vehicle 10 is schematically depicted. In the embodiment depicted in FIG. 44, the vehicle 10 includes a trailer, such as a trailer that may be selectively coupled to a semi-truck. The vehicle 10 includes the UAV support mechanism 400 as described above from which the UAVs 100 may take off and land, and may include one or more robots configured to load and unload parcel carriers 200 from the UAVs 100. In such embodiments, the vehicle 10 may be moved to a certain location to deliver parcels 300 and may remain stationary at that location while the UAVs 100 deliver parcels 300 from the vehicle 10. The vehicle 10 may remain in place at the location while the UAVs 100 deliver the parcels 300 from the vehicle 10 until all of the parcels 300 have been delivered from the vehicle 10, or until a delivery has been attempted for each of the parcels 300 within the vehicle 10, at which time the vehicle 10 may be picked up and returned to a serviceable point 5901. Such vehicles may assist in delivering parcels 300 during periods of high-volume, such as during holiday delivery season, supplementing other delivery methods.

Figure 45A:
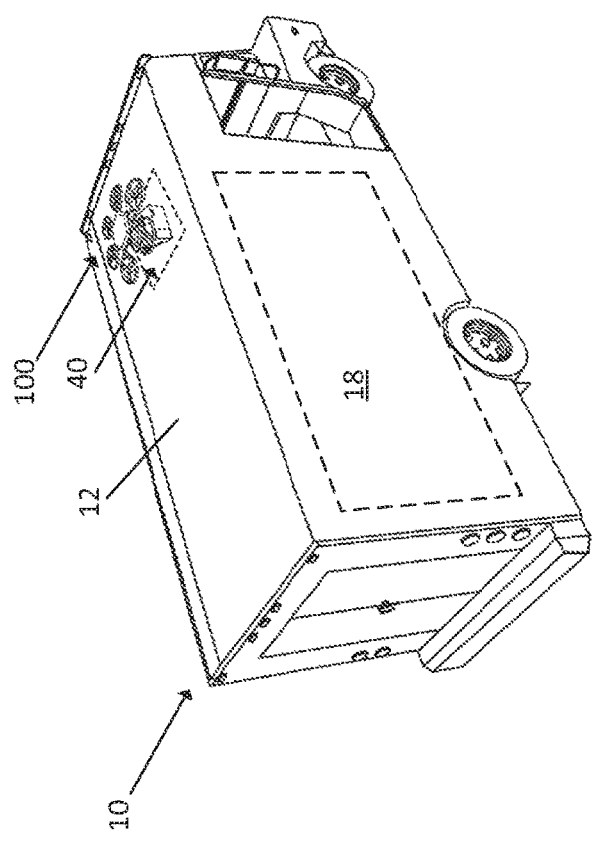
FIG. 45A schematically depicts a rear perspective view of a vehicle including a landing pad according to one embodiment shown and described herein.
Figure 45B:
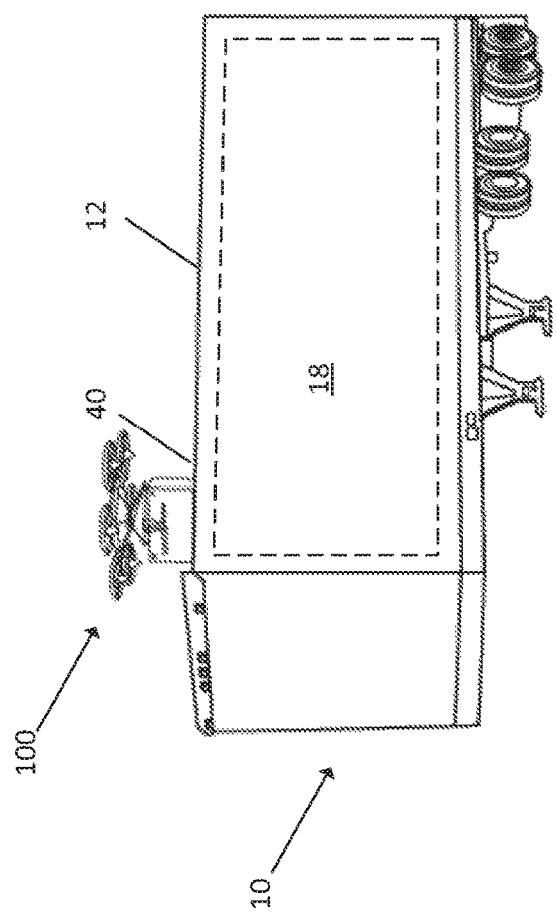
FIG. 45B schematically depicts a front perspective view of another vehicle including a landing pad according to one embodiment shown and described herein.

Referring to FIGS. 45A and 45B, another embodiment of vehicles 10 are schematically depicted. In the embodiment depicted in FIGS. 45A and 45B, the UAV support mechanism 400 includes a landing pad 40 positioned on the roof panel 12 of the vehicle 10. In such embodiments, the UAVs 100 may land to landing pad 40, as compared to the UAV support mechanism 400 described above. The landing pad 40 is configured to support the UAV 100, and includes a portal through which the interior compartment 180 of the vehicle 10 may be accessed. The vehicle 10 may include the robots 500 (FIG. 30) and the racks 30 (FIG. 29), and may be similarly configured to provide parcel carriers 200 to the UAV 100 at the landing pad 40, as compared to the supply portal 16 and the return portal 14, as described above.

Reference will now be made to the interconnectivity of various components of the enhanced parcel delivery system.

3. COMPUTER PROGRAM PRODUCTS, METHODS, AND COMPUTING ENTITIES

Embodiments described herein may be implemented in various ways, including as computer program products that comprise articles of manufacture. Such computer program products may include one or more software elements/components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software elements/components of a similar type or functionally related may be stored together such as, for example, in a particular directory, folder, or library. Software elements/components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A nonvolatile computer-readable storage medium may also include a punch card, paper tape, optical mark sheet (or any other physical medium with patterns of holes or other optically recognizable indicia), compact disc read only memory (CD-ROM), compact disc rewritable (CD-RW), digital versatile disc (DVD), Blu-ray disc (BD), any other nontransitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

4. EXEMPLARY SYSTEM ARCHITECTURE

Figure 46:
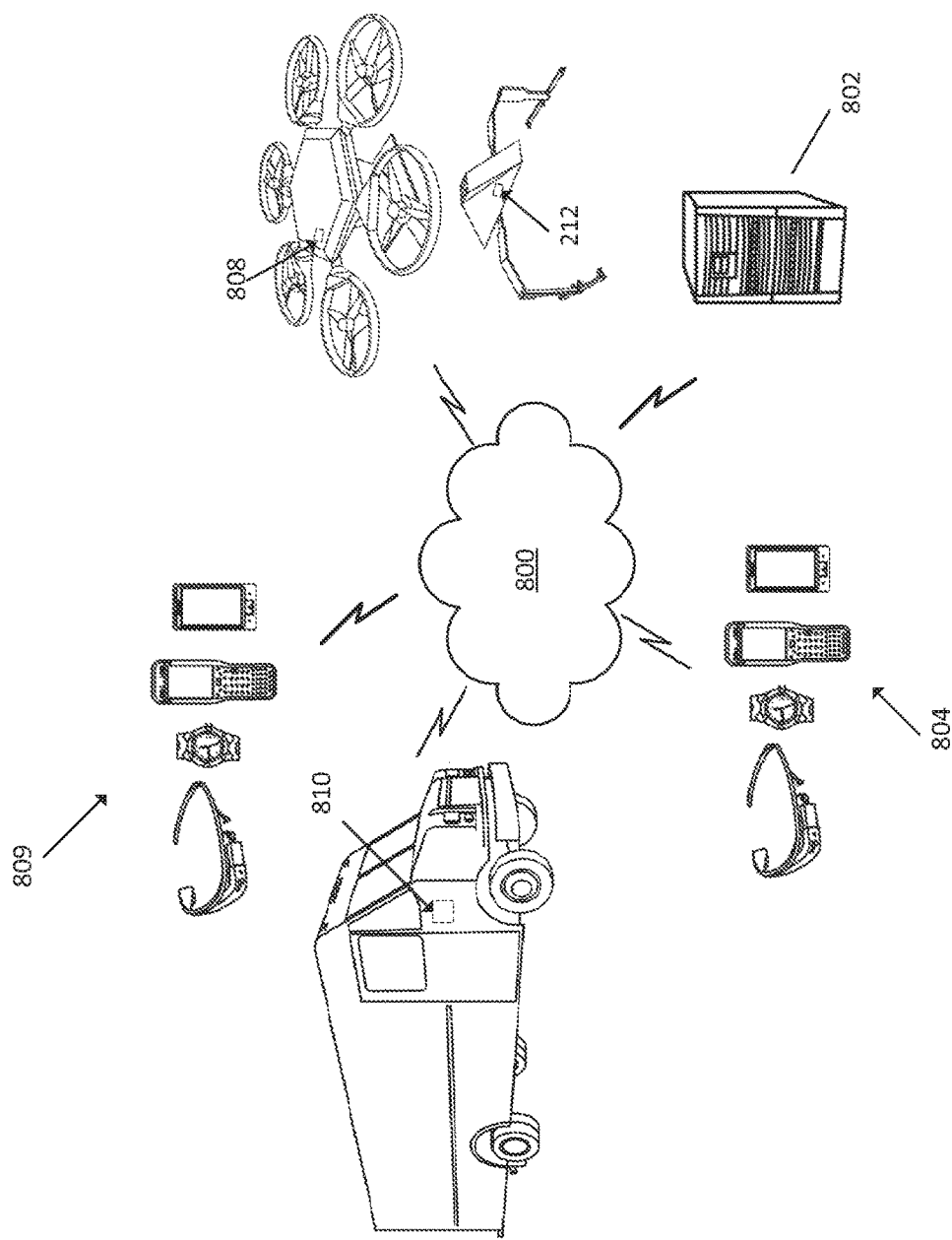
FIG. 46 schematically depicts the interconnectivity of computing entities according to one embodiment shown and described herein.

FIG. 46 provides an illustration of an exemplary embodiment of the present invention. As shown in FIG. 46, this particular embodiment may include one or more central computing entities 802, one or more networks 800, one or more user computing entities 804, one or more mobile carrier computing entities 806, one or more UAV computing entities 808, one or more parcel carrier computing entities 212, one or more delivery vehicle computing entities 810, and/or the like. Each of these components, entities, devices, systems, and similar words used herein interchangeably may be in direct or indirect communication with, for example, one another over the same or different wired or wireless networks. Additionally, while FIG. 43 illustrates the various system entities as separate, standalone entities, the various embodiments are not limited to this particular architecture.

A. Exemplary Central Computing Entity

Figure 47:
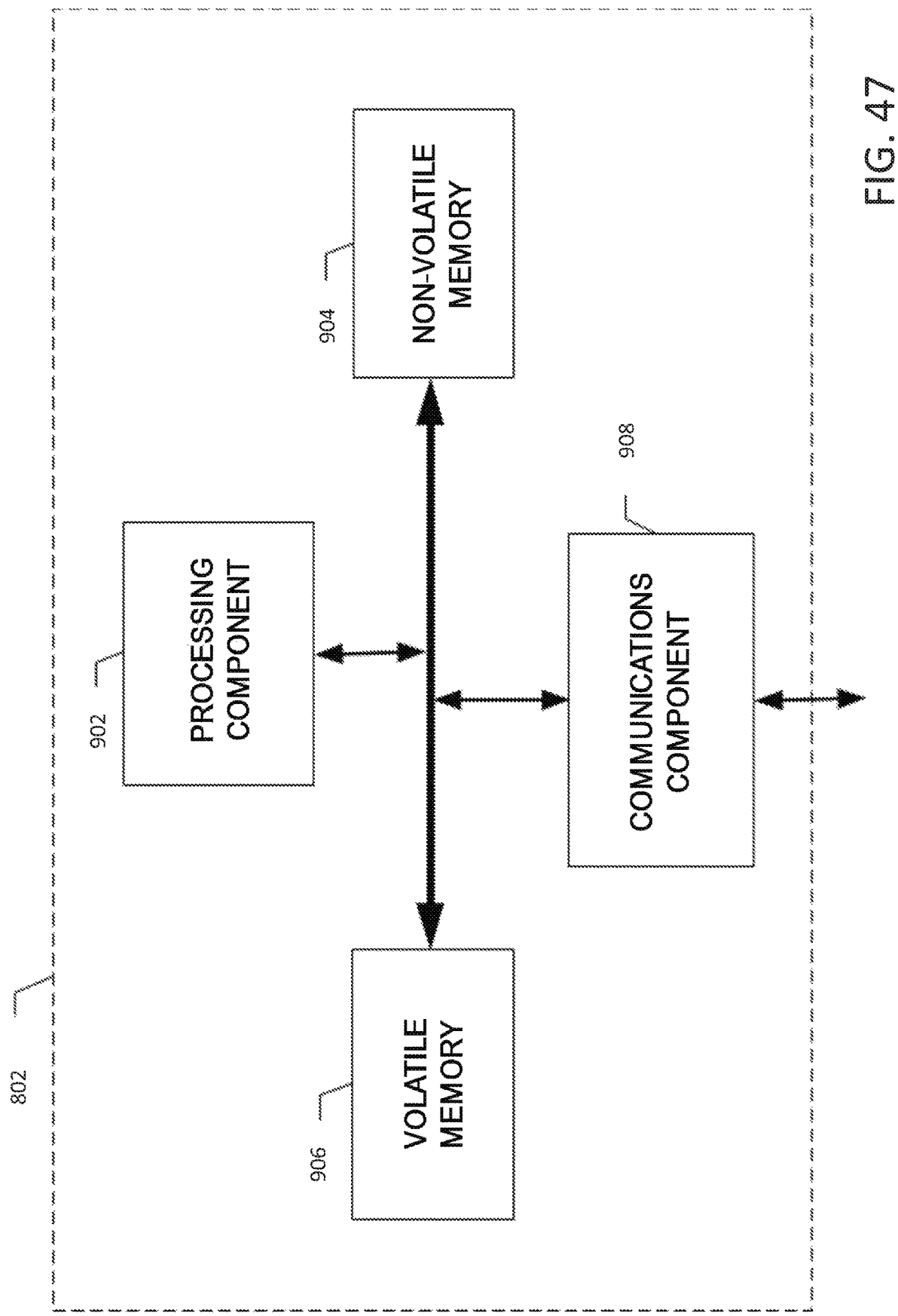
FIG. 47 schematically depicts a central computing entity according to one embodiment shown and described herein.

FIG. 47 provides a schematic of a central computing entity 802 according to one embodiment of the present invention. The central computing entity 802 can be operated by a variety of entities, including carriers. As will be recognized, a carrier may be a traditional carrier, such as United Parcel Service (UPS), FedEx, DHL, courier services, the United States Postal Service (USPS), Canadian Post, freight companies (e.g. truck-load, less-than truckload, rail carriers, air carriers, ocean carriers, etc.), and/or the like. However, a carrier may also be a nontraditional carrier, such as Coyote, Amazon, Google, Airbus, Uber, ride sharing services, crowd-sourcing services, retailers, and/or the like.

As indicated, in one embodiment, the central computing entity 802 may also include one or more communications elements/components 908 for communicating with various computing entities, such as by communicating information/data, content, information, and/or similar terms used herein interchangeably that can be transmitted, received, operated on, processed, displayed, stored, and/or the like.

As shown in FIG. 47, in one embodiment, the central computing entity 802 may include or be in communication with one or more processing elements/components 902 (also referred to as processors, processing circuitry, processing device, and/or similar terms used herein interchangeably) that communicate with other elements/components within the central computing entity 802 via a bus, for example. As will be understood, the processing elements/components 902 may be embodied in a number of different ways. For example, the processing element/component 902 may be embodied as one or more CPLDs, "cloud" processors, microprocessors, multi-core processors, coprocessing entities, ASIPs, microcontrollers, and/or controllers. Further, the processing element/component 902 may be embodied as one or more other processing devices or circuitry. The term circuitry may refer to an entirely hardware embodiment or a combination of hardware and computer program products. Thus, the processing element/component 902 may be embodied as integrated circuits, ASICs, FPGAs, PLAs, hardware accelerators, other circuitry, and/or the like. As will therefore be understood, the processing element/component 902 may be configured for a particular use or configured to execute instructions stored in volatile or non-volatile media or otherwise accessible to the processing element/component 902. As such, whether configured by hardware or computer program products, or by a combination thereof, the processing element/component 902 may be capable of performing steps or operations according to embodiments of the present invention when configured accordingly.

In one embodiment, the central computing entity 802 may further include or be in communication with memory components/elements-such as non-volatile media (also referred to as non-volatile storage, memory, memory storage, memory circuitry and/or similar terms used herein interchangeably). In one embodiment, the non-volatile storage or memory may include one or more non-volatile storage or memory media 904, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, information/data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer readable storage medium using one or more database models, such as a hierarchical database model, network model, relational model, entity-relationship model, object model, document model, semantic model, graph model, and/or the like.

In one embodiment, the memory components/elements may further include or be in communication with volatile media (also referred to as volatile storage, memory, memory storage, memory circuitry and/or similar terms used herein interchangeably). In one embodiment, the volatile storage or memory may also include one or more volatile storage or memory media 906, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, information/data, applications, programs, program modules, scripts, source code, object code, byte code, compiled code, interpreted code, machine code, executable instructions, and/or the like being executed by, for example, the processing element/component 902. Thus, the databases, database instances, database management systems, information/data, applications, programs, program modules, scripts, source code, object code, byte code, compiled code, interpreted code, machine code, executable instructions, and/or the like may be used to control certain aspects of the operation of the central computing entity 802 with the assistance of the processing element/component 902 and operating system.

As indicated, in one embodiment, the central computing entity 802 may also include one or more communications components/elements 908 for communicating with various computing entities, such as by communicating information/data, content, information, and/or similar terms used herein interchangeably that can be transmitted, received, operated on, processed, displayed, stored, and/or the like. Such communication may be executed using a wired data transmission protocol, such as FDDI, DSL, ATM, frame relay, DOCSIS, or any other wired transmission protocol. Similarly, the central computing entity 802 may be configured to communicate via wireless external communication networks using any of a variety of protocols, such as GPRS, UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR protocols, NFC protocols, Wibree, Bluetooth protocols, wireless USB protocols, and/or any other wireless protocol.

Although not shown, the central computing entity 802 may include or be in communication with one or more input components/elements, such as a keyboard input, a mouse input, a touch screen/display input, motion input, movement input, audio input, pointing device input, joystick input, keypad input, and/or the like. The central computing entity 802 may also include or be in communication with one or more output elements/components (not shown), such as audio output, video output, screen/display output, motion output, movement output, and/or the like.

As will be appreciated, one or more of the central computing entity's 802 elements/components may be located remotely from other central computing entity 802 components/elements, such as in a distributed system. That is, the term "central" is used in the generic sense and is not intended to necessarily indicate a central location. Furthermore, one or more of the elements/components may be combined and additional elements/components performing functions described herein may be included in the central computing entity 802. Thus, the central computing entity 802 can be adapted to accommodate a variety of needs and circumstances. As will be recognized, these architectures and descriptions are provided for exemplary purposes only and are not limiting to the various embodiments.

B. Exemplary User Computing Entity

A user may be an individual, a family, a company, an organization, an entity, a department within an organization, a representative of an organization and/or person, and/or the like. Thus, as will be recognized, in certain embodiments, users may be consignors and/or consignees. To do so, a user may operate a user computing entity 804 that includes one or more elements/components that are functionally similar to those of the central computing entity 802.

Figure 48:
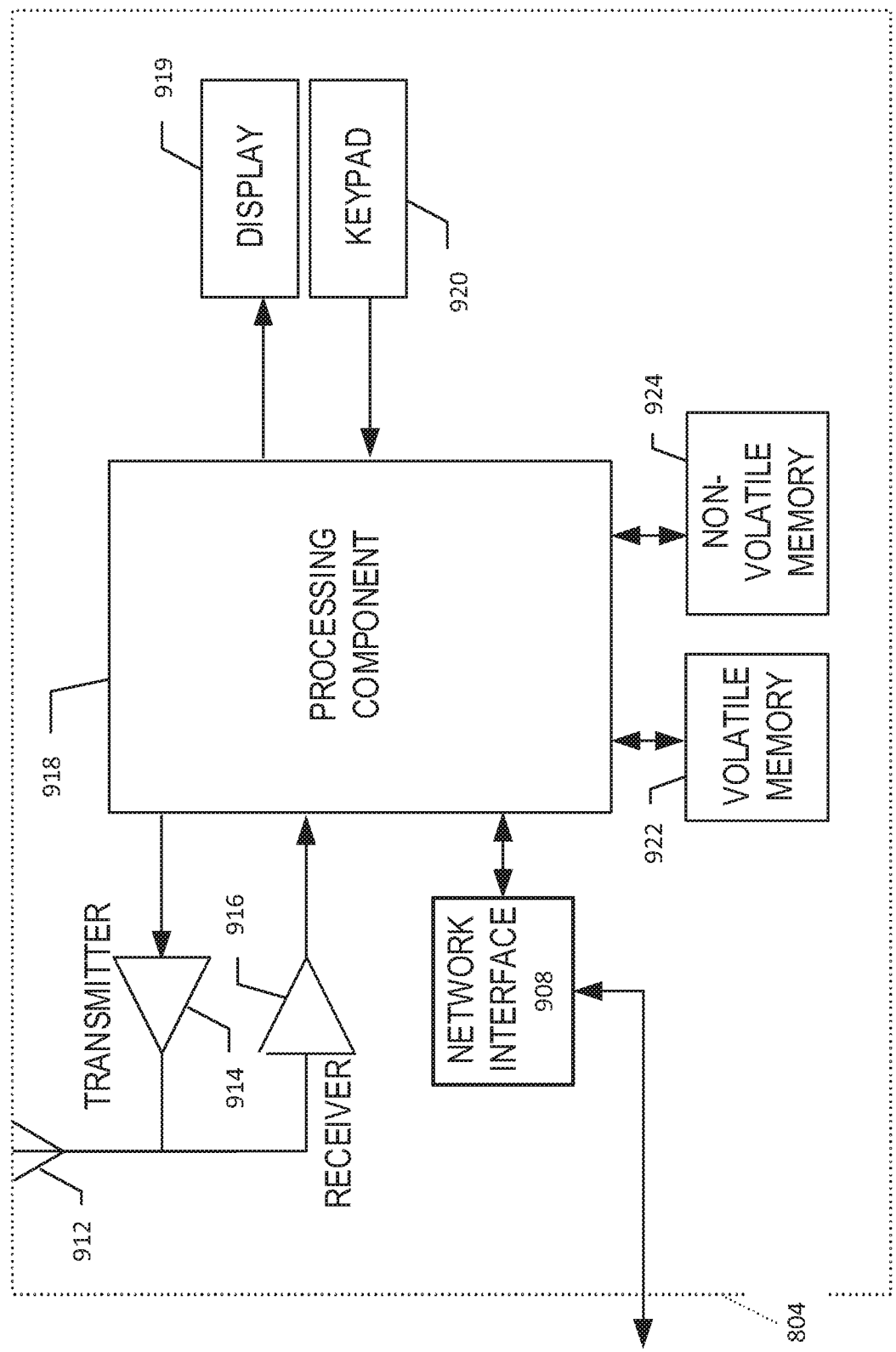
FIG. 48 schematically depicts a user computing entity according to one embodiment shown and described herein.

FIG. 48 provides an illustrative schematic representative of a user computing entity 804 that can be used in conjunction with embodiments of the present invention. In general, the terms device, system, computing entity, entity, and/or similar words used herein interchangeably may refer to, for example, one or more computers, computing entities, desktop computers, mobile phones, tablets, phablets, notebooks, laptops, distributed systems, smart home entities, kitchen appliances, Google Home, Amazon Echo, garage door controllers, cameras, imaging devices, thermostats, security systems, networks, gaming consoles (e.g., Xbox, Play Station, Wii), watches, glasses, iBeacons, proximity beacons, key fobs, RFID tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG. 45, the user computing entity 804 can include communication components/elements, such as an antenna 912, a transmitter 914 (e.g., radio), and a receiver 916 (e.g., radio). Similarly, the user computing entity 804 can include a processing element/component 918 (e.g., CPLDs, microprocessors, multi-core processors, cloud processors, coprocessing entities, ASIPs, microcontrollers, and/or controllers) that provides signals to and receives signals from communication elements/components.

The signals provided to and received from the transmitter 914 and the receiver 916, respectively, may include signaling information/data in accordance with air interface standards of applicable wireless systems. In this regard, the user computing entity 804 may be capable of operating with one or more air interface standards, communication protocols, modulation types, and access types. More particularly, the user computing entity 804 may operate in accordance with any of a number of wireless communication standards and protocols, such as those described above with regard to the central computing entity 802. In a particular embodiment, the user computing entity 804 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 804 may operate in accordance with multiple wired communication standards and protocols, such as those described above with regard to the central computing entity 802 via a network interface 908.

Via these communication standards and protocols, the user computing entity 804 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 804 can also download changes, add-ons, and updates, for instance, to its firmware, software (e.g., including executable instructions, applications, program modules), and operating system.

According to one embodiment, the user computing entity 804 may include location determining elements/components, aspects, devices, modules, functionalities, and/or similar words used herein interchangeably. For example, the user computing entity 804 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Global Navigation Satellite System (GLONASS), Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the user computing entity's 804 position in connection with a variety of other systems, including cellular towers, Wi-Fi access points, and/or the like. Similarly, the user computing entity 804 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Bluetooth Smart, NFC transmitters, and/or the like. These indoor positioning aspects can be used in a variety of settings to determine the location of someone or something to within inches or centimeters.

The user computing entity 804 may also comprise a user interface (that can include a display 919 coupled to a processing element/component 918) and/or a user input interface (coupled to a processing element/component 918). For example, the user interface may be a user application, browser, user interface, interface, and/or similar words used herein interchangeably executing on and/or accessible via the user computing entity 804 to interact with and/or cause display of information/data from the central computing entity 802, as described herein. The user input interface can comprise any of a number of devices or interfaces allowing the user computing entity 804 to receive information/data, such as a keypad 920 (hard or soft), a touch display, voice/speech or motion interfaces, or other input device. In embodiments including a keypad 920, the keypad 920 can include (or cause display of) the conventional numeric (0-9) and related keys (#, *), and other keys used for operating the user computing entity 804 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 804 can also include memory elements/components-such as volatile storage or memory 922 and/or non-volatile storage or memory 924, which can be embedded and/or may be removable. For example, the nonvolatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the user computing entity 804. As indicated, this may include a user application that is resident on the entity or accessible through a browser or other user interface for communicating with the central computing entity 802, mobile carrier computing entity 806, UAV computing entity 808, delivery vehicle computing entity 810, and/or various other computing entities.

In another embodiment, the user computing entity 804 may include one or more elements/components or functionality that are the same or similar to those of the central computing entity 802, as described in greater detail above. As will be recognized, these architectures and descriptions are provided for exemplary purposes only and are not limiting to the various embodiments.

C. Exemplary UAV Computing Entity

Figure 49:
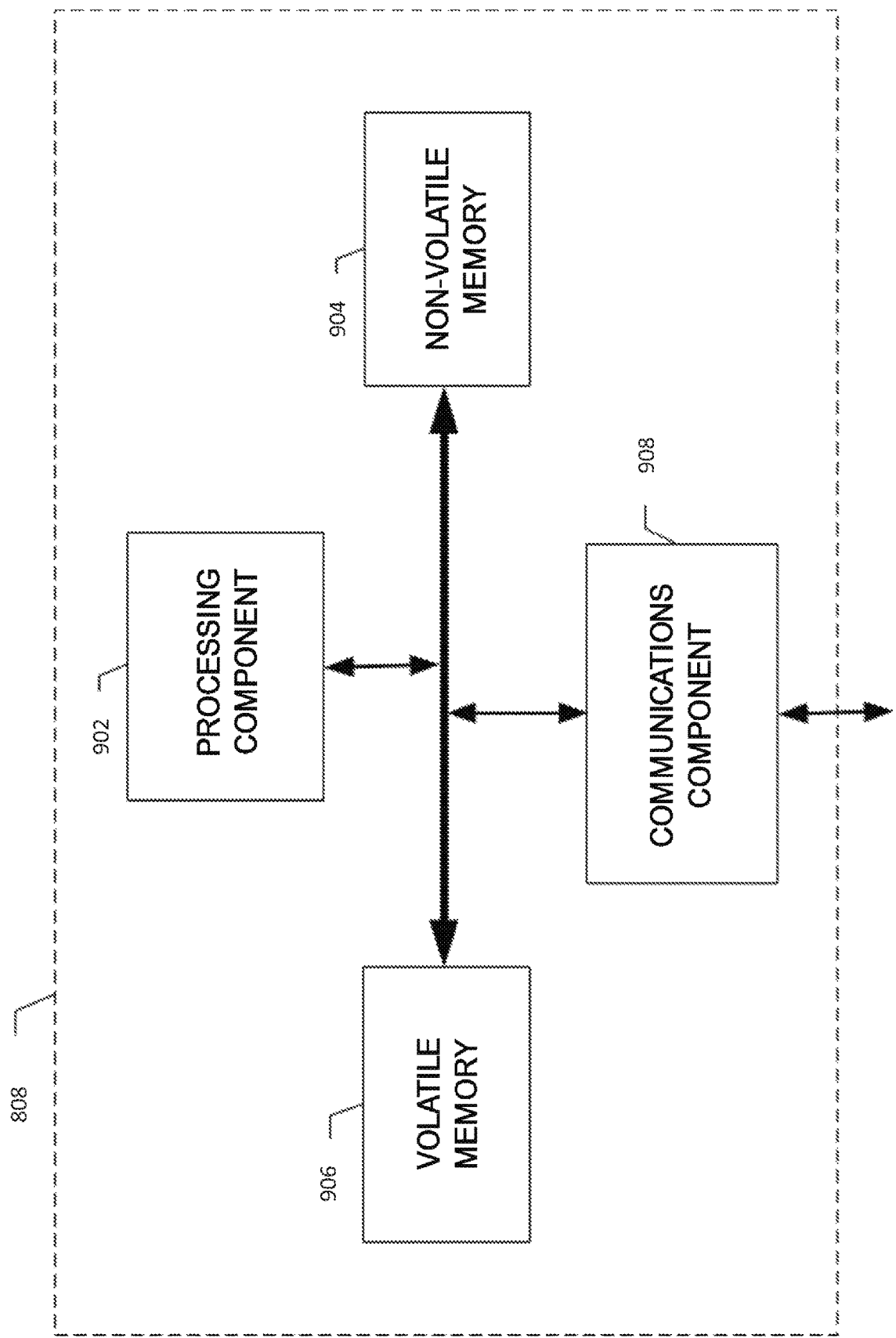
FIG. 49 schematically depicts UAV computing entity according to one embodiment shown and described herein.

FIG. 49 provides an illustrative schematic representative of the UAV computing entity 808 that can be used in conjunction with embodiments of the present invention. As described above, the elements/components of the UAV computing entity 808 may be similar to those described with regard to the central computing entity 802, the user computing entity 804, and/or the mobile carrier computing entity 806. In one embodiment, the UAV computing entity 808 may also include and/or be associated with one or more control elements/components (not shown) for controlling and operating the UAV 100 as described herein. As shown in FIG. 49, the UAV computing entity 808 can include communication elements/components 908, such as those described above with regard to the central computing entity 802 and/or the user computing entity 804. For example, the UAV computing entity 808 may operate in accordance with any of a number of wireless communication standards, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, BLE, Wibree, USB, and/or the like. Similarly, the UAV computing entity 808 may operate in accordance with multiple wired communication standards and protocols, such as those described with regard to the central computing entity 802, the user computing entity 804, and/or the like via the communication elements/components. Thus, the UAV 100 (e.g., the UAV computing entity 808) may be able to communicate with various computing entities-including user computing entities 804 (e.g., smart home entity) to, for example, provide an instruction to open a garage door, provide a notification/message and/or the like. The UAV computing entity 808 may also include one or more processing elements/components 405, including those described with regard to the central computing entity 802 and/or the user computing entity 804.

As indicated, a UAV 100 (e.g., the UAV computing entity 808) may have the ability to operate in accordance with multiple long-range and short-range communication standards and protocols and use multiple wireless carriers (e.g., China Mobile, Vodafone, Telefónica, T-Mobile, Verizon, AT&T, and Qtel). For example, in a single geographic area (e.g., country, region, state, county, city, or town), there may be multiple wireless carriers providing wireless services. Similarly, in communicating with a primary parcel delivery vehicle 10 (or various other computing entities), a UAV computing entity 808 may have the ability to use long-range and short-range communication standards and protocols depending the UAV's 100 proximity to the primary parcel delivery vehicle 10 and/or the UAV's 100 operational state (e.g., if the propulsion members 102 active or inactive).

In one embodiment, a central computing entity 802 can manage the access of the UAV computing entity 808 to the plurality of wireless carriers in one or more geographic areas and/or use of the long-range and short-range communication standards and protocols. For example, a UAV 100 associated with the various geographic areas can be activated with the various wireless carriers. Activating a UAV computing entity 808 with wireless carriers may include registering each UAV computing entity 808 with the wireless carriers from which services are desired (e.g., based on the UAV's 100 operating area). With numerous UAV 100 to manage, the central computing entity 802 may provide for an automated activation process. In certain embodiments, it may not be practical for a UAV 100 in a given geographic area to be configured to operate with more than a few wireless carriers. For instance, in one embodiment, it may be sufficient for the UAV 100 to be activated on two wireless carriers: a primary wireless carrier and a secondary wireless carrier. In other embodiments, a third or fourth activation may be justified based on the available wireless services and actual coverage patterns in the geographic area in which a UAV 100 will be used.

In addition to activating the UAV computing entity 808, the central computing entity 802 may be used to configure the UAV computing entity 808 to use the wireless services of wireless carriers and/or the various long-range and short-range communication standards and protocols. To do so, the central computing entity 802 may create and provide a configuration (e.g., a configuration file) for all UAVs 100 operating within a specific geographic area, such as a country, region, state, county, city, town, or other area. The configuration may also provide an order in which the wireless carriers should be accessed and/or the states or proximity to a primary parcel delivery vehicle 10 in which the long range and short-range communication standards and protocols should be used.

In one embodiment, the central computing entity 802 may create and provide a UAV-type configuration for each type of UAV computing entity 808 used by an enterprise. For example, an enterprise may have different types of UAV computing entities 808, each using different hardware, firmware, and software. Thus, the different configurations may be rather extensive and be customized down to, for example, the individual UAV computing entity 808. In one embodiment, UAV-type configurations may be used to provide the UAV computing entity 808 with, for instance, tuning parameters with build time embedded default values, such as the number of occurrences of a failed carrier dial up would be permitted before changing the current wireless carrier (e.g., changing from a primary wireless carrier to a secondary wireless carrier).

As indicated, the configurations may identify a primary wireless carrier and one or more secondary wireless carriers to use for wireless services. In one embodiment, the primary wireless carrier may be the wireless carrier the UAV computing entity 808 should use under normal conditions. The one or more secondary wireless carriers may be the wireless carriers the UAV computing entity 808 can use in the event of communication issues, for example, with the primary wireless carrier. For instance, the UAV computing entity 808 may switch from the primary wireless carrier to a secondary wireless when, for instance, something fails and is not recoverable by establishing a new session with the primary wireless carrier. Identifying the appropriate secondary wireless carrier to be used may be based on a variety of factors, including location, coverage availability, signal strength, and/or the like.

Similarly, the configurations may identify a primary long-range standard/protocol and a secondary short-range standard/protocol. In one embodiment, the primary long-range standard/protocol (e.g., LTE, GSM) may be the wireless standard/protocol the UAV computing entity 808 should use when its operational state is on or active (e.g., when the propulsion members 102 of the UAV 100 are active). The secondary short-range standard/protocol (e.g., BLE, UWB) may be the wireless standard/protocol the UAV 100 should use when its operational state is off or inactive (e.g., its propulsion members 102 inactive). Using the secondary wireless standard/protocol may also be determined based on the UAV's 100 proximity to the primary parcel delivery vehicle 10. For instance, when the UAV 100 is within 100 feet of the primary parcel delivery vehicle 10, the UAV may use a short-range standard/protocol or a dual-band approach until its operational state changes.

In one embodiment, by using multiple technologies and a common control mechanism (e.g., software), the UAV computing entity 808 can manage communications with multiple wireless carriers, using various standards/protocols, and drive the network connections. This may include path switching (e.g., software path switching) accomplished at build-time where different hardware is to be used and/or at run-time where it makes sense to act in different ways over time based on the actual conditions identified. Generally, path switching may refer to branching of software, for example, to address the needs of a specific UAV computing entity 808. Moreover, to adapt to different UAV computing entities 808, conditional compile-time switches can be used to enable blocks of code suitable for a specific UAV computing entity 808.

According to one embodiment, the UAV computing entity 808 may include location determining elements/components, aspects, devices, modules, functionalities, and/or similar words used herein interchangeably. As previously describe, such outdoor positioning aspects may include a location module adapted to acquire, for example, latitude, longitude, altitude, geocode, course, direction, heading, speed, UTC, date, and/or various other information/data. In one embodiment, the location module can acquire information/data, sometimes known as ephemeris information/data, by identifying the number of satellites in view and the relative positions of those satellites (e.g., GPS). The satellites may be a variety of different satellites, including LEO satellite systems, GLONASS satellite systems, DOD satellite systems, the European Union Galileo positioning systems, the Chinese Compass navigation systems, Indian Regional Navigational satellite systems, and/or the like. This information/data can be collected using a variety of coordinate systems, such as the DD; DMS; UTM; UPS coordinate systems; and/or the like. Alternatively, the location information/data can be determined by triangulating the user computing entity's 804 position in connection with a variety of other systems, including cellular towers, Wi-Fi access points, and/or the like. Similarly, the UAV computing entity 808 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, BLE transmitters, Bluetooth Smart, NFC transmitters, and/or the like. These indoor positioning aspects can be used in a variety of settings to determine the location of someone or something to within inches or centimeters.

The UAV computing entity 808 can also include one or more memory elements/components 915, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the UAV computing entity 808.

As indicated, the UAV computing entity 808 may include and/or be associated with one or more sensing elements/components, modules, and/or similar words used herein interchangeably. In embodiments, the one or more sensing elements/components include the ground landing sensors 162, the vehicle landing sensors 164, the route/flight guidance sensors 166, and the cameras 168. The UAV computing entity 808 may include sensing elements/components, such as motor/engine, fuel, battery, speed, route/flight time, altitude, barometer, air telemetry, ground telemetry, gyroscope, pressure, location, weight, emissions, temperature, magnetic, current, tilt, motor/engine intake, motor/engine output, and/or carrier sensors. The sensed information/data may include, but is not limited to, air speed information/data, ground speed information/data, emissions information/data, RPM information/data, acceleration information/data, tilt information/data, oil pressure information/data, pressure information/data, rotational information/data, distance information/data, fuel information/data, idle information/data, weight information/data, and/or the like (which may be referred to as telematics information/data). The sensing elements/components may include environmental sensors, such as air quality, chemical, precipitation, temperature sensors, and/or the like. Thus, the sensed information/data may also include carbon monoxide (CO), nitrogen oxides (NOx), sulfur oxides (SOx), Ethylene Oxide (EtO), ozone (O3), hydrogen sulfide (H2S) and/or ammonium (NH4) information/data, temperature information/data, pressure information/data, and/or meteorological information/data (which may be referred to as weather or atmospheric information/data).

As described above, the ground landing sensors 162 and the vehicle landing sensors 164 may include one or more sonar sensors, light sensors (e.g., LIDAR, LiDAR, and LADAR), magnetic-field sensors, radio wave sensors (e.g., RADAR), thermals sensors, infrared sensors, image sensors, and/or the like. Further, the vehicle landing sensors 164 and the cameras 168 may include one or more image sensors for capturing, collecting, and/or recording image information/data (e.g., sensed information/data). The image information/data can be captured and stored in a variety of formats. For example, the image information/data (including 360° video) can be captured in or converted to a variety of formats, such as Joint Photographic Experts Group (JPEG), Motion JPEG (MJPEG), Moving Picture Experts Group (MPEG), Graphics Interchange Format (GIF), Portable Network Graphics (PNG), Tagged Image File Format (TIFF), bitmap (BMP), H.264, H.263, Flash Video (FLV), Hypertext Markup Language 5 (HTML5), VP6, VP8, 4K, and/or the like. Such sensed information/data can be captured, collected, and/or or recorded using a variety of techniques and approaches for various purposes (e.g., takeoff, landing, delivery, collision avoidance, routing, and/or the like).

D. Exemplary Delivery Vehicle Computing Entity

Referring again to FIG. 46, the one or more delivery vehicle computing entities 810 may be attached, affixed, disposed upon, integrated into, or part of a primary parcel delivery vehicle 10. The delivery vehicle computing entity 810 may collect telematics information/data (including location information/data) and transmit/send the information/data to various other computing entities via one of several communication methods.

In one embodiment, the delivery vehicle computing entity 810 may include, be associated with, or be in wired or wireless communication with one or more processing elements/components, location determining elements/components, one or more communication elements/components, one or more sensing elements/components, one or more memory location determining elements/components, one or more power sources, and/or the like. Such elements/components may be similar to those described with regard to the central computing entity 802, the user computing entity 804, the mobile carrier computing entity 806, and/or the UAV computing entity 808.

In one embodiment, the one or more location determining elements/components may be one of several components in wired or wireless communication with or available to the delivery vehicle computing entity 810. Moreover, the one or more location determining elements/components may be compatible with various satellite or navigation systems, coordinate systems, and/or the like. Thus, the one or more location determining elements/components may be used to receive latitude, longitude, altitude, heading or direction, geocode, course, position, time, and/or speed information/data (e.g., referred to herein as telematics information/data and further described herein below). The one or more location determining elements/components may also communicate with the central computing entity 802, the delivery vehicle computing entity 810, mobile carrier computing entity 806, and/or similar computing entities.

As indicated, in addition to the one or more elements/components, the delivery vehicle computing entity 810 may include and/or be associated with one or more sensing elements/components, modules, and/or similar words used herein interchangeably. For example, the sensing elements/components may include vehicle sensors, such as motor/engine, fuel, odometer, hubometer, tire pressure, location, weight, emissions, door, and speed sensors. The sensed information/data may include, but is not limited to, speed information/data, emissions information/data, RPM information/data, tire pressure information/data, oil pressure information/data, seat belt usage information/data, distance information/data, fuel information/data, idle information/data, and/or the like (which may be referred to as telematics information/data). The sensing elements/components may include environmental sensors, such as air quality sensors, temperature sensors, and/or the like. Thus, the sensed information/data may also include CO, NOx, SOx, EtO, O3, H2S, and/or NH4 information/data, and/or meteorological information/data (which may be referred to as weather, environmental, and/or atmospheric information/data).

In one embodiment, the delivery vehicle computing entity 810 may further be in communication with a vehicle control module or system. The vehicle control module or system, which may be a scalable and subservient device to the delivery vehicle computing entity 810, may have information/data processing capability to decode and store analog and digital inputs from vehicle systems and sensors. The vehicle control module or system may further have information/data processing capability to collect and present telematics information/data to the J-Bus (which may allow transmission to the delivery vehicle computing entity 810), and output standard vehicle diagnostic codes when received from a vehicle's J-Bus-compatible onboard controllers and/or sensors.

As will be recognized, the delivery vehicle computing entity 810 can include communication elements/components, such as those described with regard to the central computing entity 802, UAV computing entity 808, and/or user computing entity 804. Furthermore the delivery vehicle computing entity 810 may be communicatively coupled to the robot processor 522 and the conveyor controller 460 and may control operation of the robot 500 and the conveyor 440, as will be described in greater detail herein.

E. Exemplary Parcel Carrier Computing Entity

In one embodiment, a parcel carrier computing entity 212 may include one or more elements/components that are functionally similar to those of the central computing entity 802, user computing entity 804, UAV computing entity 808, and/or delivery vehicle computing entity 810. For example, in one embodiment, each parcel carrier computing entity 212 may include one or more processing elements/components (e.g., CPLDs, microprocessors, multi-core processors, cloud processors, coprocessing entities, ASIPs, microcontrollers, and/or controllers), one or more display device/input devices (e.g., including user interfaces), volatile and non-volatile storage or memory elements/components, and/or one or more communications elements/components. For example, the user interface may be a user application, browser, user interface, interface, and/or similar words used herein interchangeably executing on and/or accessible via the parcel carrier computing entity 212 to interact with and/or cause display of information/data from the central computing entity 802, as described herein. This may also enable the parcel carrier computing entity 212 to communicate with various other computing entities, such as the UAV computing entity 808, and/or various other computing entities. As will be recognized, these architectures and descriptions are provided for exemplary purposes only and are not limiting to the various embodiments.

F. Exemplary Mobile Carrier Computing Entity

In one embodiment, a mobile carrier computing entity 806 may include one or more elements/components that are functionally similar to those of the central computing entity 802, user computing entity 804, UAV computing entity 808, and/or delivery vehicle computing entity 810. For example, in one embodiment, each mobile carrier computing entity 806 may include one or more processing elements/components (e.g., CPLDs, microprocessors, multi-core processors, cloud processors, coprocessing entities, ASIPs, microcontrollers, and/or controllers), one or more display device/input devices (e.g., including user interfaces), volatile and non-volatile storage or memory elements/components, and/or one or more communications elements/components. For example, the user interface may be a user application, browser, user interface, interface, and/or similar words used herein interchangeably executing on and/or accessible via the mobile carrier computing entity 806 to interact with and/or cause display of information/data from the central computing entity 802, as described herein. This may also enable the mobile earner computing entity 806 to communicate with various other computing entities, such as user computing entities 804, and/or various other computing entities. As will be recognized, these architectures and descriptions are provided for exemplary purposes only and are not limiting to the various embodiments.

Reference will now be made to delivery methods for delivering parcels 300 via the UAVs 100. In various embodiments, the UAVs 100 may be dispatched based on logical groupings, geofencing, and the like.

G. Geographic Information/Data Database

In one embodiment, each computing entity may include or be in communication with one or more geographic information/data database (not shown) configured to access, process, provide, manipulate, store, and/or the like map information/data. For example, the geographic information/data database may include or have access to a map information/data database that includes a variety of data (e.g., map information/data) utilized for displaying a map, constructing a route/flight or navigation path, and/or other map related functions for terrestrial, nautical, and/or aerial vehicles. For example, the geographic information/data database may communicate with or comprise a geographic information/data database comprising map information/data provided by a map provider computing entity. For example, a geographic information/data database may include node data, waypoint records, street/flight/route segment records, point of interest (POI) data records, event of interest data records, serviceable point 5901 data records, and other data records. In one embodiment, the other data records include cartographic ("carto") data records, routing data records (e.g., for routing and navigating vehicles to particular points), and/or the like. For example, the geographic information/data database may comprise map information/data including boundary, location, and attribute information/data corresponding to the various serviceable points 5901, POIs, events of interest, and/or the like.

One or more portions, components, areas, layers, features, text, and/or symbols of the POI or event data can be stored in, linked to, and/or associated with one or more of these data records. For example, one or more portions of the POI, event data, or recorded route/flight information can be matched with respective map or geographic records via position or GNSS and/or GPS) data associations (such as using known or future map matching, geo-coding, and/or reverse geo-coding techniques), for example. As will be recognized, the map information/data can be stored using a variety of formats, layers, and/or the like-including shapefiles, ArcMaps, geodatabases, coverages, imagery, rasters, computer-aided drafting (CAD) files, other storage formats, and/or the like. For instance, the geographic information/data database can appropriately store/record map information/data as a part of a digital map, e.g., as part of a feature layer, raster layer, service layer, geoprocessing layer, basemap layer, service are layer, constituent area layer, and/or the like.

In an example embodiment, the street/flight/route segment data records are segments representing roads, streets, flight paths, paths, and/or the like. The node data records are end points corresponding to the respective links or segments of the street/flight/route segment data records. The street/flight/route segment data records and the node data records represent a road networks or flight paths, used by various types of vehicles. Alternatively, the geographic information/data database can contain path segments and node data records or other data that represent pedestrian paths or areas in addition to or instead of the street/flight/route segment data records, for example. The object or data structure of the street/flight/route segments and other records may comprise a variety of information/data associated with each map element. In some examples, this information/data may include a consignee name, pick-up or delivery identifier, primary delivery point (e.g., first desired delivery point/location 5902), secondary delivery point, street name, street number, street prefix, street suffix, street type, city, state, province, territory, country, postal code, residential or commercial indicator, street classification, directionals (e.g., one way <specific to which way> or both ways), longitude and latitude, geocode, location identifier, and/or the like. For example, in one embodiment, a map element may be represented by and/or associated with a longitude and latitude, a geocode, a nearest street/flight/route segment, an address, and/or the like. Similarly, street/flight/route segments may be represented by or associated with a name, a segment identifier, a connecting node, an address or address range, a series of longitude and latitude coordinates, and/or the like that define the overall shape and location of the street/flight/route segment. As will be recognized, a variety of other approaches and techniques can be used to adapt to various needs and circumstances.

The street/flight/route segments and nodes can be associated with attributes, such as geographic coordinates (e.g., latitude and longitude), names or identifiers, street names, address ranges, speed limits, turn restrictions at intersections, and other navigation related attributes, as well as serviceable points, events of interest, and/or POIs, such as gasoline stations, hotels, restaurants, museums, stadiums, offices, waypoints, automobile dealerships, auto repair shops, buildings, stores, parks, etc. For example, serviceable points 5901, events of interest, and/or POIs can be represented in digital maps as being accessible by one or more street networks or street segments of a street network. Serviceable points 5901, events of interest, POIs, street networks, and/or the like can be represented in digital maps as navigable/traversable/travelable segments or points for traveling to and/or from serviceable points 5901, waypoints, events of interest, and/or POIs.

The geographic information/data database can include data about the serviceable points 5901, events of interest, and/or POIs and their respective locations in the serviceable points 5901, events of interest, and/or POI data records. The geographic information/data database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic information/data database can include and/or be associated with event information/data (e.g., traffic incidents, constructions, scheduled events, unscheduled events, etc.) associated with the POI data records or other records of the geographic information/data database. For example, in one embodiment, a serviceable point 5901, event of interest, and/or POI may be represented by and/or associated with a longitude and latitude, a geocode, a nearest street/flight/route segment, an address, and/or the like. As will be recognized, a variety of other approaches and techniques can be used to adapt to various needs and circumstances.

In one embodiment, the geographic information/data database may store digital maps. In another embodiment, the geographic information/data database may be in communication with or associated with one or more map or content provider computing entities (e.g., mapping websites/servers/providers/databases, including providers such as maps.google.com, bing.com/maps, mapquest.com, Tele Atlas®, NAVTEQ®, and/or the like) that provide map information/data (or other content) of digital maps to a variety of users and/or entities. Using the digital maps, an appropriate computing entity can provide map information/data, for example, about serviceable points 5901, events of interest, and/or POIs (e.g., their locations, attributes, and/or the like) and/or their corresponding street networks based on map information/data.

The geographic information/data database can be maintained by the map or content provider (e.g., a map developer) in association with the services platform. By way of example, the map developer can collect geographic data to generate and enhance the geographic information/data database. There can be different ways used by the map developer to collect data. These ways can include obtaining data from other sources, such as municipalities or respective geographic authorities. The geographic information/data database can be a master geographic information/data database stored in a format that facilitates updating, maintenance, and development. For example, the master geographic information/data database or data in the master geographic information/data database can be in an Oracle spatial format, .kml, SQL, PostGIS, or other spatial format, such as for development or production purposes. The Oracle spatial format or development/production database can be compiled into a delivery format, such as a geographic data files (GDF) format. The data in the production and/or delivery formats can be compiled or further compiled to form geographic information/data database products or databases, which can be used in end user computing entities or systems.

5. ADDITIONAL FEATURES, FUNCTIONALITY, AND OPERATIONS

A. Parcel Information/Data

In one embodiment, the process may begin by the central computing entity 802 generating and/or receiving parcel information/data for one or more parcels 300. For example, a user may initiate the transportation process by entering identifying information/data into the central computing entity 802. In various embodiments, the user (e.g., a user or user representative operating a user computing entity 804) may access a webpage, application, dashboard, browser, or portal of a carrier. After the user is identified (e.g., based on his or her profile), the user may initiate a parcel 300. In various embodiments, the central computing entity 802 may then provide or be in communication with a user interface (e.g., browser, dashboard, application) for the user to provide parcel information/data which includes certain details regarding the parcel 300. In various embodiments, the parcel information/data may include a name, street address, city, state, postal code, country, telephone number, and/or the like for both the consignor and the consignee. In various embodiments, the user interface may comprise a tillable form with fields including ship-from information/data and ship-to information/data. In various embodiments, some of the information/data fields may be pre-populated. For example, if the user logged into a registered account/profile, the address information/data entered during registration may be pre-populated in certain information/data fields. In some embodiments, the user may also have a digital address book associated with the account comprising address information/data for possible ship-to and/or ship-from information/data. The user may be able to select certain ship-to and/or ship-from information/data from the address book for the associated parcel 300.

In one embodiment, after the central computing entity 802 receives the ship-to and/or ship-from information/data from the user, the central computing entity 802 may perform one or more validation operations. For example, the central computing entity 802 may determine whether the primary address (and/or other addresses) in the specified country or postal code is eligible for a pick-up or delivery. The central computing entity 802 may also determine whether the primary address (and/or other secondary addresses) is valid, e.g., by passing the primary address through one or more address cleansing or standardization systems. The central computing entity 802 may perform a variety of fraud prevention measures as well, such as determining whether the users (or one of the delivery addresses) have been "blacklisted" from user pick-up and/or delivery. As will be recognized, a variety of other approaches and techniques can be used to adapt to various needs and circumstances.

In addition to ship-to and/or ship-from information/data, the parcel information/data may also include service level information/data. The service level options may be, for example, Same Day UAV, Same Day Ground, Next Day UAV, Next Day Ground, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like.

In one embodiment, the central computing entity 802 (a) may be provided parcel 300 characteristics and attributes in the parcel information/data and/or (b) may determine parcel 300 characteristics and attributes from the parcel information/data. The characteristics and attributes may include the dimensions, weight, transportation classifications, planned movements in the carrier's transportation and logistics network, planned times, and/or the like for various parcels 300. For example, the length, width, height, base, radius, and weight can be received as input information/data and/or can be determined or collected by various carrier systems. For example, sensors or cameras may be positioned to capture or determine the length, width, height, and weight (including dimensional weight) of a parcel 300 as it moves along the conveyor, moves in or out of loading bay, is carried by a lift truck, is transported through the carrier's transportation and logistics network, and/or the like.

In one embodiment, with such information/data, the central computing entity 802 can determine/identify the cube/volume for each parcel 300. The units of measurement for the equations may be established so that the size produced by the determinations is in cubic feet, or cubic inches, or any other volumetric measure. In one embodiment, after determining the cube/volume for a parcel 300 (and/or making various other determinations), the central computing entity 802 can apply a classification to the parcel 300 based at least in part on the cube/volume. The classifications may include (1) size category one parcels 300, (2) size category two parcels 300, (3) size category three parcels 300, and/or (4) size category four parcels 300. By way of example, (1) size category one parcels 300 may be defined as being within >0 and ≤2 cubic feet, (2) size category two parcels 300 may be defined as being within >2 and ≤4 cubic feet, (3) size category three parcels 300 may be defined as being within >4 and ≤6 cubic feet, and/or (4) size category four parcels 300 may be defined as being over >6 cubic feet. As will be recognized, a variety of other approaches and techniques can be used to adapt to various needs and circumstances. This can facilitate determining the types of delivery options that are available for a parcel, such as UAV delivery or primary parcel 300 delivery vehicle delivery 10.

In one embodiment, the central computing entity 802 may assign or associate one or more planned times for each parcel 300—along with a planned time for specific activities for the parcel 300, each stop of a route/flight, each route/flight, and/or the like. A planned time may be the time for handling (e.g., sorting, re-wrapping, loading, unloading, inspecting, picking up, delivering, labeling, over-labeling, engaging, disengaging, and/or the like) a parcel 300. In one embodiment, each parcel 300, each activity, each stop of a route/flight, each route/flight, and/or the like may have or be associated with total planned times and/or additive planned times. The planned times may be based on historical information/data, such as average planned times.

As indicated, a planned time may comprise a total planned time for a parcel 300, an activity, a stop of a route/flight, a route/flight, and/or the like. The total planned time may comprise various additive planned times (both of which are referred to herein interchangeably as planned times). The planned times may be based on a variety of factors or parameters. For example, the planned time may be based on the cube/volume and/or weight of the parcel 300—e.g., it may take more time to move a parcel 300 that weighs 11.52 pounds from a conveyor belt than to move a parcel 300 that weighs 0.32 pounds from the same conveyor belt. Further, the planned time factors and/or parameters may also contemplate or include the type of parcel 300, such as whether the parcel 300 requires special handling. The planned time factors and/or parameters may also contemplate the service level of and/or activities to be carried out for the parcel 300. Based on the factors and parameters, for instance, the central computing entity 802 may store, have access to, and/or may forecast/estimate planned times for sorting, handling, conveying, scanning, picking up, delivering, and/or the like various parcels 300. For purposes of illustration and not of limitation, for sorting a parcel 300 from a belt conveyor to a position in a full length trailer, (1) a size category one parcel may be assigned or associated with a 1 second additive planned time, (2) a size category two parcel assigned a 1.5 second additive planned time, and so forth. Similarly, for a load operation from a warehouse to a vehicle, for instance, (1) each size category one parcel may be assigned or associated with 5 seconds of planned time, (2) each size category two parcel may be assigned or associated with 7 seconds of planned time, (3) each size category three parcel may be assigned or associated with 10 seconds of planned time, and (4) each size category four parcel may be assigned or associated with 20 seconds of planned time. Moreover, (1) each special handling category one parcel may be assigned or associated with 25 seconds of additive planned time, (2) each special handling category two parcel may be assigned or associated with 45 seconds of additive planned time, and (3) each special handling category three parcel may be assigned or associated with 33 seconds of additive planned time. The additive planned times may also be specific to carrier equipment: unload systems, load systems, sortation systems, vehicles, re-wrap systems, weighing systems, inspection systems, tools, and/or any other suitable systems. Thus, the additive planned times may vary for different types of systems (e.g., unload conveyor A, unload conveyor B) since the times for handling specific tasks associated with the different systems may vary. Additionally, some of the additive planned times may vary based on different types of vehicles since a storage area of the vehicles may vary based on the size of the vehicles. For instance, it may take longer or shorter times to walk to or access locations of the storage area and access walls, shelves, and/or the like of the storage area. In this example, the central computing entity 802 may determine/identify additive planned times associated with setup of conveyors (e.g., an unload conveyor). Further, there may be an additive planned time for loading the parcel 300 onto a primary parcel 300 vehicle 10 or conveyor, sorting the parcel 300 at a hub or other center, re-wrapping and over-labeling the parcel 300, scanning and walking the parcel 300 from a primary parcel 300 vehicle 10 to its final delivery destination, and/or the like.

The additive planned times may also be specific to vehicles (which also may be referred to herein as equipment) used in load, unload, pick-up, and/or delivery operations of parcels 300, as well as one or more bundles/containers. For instance, the central computing entity 802 may determine the number of parcels 300 that may be loaded on or unloaded from the trailer or truck within a given time period based on the sizes of trucks/trailers (e.g., 40 foot trailers, 50 foot trailers) and/or the like. As such, in response to identifying a selected primary parcel 300 vehicle 10 from which to unload and/or load parcels 300, the central computing entity 802 may determine/identify additive planned times (e.g., an unload system, a load system) based in part on the size of the trailer/truck and/or equipment being used. As will be recognized, longer length trailers/trucks may require greater additive planned times relative to shorter length trailers, for example, to walk off parcels 300 (e.g., parcels 300), and may, but need not, require longer conveyors, which may require more setup time than shorter conveyors. Additionally, in some embodiments, various size category one parcels 300 may be stored in one or more bundles/containers (e.g., bags, tote boxes, and/or the like). As such, in an instance in which the central computing entity 802 may determine that a bundle/container includes size category one parcels 300, the central computing entity 802 may assign an additive planned time to the bundle/container which may decrease or increase the handling time for size category one parcels 300 for a given load.

In one embodiment, the central computing entity 802 can determine/identify a total planned time for handling, transporting, warehousing, sorting, loading, unloading, re wrapping, inspecting, picking up, delivering, and/or the like a parcel 300 from ingestion into the carrier's transportation and logistics network through to delivery at its final delivery destination. Additionally, the central computing entity 802 can determine planned times for different legs or activities for a given parcel 300 (e.g., a planned time for pick-up or delivery of a parcel 300). In one embodiment, the total planned time may be an estimated time irrespective of the various potential additive planned times.

Continuing with the above example, for the size category four parcel with a cube of 2.315 cubic feet weighing 15 pounds, the central computing entity 802 may assign a total planned time for picking up a parcel 300 from Corporation ABC's Distribution warehouse in Orlando, Fla., and delivering the same to 123 Springfield Road, Norcross, Ga. 30092. The total planned time may be estimated based on historical information/data for similar parcels 300 and/or be the sum of various activities to be carried out for the parcel (including picking up and delivering the parcel 300). For instance, the total planned time for a parcel may be 0.0352778 hours (127 seconds). This can represent the total allowed time for picking up, handling, conveying, inspecting, unloading, loading, re-wrapping, delivering, and/or the like the parcel 300 as it is transported through the carrier's transportation and logistics network. In this example, the driver is allowed or allotted 0.0007869 hours (2.83284 seconds) to pick up the parcel 300. As will be recognized, total planned times and additive planned times can be stored in association with various parcel information/data. Using this information/data, the central computing entity 802 can determine and assign total planned times and additive planned times for dispatch plans, routes/flights, logical groupings, stops on routes/flights, parcels 300, and/or the like.

In one embodiment, the parcel information/data may also include tracking information/data (of various "tracking events") corresponding to the location of the parcel 300 in the transportation and logistics network. To determine and reflect a parcel's movement, a parcel 300 identifier associated with the parcel 300 may, for example, be scanned or otherwise electronically read at various points as the parcel 300 is transported through the carrier's transportation and logistics network. As indicated, these events may be referred to as tracking events. In one embodiment, the latest or most-recent tracking events (e.g., tracking information/data) can associate the parcel 300 with the particular origin entity, destination entity, bundle/container, vehicle, employee, location, facility, and/or the like.

B. User Profiles

In one embodiment, one or more users (e.g., consignors and/or consignees) can register/enroll for an account, subscription, program, and/or similar words used herein interchangeably. In another embodiment, the user may be automatically enrolled/registered for the same. As previously noted, a user may be an individual, a family, a family member, a company, an organization, an entity, a department within an organization, a representative of an organization and/or person, and/or the like. In one embodiment, to register, a user (e.g., a user operating a user computing entity 804) may access a webpage, mobile application, application, dashboard, browser, or portal of an entity that provides notification/message services.

In one embodiment, as part of the enrollment/registration process, a user (e.g., a user operating a user computing entity 804) may be requested to provide information/data (e.g., including user information/data, biographic information/data, biometric information/data, geographic information/data, entity/entity information/data, payment information/data, and/or the like) by the central computing entity 802 (e.g., via the registration module). The information/data may be manually input by a user; may be automatically provided by allowing access to other accounts, such as Amazon.com, Facebook, Gmail, Twitter, PayPal, and/or the like; may be automatically collected by various computing entities (including automatic entity identification); combinations thereof; and/or other techniques and approaches. For instance, the biographic information/data may include the user's name, such as a first name, a last name, a company name, an entity name, an organization name, and/or the like. The geographic information/data may also include one or more physical addresses or locations associated with the user (e.g., street address, city, state, postal code, and/or country). The physical addresses or locations may be residential addresses, commercial addresses, geocodes, latitude and longitude points, virtual addresses, and/or the like. In one embodiment, the user information/data may include one or more electronic signatures and signature formats for electronically signing documents, releases, and/or the like.

The user (e.g., consignor or consignee) may also provide one or more physical addresses associated with the user (e.g., street address, city, state, postal code, and/or country) and/or one or more geocodes to the central computing entity 802. For instance, Joseph Brown's primary residential address of 105 Main Street, Atlanta, Ga. 30309, USA, may be provided to the central computing entity 802. Further, one or more secondary residential addresses may also be provided to the central computing entity 802 for association with Mr. Brown's account and profile, such as 71 Lanier Islands, Buford, Ga. 30518, USA. As will be recognized, the residential addresses may include weekend residences, family member residences visited by the user, and/or the like. Additionally, the user (e.g., consignor or consignee) may also provide one or more business addresses associated with the user (e.g., street address, city, state, postal code, and/or country) to the central computing entity 802. For example, Mr. Brown may have a primary business address of 1201 West Peachtree Street, Atlanta, Ga. 30309, USA. One or more secondary business addresses may also be provided to the central computing entity 802 for association with Mr.

Brown's account and profile, such as 101 South Tryon Street, Charlotte, N.C. 28280, USA; 950 F Street, NW, Washington, D.C. 20004, USA; and 90 Park Avenue, New York, N.Y. 10016, USA. As will be recognized, the business addresses may include various office locations for a single enterprise, multiple office locations for various enterprises, and/or the like. As will be recognized, the user (e.g., consignor or consignee) may provide other biographic and/or geographic information/data (e.g., geocodes) to adapt to various needs and circumstances.

In one embodiment, in addition to the physical addresses, the user (e.g., operating a user computing entity 804) may also input, request, or be automatically generated and assigned a "virtual address." The virtual address can be a combination of alphanumeric characters to identify a user or user profile. The virtual address can be stored by the central computing entity 802 in association with the user's profile. For example, Joseph Brown (e.g., operating a user computing entity 804) may input a request for a unique virtual address such as BigBrown8675309 or any other unique virtual address. In another embodiment, the central computing entity 802 may automatically generate and assign a unique virtual address for the user, such as assigning virtual address 1XR457RS7 to Joseph Brown. Such virtual addresses can be used by users who do not want to (a) provide their physical addresses to merchants or other third parties, (b) have their physical addresses printed on labels placed on the exterior of parcels 300, (c) use geocoded points for deliveries, (d) the like. For instance, this may enable a user (e.g., consignor0 to ship a parcel 300 using only BigBrown8675309; 1XR457RS7; or 33.7869128, −84.3875602 as the destination address (e.g., virtual address) using the appropriate carrier. Upon ingestion of the parcel 300 into the carrier's transportation and logistics network, carrier personnel can read (e.g., manually or with the aid of an entity) the virtual address on the parcel 300 (e.g., BigBrown8675309 or 1XR457RS7), look up the appropriate physical delivery address for the parcel 300 based on the consignee's profile (e.g., search for the user profile associated with the virtual address), and route/flight the parcel 300 accordingly (including the use of automatic service schedules). In certain embodiments, the parcel 300 may be routed only using the virtual address. That is, each parcel 300 is handled by carrier personnel, a mobile station 105 (in communication with the central computing entity 802) operated by the carrier personnel can cause display of the appropriate handling or routing instructions while masking the actual physical delivery address. In other embodiments, however, once the parcel 300 with the virtual address is inducted into the carrier's transportation and logistics network, carrier personnel may place a label on the parcel 300 that indicates the physical delivery address (e.g., based on an address associated with the profile and/or automatic service schedule).

In addition to the virtual address, the central computing entity 802 may also generate and store an internal user identifier in association with the user profile, such as a global unique identifier (GUID) or a universally unique identifier (UUID). For instance, in one embodiment, the user identifier may be a 128-bit value displayable as hexadecimal digits with groups separated by hyphens. By way of example, the user identifier for Joseph Brown may be 21EC2020-3AEA-4069-A2DD-08002B30309D. In one embodiment, a user identifier may be used to uniquely identify a user profile. In another embodiment, a user identifier may be used to uniquely identify a given address (e.g., physical address or virtual address) associated with a user profile. In such an embodiment, if a user profile is associated with four addresses, the central computing entity 802 may generate and store four user identifiers in association with the user profile (or use one user identifier for all the addresses for the user). The user identifier may also be stored in association with parcel information/data for a parcel 300 to associate the parcel 300 (and its parcel information/data) with the (a) correct user (e.g., user profile) and/or (b) correct address for a user. For instance, the parcel information/data for all parcels 300 corresponding to Joseph Brown's user profile may be appended with the user identifier created for Joseph Brown. In various embodiments, using this approach allows parcels 300 (and their parcel information/data) to be linked to appropriate user profiles. Thus, when Joseph Brown accesses his account, he can view all of his parcels 300 (e.g., those parcels 300 with parcel information/data appended with his user identifier (or other identifier)). Similarly, any actions for a parcel 300 or user can be passed to the parcel information/data for the parcel 300 (including carrying out automatic service schedules). In other words, the user identifier appended to the parcel information/data resolves to the corresponding user profile/account and/or address. The parcel information/data may have multiple user identifiers appended—one or more user identifiers for the consignor and one or more user identifiers for the consignee.

In one embodiment, the user information/data may include one or more communication formats for communicating with the user as part of his or her notification/message preferences. The communication formats may include text notifications/messages (e.g., SMS, MMS), email notifications/messages, voice notifications/messages, video notifications/messages (e.g., YouTube, the Vine), picture notifications/messages (e.g., Instagram), social media notifications/messages (e.g., private social media created internally for entities, business social media (e.g., Yammer, SocialCast), or public social media (e.g., Facebook, Instagram, Twitter), and/or a variety of other notifications/messages in various communication formats. In addition to the one or more communication formats, the user (e.g., operating a user computing entity 804) can provide the corresponding electronic destination addresses to be used in providing information/data associated with the notification/message services to the user (e.g., email addresses, online handles, phone numbers, usernames, etc.). For instance, for text notifications/messages, the user may provide one or more cellular phone numbers. For email notifications/messages, the user may provide one or more email addresses (to receive emails or notifications through specific accounts). And for voice notifications/messages, the user may provide one or more cellular or landline phone numbers or other electronic destination addresses to which audio files can be delivered. Additionally, in one embodiment, validation operations can be performed with respect to each input electronic destination address-to ensure accuracy. As will be recognized, a variety of other types of electronic destination addresses can be used to adapt to various needs and circumstances.

In one embodiment, entity/entity information/data, user information/data, physical address or location information/data, and/or the like may be received, provided, obtained, detected, assigned, collected, requested, and/or similar words used herein interchangeably as part of the registration/enrollment process. As will be recognized, entity/entity information/data may be collected for any number of entities or entities for association with a user's account, subscription, program, and/or similar words used herein interchangeably. The entity/entity information/data may include one or more entity or entity identifiers-phone numbers, Subscriber Identity Module (SIM) numbers, Media Access Control (MAC) addresses, International Mobile Subscriber Identity (IMSI) numbers, Internet Protocol (IP) addresses, Mobile Equipment Identifiers (MEIDs), unit identifiers (e.g., GPS unit identifiers, UDiDs, mobile identification numbers (MINs), IMSI_S (Short IMSIs), email addresses, usernames, GUIDs, Integrated Circuit Card Identifiers (ICCIDs), electronic serial numbers (ESN), International Mobile Equipment Identities (IMEIs), Wi-Fi IDs, RFID tags, and/or the like. The entity/entity information/data may include an entity's vendor, model, specification authority, version, components, software specification and/or version, person associated with the entity, and/or the like. The entity/entity information/data may be used to track, monitor, connect with, communicate with, and/or the like the corresponding entities or entities.

In one embodiment, with the appropriate information/data, the central computing entity 802 may create a user profile for the user via the enrollment/registration process. Accordingly, the central computing entity 802 may create, store, and/or have access to various user profiles and/or information/data associated with the user profiles. In addition to at least the information/data described above, a user profile may include one or more corresponding usernames, passwords, images, tokens, challenge phrases, reminders, and/or the like (referred to herein as credentials) for accessing accounts, applications, services, entities, and/or the like. As will be recognized, a variety of other approaches and techniques can be used to adapt to various needs and circumstances.

In one embodiment, a user profile identifier may be used to uniquely identify a user profile. In another embodiment, a user profile identifier may be used to uniquely identify a given address associated with a user profile. In such an embodiment, if a user profile is associated with four addresses, the central computing entity 802 may create and store four user profile identifiers in association with the user profile. The user profile identifier may also be stored in association with parcel information/data for a parcel 300 to associate the parcel 300 (and its parcel information/data) with the (a) correct user (e.g., user profile) and/or (b) correct address for a user. Moreover, the central computing entity 802 can associate parcel information/data for a parcel 300 with the corresponding user profile. This may include appending the parcel information/data with the appropriate user profile identifier (or other identifier corresponding to the user profile). For instance, the parcel information/data for all parcels 300 corresponding to Smith Co. Automotive's user profile may be appended with the user profile identifier (or other identifier) created for Smith Co. Automotive. In various embodiments, using this approach allows parcels 300 (and their parcel information/data) to be linked to appropriate user profiles. Thus, when a user at Smith Co. Automotive accesses its account, he or she can view all of his parcels 300 (e.g., those parcels 300 with parcel information/data appended with his user profile identifier (or other identifier)). Similarly, any actions selected by the user for a parcel 300 can be passed to the parcel information/data for the parcel 300.

C. Pick-Up Points and Delivery Points

Figure 58:
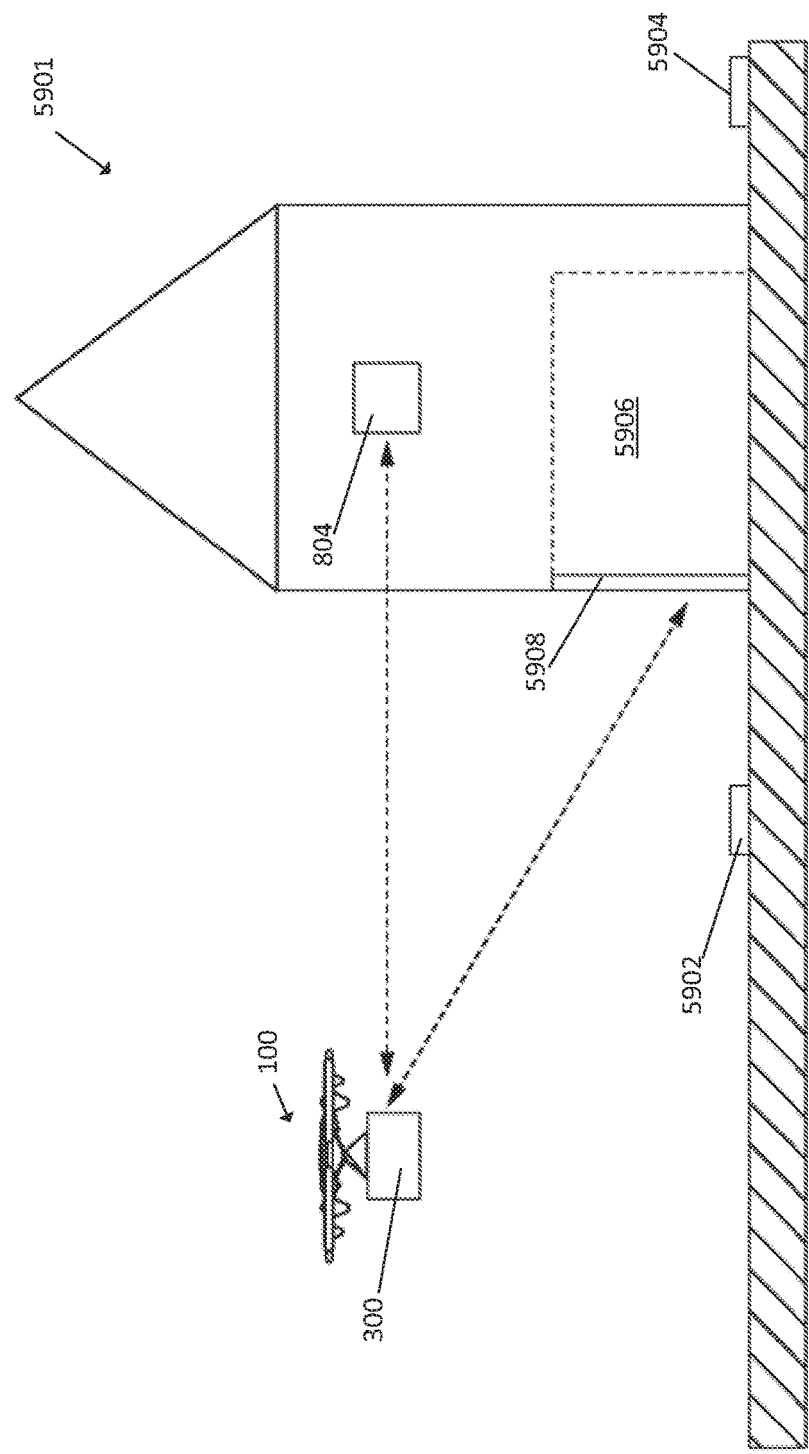
FIG. 58 schematically depicts a serviceable point according to one embodiment shown and described herein.

In one embodiment, pick-up and/or delivery points may be locations at which parcels can be picked up from and/or delivered to at a given serviceable point 5901. Such locations can be stored in user profiles and/or as parcel information/data. Referring to FIG. 58, a delivery point may identify a location on a driveway, a location on a front porch, a location inside of a garage, a location in yard, a location on top of a building, and/or the like associated with a serviceable point 5901. In one embodiment, the UAV 100 can use a primary delivery point (e.g., first desired delivery point/location 5902) for all deliveries as a default. Similarly, the UAV 100 can use one or more secondary delivery points (e.g., second desired delivery points/locations 5904) in the event the primary delivery point (e.g., first desired delivery point/location 5902) is obstructed, is otherwise inaccessible, is not preferred for a particular delivery or type of delivery, and/or the like.

In addition to delivery points, a UAV landing point may be, for example, a location at which a UAV 100 can land for retrieval of parcels by consignees. In one embodiment, a UAV landing point may be used, for example, if a single address is associated with multiple primary/secondary delivery points 5902, 5904 accessed by a single landing location (e.g., a mall with deliveries to multiple stores or an apartment complex with deliveries to multiple apartments). Thus, in one example, a UAV landing point may be where a UAV 100 can land for multiple consignees to retrieve parcels (e.g., landing at a mall or apartment complex). In another embodiment, a landing point can be used when an automated release of a parcel is not available, for example, because of its size or configuration.

In one embodiment, different types of information/data sets can be used to identify the various types of points at a serviceable point 5901. For example, in one embodiment, information/data associated with a serviceable point 5901 may include primary/secondary delivery point 5902, 5904 information/data and or landing point information/data. As will be recognized, such information/data associated with the different points can be collected or determined using a variety of techniques and methods. For example, in one embodiment, each time a UAV 100 visits a primary/secondary delivery point 5902, 5904 associated with a serviceable point 5901, a primary/secondary delivery point geo coordinate is collected or determined for the primary/secondary delivery point. The term primary/secondary delivery point geo coordinate may refer to, for example, information/data may include longitude and latitude coordinates, geocodes, altitude, course, speed, distance, UTC, date information, and/or the like. This information/data may be collected, for example, via the UAV computing entity 808 (with or without the aid of the driver of the UAV 100). Similar information/data can be collected from physical visits by carrier personnel, for instance, to serviceable points 5901.

Operatively, in one embodiment, the UAV computing entity 808 provides the functionality to maintain and process location information/data (such as latitude and longitude information/data) for locations to which parcels are delivered or from which parcels picked up, for example. Accordingly, in one embodiment, the UAV computing entity 808 is adapted to be used to gather geo coordinate samples (e.g., geocode, latitude and longitude points, GPS readings, and/or the like) at each landing, delivery, or pick-up at a serviceable point 5901 over a period of time. More specifically, the UAV computing entity 808 can be configured to collect geo coordinate samples continuously or upon determining the occurrence of one or more configurable triggering events. Such configurable triggering events may include, but are not limited to: landing events, obstacle detection events, parcel release events, failure events, scan or other read events, communication or confirmation events, notification events, delivery events, and/or the like. Thus, for each delivery point and landing point at a serviceable point 5901, one or more geo coordinate samples (e.g., GPS readings) may be taken by the UAV computing entity 808 in response to various triggering events.

As indicated, in one embodiment, the UAV computing entity 808 is configured to continuously and/or periodically store geo coordinate samples, regardless of whether a triggering event has occurred. This may be beneficial since geo coordinates may not always be available at any given time since, for example, a GPS signal could be temporarily blocked by a nearby obstruction. Thus, for instance, if a triggering event occurs at a time when a geo coordinate is not immediately obtainable, the last known geo coordinate (or in some embodiments the next geo coordinate) can be used. In such embodiments, the UAV computing entity 808 may store information/data about the time of the geo coordinate sample and the time of the associated triggering event so that the geographic information/data database provider may use the information/data in determining the accuracy of the geo coordinate samples.

The geo coordinate samples can be provided to the geographic information/data database, which, after an appropriate number of geo coordinate samples associated with a primary/secondary delivery point, processes the sample geo coordinates and creates or updates the primary/secondary delivery point geo coordinate for the serviceable point 5901. For example, the geographic information/data database may be configured to require two, three, and/or more consistent sample geo coordinates associated with a primary/secondary delivery point 5902, 5904 before creating or updating a primary/secondary delivery point geo coordinate for the serviceable point 5901.

In various embodiments, the information/data sets for the points need to be stored and accessed for route/path determination and optimization. In various embodiments, the primary/secondary delivery point 5902, 5904 information/data may be stored in a variety of ways-including as part of a user profile, parcel information/data, and/or a serviceable point 5901 profile. For example, a serviceable point 5901 object (e.g., data structure) may be used to store (a) the address of the serviceable point 5901, (b) the latitude and longitude of a primary/secondary delivery point 5902, 5904 associated with the serviceable point 5901 (e.g., primary/secondary delivery point geo coordinate), (c) the latitude and longitude type (e.g., latitude and longitude of a primary/secondary delivery point 5902, 5904 or latitude and longitude of a UAV landing point) of the primary/secondary delivery point 5902, 5904 associated with the serviceable point 5901, (d) the latitude and longitude of a street network connection point 400 associated with the serviceable point 5901 (e.g., street network connection point geo coordinate), (e) obstacles at the serviceable point 5901, (f) delivery history at the serviceable point 5901, and/or the like.

D. Grouping-Based Load and Takeoff Operations

Figure 51:
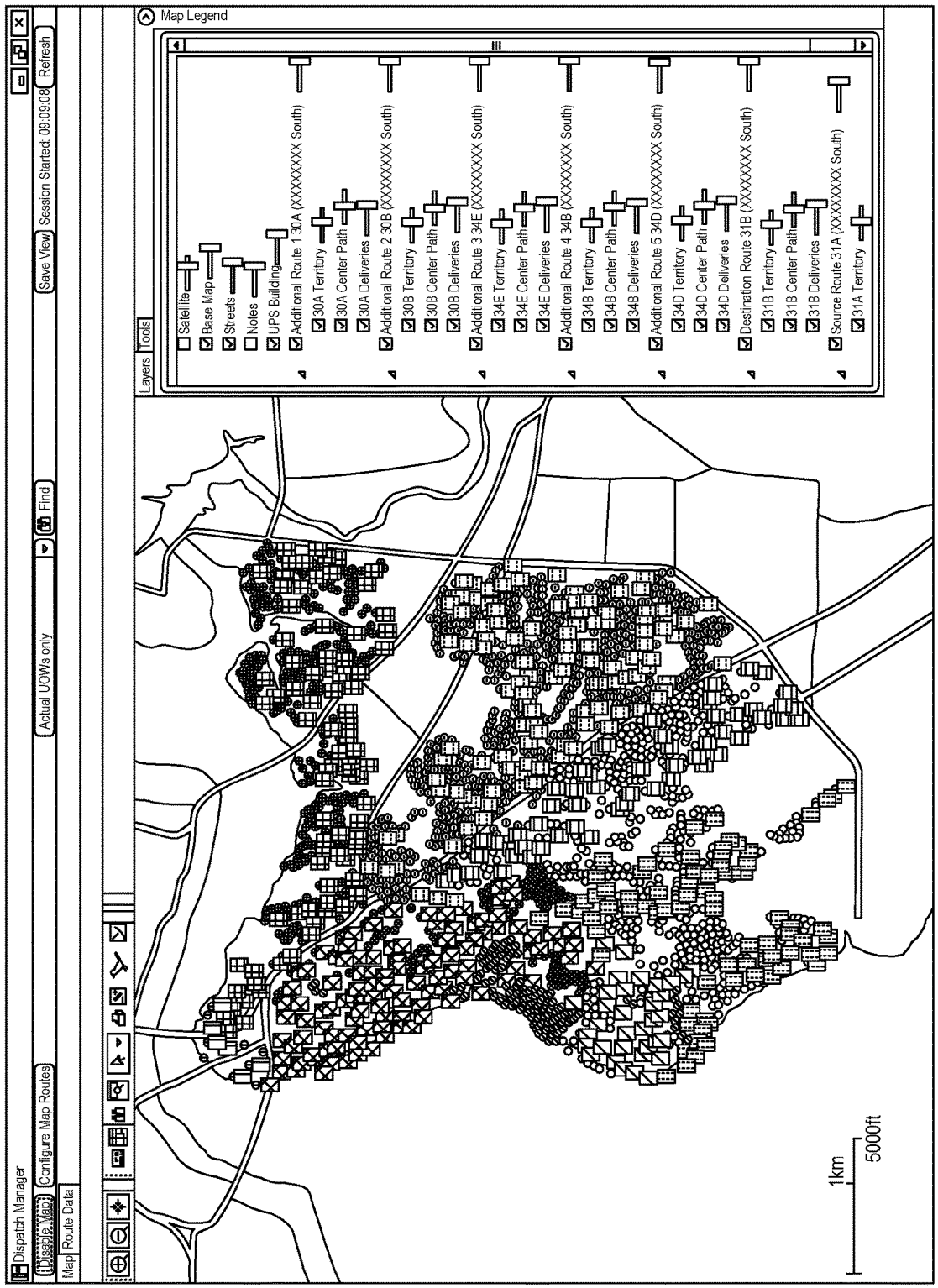
FIG. 51 schematically depicts a region including one or more serviceable points according to one embodiment shown and described herein.
Figure 52:
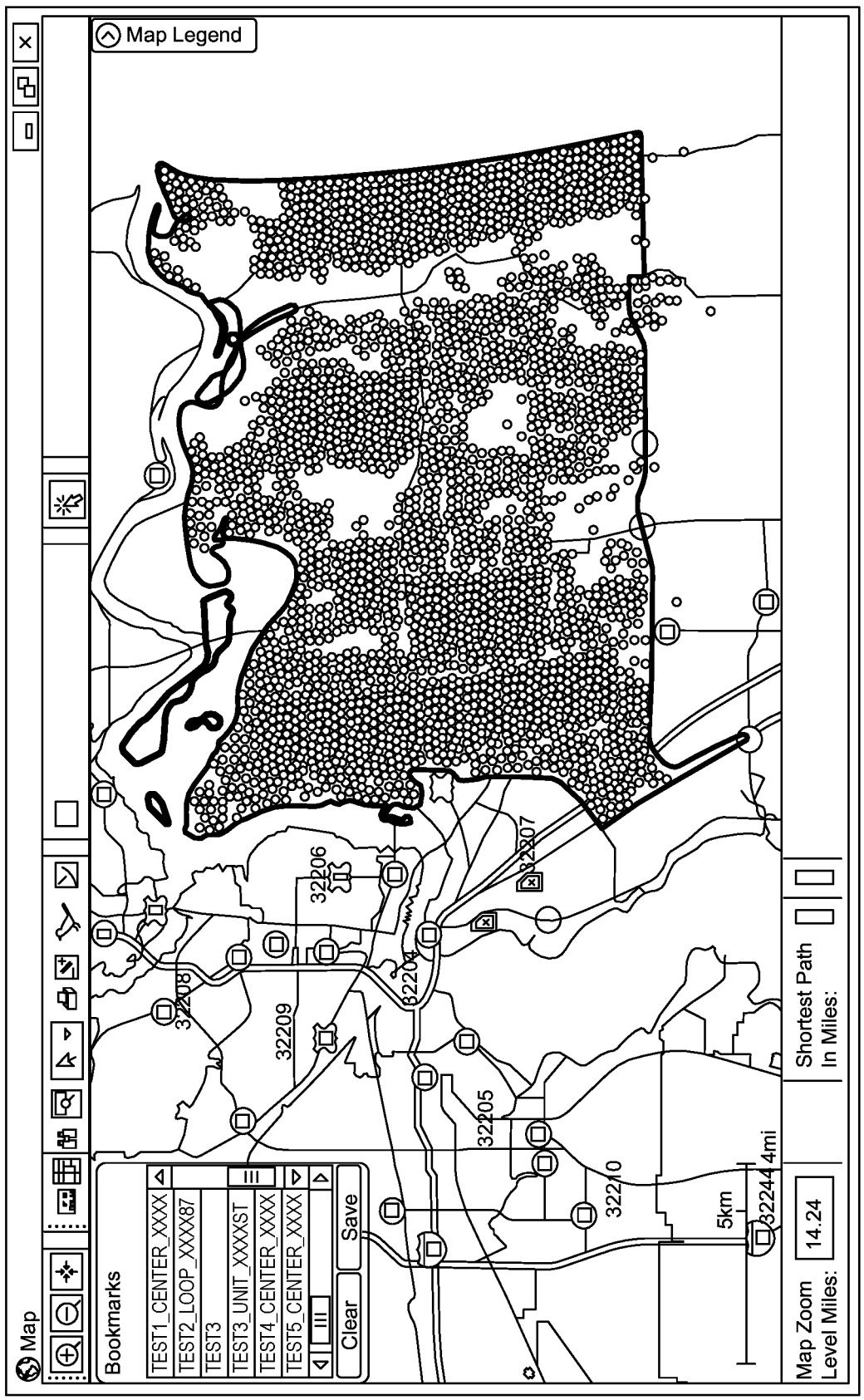
FIG. 52 schematically depicts a region including one or more serviceable points according to one embodiment shown and described herein.
Figure 53:
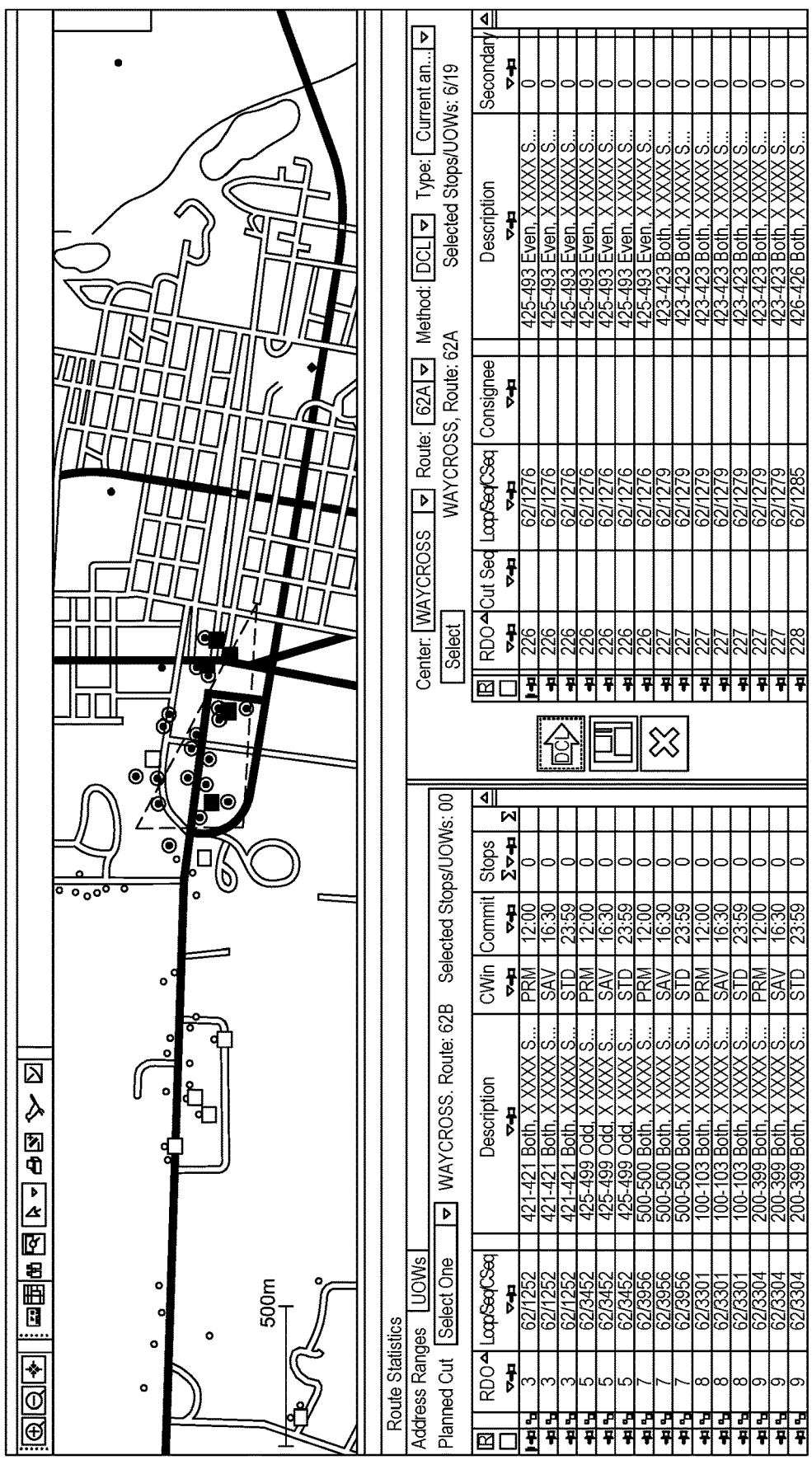
FIG. 53 schematically depicts a region including one or more serviceable points according to one embodiment shown and described herein.

In one embodiment, the central computing entity 802 can create/generate dispatch plans for carrying out the pick-ups and/or deliveries for the UAV computing entity 808 to pick-up points and/or delivery points at one or more serviceable points 5901. Dispatch plans are well known and are used daily by various carriers. In general, dispatch plans are groups of routes/flights planned to be dispatched together along with their associated delivery and pick-up assignments. Dispatch plans may also indicate how each primary parcel delivery vehicle 10 should be loaded and/or how each route/flight should be carried out. FIGS. 51, 52, and 53 include various territories, routes/flights, serviceable points 5901 associated with a territory (e.g., geographic area) or route/flight, and assigned pick-ups and deliveries for serviceable points 5901 for the same. A route/flight is generally a one or more address ranges for serviceable points 5901 with associated service levels assigned to a single service provider (e.g., carrier delivery personnel). Each route/flight usually includes a trace, which is a predefined path for carrying out one or more deliveries. A delivery order listing then is a listing of address ranges, addresses, and/or parcels 300 for serviceable points 5901 that follows the trace for the route/flight to visit perform the assigned pick-ups and/or deliveries for serviceable points 5901. Through an appropriate interface, dispatch plans can be compared against alternative dispatch plans to load balance and otherwise adjust the various dispatch plans for a given geographic area, service center, route/flight, and/or the like. U.S. Pat. No. 7,624,024 entitled Systems and Methods for Dynamically Updating a Dispatch Plan, filed Apr. 18, 2005 provides a general description of dispatch plans and how these plans may be generated and updated. This may include dynamically updating dispatch plans to add, remove, or update pick-ups and/or deliveries for serviceable points 5901. U.S. Pat. No. 7,624,024 is incorporated herein in its entirety by reference.

So that the parcels can be readily accessed for loading to a UAV 100 based on the delivery order listing, each parcel can be assigned a load/storage position in the primary parcel delivery vehicle 10. In one embodiment, each load/storage position may be associated with a unique load/storage position. For instance, each parcel may be assigned a sequence number between 0001-9999 (a number within the sequence range) based upon the load/storage position. In another example, each parcel may be assigned a grid position A1-Z99. As will be recognized, a variety of other approaches and techniques can be used to adapt to various needs and circumstances.

In one embodiment, the load/storage position can be stored in association with the corresponding parcel information/data. The load/storage position can be provided via an interface, printed on a pre-load label to assist in loading the vehicle, and/or implemented through a variety of other techniques and approaches. In one embodiment, the load/storage position (e.g., 0001-0050 or A1-A30) can be a logical grouping. A logical grouping may comprise a plurality of parcels that are to be delivered within a planned time (e.g., an estimated time period/frame of one another, such as 15 minutes, 1 hour, 2 hours, 4 hours, day, and/or the like). For instance, logical groupings may be based on routes/flights, route/flight portions, neighborhood names, zip codes, zip code+4, geographic areas, longitude and latitude ranges, geocodes, geographic descriptors, zones of confidence, geofences, and/or the like. As will be recognized, in one embodiment, each route/flight may comprise one or more logical groupings and/or logical grouping identifiers. Each logical grouping may correspond to a specific planned time (e.g., estimated pick up/delivery time or window). For instance, a logical grouping may be associated with a planned time for delivering all of the parcels in the logical grouping: 15 minutes, 30 minutes, 1 hour, 2 hours, and/or the like. The estimated pick-up/delivery window may indicate the estimated amount of time to deliver all parcels of the logical grouping. For instance, if the planned time for the logical grouping is 1 hour, this may indicate that the parcels 300 for the logical grouping will be delivered within the next hour from that point. That is, the estimated pick-up/delivery window or time can be used to indicate when or within what timeframe the corresponding parcels will be delivered. If the current time is 1:00 pm EST and the planned time is 1 hour, the estimated pick-up/delivery window for all parcels will be 1:00 pm EST to 2:00 pm EST. The logical groupings can also be stored in association with the parcel information/data. In another embodiment, a specific information/data field or portion of an information/data field in the parcel information/data may already be designated as a logical grouping identifier. For example, the logical grouping identifier may be a portion of the shipment identifier, all or a portion of a zip code field, a load/storage position, a route/flight, a route/flight portion, all or a portion of a sequence number, a geographic descriptor, and/or the like. By using such logical groupings, grouped takeoffs for UAVs 100 can be coordinated within specific planned time and/or pick-up/delivery windows.

Figure 50:
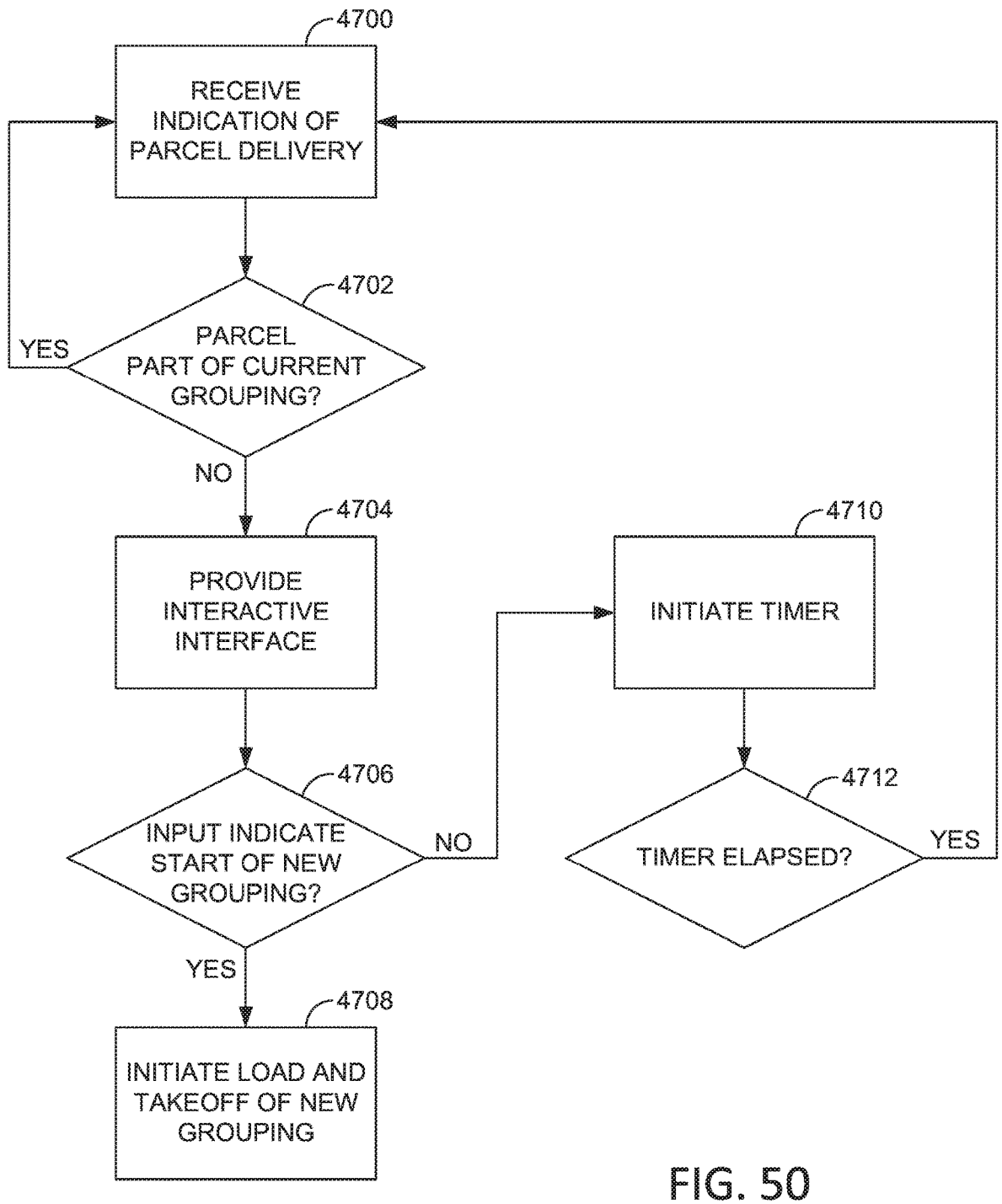
FIG. 50 schematically depicts a flowchart illustrating operations and processes that can be used in accordance with various embodiments shown and described herein.

In one embodiment, a variety of computing entities (e.g., delivery vehicle computing entity 810, central computing entity 802, mobile carrier computing entity 806, and/or the like) can determine or receive input that a parcel is about to be delivered, is being delivered, or has just been delivered (Block 4700 of FIG. 50). For instance, in one embodiment, the mobile carrier computing entity 806 is configured to receive input (e.g., via the user interface) that indicates a variety of service dynamics, such as delivery-related or vehicle-related activities or occurrences. For example, in various embodiments, the user interface is configured to permit a driver to indicate the following service dynamics: (a) that a delivery stop has commenced (e.g., by pressing a button indicating that the driver has arrived at a delivery point/location and commenced the delivery process, scanning or interrogating a parcel), (b) that a delivery stop has ended (e.g., by pressing a button indicating that the driver has completed the delivery and is now leaving the delivery location), (c) that a particular bill of lading and its associated freight or packages have been picked up or delivered (e.g., by entering or scanning a tracking number or code, or otherwise identifying one or more bills of lading associated with freight or packages that have been picked up or delivered), (d) the number of units picked up or delivered at a stop (e.g., by manually entering a numerical value), (e) the weight of packages or freight picked up or delivered at a stop (e.g., by manually entering a numerical value), (f) that a lunch or break period has commenced or ended (e.g., by pressing a button indicating that the start or stop of a break or lunch), (g) that a particular delay encountered by a driver has commenced or ended (e.g., by entering a code or otherwise identifying a type of delay that a driver has encountered-such as waiting for freight, caught in traffic, fueling a vehicle, waiting at train tracks, waiting at security, waiting for bill of lading[H]_and pressing a button indicating that the identified delay has started or stopped), (h) that the driver has begun a work day and is on the clock (e.g., at a shipping hub and before starting the delivery vehicle computing entity 810), (i) that the driver has ended a work day and is off the clock, G) that the driver and vehicle have entered a particular area (e.g., the property of a shipping hub, a designated delivery area or other work area), and/or (k) that the driver and vehicle have exited a particular area (e.g., the property of a shipping hub, a designated delivery area or other work area).

In one embodiment, in response to receiving input indicating that a delivery is about to occur or has occurred, the mobile carrier computing entity 806 may capture service information/data and/or parcel information/data in a computer readable format (Block 4700 of FIG. 50). After receiving input capturing the service information/data and/or parcel information/data, an appropriate computing entity can determine whether the parcel information/data is part of the current logical grouping (4702 of FIG. 50). For the first delivery for the day (or other time period, such as shifts or after breaks), the appropriate computing entity will determine that the parcel is not part of the current logical grouping as it is the first logical grouping being delivered for the day or time period/frame (e.g., the current logical grouping value is null until it is set by the first delivery of the day or time period). Once the current logical grouping value has been set for the day (or time period), the appropriate computing entity can store an indicator of the current logical grouping based on the last parcel delivered. Correspondingly, each time the mobile carrier computing entity 806 (or other appropriate computing entity) records a stop as being completed (e.g., a parcel as being delivered), the mobile carrier computing entity 806 can store the logical grouping of that parcel (e.g., the most recently delivered parcel) as the current logical grouping. For subsequent parcels, the appropriate computing entity (e.g., delivery vehicle computing entity 810, central computing entity 802, mobile carrier computing entity 806, and/or the like) can compare the logical grouping for the parcel that is about to be or has been delivered with the logical grouping that is indicated as being the current logical grouping. To do so, an appropriate computing entity identifies the current logical grouping and the logical grouping for the parcel that is about to be or has been delivered.

Responsive to determining that a parcel is part of the current logical grouping, the appropriate computing entity does not take any action. Rather, the appropriate computing entity (e.g., delivery vehicle computing entity 810, central computing entity 802, mobile carrier computing entity 806, and/or the like) waits for input indicating that a different parcel is about to be or has been delivered (e.g., the process returns to Block 4700 of FIG. 50).

Responsive to determining that a parcel is not part of the current logical grouping, in one embodiment, the mobile carrier computing entity 806 can present a customized, interactive interface to the carrier personnel (Blocks 4704, 4706, and 4708 of FIG. 50). In one embodiment, the customized, interactive interface may provide the carrier personnel with the ability to confirm whether the parcel is part of a new logical grouping. Responsive to input received via the customized, interactive interface indicating that the parcel is not part of a new logical grouping, an appropriate computing entity (e.g., delivery vehicle computing entity 810, central computing entity 802, mobile carrier computing entity 806, and/or the like) can automatically initiate a timer for a configurable time period/frame (e.g., 30 seconds, 2 minutes, 5 minutes, 10 minutes, and/or the like) to bypass the operations in Blocks 4700-4708 of FIG. 50. The automated timer provides for a mechanism to limit the burden on carrier personnel with repeated requests (e.g., for each parcel being delivered) to confirm logical groupings in a short period of time (e.g., for every parcel delivered within a short period of time). Once the time period/frame of has elapsed (Block 4712 of FIG. 50), the process can return to Block 4700 of FIG. 50. Use of the automated timer also reduces processing by not checking each parcel that is for pick up or delivery, but allows the processing element to be used for other processing and/or tasks.

Responsive to input received via the customized, interactive interface indicating that the parcel is part of a new logical grouping, an appropriate computing entity (e.g., delivery vehicle computing entity 810, central computing entity 802, mobile carrier computing entity 806, and/or the like) can automatically initiate the loading of the parcels 300 for the new logical grouping for takeoff and delivery via one or more UAVs 100 (Block 4708 of FIG. 50).

In an embodiment in which a timer is utilized, if a parcel is delivered during the time period/frame of the timer, the next delivery outside of the time period/frame from the logical grouping will be detected at Block 4700 since the current logical grouping indicator will not have been updated since the corresponding operations have been bypassed. Thus, if parcels are delivered during the time period/frame of the timer, other parcels in the logical grouping will be detected to generate and transmit corresponding notifications/messages.

E. Geofence-Based Load and Takeoff Operations

In one embodiment, an appropriate computing entity can identify or define one or more geofences, such as defining a geofence around a geographic area. The geofences may be defined to surround a defined geographic area, such as surrounding countries, regions, states, counties, cities, towns, interstates, roads, streets, avenues, toll roads, zip codes, area codes, ways, exit and entrance ramps, delivery routes, route/flight patterns, neighborhoods, shopping centers, off-road areas (e.g., areas without paved roads), private land areas, parking lots (e.g., at malls or other establishments), driveways, and/or the like. The geofences may be defined, for example, by the latitude and longitude coordinates associated with various points along the perimeter of the geographic area. Alternatively, geofences may be defined based on latitude and longitude coordinates of the center, as well as the radius, of the geographic area. Geofences may be as large as an entire country, region, state, county, city, or town (or larger). The geographic areas, and therefore the geofences, may be any shape including, but not limited to, a circle, square, rectangle, an irregular shape, and/or the like. Moreover, the geofenced areas need not be the same shape or size. Accordingly, any combination of shapes and sizes may be used in accordance with embodiments of the present invention. Similarly, a geofence may overlap or reside wholly within another geofence.

In one embodiment, once at least one geofence has been defined, the coordinates (or similar methods for defining the geofenced areas) and corresponding geofence identifier may be stored in a map/geographic information/data database accessible by a variety of computing entities. Thus, as the primary parcel delivery vehicle 10 and/or UAV 100 enters and exits the one or more defined geofences, an appropriate computing entity can monitor the location of the primary parcel delivery vehicle 10 and/or UAV 100 and trigger/initiate certain events based on the location.

So that the parcels can be readily accessed for loading to a UAV 100 based on geofences, each parcel 300 and/or parcel carrier 200 can be assigned a geofence identifier (indicating the geofence in which it should be delivered) and stored in the primary parcel delivery vehicle 10 proximate to other parcels associated with the same geofence identifier. In one embodiment, each geofence may be associated with a planned time for delivering all of the parcels in the geofence: 15 minutes, 30 minutes, 1 hour, 2 hours, and/or the like. The estimated pick-up/delivery window may indicate the estimated amount of time to deliver all parcels in the geofence. For instance, if the planned time for the geofence is 1 hour, this may indicate that the parcels associated with the geofence will be delivered within the next hour once the geofence is entered. That is, the estimated pick-up/delivery window or time can be used to indicate when or within what timeframe the corresponding parcels will be delivered. If the current time is 1:00 pm EST and the planned time is 1 hour, the estimated pick-up/delivery window for all parcels will be 1:00 pm EST to 2:00 pm EST. The geofence identifier can also be stored in association with the parcel information/data. In another embodiment, a specific information/data field or portion of an information/data field in the parcel information/data may already be designated as a geofence identifier. For example, the geofence identifier may be a portion of the shipment identifier, all or a portion of a zip code field, a load/storage position, a route/flight, a route/flight portion, all or a portion of a sequence number, a geographic descriptor, and/or the like. By using such geofences, grouped loads and takeoffs for UAVs 100 can be coordinated within specific planned time and/or pick-up/delivery windows.

In one embodiment, with one or more geofenced areas (e.g., geofences) defined, the location of the primary parcel delivery vehicle 10 and/or UAV 100 can be monitored. Generally, the location of the primary parcel delivery vehicle 10 and/or UAV 100 can be monitored by any of a variety of computing entities, including the delivery vehicle computing entity 810, UAV computing entity 808, the mobile carrier computing entity 806, the central computing entity 802, and/or the like. For example, as noted above, a location at a particular time may be determined with the aid of location determining elements/components. By using the primary parcel delivery vehicle's 10 and/or UAV's 100 location, an appropriate computing entity can determine, for example, when the primary parcel delivery vehicle 10 and/or UAV 100 enters a defined geofence.

In one embodiment, in response to (e.g., after) a determination that a primary parcel delivery vehicle 10 and/or UAV 100 has entered a defined geofenced area, an appropriate computing entity can initiate the pick-up/delivery of the parcels associated with the geofence identifier for the entered geofence. That is, a corresponding computing entity can identify all parcels in the dispatch plan associated with the geofenced identifier for loading and taking off via a UAV 100. In particular, once the vehicle 10 and/or UAV 100 has entered a defined geofenced area, UAVs 100 may be dispatched from the vehicle 10 to deliver parcels 300 to delivery/pick-up points/locations positioned within the geofenced area.

In one embodiment, after the primary parcel delivery vehicle 10 and/or UAV 100 has entered the geofenced area, the location of the primary parcel delivery vehicle 10 and/or UAV 100 can continue to be monitored by any of a variety of computing entities. By using the primary parcel delivery vehicle's 10 and/or UAV's 100 location, a computing entity can determine, for example, when the primary parcel delivery vehicle 10 and/or UAV 100 exits the defined geofenced area. As described, this may include using various location determining elements/components. In another embodiment, in response to (e.g., after) a determination that a primary parcel delivery vehicle 10 and/or UAV 100 has exited the defined geofenced area, an appropriate computing entity can stop the delivery of parcels to the exited geofence (e.g., based on the geofence identifier) and/or provide a notification/message to the mobile carrier computing entity 806 and/or central computing entity 802 regarding the status of each parcel to be delivered using a UAV 100 within the geofence.

F. Route/Flight-Based Load and Takeoff Operations

In embodiments, in conjunction with or independently of the logical group-based and geofence-based load and takeoff methods described above, the UAVs 100 may be loaded to and may take off from the vehicle 10 according to a dispatch plan based on a route/flight (e.g., trace) or predetermined/configurable path for carrying out one or more deliveries/pick-ups. As described above, each route/flight usually includes a trace, which is a predefined path for carrying out one or more pick-ups and/or deliveries. A delivery order listing is a listing of address ranges, addresses, and/or parcels 300 for serviceable points 5901 that follows the trace to perform the assigned pick-ups and/or deliveries for serviceable points 5901. Through an appropriate interface, dispatch plans can be compared against alternative dispatch plans to load balance and otherwise adjust the various dispatch plans for a given geographic area, service center, route/flight, and/or the like. In such embodiments, takeoffs can be triggered based on time, location, pick-ups and/or deliveries completed, position in the trace, and/or the like.

Furthermore, in such embodiments, messages/notifications can be provided to user computing entities 804 based on the progress of a vehicle 10 and/or UAV 100 through a predetermined/configurable route/flight. The message/notification criteria may be based on the estimated time of arrival of carrier at the serviceable point 5901. For example, the consignor/consignee may seek to receive a message when the vehicle 10 and/or the UAV 100 is approximately 1 hour away, 30 minutes away, 15 minutes away and/or 5 minutes away. In this case, central computing entity (and/or the user computing entity 804) may identify the number of stops needing to be made before arriving at the specific consignor/consignee's serviceable point 5901 and applying a predetermined/configurable stop time estimate to calculate an estimated time of arrival at the consignor/consignee's serviceable point 5901 (e.g., number of stops*standard stop duration). In some embodiments, the estimate may also include estimated travel time between the remaining stops (e.g., ETA calculated by navigations software, distance of anticipated route*average speed, etc.). In further embodiments, the central computing entity 802 may use historical information/data regarding service times and/or travel times between stops to arrive at an estimated arrival time at the user's serviceable point. Depending on the user's preferences in the corresponding user profile, this process may be repeated with messages being sent when the vehicle 10 or UAV 100 is 30, 15, and/or 5 minutes away. The central computing entity 802 (and/or the user computing entity 804) may also send the consignor/consignee an arrival message when the vehicle 10 and/or the UAV 100 is approaching and/or arrives at the consignor/consignee's serviceable point 5901. The individual messages may be sent via the same protocol or under different protocols according to the preferences of the user and/or carrier (e.g., countdown messages by text). As will be recognized, a variety of other approaches and techniques can be used to adapt to various needs and circumstances.

G. Pre-Flight Condition Operations

Figure 54:
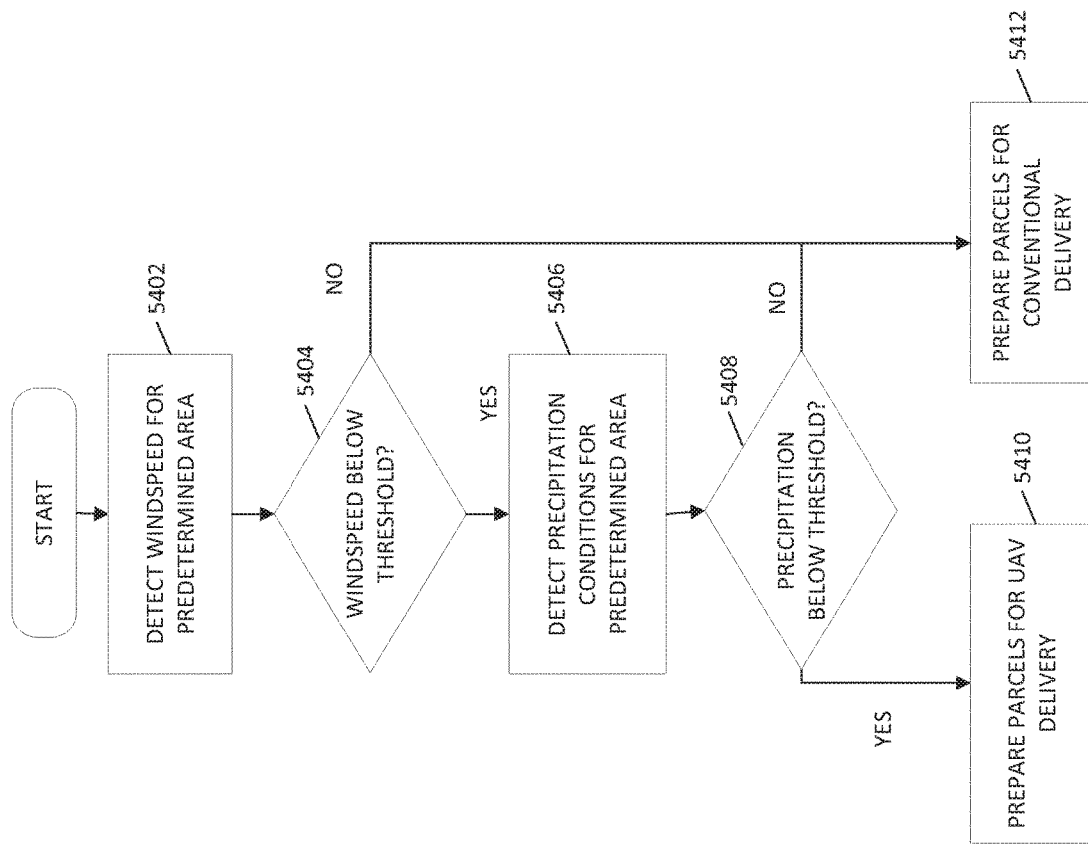
FIG. 54 schematically depicts a flowchart illustrating operations and processes that can be used in accordance with various embodiments shown and described herein.

Referring to FIG. 54, one embodiment of operations for determining if a parcel 300 is suitable for delivery via UAV 100 is schematically depicted. For example, prior to attaching a parcel carrier 200 to a parcel 300 at the intermediate location 601 (FIG. 32), the central computing entity 802, or another suitable computing entity, may determine whether conditions are suitable for delivering the parcels 300 via UAV 100. In a first step 5402, the central computing entity 802 detects a wind speed associated with a predetermined/configurable area. In embodiments, the predetermined/configurable area includes a geographic area in which parcels 300 may be delivered and/or picked up via UAV 100, and may include one or more geofenced areas. The central computing entity 802 may detect the wind speed conditions, such as by accessing weather forecasts from the internet via the network 800 (e.g., wind speeds at the current time and/or projected time of delivery). Alternatively, vehicles 10 may be equipped with one or more wind speed detection devices, such as an anemometer that is communicatively coupled to an associated delivery vehicle computing entity 810, and the central computing entity 802 may receive detected wind speed conditions for the predetermined/configurable area from the delivery vehicle computing entity 810 of a vehicle 10.

In a second step 5404, the central computing entity 802 determines if the wind speed is below a predetermined/configurable wind speed threshold. If the detected wind speed conditions are not below the predetermined/configurable wind speed threshold, then the central computing entity 802 proceeds to step 5412 and provides instructions to prepare the parcels 300 within the intermediate location 601 for conventional delivery (e.g., without the use of a UAV 100). In embodiments, the predetermined/configurable wind speed threshold may be 30 miles per hour (mph). In other embodiments, the predetermined/configurable wind speed threshold may be 25 mph. In still other embodiments, the predetermined/configurable wind speed threshold may be 15 mph.

If at step 5404, the detected wind speed is below the predetermined/configurable wind speed threshold, then the central computing entity 802 proceeds to step 5406, and detects precipitation conditions for the predetermined/configurable area. In embodiments, the central computing entity 802 may detect precipitation conditions within the predetermined/configurable area. For example, the central computing entity 802 may detect current and forecasted precipitation conditions within the predetermined/configurable area, such as by accessing weather forecasts from the internet via the network 800.

The central computing entity 802 then proceeds to step 5408, and determines if the precipitation conditions within the predetermined/configurable area are below a predetermined/configurable precipitation threshold. If the detected precipitation conditions are not below the predetermined/configurable precipitation threshold, then the central computing entity 802 proceeds to step 5412 and provides instructions to prepare the parcels 300 within the intermediate location 610 for conventional delivery. If the detected precipitation conditions are below the predetermined/configurable precipitation threshold, then the central computing entity 802 proceeds to step 5410 and provides instructions to prepare the parcels 300 within the intermediate location for delivery via UAV 100. The predetermined/configurable precipitation threshold may be based on a percent chance of precipitation within the predetermined/configurable area (e.g., a percent chance of precipitation within the predetermined/configurable area on a specific day), or the predetermined/configurable precipitation threshold may include a detected precipitation event (e.g., rain, sleet, snow, etc.) within a predetermined/configurable distance of the predetermined/configurable area. For example, the predetermined/configurable precipitation threshold may be a forecast indicating a 10% chance of precipitation within the predetermined/configurable area. In other embodiments, the predetermined/configurable precipitation threshold may be a forecast indicating a 20% chance of precipitation within the predetermined/configurable area. In other embodiments, the predetermined/configurable precipitation threshold may include an indication of a precipitation event detected within 20 miles of the predetermined/configurable area. In still other embodiments, the predetermined/configurable precipitation threshold may include an indication of a precipitation event detected within 40 miles of the predetermined/configurable area.

Accordingly, the central computing entity 802 may provide instructions to prepare parcels 300 within the intermediate location 601 for conventional delivery or for delivery via UAV 100 based on the above-described and/or various other weather/environmental conditions. As may be appreciated, it may be difficult to operate UAVs 100 in adverse weather/environmental conditions, such as in high winds, in precipitation, and/or in low or high temperatures. Operation of the UAVs 100 in such conditions may increase the chances for unsuccessful delivery of the parcel 300, and may result in damage to the parcel 300 and/or the UAV 100, which may generally reduce user satisfaction and may increase operating costs. Accordingly, by providing an indication that the parcels 300 should be prepared for conventional delivery based on the detection of adverse weather/environmental conditions, the central computing entity 802 may assist in reducing operating costs and in ensuring successful delivery of the parcels 300.

H. Parcel Engagement Operations

Figure 55:
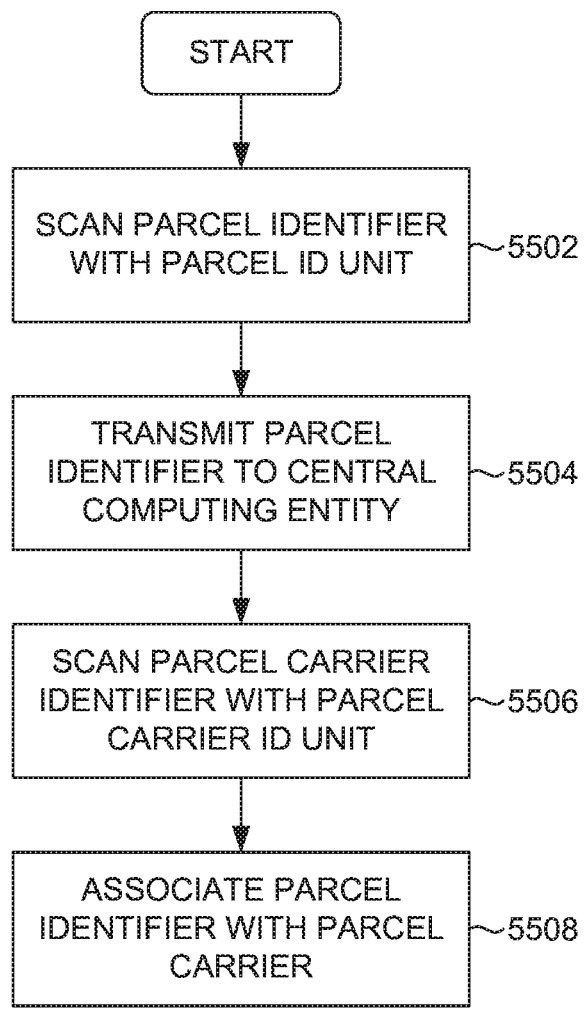
FIG. 55 schematically depicts a flowchart illustrating operations and processes that can be used in accordance with various embodiments shown and described herein.

Referring collectively to FIGS. 32 and 55, the perspective view of the intermediate location 601 and one embodiment of operations for associating a parcel 300 with a parcel carrier 200 are schematically depicted, respectively. In a first step 5502, a parcel 300 is scanned/read/received by the parcel identification unit 632, and the parcel identification unit 632 may read the parcel identifier of the parcel 300. In a second step 5504, the parcel identification unit 632 may communicate the parcel identifier to the central computing entity 802. In a third step 5506, the parcel carrier identification unit 613 scans a parcel carrier 200 positioned on the robot 612 as the robot 612 installs the parcel carrier 200 to the parcel carrier clamps 622. In a fourth step 5508, the parcel carrier identification unit 613 communicates the scanned/read/received parcel carrier 200 to the central computing entity 802. In a fifth step 5508, the central computing entity 802 associates the scanned/read/received parcel identifier with the scanned/read/received parcel carrier identifier. As may be appreciated, the parcel carrier 200 and the associated parcel 300 may be connected to one another at the engagement clamping mechanism 634, which is spaced apart from the parcel identification unit 632 and the parcel carrier identification unit 613 of the robot 612. Accordingly, when associating the parcel carrier identifier with the parcel identifier, the central computing entity 802 may consider and accommodate the parcel carriers 200 positioned between the parcel carrier identification unit 613 and the engagement clamping mechanism 632, as well as the parcels 300 positioned between the parcel identification unit 632 and the engagement clamping mechanism 634.

By associating the parcels 300 with the parcel carriers 200 that are attached to the parcels 300, the central computing entity 802 may track and monitor the position and progress of parcels 300 and associated parcel carriers 200 throughout a delivery process.

Reference will now be made to methods for supplying parcel carriers 200 within the vehicle 10 to the UAV 100, and operations for the delivery and pick-up of parcels 300 via UAV 100.

I. Remote User Authorization and Takeoff Operations

Figure 56:
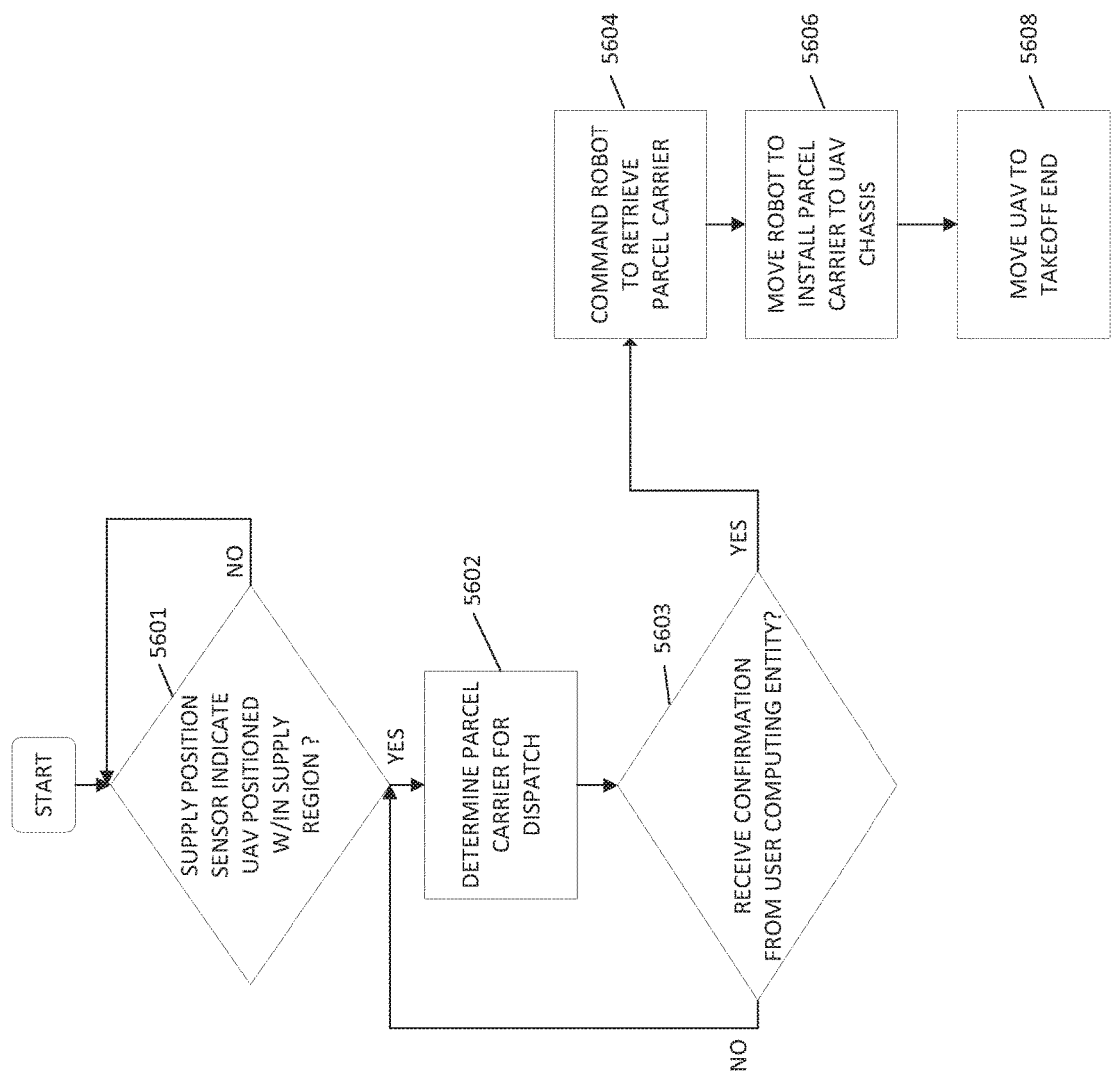
FIG. 56 schematically depicts a flowchart illustrating operations and processes that can be used in accordance with various embodiments shown and described herein.

Referring to FIG. 56, one embodiment of operations for loading a parcel carrier 200 to a UAV 100 is schematically depicted. As described above, the delivery vehicle computing entity 810 is communicatively coupled to the central computing entity 802, and may be communicatively coupled to the robot processor 522 and the conveyor controller 460 of the vehicle 10. In a first step 5601, the delivery vehicle computing entity 810 determines if the supply position sensor 450*a* indicates if a UAV 100 is positioned within the supply region 408. If the delivery vehicle computing entity 810 does not receive a signal from the supply position sensor 450*a* indicating the UAV 100 is positioned within the supply region 408, the delivery vehicle computing entity 810 remains at step 5602. If the delivery vehicle computing entity 810 receives a signal from the supply position sensor 450*a* indicating that a UAV 100 is positioned within the supply region 408, the delivery vehicle computing entity 810 proceeds to step 5604 and commands the robot 500 to retrieve a parcel carrier 200 from the rack 30 within the vehicle 10.

In an optional second step 5602, the delivery vehicle computing entity 810 determines and a parcel carrier 200 for dispatch. As described above, parcel carriers 200 (and the associated parcels 300) may be dispatched from the vehicle 10 based on logical groupings and/or based on the position of the vehicle 10, such as when the vehicle 10 is positioned within a geofenced area. Upon selecting a parcel carrier 200 for dispatch, the delivery vehicle computing entity 801 proceeds to step 5603. At step 5603, the delivery vehicle computing entity 810 determines if a confirmation has been received from the user computing entity 804, indicating that the consignor/consignee would like the delivery/pick up to be performed via UAV 100. For example, in some embodiments, prior to dispatching a parcel carrier 200 (and associated parcel 300 when performing a delivery) from the vehicle 10, the delivery vehicle computing entity 804 may send a notification to the user computing entity 804. The notification may invite the consignor/consignee to provide an input via the user computing entity 804 confirming that the consignor/consignee would like a delivery/pick-up to be performed via UAV. If the delivery vehicle computing entity 810 does not receive a confirmation from the user computing entity 808, the delivery vehicle computing entity 810 may return to step 5602 and determine another parcel carrier 200 for dispatch. In this way, the delivery vehicle computing entity 810 may receive confirmation from a consignor/consignee that the consignor/consignee would like to have a delivery/pick-up performed via UAV 100 prior to dispatch of the UAV 100 from the vehicle 10. If the delivery vehicle computing entity 810 receives a confirmation from the user computing entity 808, the delivery vehicle computing entity 810 proceeds to step 5604 and commands the robot to retrieve the parcel carrier 200 from the rack 30.

The delivery vehicle computing entity 810 then proceeds to step 5606, and commands the robot 500 to install the parcel carrier 200 to the UAV chassis 110. Upon installing the parcel carrier 200 to the UAV chassis 110, the delivery vehicle computing entity 810 may additionally provide information/data to the UAV computing entity 804 indicating the destination of the parcel carrier 200 (e.g., a coordinate location of the delivery/pick-up point/location to which the parcel carrier 200 is to be transported).

Once the parcel carrier 200 is installed to the UAV chassis 110, the delivery vehicle computing entity 810 proceeds to step 5608, and moves the UAV to the takeoff end 402. Once moved to the takeoff end 402, the propulsion members 102 of the UAV 100 may be engaged, and the UAV 100 may depart from the vehicle 10.

The operations described above with respect to FIG. 56 may be performed to prepare UAVs 100 for both deliveries, in which the parcel carrier 200 installed to the UAV 100 is coupled to a parcel 300. The operations may also be performed to prepare UAVs 100 for pick-ups, in which the parcel carrier 200 installed to the UAV 100 is not coupled to a parcel 300, but is rather configured to pick up a parcel 300 from a serviceable point.

J. Navigation of UAV for Pick-Up/Delivery

In various embodiments, UAVs 100 can operate autonomously. In an autonomous embodiment, UAVs 100 may navigate between vehicles 10 and serviceable points 5901 along predetermined/configurable flight routes/paths. A predetermined/configurable flight path may include a direct line of flight between the vehicle 10 and the serviceable point 5901. The UAV 100 may proceed along a direct line between a vehicle 10 and a serviceable point 5901, and the UAV 100 may deviate from the predetermined/configurable flight path in response to receiving an indication of an object or obstacle in the flight path from the flight guidance sensor 166. In some embodiments, the predetermined/configurable flight path may include one or more waypoints (e.g., geocodes or geo coordinates), or one or more geographic locations that the UAV 100 will travel to between the vehicle 10 and the serviceable point 5901. The waypoints may be determined to provide an efficient flight path between the vehicle 10 and the serviceable point 5901 (e.g., minimizing flight time), and be determined based on known obstacles that would prevent a direct flight path between the vehicle 10 and the serviceable point 5901 (e.g., buildings, power lines, etc.).

Alternatively, in some embodiments, the flight and operations of the UAV 100 may be remotely and manually controlled, such as through the mobile carrier computing entity 806, the central computing entity 802, and/or the delivery vehicle computing entity 810. As will recognized, a variety of other approaches and techniques can be used to adapt to various needs and circumstances.

Figure 57:
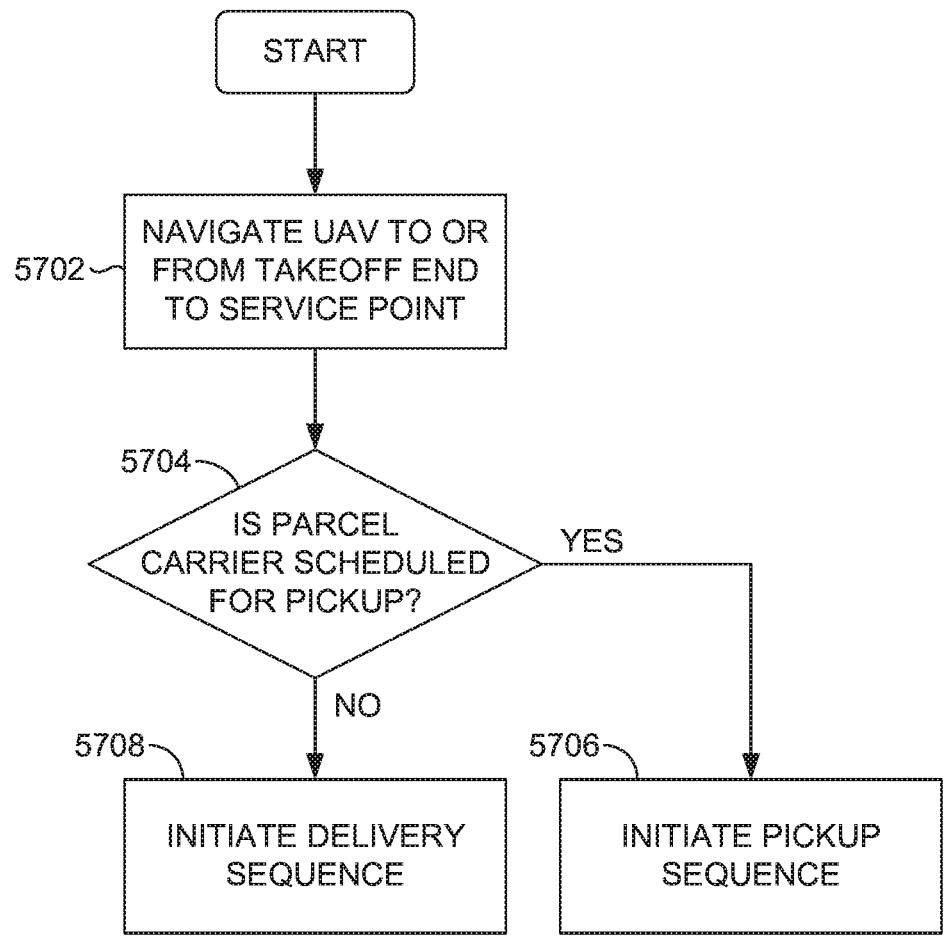
FIG. 57 schematically depicts a flowchart illustrating operations and processes that can be used in accordance with various embodiments shown and described herein.

Referring to FIG. 57, one embodiment of operations of the UAV 100 after the UAV 100 has departed from the vehicle 10 is schematically depicted. In a first step 5702, the UAV 100 navigates from the takeoff end 402 of the vehicle 10 to a desired serviceable point 5901. In embodiments, the UAV 100 navigates to a desired serviceable point based on information/data associated with the parcel carrier 200.

In some embodiments, the delivery vehicle computing entity 810 and/or the UAV computing entity 808 may provide a notification/message to the user computing entity 804 indicating that the UAV 100 has departed from the vehicle 10. The UAV computing entity 808 may also provide an indication to the user computing entity 804 indicating the estimated time of arrival of the UAV 100 to the serviceable point based on the position of the UAV 100 with respect to the serviceable point. Further in some embodiments, the UAV computing entity 808 may transmit a live-feed/stream for display on the user computing entity 804 of the route/flight of the UAV 100, such as may be captured by the one or more cameras 168.

At step 5704, if the parcel carrier 200 is scheduled for a pick-up, the UAV computing entity 808 proceeds to step 5706 and initiates a pick-up sequence. If the parcel carrier 200 is not scheduled for a pick-up, then the UAV computing entity 808 proceeds to step 5708 and initiates a delivery sequence. Operational steps for the delivery sequence (e.g., step 5708) and the pick-up sequence (e.g., step 5706) are described in greater detail herein.

Referring to FIG. 58, a front view of a UAV 100 at a serviceable point 5901 is schematically depicted. In embodiments, a consignee or user may request delivery to or pick-up of the parcel 300 at a serviceable point 5901, which may include a home, business, or other location at which the consignee wishes the parcel 300 to be delivered. The consignor/consignee may further request that the parcel 300 is delivered to one or more preferred delivery/pick-up points/locations at the serviceable point 5901. As one example, the consignee may request that the parcel is delivered to a first desired delivery point/location 5902 or an alternate second desired delivery point/location 5904 at the serviceable point 5901, where the first desired delivery point/location 5902 is spaced apart from the second desired delivery point/location 5904. In the embodiment depicted in FIG. 58, the first the first desired delivery point/location 5902 is positioned in a front area of the serviceable point 5901 (e.g., in the front yard and/or the like), while the second desired delivery point/location 5904 is positioned in a rear area of the serviceable point 5901 (e.g., in the back yard and/or the like). Alternatively, the first desired delivery point/location 5902 and the second desired delivery point/location 5904 may be positioned at any locations of the serviceable point 5901 suitable to receive a parcel 300, for example, the roof of a structure, a porch, a driveway, and/or the like. In some embodiments, the first desired delivery point/location 5902 and/or the second desired delivery point/location 5904 may be positioned within a portion of the serviceable point 5901 having restricted access. For example, the first desired delivery point/location 5902 and/or the second desired delivery point/location 5904 may be positioned within a garage 5906 of the serviceable point 5901, where the garage 5906 is selectively accessible through a garage door 5908. In embodiments, the position of the desired delivery points/locations at the serviceable point 5901 may be associated with a user profile, such that the desired delivery points/locations may be re-used for subsequent deliveries to the serviceable point 5901.

In embodiments, the UAV computing entity 808 may communicate with the user computing entity 802 so that the UAV 100 may gain access to the garage 5906 (or access the same via user profile). For example, the UAV computing entity 808 may receive delivery instructions from the consignee, via the user computing entity 804 and the central computing entity 802, indicating that the parcel 300 is to be delivered to a restricted access area of the serviceable point 5901. Along with the request to deliver the parcel to a restricted access area of the serviceable point 5901, the UAV computing entity 804 may receive an access code from the consignee (or access the same via the user's user profile) via the user computing entity 804 and/or the central computing entity 802. The access code may provide selective access to the restricted access area of the serviceable point 5901 (if valid).

In one embodiment, upon receiving a communication of the access code from the UAV computing entity 808 (e.g., stored in a user profile), the user computing entity 804 can validate the access code, and if valid, may command the garage door 5908 (FIG. 58) to open such that the UAV 100 may enter and deliver the parcel 300 to the garage 5906 (FIG. 58). The access code may include a unique single-use or temporary access code that may provide access to the restricted access area of the serviceable point 5901 once. For example, upon receiving the unique single-use access code from the UAV computing entity 808, the user computing entity 804 may validate the access code, and if valid, command the garage door 5908 (FIG. 58) to open. In a single-use implementation, the user computing entity 804 may not command the garage door 5908 (FIG. 58) to open upon any subsequent receipt of the unique single-use access code. By utilizing a unique single-use access code, access may be provided for a specific parcel delivery, without providing the UAV computing entity 808 or any other computing entity with data/information that might be able to facilitate general access to the restricted access area of the serviceable point 5901.

Furthermore, in some configurations, the access code may include a unique access code that when communicated to the user computing entity 804, causes the user computing entity 804 to partially open the garage door 5908 (FIG. 58) such that a UAV 100 may navigate to the interior of the garage 5906 (FIG. 58). By only partially opening the garage door 5908, the access code may allow access to the garage 5908 for delivery of the parcel 300, without fully opening the garage door 5908 and providing un-restricted access to the garage 5906 (FIG. 58). While the user computing entity 804 is described as commanding the garage door 5908 to selectively open to allow access to the garage 5906, it should be understood that the user computing entity 804 may selectively provide access to any suitable restricted access area of the serviceable point 5901.

Alternatively or in addition to receiving and subsequently providing an access code to obtain access to the restricted access area of the serviceable point 5901, the UAV computing entity 802 may interact directly with the consignee via the user computing entity 804 to obtain access to the restricted area of the serviceable point 5901. For example, upon arriving to the serviceable point 5901, the UAV computing entity 802 may establish communication with the user computing entity 804 (e.g., gate or garage door controller, smart home entity, and/or the like) and may send a request to access the restricted access area of the serviceable point 5901. The consignee may then provide an input to the user computing entity 804 that may provide access to the restricted access area of the serviceable point 5901 (e.g., by opening the garage door 5908). The UAV computing entity 802 may also close the gate or garage door in a similar manner. Alternatively, access to the restricted access area may be based on a timer (e.g., the door or gate is open for 30 seconds or 1 minute).

The central computing entity 802 may receive a location coordinate (e.g., a latitude and a longitude) of the first desired delivery point/location 5902 and the second desired delivery point/location 5904 from the consignee via the user computing entity 804 (or access the same via a corresponding user profile). Alternatively, in some embodiments, upon receiving a request to receive a parcel delivery to the serviceable point 5901 from the user computing entity 804, the central computing entity 802 may send the user computing entity 804 information/data including an indicia configured to be printed on a media. As a specific example, the central computing entity 802 may send a consignee via the user computing entity 804 a QR code, barcode, Maxi Code, symbol, and/or the like configured to be printed on a medium and placed at the first desired delivery point/location 5902 and/or the second desired delivery point/location 5904. The cameras 168 of the UAV 100 may be configured to read the indicia and may utilize the indicia to navigate to the first desired delivery point/location 5902 and/or the second desired delivery point/location 5904.

Similarly, the central computing entity 802 may receive a location coordinate (e.g., a latitude and a longitude) of a desired pick-up point/location from the consignee via the user computing entity 804 (or access the same via a corresponding user profile). Alternatively, in some embodiments, upon receiving a request to receive a parcel pick-up at the serviceable point 5901 from the user computing entity 804, the central computing entity 802 may send the user computing entity 804 information/data representing an indicia configured to be printed on a media. As a specific example, the central computing entity 802 may send a consignee via the user computing entity 804 a QR code, barcode, Maxi Code, symbol, and/or the like configured to be printed on a medium and placed at the desired pick-up point/location and/or the parcel 300 to be picked up. The cameras 168 of the UAV 100 may be configured to read the indicia and may utilize the indicia to navigate to the pick-up point/location.

K. Primary and Secondary Pick-Up and Delivery Points

Figure 59:
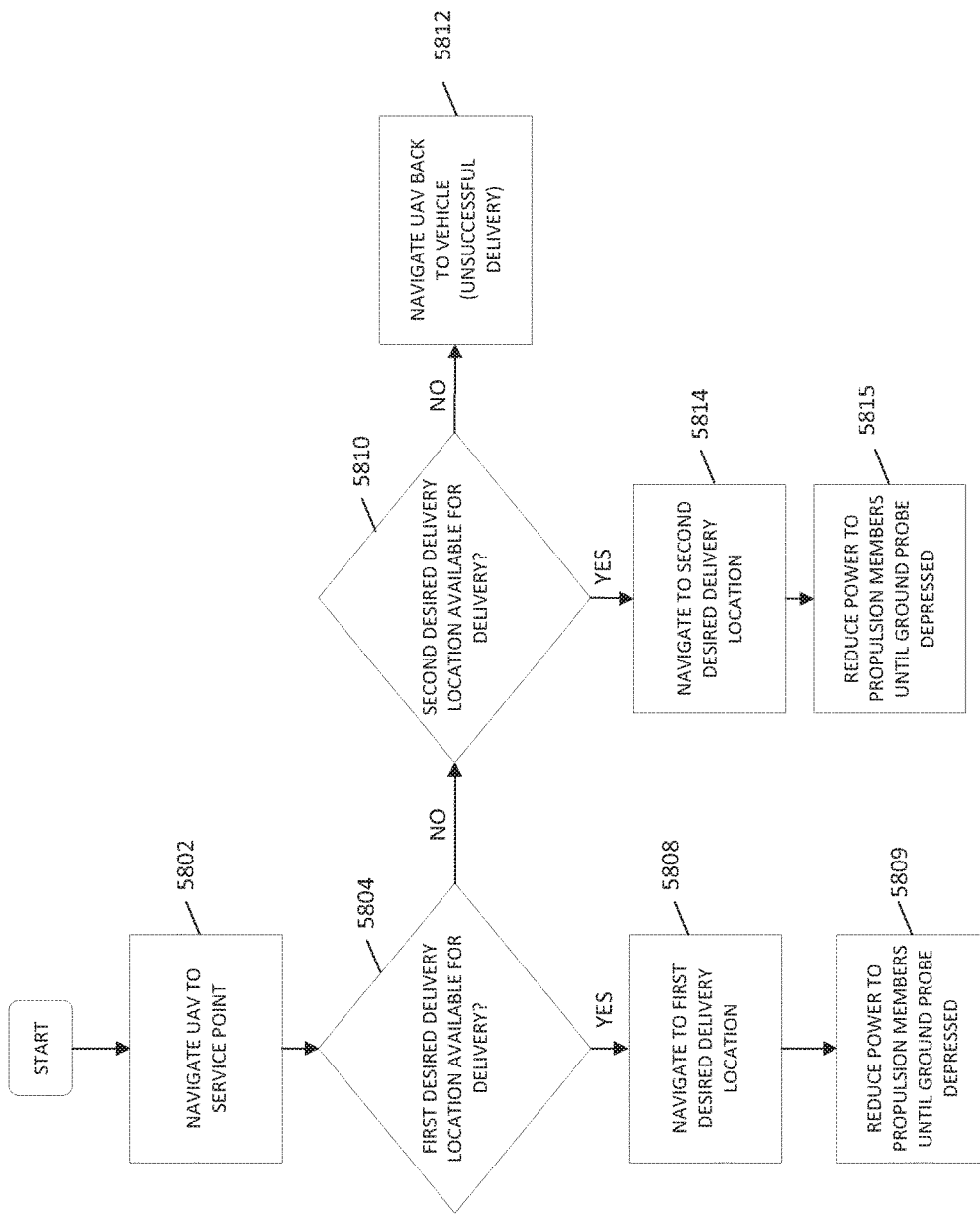
FIG. 59 schematically depicts a flowchart illustrating operations and processes that can be used in accordance with various embodiments shown and described herein.

Referring to FIG. 59, one embodiment of operations for delivering a parcel 300 to the serviceable point 5901 is schematically depicted. In a first step 5802, the UAV 100 navigates to the serviceable point 5901. As described above, within the serviceable point 5901, a preference for delivery at the first desired delivery point/location 5902 or the alternate second desired delivery point/location 5904 may be indicated by the consignee of the parcel 300, such as through the user computing entity 804 or a corresponding user profile. The UAV computing entity 808 then proceeds to step 5804, where the UAV computing entity 808 determines if the first delivery point/location 5902 (e.g., primary delivery point) is available for delivery of the parcel 300. If the first delivery point/location 5902 is available for delivery of the parcel 300, the UAV computing entity 808 proceeds to step 5808 and navigates to the first desired delivery point/location 5902. Once the UAV 100 is positioned over the first desired delivery point/location 5902, the UAV computing entity 808 proceeds to step 5809 and reduces the power provided to the propulsion members 102, such that the UAV 100 descends to the first delivery point/location 5902. The UAV computing entity 808 may cause the UAV 100 to descend until the ground probe 250 is depressed. As described above, the ground probe 250 may be communicatively coupled to the parcel carrier computing entity 212, and depression of the ground probe 250 may cause the parcel carrier 200 to release the parcel 300 at the first desired delivery point/location 5902.

If the first delivery point/location 5902 is not available for delivery of the parcel 300, the UAV computing entity 808 proceeds to step 5810, and the UAV computing entity 808 determines if the second delivery point/location 5904 (e.g., secondary delivery point) is available for delivery of the parcel 300. If the second delivery point/location 5904 is not available for delivery of the parcel 300 the UAV computing entity 808 proceeds to step 5812 and navigates the UAV 100 back to the vehicle 10. In the instance that the UAV computing entity 808 navigates the UAV 100 back to the vehicle 10 without delivering the parcel 300, the UAV computing entity 808 may optionally provide a notification/message to the user computing entity 804 that the parcel 300 was not successfully delivered.

If the second delivery point/location 5904 is available for delivery of the parcel 300, the UAV computing entity 808 proceeds to step 5814 and navigates the UAV 100 to the second desired delivery point/location 5904. Once the UAV 100 is positioned over the second desired delivery point/location 5904, the UAV computing entity 808 proceeds to step 5815 and reduces the power provided to the propulsion members 102, such that the UAV 100 descends to the second delivery point/location 5904. The UAV computing entity 808 may cause the UAV 100 to descend until the ground probe 250 is depressed. As described above, the ground probe 250 may be communicatively coupled to the parcel carrier computing entity 212, and depression of the ground probe 250 may cause the parcel carrier 200 to release the parcel 300 at the second desired delivery point/location 5904.

In embodiments, the UAV computing entity 808 may determine that the first delivery point/location 5902 and/or the second delivery point/location 5904 are unavailable for delivery of the parcel 300 based on the detection of objects positioned on or adjacent to the first delivery point/location 5902 and/or the second delivery point/location 5904 that would prevent the UAV 100 from having a clear route/flight path to the first delivery point/location 5902 and/or the second delivery point/location 5904. For example, the UAV computing entity 808 may detect a person near or at the first delivery point/location 5902 with the route/flight guidance sensors 166 and/or the one or more cameras 168, such that the UAV 100 may not navigate toward the first delivery point/location 5902 without contacting the person. By providing a first delivery point/location 5902 and a second delivery point/location 5904, the UAV computing entity 808 may have the opportunity to successfully deliver the parcel 300 to the second delivery point/location 5904, instead of returning to the vehicle 10, unsuccessfully delivering the parcel 300. While the operations described above with respect to FIG. 59 describe a first delivery point/location 5902 and a second delivery point/location 5904, it should be understood that the consignee may provide any suitable number of alternate delivery locations, such as through the user computing entity 804, to which the UAV 100 may attempt to deliver the parcel 300.

L. Pick-Up or Delivery at Restricted Access Area

Figure 60:
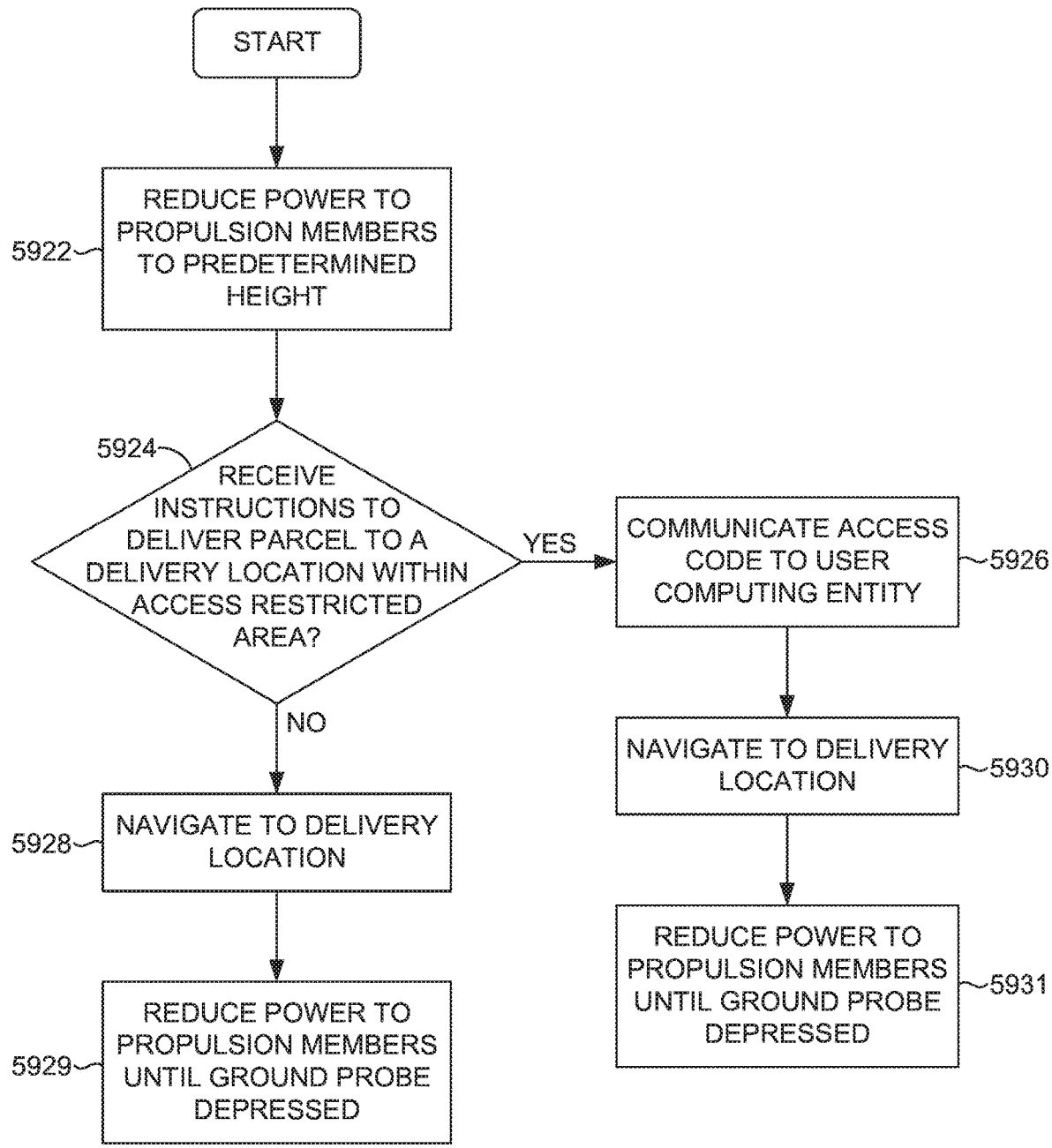
FIG. 60 schematically depicts a flowchart illustrating operations and processes that can be used in accordance with various embodiments shown and described herein.

Referring to FIG. 60, one embodiment of operations for a delivery sequence of the UAV 100 is schematically depicted. In the embodiment depicted in FIG. 60, the UAV 100 may deliver the parcel 300 to a restricted access area of the serviceable point 5901. In a first step 5922, the UAV computing entity 808 may reduce the power provided to the propulsion members 102 such that the UAV 100 descends to a predetermined/configurable height and positioned a predetermined/configurable distance from the restricted access area of the serviceable point 5901. In embodiments, the predetermined/configurable height and the predetermined/configurable distance may include any suitable height and distance that allows the UAV computing entity 808 to communicate with the user computing entity 804.

In a second step 5924, the UAV computing entity 808 determines if instructions were received to deliver the parcel 300 to a restricted access area of the serviceable point 5901. If the UAV computing entity 808 did not receive instructions to deliver the parcel 300 to a restricted access area of the serviceable point 5901, the UAV computing entity proceeds to step 5928 and navigates the UAV 100 to the delivery point/location at the serviceable point 5901. At step 5929, the UAV computing entity 808 may reduce power provided to the propulsion members 102, causing the UAV 100 to descend until the ground probe 250 is depressed. As described above, the ground probe 250 may be communicatively coupled to the parcel carrier computing entity 212, and depression of the ground probe 250 may cause the parcel carrier 200 to release the parcel 300 at the delivery location.

If, at step 5904, the UAV computing entity 808 received instructions to deliver the parcel 300 to a restricted access area of the serviceable point 5901, then the UAV computing entity 808 proceeds to step 5926, where the UAV computing entity 808 communicates an access code to the user computing entity 804. As described above, in response to receipt of an access code, the user computing entity 804 may selectively provide access to the restricted access area of the serviceable point 5901, for example, by commanding the garage door 5908 (FIG. 58) to open. After communicating the access code to the user computing entity 804, the UAV computing entity 808 proceeds to step 5930 and navigates the UAV to the delivery point/location within the restricted access area of the serviceable point 5901. At step 5931, the UAV computing entity 808 may reduce power provided to the propulsion members 102, causing the UAV 100 to descend until the ground probe 250 is depressed. As described above, the ground probe 250 may be communicatively coupled to the parcel carrier computing entity 212, and depression of the ground probe 250 may cause the parcel carrier 200 to release the parcel 300 at the delivery location. In this way, the UAV 100 may access restricted access areas of the serviceable point 5901 to deliver a parcel 300.

M. Parcel Release Operations at Delivery Point

Figure 61:
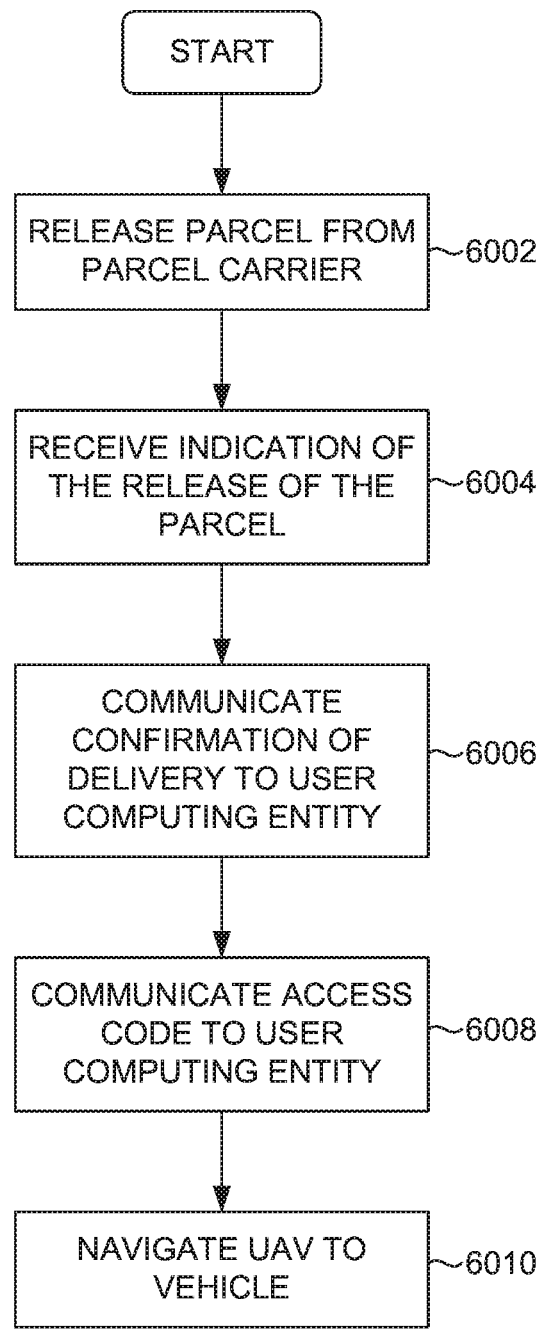
FIG. 61 schematically depicts a flowchart illustrating operations and processes that can be used in accordance with various embodiments shown and described herein.

Reference will now be made to the operations and methods that may be employed as the parcel 300 is released from the parcel carrier 200. Referring to FIG. 61, one embodiment of operations for a delivery sequence of the UAV 100 is schematically depicted. In a first step 6002, the parcel 300 is released from the parcel carrier 200, for example, in response to depression of the ground probe 250. Upon release of the parcel 300 from the parcel carrier 200, the UAV computing entity 808 proceeds to step 6004, and receives an indication of the release of the parcel 300 from the parcel carrier 200. For example, the parcel carrier computing entity 212 may communicate with the UAV computing entity 808 and may provide an indication when the parcel 300 is released from the parcel carrier 200. Additionally or alternatively, in some embodiments, the camera 168 of the UAV 100 may record the release of the parcel 300 from the parcel carrier 200, via a video and/or still photo.

Upon receiving the indication of the release of the parcel 300 from the parcel carrier 200, the UAV computing entity 808 proceeds to step 6006 and communicates confirmation of delivery of the parcel 300 to the user computing entity 804 (and/or a variety of other computing entities). In embodiments where the UAV computing entity 808 records the release of the parcel 300 via the camera 168, the UAV computing entity 808 may communicate video, still photo, and/or a live video feed of the parcel 300 being delivered to the delivery point/location at the serviceable point 5901, thereby providing confirmation of delivery of the parcel 300, as will be described in greater detail herein. The data/information (e.g., the photos and/or videos) obtained by the camera 168 may be associated with the parcel 300 and stored at the central computing entity, along with other data/information obtained by the UAV computing entity 808 that may be associated with the parcel 300 and the delivery via the UAV 100. For example, telemetry data/information, temperature data/information associated with the delivery of the parcel 300 may be stored at the central computing entity 802. The data/information obtained by the UAV computing entity 808 may subsequently be accessed by other computing entities, such as the user computing entity 804.

In some embodiments, the UAV computing entity 808 may additionally send an indication to the user computing entity 804 to prompt the consignee to provide an input confirming the delivery of the parcel 300. The UAV computing entity 808 may send the prompt to the user computing entity 804 in any suitable manner, and may interface with any suitable platform, including but not limited to ring.com and/or the like.

At step 6008, the UAV computing entity 808 may optionally communicate an indication and/or an access code to the user computing entity 804 after leaving the delivery location, for example when the UAV 100 is delivering a parcel 300 to an access restricted area of the serviceable point

5901. Upon receipt of the indication and/or access code, the user computing entity 804 may selectively prevent access to the access restricted area of the serviceable point 5901, for example, by closing the garage door 5908. At step 6010, the UAV computing entity 808 navigates the UAV 100 back to the vehicle 10.

N. Parcel Pick-Up Operations at Pick-Up Point

Figure 62:
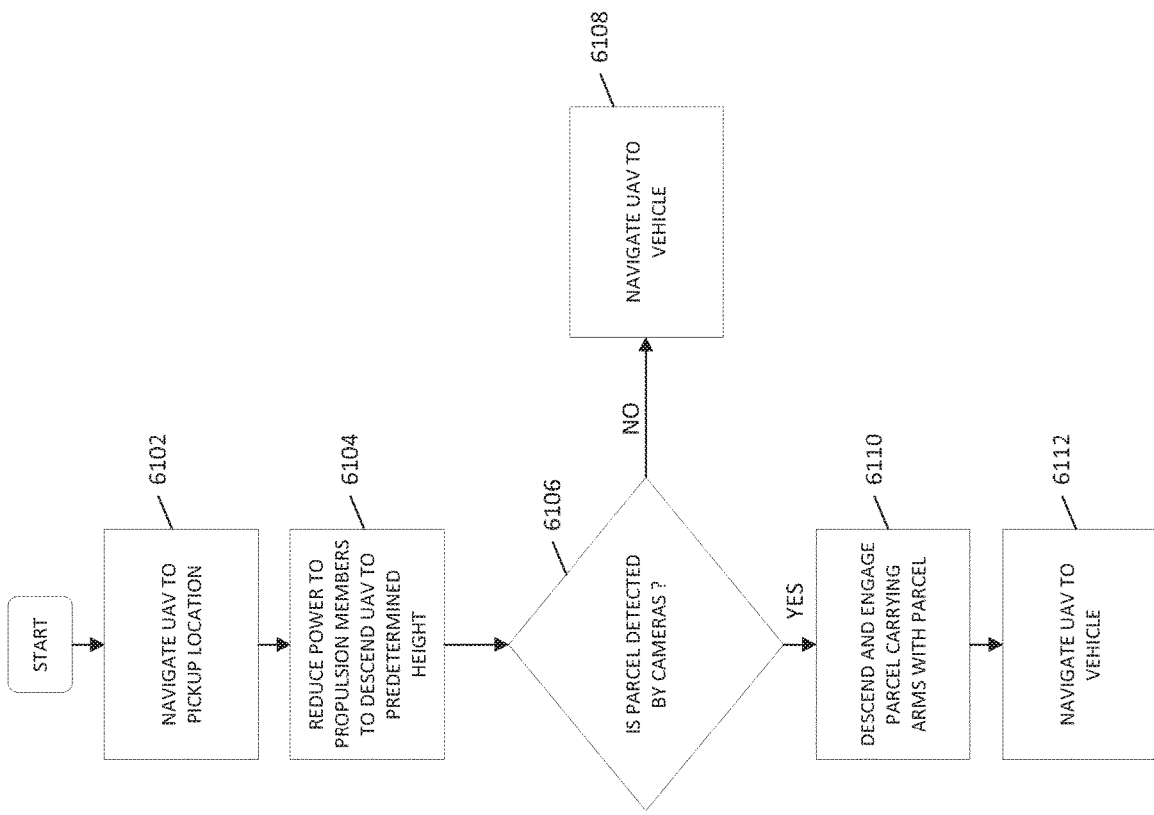
FIG. 62 schematically depicts a flowchart illustrating operations and processes that can be used in accordance with various embodiments shown and described herein.

Referring to FIG. 62, one embodiment of operations for picking up a parcel 300 at a serviceable point 5901 is schematically depicted. As described above, the UAV 100 may be dispatched from the vehicle 10 to deliver a parcel 300 from the vehicle 10 to a serviceable point 5901, or the UAV 100 may be dispatched from the vehicle 10 to pick up a parcel 300 from the serviceable point 5901 and return the parcel 300 to the vehicle.

In a first step 6102, the UAV computing entity 808 navigates the UAV 100 to a pick-up point/location at the serviceable point 5901. As described above, a consignee may request the pick-up of a parcel 300 at the serviceable point 5901 and may provide the UAV computing entity 808 with a pick-up point/location for the parcel 300. Upon arriving at the pick-up point/location at the serviceable point 5901, the UAV computing entity 808 proceeds to step 6104 and reduces the power to the propulsion members 102 to descend the UAV 100 to a predetermined/configurable height at the pick-up point/location at the serviceable point 5901. In embodiments, the predetermined/configurable height may be any suitable height at which the camera 168 of the UAV may detect a parcel 300 at the pick-up point/location at the serviceable point 5901.

At step 6106, the UAV computing entity 808 determines if a parcel 300 is detected at the pick-up point/location at the serviceable point 5901 by the camera 168. If no parcel 300 is detected at the pick-up point/location at the serviceable point 5901, the UAV computing entity 808 proceeds to step 6108 and navigates the UAV 100 back to the vehicle 10. The UAV computing entity 808 may also provide an indication to the user computing entity 804 that the UAV 100 did not successfully pick up a parcel from the pick up point/location.

If a parcel 300 is detected at the pick-up point/location at the serviceable point 5901, the UAV computing entity 808 proceeds to step 6110 and causes the UAV 100 to descend over the parcel 300, such as by reducing the power provided to the propulsion members 102. In embodiments, the UAV computing entity 808 may utilize the camera 168 and the ground landing sensors 162 to controllably descend over the parcel 300 at the pick up point/location at the serviceable point 5901. In some embodiments, the camera 168 may detect an indicia positioned on the parcel. As the UAV 100 descends, the parcel carrying arms 230 may engage the parcel 300. For example, as described above, upon the depression of the ground probe 250, the parcel carrying arms 230 may move into a disengaged position, such that the parcel carrying arms 230 are spaced apart from the parcel 300. Once the parcel carrying arms 230 are positioned around the parcel 300, the parcel carrying arms 230 may be repositioned into the engaged position such that the parcel 300 is coupled to the parcel carrier 200. Once the parcel 300 is coupled to the parcel carrier 200, the parcel carrier computing entity 212 may send a signal to the UAV computing entity 808 indicating that the parcel 300 is coupled to the parcel carrier 200.

Once the parcel 300 is coupled to the parcel carrier 200, the UAV computing entity 808 proceeds to step 6112 and may command power to be provided to the propulsion members 102 and the UAV computing entity 808 navigates the UAV 100 back to the vehicle 10. In embodiments where the UAV 100 automatically picks up a parcel 300 from the pick-up point/location (e.g., picks up the parcel 300 without requiring user intervention), the parcel 300 may be of a predetermined/configurable size/dimension, such that the parcel carrier may accurately engage the parcel 300.

The UAV computing entity 808 may additionally provide a notification/message to the user computing entity 804 that the parcel 300 was picked up from the serviceable point 5901. In embodiments where the UAV computing entity 808 records the pick-up of the parcel 300 via the camera 168, the UAV computing entity 808 may communicate video, still photo, and/or a live video feed of the parcel 300 being picked up at the serviceable point 5901, thereby providing confirmation of delivery of the parcel 300. The data/information (e.g., the photos and/or videos) obtained by the camera 168 may be associated with the parcel 300 and stored at the central computing entity 802, along with other data/information obtained by the UAV computing entity 808 that may be associated with the parcel 300 and the pick-up via the UAV 100. For example, telemetry data/information, temperature data/information associated with the pick-up of the parcel 300 may be stored at the central computing entity 802. The data/information obtained by the UAV computing entity 808 may subsequently be accessed by other computing entities, such as the user computing entity 804.

O. Additional Parcel Pick-Up Operations at Pick-Up Point

Figure 63:
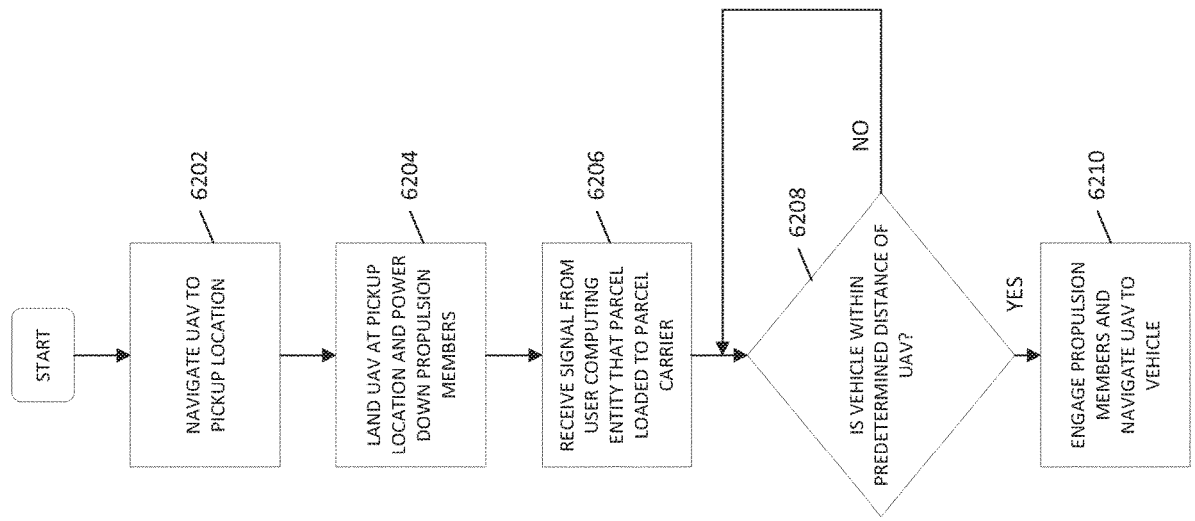
FIG. 63 schematically depicts a flowchart illustrating operations and processes that can be used in accordance with various embodiments shown and described herein.

Referring to FIG. 63, one embodiment of operations for picking up a parcel 300 at a serviceable point 5901 is schematically depicted. In a first step 6202, the UAV computing entity 808 navigates the UAV 100 to a pick-up point/location at the serviceable point 5901. As described above, a consignee may request the pick-up of a parcel 300 at the serviceable point 5901 and may provide the UAV computing entity 808 with a pick-up point/location for the parcel 300. Upon arriving at the pick-up point/location at the serviceable point 5901, the UAV computing entity 808 proceeds to step 6204 and lands at the pick-up point/location at the serviceable point 5901, such as by reducing the power provided to the propulsion members 102. The UAV computing entity 808 may communicate with the ground landing sensors 162 to controllably land the UAV 100 at the pick-up point/location at the serviceable point 5901. Upon landing the UAV 100 at the pick-up point/location at the serviceable point 5901, the UAV computing entity 808 may cease providing power to the propulsion members 102 (e.g., causing the propulsion members 102 to stop rotating). The UAV 100 may remain at the pick-up point/location at the serviceable point 5901 allowing a user to couple a parcel 300 to the parcel carrier 200 of the UAV 100. For example, in embodiments where the parcel carrier 200 is coupled to a parcel housing 360 (FIG. 19), the UAV 100 may remain at the pick-up point/location at the serviceable point 5901 allowing a user to place a parcel 300 within the parcel housing 360.

At step 6206, the UAV computing entity 808 and/or the central computing entity 802 receive an indication from the user computing entity 804 indicating that the parcel 300 is loaded to the parcel carrier 200. For example, the user may provide an input to the user computing entity 804 indicating that the parcel 300 is loaded to the parcel carrier 200, and the user computing entity 804 may communicate the indication to the UAV computing entity 804 and/or the central computing entity 802. Upon receiving the indication that the parcel 300 is loaded to the parcel carrier 200, the UAV computing entity 804 proceeds to step 6208 and determines if a vehicle 10 is positioned within a predetermined/configurable distance of the UAV 100. For example, the UAV computing entity 804 may communicate with the central computing entity 802 and/or one or more delivery vehicle computing entities 810 to determine if any vehicles 10 are positioned within a predetermined/configurable distance of the UAV 100. If no vehicles 10 are positioned within the predetermined/configurable distance of the UAV computing entity 808 will remain at step 6206 and the UAV 100 will remain at the pick-up point/location at the serviceable point 5901. If a vehicle 10 is positioned within the predetermined/configurable distance of the UAV 100, the UAV computing entity 808 proceeds to step 6210 and engages the propulsion members 102 and navigates to the vehicle 10.

In embodiments, the predetermined/configurable distance between the UAV 100 and the vehicle 10 may be an estimated route/flight range of the UAV 100 based on available power to the UAV 100, such as from the power supply 214. Once the central computing entity 802 and/or the UAV computing entity 808 receive the indication that the parcel 300 is loaded to the parcel carrier, if no vehicle 10 is positioned within the predetermined/configurable distance of the UAV 100 or if no vehicle is scheduled to be positioned within the predetermined/configurable distance of the UAV 100, the central computing entity 802 may generate instructions to dispatch a vehicle 10 to retrieve the UAV 100, or may re-route a vehicle 10's delivery route/flight such that a vehicle 10 will be positioned within the predetermined/configurable distance of the UAV 100, such that the parcel 300 may be retrieved from the pick-up point/location.

P. Communication-Based Pick-Up and Delivery Confirmation

In embodiments, the computing entities may send and receive various notifications/messages and/or data/information related to the pick-up and/or delivery of parcels 300. As will be recognized, certain communication technologies and protocols have range limitations for directly connecting to and/or directly communicating with computing entities (e.g., point-to-point, peer-to-peer, Wi-Fi, WLAN, WPAN, and/or the like). For example, NFC technologies may have range limitations of less than 12 inches. Various Bluetooth technologies may have range limitations from 20 feet to 300 feet. Wi-Fi Direct may have range limitations of 600 feet. Thus, depending on the application or context, various communication technologies and protocols can be used to adapt to various needs and circumstances. For instance, NFC, Bluetooth, Wi-Fi Direct, and other technologies may be used to provide confirmation that the UAV 100 actually visited the serviceable point 5901 for a delivery or pick-up. As will be recognized, a variety of other approaches and techniques can be used to adapt to various needs and circumstances.

In one embodiment, the UAV computing entity 808 can confirm delivery or pick-up of a parcel by connecting to and/or communicating with registered user computing entities 804 (e.g., a user's smartphone, Wi-Fi network, garage door, Echo, Nest, Home, security system, and/or the like). For instance, in the Bluetooth context, a user computing entity 804 can connect with multiple entities simultaneously with each entity being within a 30-foot radius. In essence, Bluetooth (and other) systems create personal-area networks (PANs) or piconets that may fill an area, room, or vehicle. To create a connection, communication, session, and/or similar words used herein interchangeably between a user computing entity 804 and a UAV computing entity 808, a trusted relationship can be established between the entities using credential information/data (e.g., passwords and/or other credentials) that can be stored by each entity for future connection attempts (e.g., the entities are paired). After computing entities have been paired or credential information/data stored, establishing a connection may begin with a phase called "inquiry" through which a UAV computing entity 808 sends an inquiry request to all user computing entities 804 found within its range. The user computing entities 804 within range would then receive the query and reply. The UAV computing entity 808 then synchronizes with the various user computing entities 804 within range. Once the computing entities are connected (e.g., a connection is established) or communicate, the UAV computing entity 808 can provide instructions to various user computing entities (e.g., record the delivery, open or close the garage door, generate a record of the communication, and/or the like) and/or provide notifications/messages regarding the same. As will be recognized, other communication technologies and protocols (e.g., NFC, Wibree, HomeRF, SWAP, Wi-Fi Direct, and/or the like) can be used in a similar manner in terms of connecting and disconnecting with UAV computing entities 808. That is, the other communication technologies and protocols can communicate with or establish connections between user computing entities 804 and UAV computing entities 808.

In one embodiment, the central computing entity 802 (and/or a variety of other computing entities) may perform connection-based monitoring regularly, periodically, continuously, during certain time periods or time frames, on certain days, upon determining the occurrence of one or more configurable/determinable triggers/events, combinations thereof, and/or the like. In one embodiment, the central computing entity 802 (and/or a variety of other computing entities) may perform connection-based monitoring upon determining the occurrence of one or more configurable triggers/events, in response to requests, in response to determinations/identifications, combinations thereof, and/or the like. For example, the connection-based monitoring can be initiated using a variety of different triggers—(a) a designated UAV 100 taking off or landing; (b) a designated UAV 100 beginning to ascend or descend; (c) a designated UAV 100 releasing a parcel; (d) a designated UAV 100 moving into or out of a geofenced area; (e) a designated UAV 100 moving into a geofenced area; and/or a variety of other triggers/events. As will be recognized, a variety of other triggers/events can be used to adapt to various needs and circumstances. If a configurable/determinable trigger/event is not detected, an appropriate computing entity can determine/identify whether a configurable time period has begun or ended. If the appropriate computing entity determines/identifies that the configurable time period has not begun or ended, the appropriate computing entity can continue monitoring for configurable/determinable triggers/events. However, if the appropriate computing entity determines/identifies that the configurable time period has begun or ended, the appropriate computing entity (e.g., central computing entity 802) can continuously monitor whether one or more user computing entities 804 are connected to (e.g., communicating with) one or more UAV computing entities 808. The monitoring may continue indefinitely, until the occurrence of one or more configurable/determinable triggers/events, until a configurable time period has elapsed, combinations thereof, and/or the like.

Continuing with the above example, a UAV computing entity 808 can automatically communicate with one or more user computing entities 804 (e.g., including garage door controllers). To do so, the user profile for the user (e.g., associated with the parcel to be delivered) can be accessed to identify any related user computing entities 804 and the corresponding connection information/data. Generally, the connections between one or more user computing entities 804 and/or one or more of the UAV computing entities 808 can be attempted by or monitored by any of a variety of computing entities-including central computing entities 802, user computing entities 804, UAV computing entities 808, and/or the like. Continuing with the above example, an appropriate computing entity may determine/identify when a user computing entity 804 and a UAV computing entity 808 are connected or communicating with one another. For instance, upon descent to a serviceable point 5901, the UAV computing entity 808 can monitor for connections to or attempt to connect to one or more user computing entities 804 associated with the parcel using the information/data previously collected or obtained.

Responsive to connecting with one or more user computing entities 804, the UAV computing entity 808 can indicate or provide an indication of the same (e.g., that the UAV computing entity 808 is connected to the user computing entity 804 for Joseph Brown). The indication may include entity information/data associated with the corresponding user computing entity 804 and/or UAV computing entity 808, such as the corresponding entity identifiers and names. The indication may also include other information/data, such as the location at which the entities connected (e.g., geocode or GPS samples), the time at which the entities connected, and/or the like. The appropriate computing entity can then store the information/data in one more records and/or in association with the account, subscription, program, parcel information/data, and/or the like. The information/data can also be stored in association with tracking information/data for the parcel. This may include storing the electronic signature from the user's profile in association with the parcel information/data for the parcel. That is, the connection can serve as an electronic signature by the user, and the electronic signature can then be stored accordingly with the information/data for the parcel.

The appropriate computing entity can also provide notifications/messages in accordance with users' notification/message preferences. For example, the central computing entity 802 (and/or UAV computing entity 808) can automatically provide (e.g., generate, queue, and/or transmit) one or more notifications/messages based on the configurable/determinable parameters for a give user profile (messages to both consignors and/or consignees). For example, the central computing entity 802 (and/or other appropriately configured computing entities) can automatically provide the notifications/messages to the electronic destination addresses regarding parcels that have been picked up or delivered or have been attempted to be picked up or delivered. As will be recognized, this may include generating, queuing, and/or transmitting an email message to a user's email address, a text message to a user's cellular phone, a notification/message to a designated application, and/or the like based on the configurable/determinable parameters. As will be recognized, a variety of types of messages can be provided to various electronic destination addresses in response completing or attempting pick-ups or deliveries. Such notifications/messages may include links or access to parcel information/data and/or the real time location of the parcel. The links or access to information/data sources may be used to provide real-time location information/data of the corresponding UAV computing entity 808. Such notifications/messages can be provided on a periodic or regular basis and/or in response to certain triggers/events.

Q. Notifications/Messages

In embodiments, various computing entities can provide notifications/messages in accordance with users' notification/message preferences (e.g., stored in user profiles). For example, the UAV computing entity 808 and/or central computing entity 802 can automatically provide (e.g., generate, queue, and/or transmit) one or more notifications/messages based on the configurable/determinable parameters for a give user profile (messages to both consignors and/or consignees). For example, an appropriate computing entity can automatically provide the notifications/messages to the electronic destination addresses regarding parcels that have been picked up or delivered or have been attempted to be picked up or delivered. As will be recognized, this may include generating, queuing, and/or transmitting an email message to a user's email address, a text message to a user's cellular phone, a notification/message to a designated application, and/or the like based on the configurable/determinable parameters. As will be recognized, a variety of types of messages can be provided to various electronic destination addresses in response completing or attempting pick-ups or deliveries. Such notifications/messages may include links or access to parcel information/data and/or the real time location of the parcel (e.g., including various maps). The links or access to information/data sources may be used to provide real-time location information/data of the corresponding UAV computing entity 808. Such notifications/messages can be provided on a periodic or regular basis and/or in response to certain triggers/events.

For example, as noted above, the UAV computing entity 808 may provide a notification/message to the user computing entity 804 upon releasing a parcel 300 from the parcel carrier 200, and may prompt the consignor/consignee to confirm delivery of the parcel 300 via the user computing entity 804. Additionally, the UAV computing entity 808 may provide a notification/message to the user computing entity 804 upon picking up a parcel 300 at the serviceable point 5901, and may prompt the consignor/consignee to confirm pick-up of the parcel 300 vial the user computing entity 804. The notifications/messages may include sound, video (including 360° video), GIFs, telemetry information/data, pick-up information/data, delivery information/data, environmental information/data, links to information/data, still images captured by the camera 168, and/or the like.

The UAV computing entity 808 and/or central computing entity 802 may similarly provide notifications/messages to the user computing entity 804 indicating various progress throughout the delivery process, including a notification/message when the UAV 100 is dispatched from the vehicle 10 and an estimated time of arrival of the UAV 100 to the serviceable point 5901.

R. Return and Landing Operations at Vehicle

Figure 64:
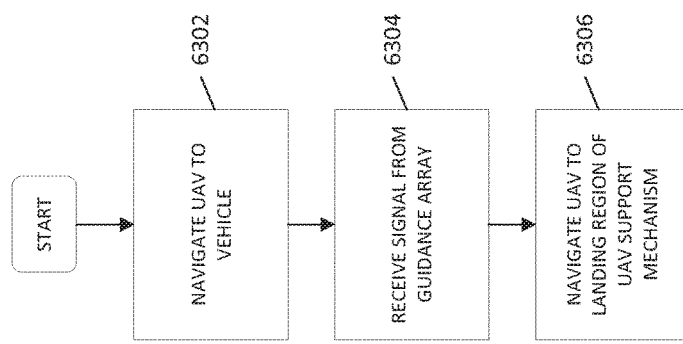
FIG. 64 schematically depicts a flowchart illustrating operations and processes that can be used in accordance with various embodiments shown and described herein.

Referring to FIG. 64, one embodiment of operations for landing a UAV 100 to a vehicle 10 is schematically depicted. As described above, a UAV 100 may be dispatched from a vehicle to a delivery point/location or a pick-up location, and upon delivery or pick up of a parcel, the UAV 100 returns to the vehicle 10. In a first step 6302, the UAV computing entity 808 navigates the UAV 100 to the vehicle 10. In embodiments, the UAV computing entity 808 may communicate with the delivery vehicle computing entity 810 and/or the central computing entity 802 to determine the location of the vehicle 10 and/or the planned route of the vehicle 10. As the UAV 100 approaches the vehicle 10, the UAV computing entity 808 proceeds to step 6304 and receives a signal from the guidance array 430 of the UAV support mechanism 400, such as through the camera 168 and/or the vehicle landing sensors 164. As described above, the guidance array 430 may include visual indicators 432 and positioning beacons 434 to assist the UAV 100 in locating the position of the opposing rails 410.

The UAV computing entity 808 then proceeds to step 6306 and navigates the UAV 100 to the landing region 404 of the UAV support mechanism 400. In particular, the UAV computing entity 808 may rely on the signal or signals from the guidance array 430 and the vehicle landing sensors 164. As described above, the vehicle landing sensors 164 may include sensors (e.g., LIDAR) that may accurately detect the position of the opposing rails 410 such that the UAV 100 may accurately engage the opposing rails 410 such that the UAV 100 may accurately engage the opposing rails 410, engaging the reduced width portion 115 of the UAV chassis 110 with the opposing rails 410. In particular, the UAV computing entity 808 may fly the UAV 100 to the landing region 440 and proceed along the converging opposing rails 410 until the reduced width portion 115 contacts the opposing rails 410.

In some embodiments, the UAV computing entity 808 may not land to the vehicle 10 while the vehicle 10 is in motion. In particular, it may be difficult to accurately detect the position of the opposing rails 410 while the vehicle 10 is in motion, and the UAV computing entity 808 may command the UAV 100 to navigate and follow the vehicle 10 at a predetermined/configurable distance from the vehicle 10 until the vehicle comes to a stop. In some embodiments, the delivery vehicle computing entity 810 may send a signal to the UAV computing entity 808 when the vehicle 10 is stopped or parked, such that the UAV computing entity 808 may command the UAV 100 to land to the vehicle 10.

In other embodiments, however, the UAV computing entity 808 may command the UAV 100 to land to the vehicle 10 while the vehicle 10 is in motion based on the detected position of the opposing rails 410 and the expected future movements of the vehicle based on a predetermined delivery route of the vehicle 10. For example, when the vehicle 10 includes an autonomous vehicle, the delivery vehicle computing entity 810 may communicate the expected movements of the vehicle to the UAV computing entity 808. For example, the delivery vehicle computing entity 810 may communicate the speed of the vehicle 10 to the UAV computing entity 808. In such an embodiment, the UAV computing entity 808 may calculate an optimal landing speed as an offset from the speed of the vehicle 10. For example, if the vehicle 10 were traveling in the forward direction at 10 miles per hour, the UAV computing entity 808 could adjust its speed and direction of travel to 9 miles per hour in the same direction as the vehicle 10 (in the vehicle's path). Thus, the UAV 100 would engage the opposing rails 410 of the vehicle 10 at a difference of 1 mile per hour. This would reduce the risks of damage to the vehicle 10 and UAV 100. As will be recognized, the delivery vehicle computing entity 810 and UAV computing entity 808 could be in continuous communication to provide and receive real time speed changes of the vehicle 10 until the UAV 100 successful lands and engages with the opposing rails 410 of the vehicle 10. In another embodiment, the delivery vehicle computing entity 810 may provide a regular or continuous stream of speed commands to the UAV computing entity 808 indicating the optimal landing speed for engagement with the opposing rails 410 of the vehicle 10. This embodiment does not require the UAV computing entity 808 to calculate a speed offset of the vehicle 10. As will be recognized, a variety of other approaches and techniques can be used to adapt to various needs and circumstances.

S. Parcel/Parcel Carrier Retrieval Operations at Vehicle

Figure 65:
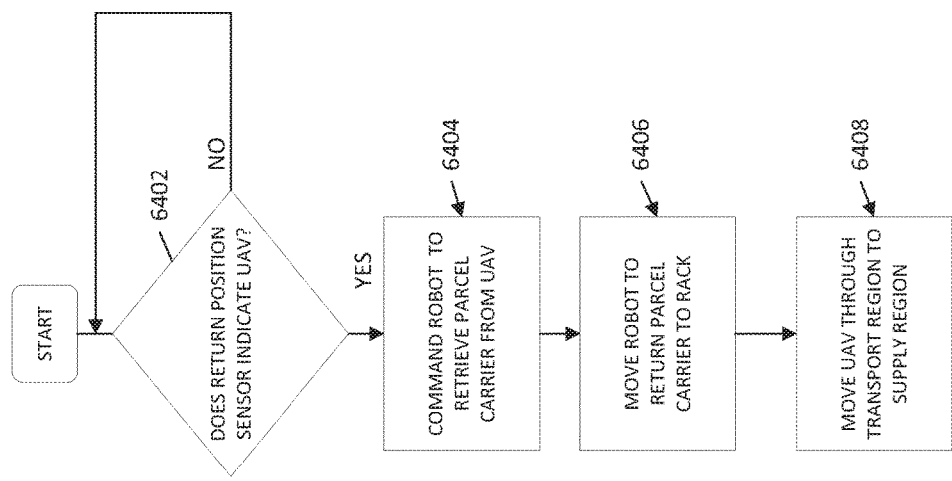
FIG. 65 schematically depicts a flowchart illustrating operations and processes that can be used in accordance with various embodiments shown and described herein.

Referring to FIG. 65, one embodiment of operations for retrieving a parcel carrier 200 from a UAV 100 that has landed to the vehicle 10 is schematically depicted. As described above, the delivery vehicle computing entity 810 is communicatively coupled to the central computing entity 802, and may be communicatively coupled to the robot processor 522 and the conveyor controller 460 of the vehicle 10. In a first step 6402, the delivery vehicle computing entity 810 determines if the return position sensor 450*b* indicates if a UAV 100 is positioned within the return region 406. If the delivery vehicle computing entity 810 does not receive a signal from the return position sensor 450*b* indicating the UAV 100 is positioned within the return region 406, the delivery vehicle computing entity 810 remains at step 6402. If the delivery vehicle computing entity 810 receives a signal from the return position sensor 450*b* indicating that a UAV 100 is positioned within the return region 406, the delivery vehicle computing entity 810 proceeds to step 6404 and commands the robot 500 to retrieve the parcel carrier 200 (and the associated parcels 300 in the instance of a UAV 100 returning from a pick-up) from the UAV 100.

The delivery vehicle computing entity 810 then proceeds to step 6406 to move the robot 500 to place the parcel carrier 200/parcel 300 to the rack 30 within the vehicle 10. The delivery vehicle computing entity 810 may then command the conveyor 440 to move the UAV 100 through the transport region 407 to the supply region 408, such that the UAV 100 may be re-supplied with another parcel carrier to perform another delivery or pick-up.

T. Exemplary Recovery Operations

Figure 66:
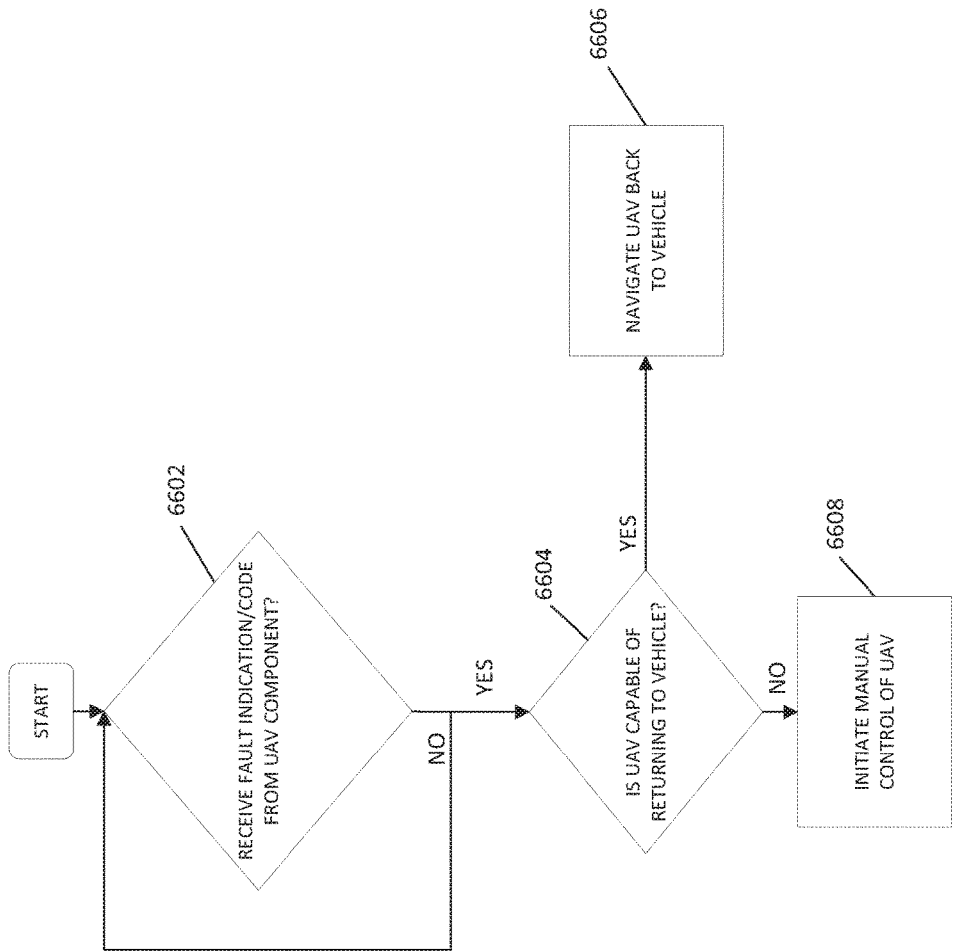
FIG. 66 schematically depicts a flowchart illustrating operations and processes that can be used in accordance with various embodiments shown and described herein.

Referring to FIG. 66, one embodiment of operations for UAV emergency recovery is schematically depicted. As may be understood, components of the UAV 100 may periodically encounter faults. In a first step 6602, if the UAV computing entity 808 does not receive a fault indication from any of the UAV systems or components (such as the propulsion members 102, the power supply 214, etc.), the UAV computing entity 808 remains at step 6602. If the UAV computing entity 808 does receive a fault indication, the UAV computing entity 808 proceeds to step 6604. At step 6604, the UAV computing entity 808 determines if the UAV 100 is capable of returning to the vehicle 10 based on the position of the UAV 100 and the nature of the fault. If the UAV 100 is capable of returning to the vehicle 10, the UAV computing entity 808 commands the UAV to navigate back to the vehicle 10. If the UAV computing entity 808 determines that the UAV 100 is not capable of automatically returning to the vehicle 10, the UAV computing entity 808 proceeds to step 6604. At step 6604, the UAV computing entity 808 communicates with the mobile carrier computing entity 806 and/or the central computing entity 802 to allow manual control of the UAV 100 via the mobile carrier computing entity 806 and/or the central computing entity 802. By allowing manual control of the UAV 100 via the mobile carrier computing entity 806 and/or the central computing entity 802, a user, such as a delivery employee may guide the UAV 100 to an appropriate landing spot such that the UAV 100 may be subsequently retrieved. In some embodiments, when the UAV 100 is manually controlled vial the mobile carrier computing entity 806 and/or the central computing entity 802, a video feed of the route/flight of the UAV 100, such as may be captured by the one or more cameras 168, may be provided for display to the mobile carrier computing entity 806 and/or the central computing entity 802 to allow a user to operate the UAV 100.

In some embodiments, the UAV 100 may optionally include a parachute or other descent control device that may be deployed when the UAV computing entity 808 receives a fault indication. The parachute or descent control device may assist in preventing uncontrolled descent of the UAV 100 if one or more of the UAV components malfunction. In some embodiments, if the UAV computing entity 808 loses contact with the central computing entity 802, the UAV computing entity 808 may navigate the UAV 100 back to a last known coordinate, or a last known location at which the UAV computing entity 808 had established communication with the central computing entity 802, and upon arriving at the last known location, the UAV computing entity 808 may attempt to re-establish contact with the central computing entity 808.

Reference will now be made to the tracking of various UAVs 100 that may utilized in delivery processes. As may be understood, a carrier may utilize multiple UAVs 100 and it may be desirable to maintain records of route/flight information/data of the UAVs 100 to assist in planning preventative maintenance of the UAVs 100, as well as to optimize the utilization and operation of the UAVs 100.

U. Exemplary Information/Data Collection and UAV Servicing

Referring to FIG. 67, one embodiment of data records that may be retained, such as by the central computing entity 802 is schematically depicted. Each UAV 100 utilized by a carrier may have a unique UAV ID, by which each of the UAVs 100 may be identified. Each of the UAV computing entities 808 may record the route/flight time for each route/flight the UAV 100 completes and may transmit these route/flight times to the central computing entity 802. This may include recording the environmental information/data at during flight operations along with the corresponding geo coordinates and various other types of information/data. This type of information/data can be used to provide real time status updates for specific geographic areas. Each of the route/flight times may be compared against a planned route/flight time, which can be based on the position of the UAV 100 at takeoff with respect to the serviceable point 5901 to which the UAV 100 is dispatched. By comparing planned route/flight time with actual route/flight times, route/flight paths along a delivery route may be analyzed and optimized.

The UAV computing entity 808 and/or the central computing entity 802 may record and retain the number of route/flight hours each UAV 100 performs between maintenance intervals, and may record and retain different types of faults experienced by each UAV 100. By retaining performance records of each of the UAVs 100, a carrier may optimize preventative maintenance of the UAVs 100, and may identify repetitive issues or faults of different UAVs 100.

6. CONCLUSION

Many modifications and other embodiments of the inventions set forth herein will come to mind to one skilled in the art to which these inventions pertain having the benefit of the teachings presented in the foregoing descriptions and the associated drawings. For example, various embodiments may be configured to associate a plurality of assets with a particular sort location. In such embodiments, a sort employee may scan a plurality of asset identifiers (e.g., sequentially) before transporting the plurality of items to a sort location. Thereafter, the plurality of assets may be associated with the proximate sort location according to the features and methods described herein. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

7. ADDITIONAL OR ALTERNATIVE EMBODIMENTS

Various embodiments of the present invention are directed to an enhanced parcel delivery system for confirming delivery accuracy and mitigating adverse events associated with parcel delivery. As described in detail herein, the enhanced parcel delivery system may generally comprise any combination of the computer program products, methods, and computing entities previously described (see, e.g., "3. Computer Program Products, Methods, and Computing Entities"), in some embodiments. The enhanced parcel delivery system may generally comprise any combination of the exemplary system architecture previously described (see, e.g., "4. Exemplary System Architecture"), in embodiments. In some embodiment, the enhanced parcel delivery system may generally comprise any combination of the computer program products, methods, and computing entities and the exemplary system architecture previously described. In further embodiments, the enhanced parcel delivery system may include any combination the components, additional features, functionality, and operations previously described (see, e.g., "5. Additional Features, Functionality, and Operations"). The enhanced parcel delivery system is further described hereinafter with regard to performance of exemplary methods.

Figure 68:
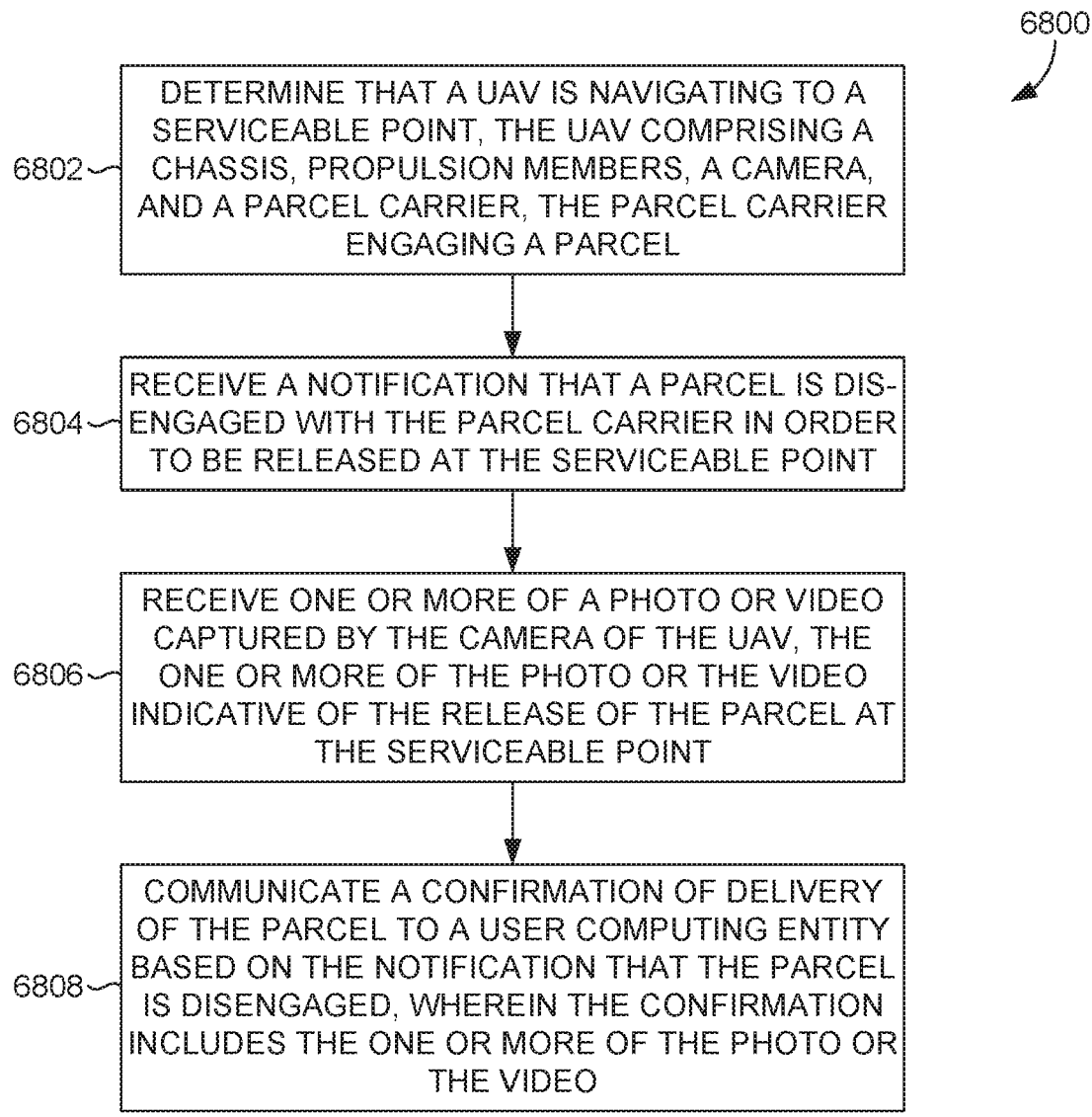
FIG. 68 schematically depicts a flowchart illustrating operations and processes that can be used in accordance with various embodiments shown and described herein.

Turning to FIG. 68, an exemplary method 6800 is provided in accordance with the present invention. The method 6800 may be performed by way of the enhanced parcel delivery system. The method 6800 comprises determining that a UAV is navigating to a serviceable point, as shown at block 6802, wherein the UAV comprises a chassis, propulsion members, a camera (see, e.g., "v. UAV Control System"), and a parcel carrier that is engaging a parcel. For example, the enhanced parcel delivery system may receive GPS information that describes the location of the UAV and may recognize that the UAV is navigating to a serviceable point. Additionally or alternatively, the enhanced parcel delivery system may recognize that the UAV is navigating to a serviceable point based on one or more of a pre-determined serviceable point, a delivery route, a date and time associated with the pre-determined serviceable route, receipt of a confirmation of delivery or pickup at an immediately preceding serviceable point, and/or receipt of a confirmation of delivery or pickup at n number of preceding serviceable point(s). Generally, the term "serviceable point" refers to a location for a parcel pickup or parcel delivery (see, e.g., "C. Pick-Up Points and Delivery Points"). A serviceable point may be defined using one or more of a street address, a storage locker location, a specific parking space, geo-coordinates, and/or the location of the serviceable point may be defined relative to other serviceable points and/or relative to other serviceable points within one or more delivery routes, for example.

At block 6804, the method 6800 comprises receiving a notification that a parcel is dis-engaged with the parcel carrier in order to be released at the serviceable point. For example, the enhanced parcel delivery system may receive a wireless communication from the UAV indicating that the parcel has been delivered by the UAV (see, e.g., "M. Parcel Release Operations at Delivery Point"). The method 6800 further comprises receiving one or more of a photo or video captured by the camera of the UAV, the one or more of the photo or the video indicative of the release of the parcel at the serviceable point, as shown at block 6806. The photo and/or video may be captured concurrently with or subsequent to the notification that the parcel is dis-engaged, in some embodiments. For example, the UAV may record a video of the release of the parcel from the parcel carrier and/or may capture a photo of the parcel as released at the serviceable point (see, e.g., "M. Parcel Release Operations at Delivery Point"). The field-of-view of the photo and/or video captured via the UAV may include the parcel and at least a portion of its surroundings, for example, nearby structures such as a sidewalk, a porch, a house, a door, and/or plants. The field-of-view may be modified, for example, by adjusting the camera in focus, zoom, and/or aperture direction. The camera of the UAV may be adjusted by directing the camera (e.g., lens) to a 45 degree angle towards the parcel, in one example, to capture a field-of-view that comprises the parcel released at the serviceable point. In another example, the camera of the UAV may be adjusted by directing the camera (e.g., lens) to a 90 degree angle towards the parcel released at the serviceable point in order to capture a field-of-view that comprises the parcel and at least a portion of its surroundings (e.g. photo or video may include portions of a home). One or more cameras and one or more various "shooting" angles may be used alone, or in combination, in further embodiments. In one such example, a first camera may be directed at a 45 degree angle towards the parcel to capture a first field-of-view while a second camera may be directed at a 90 degree angle towards the parcel in order to capture a second field-of-view.

In a further embodiment, the photo and/or the video is captured by the camera based on the distance of the UAV from the parcel, and/or another object in the field-of-view such as a door or steps. For example, subsequent to releasing the parcel, the UAV may be navigated away from the parcel. When the location of the UAV is determined to reach a threshold distance from the parcel (e.g., approximately 5 feet up to or about 20 feet), the camera may be triggered to capture a photo and/or video of the parcel and its surrounds. By triggering the camera once the UAV is a number of feet physically away from the parcel, the field-of-view is predicted to include the surroundings of the parcel. In yet a further embodiment, the camera may be triggered to capture a photo and/or a video when structures identified in the current field-of-view of the camera align with structures identified in a reference image of the serviceable point. For example, subsequent to releasing the parcel, the UAV may be navigated away from the parcel while directing the camera at the parcel. Using the current or real-time field-of-view of the camera, structures such as windows and doors within the field-of-view of the camera may be identified and aligned with the same or similar structures identified in a reference image of the serviceable image by adjusting the shooting angle of the camera, the location of the UAV, and/or the altitude of the UAV. In detecting this alignment between the current or real-time field-of-view of the camera and the reference image, the camera may be triggered to capture a photo and/or a video. Using this image analysis alignment, the camera captures delivery images having a consistent or similar field-of-view on each visit to the serviceable point.

At block 6808, the method 6800 comprises communicating a confirmation of delivery of the parcel to a user computing entity based on the notification that the parcel is disengaged, wherein the confirmation includes the one or more of the photo or the video. For example, a UAV may communicate a photo or video of the parcel being released or as released to the enhanced parcel delivery system (see, e.g., "M. Parcel Release Operations at Delivery Point"). In some embodiments, the photo and/or the video are provided to a central computing entity, a parcel carrier computing entity, a delivery vehicle computing entity, and/or a mobile carrier computing entity, each previously discussed, wherein the enhanced parcel delivery system recognizes that the photo and/or the video act as an internal confirmation of delivery of the parcel. Based on the receipt of the photo and/or the video, the enhanced parcel delivery system may generate the confirmation of delivery and send the confirmation to a user computing entity, for example. Additionally or alternatively, when the one or more of a photo or video captured by the camera of the UAV is received by the enhanced parcel delivery system, the enhanced parcel delivery system may use metadata stored in the photo and/or the video to verify that location metadata corresponds to the location of the serviceable point, for example.

Generally, metadata is generated when the photo and/or video are captured and digitally converted into an image. With regard to digital images, metadata provides information in addition to the image data itself, such that the additional data travels with the image data. The metadata may include location data, address data, unique identifiers, file type, data type, file size, data quality, a source of the data, a caption, a tag, a date and time of creation, one or more properties, a name, a color depth, an image resolution, an image size, and the like. The metadata may include descriptive metadata, structural metadata, administrative metadata, reference metadata, statistical metadata, and/or rights metadata. The metadata may conform to the International Press Telecommunications Council (IPTC) Standards for photos and/or video, in some embodiments.

In further embodiments, the methods described hereinafter with regard to image (photo or video) matching may be employed by the enhanced parcel system when determining whether to generate and communicate a delivery confirmation as well. For example, the one or more of the photo and/or video may be verified by identifying elements (e.g., shapes, colors, sizes of elements within the image relative to one another, spacing of elements within the image relative to one another, angles), structures (e.g., roof, porch, stoop, door, window, stairs, fence, wrought iron, window shutters), textures (e.g., concrete, brick, natural stone, siding, tiles), and/or alphanumeric characters (e.g., house numbers, mailbox numbers, "Welcome" doormat, sequence of alphanumeric characters) within the photo and/or video data and matching the element, structures, textures, and and/or alphanumeric characters to one or more reference images stored in a database, wherein the one or more reference images are associated or linked to the serviceable point at issue, and/or are associated or linked to a geographic (e.g., GPS) location used to define the target serviceable point. As discussed hereinafter, the photo and/or video may be uploaded, from the UAV when captured via the UAV or from a mobile device, for example, to the carrier computing entity for reference in subsequent visits to the same serviceable point. As such, the photo and/or video may be used by UAV or user as a reference image for a specific serviceable point, as discussed later.

In embodiments, communicating a confirmation of delivery of the parcel to a user computing entity comprises communicating the confirmation to an account associated with a user, wherein a user accesses the account to view (e.g., a text or email message) or listen (e.g., a voicemail) to the confirmation via the user computing entity (see, e.g., "B. User Profiles"). Exemplary accounts include an email account, a social media account, a user account associated with the parcel carrier, a user account associated with the mobile carrier, and/or a user account associated with the sender of the parcel. In another embodiment, the confirmation of delivery of the parcel is communicated to the user computing entity, wherein the user computing entity is a mobile device such as a cell phone, laptop, tablet, a "smart" wearable device (e.g., a watch or fitness tracking device), or personal computing device, for example. In yet another embodiment, the confirmation of delivery of the parcel in communicated to the user computing entity, wherein the user computing entity is an electronic doorbell (e.g., Skybell™, Ring™) and/or an electronic home-control system (e.g., Ecobee™, Nest™, Alexa™)

In some embodiments, the method 6800 provides for receiving optional user input or optional user responses to the confirmation of delivery of the parcel to the user computing entity based on the notification that the parcel is disengaged. For example, the confirmation may include optional user-selectable options or user-activated actions that may be input via the user computing device in order for the user to notify the enhanced parcel delivery system of accurate, complete, inaccurate, or incomplete pickup of a parcel or delivery of a parcel. In this way, a user may view the photo and/or the video of the pickup or delivery and notify the enhanced parcel carrier in the event there is a misdelivery, for example. The confirmation of delivery of the parcel may include at least one optional user-selectable prompt to be displayed at the user computing entity, wherein the at least one optional user-selectable prompt requests a user confirmation of accuracy of the delivery of the parcel, in one embodiment. In an embodiment, user selection of the at least one optional user-selectable prompt at the user computer entity initiates communication of the notification reporting the adverse delivery event. In some embodiments, the optional user input may be received via an account associated with a user (see, e.g., "B. User Profiles").

In one such embodiment, the method 6800 comprises receiving a notification from the user computing entity, the notification reporting an adverse delivery event. For example, the notification may include user input in response to the confirmation, wherein the user input indicates that there is an adverse delivery event. The notification, the user input, or additional user input, may further identify the specific type of adverse delivery event. In one example, the user input may be a selection of a hyperlink within the confirmation that was previously communicated, wherein the hyperlink is selectable to indicate a problem with the delivery (e.g., adverse delivery event). In further embodiments, in response to receiving the notification, a return merchandise authorization (RMA) may be automatically requested and/or generated by the enhanced parcel delivery system. Said RMA may be accessible by a user through a corresponding account, in such an embodiment.

The notification reporting the adverse delivery event may be received by the enhanced parcel delivery system, and further, be routed to one or more mobile devices associated with delivery personnel, a UAV computing entity, a delivery vehicle computing entity, and/or a mobile carrier computing entity. In some embodiments, the adverse delivery event is one or more of an incorrect serviceable point, an incorrect micro-location of the serviceable point, an incorrect delivery date, an incorrect delivery time window, an incorrect parcel (e.g., consignee is not expecting a parcel), or an incorrect consignee. As used herein, a micro-location refers to a specific localized physical area within the serviceable point for which placement of the parcel is desired or expected, for example, such as placement on a porch, placement under a protective overhead structure such as a portico, placement within an enclosure such as a "screened-in" porch, theft prevention placement such as behind vegetation or at a door in the rear of a house, and the like.

Alternatively, the notification reporting an adverse delivery event may be received from another computing entity based on said computing entity's automatic (i.e., without user input being required) determination that the one or more of the photo and/or the video provides an indication of an adverse delivery event. The adverse event may be one or more of an incorrect serviceable point, an incorrect micro-location of the serviceable point, an incorrect delivery date, an incorrect delivery time window, an incorrect parcel, or an incorrect consignee (e.g., user is no expecting a parcel, user is not expecting a parcel from the particular carrier, or user is not expecting a parcel from the particular vendor indicated on packaging of parcel). Based on the confirmation of delivery of the parcel being sent to a user computing entity (e.g., a user computing entity at serviceable point, such as an electronic doorbell (e.g., Skybell™, Ring™), an electronic home-control system (e.g., Ecobee™, Nest™, Alexa™), a personal computer, a mobile phone), the user computing entity itself may recognize an adverse delivery event when the photo and/or video in the confirmation does not match or align with a reference image stored or accessed by the user computing entity. In one example, the confirmation is communicated to a personal computer associated with the serviceable point, the user computing entity by connecting the UAV to the personal computer through a local wireless network, near field communication (e.g., Bluetooth™) peer-to-peer connection, or the like.

In one embodiment, the method 6800 recognizes a default mitigation action to be initiated for the adverse delivery event. For example, a default mitigation action may include providing electronic instructions to a reverse logistics provider to instruct the reverse logistics provider to collect and deliver the parcel associated with adverse delivery event to an unattended delivery station (e.g., a locker configured to receive and securely store parcels). Additionally or alternatively, the method 6800 comprises identifying a type of adverse event specified in the notification reporting the adverse delivery event. In one such instance, the method 6800 recognizes a mitigation action that is specific to the type of adverse event identified for the reported adverse delivery event. For example, the recognized mitigation action may include scheduling (re)delivery of the item to a micro-location at the serviceable point or scheduling a subsequent delivery of the parcel to another serviceable point. The method 6800 may then initiate the recognized mitigation action for the reported adverse delivery event, for example, in an embodiment. In further embodiments, the method 6800 determines a new delivery time on the same date as the original delivery associated with the adverse event and communicates the new delivery time to the user computing entity. In another embodiment, the method 6800 determines a new time on a new date for subsequently performing the mitigation action, for example, that include (re)delivering the parcel to cure the adverse event and communicates the new date and time to the user computing entity.

In one example, the recognized mitigation action includes retrieving the parcel from the serviceable point using the UAV. In such an example, the method 6800 determines that a UAV is navigating to the serviceable point. For example, the UAV is piloted to return to the serviceable point where the parcel was released prior to the notification of the adverse delivery event in order to physically retrieve the parcel. The method 6800 may then comprises receiving a notification that the previously-released parcel is engaged with the parcel carrier of said UAV. For example, the UAV has returned to the serviceable point and is or has picked-up the parcel (see, e.g., "N. Parcel Pick-Up Operations at Pick-Up Point"). The method 6800 may further comprise determining that a UAV is navigating from the serviceable point to a UAV support mechanism, as previously described. For example, the UAV is piloted to return to a delivery vehicle as the UAV has completed the physical retrieval of the parcel from the serviceable point.

In embodiments, based on receiving the notification reporting an adverse delivery event, the method 6800 comprises determining a time period that elapsed between receipt of the notification that the parcel was dis-engaged with the parcel carrier and receipt of the notification reporting the adverse delivery event. In such an embodiment, when the time period that elapsed is under a predefined threshold, the method 6800 initiates a mitigation action that includes retrieving the parcel from the serviceable point using the UAV. For example, when the time period that elapsed is under a predefined threshold, the enhanced parcel delivery system predicts or anticipates that the UAV used to deliver the parcel is still within a particular distance of the serviceable point. In some instances, the enhanced parcel delivery system may consider the historical traveling speed of the UAV, a current speed of the UAV, an average speed of the UAV, or near real-time speed information of the UAV. As such, because it is predicted by the enhanced parcel system that the UAV used to deliver the parcel is still within a particular distance of the serviceable point, the UAV may be re-routed to retrieve the parcel from the serviceable point with time and distance efficiency (e.g., traveling short distances requires less power usage of the UAV than traveling longer distances).

In embodiments, based on receiving the notification reporting an adverse delivery event, the method 6800 may determining a distance measured from the serviceable point to a current location of the UAV. When the distance is within a predefined distance threshold, the method 6800 comprises initiating a mitigation action that includes retrieving the parcel from the serviceable point using the same UAV that performed delivery of the parcel, for example. However, when the distance meets or exceeds the predefined distance threshold, for example, the method 6800 may initiate a mitigation action that includes determining a future date and/or time when a delivery vehicle (e.g., automobile, automated vehicle vehicle), the UAV that performed delivery of the parcel, or another UAV is predicted to be within the predefined distance threshold of the serviceable point. In such an example, the method 6800 may use the future date and time when the delivery vehicle, the UAV, or another UAV is predicted to be within the predefined distance threshold of the serviceable point to schedule retrieval of the parcel from the serviceable point via the delivery vehicle, the UAV, or the another UAV. The predefined distance threshold may correspond to previously-discussed geofences (see, e.g., "E. Geofence-Based Load and Takeoff Operations"). As such, when a future date and time when the delivery vehicle, the UAV, or another UAV is predicted to be within the predefined distance threshold of the serviceable point, the method 6800 comprises scheduling retrieval of the parcel. Subsequently, the parcel is retrieved by the delivery vehicle, the UAV, or another UAV that was predicted to be within the predefined distance threshold of the serviceable point based on the future date and time determined.

Figure 69:
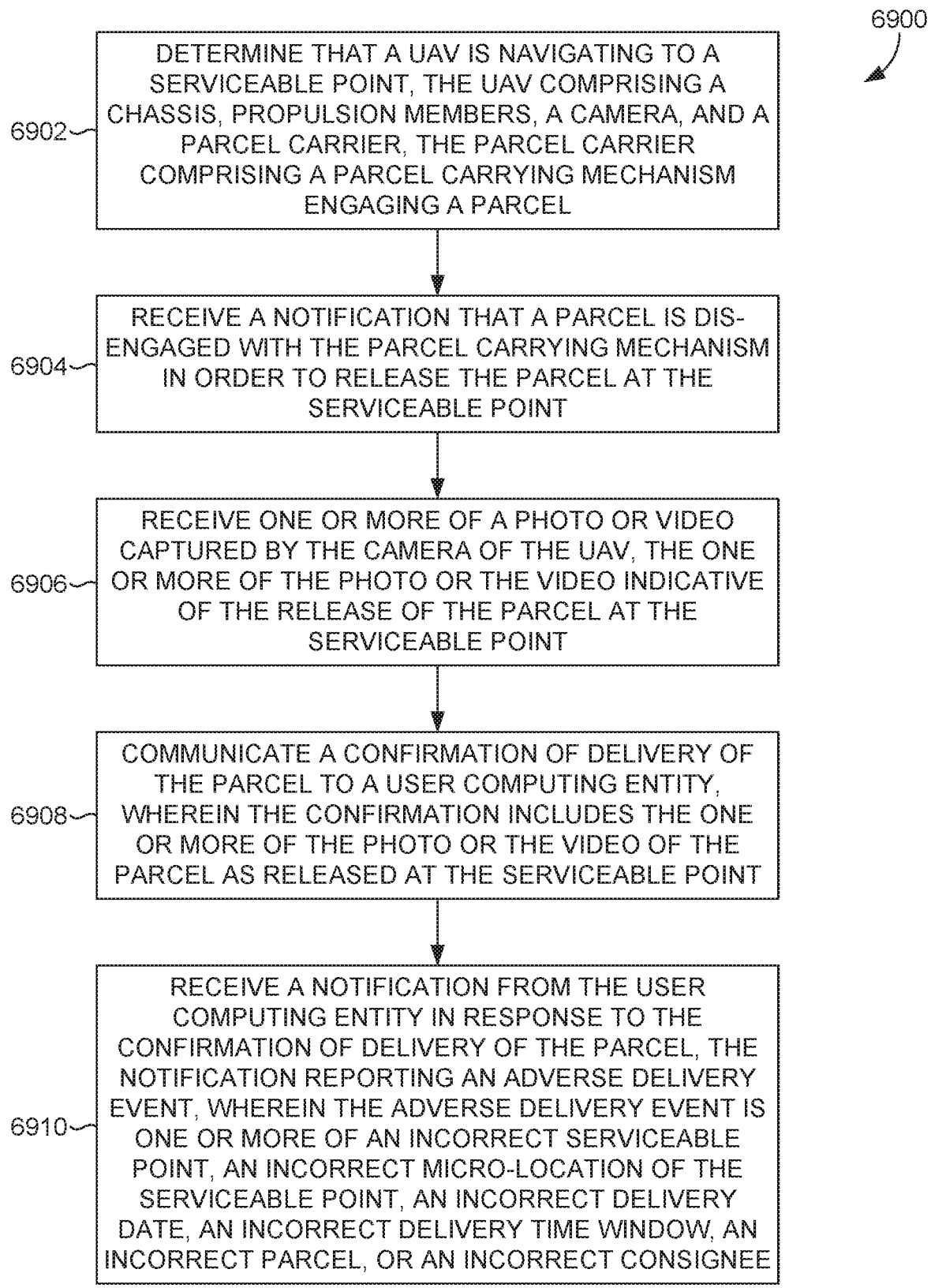
FIG. 69 schematically depicts a flowchart illustrating operations and processes that can be used in accordance with various embodiments shown and described herein.

FIG. 69 provides an exemplary method 6900 in accordance with the present invention. The method 6900 may be performed by way of the enhanced parcel delivery system. In an embodiment, the method 6900 comprises determining that a UAV is navigating to a serviceable point, shown at block 6902, wherein the UAV comprises a chassis, propulsion members, a camera, and a parcel carrier, and wherein the parcel carrier comprises a parcel carrying mechanism that is engaging a parcel. As used in this context, "engage" refers to physically interacting with the parcel such that when a parcel is engaged, the UAV is able to physically hold and physically transport the parcel. For example, the UAV is currently loaded, and is securely holding the parcel as engaged by the parcel carrying mechanism of the UAV's parcel carrier (see, e.g., previously-described "iii. Engagement of the UAV & Parcel Carrier," "iv. Engagement of the Parcel Carrier with a Parcel," and "H. Parcel Engagement Operations"). At block 6904, the method 6900 comprises receiving a notification that a parcel is dis-engaged with the parcel carrying mechanism in order to release the parcel at the serviceable point. As used in this context, "dis-engage" refers to reducing or withdrawing from physical interaction with the parcel such that when a parcel is dis-engaged, the UAV is not physically holding and/or is not physically transporting the parcel (see, e.g., "M. Parcel Release Operations at Delivery Point). The method 6900 further comprises, as shown at block 6906, receiving one or more of a photo or video captured by the camera of the UAV, the one or more of the photo or the video indicative of the release of the parcel at the serviceable point. The photo and/or video may be received and captured as discussed in prior method(s). At block 6908, the method 6900 comprises communicating a confirmation of delivery of the parcel to a user computing entity, wherein the confirmation includes the one or more of the photo or the video of the parcel as released at the serviceable point. The confirmation may be generated and communicated as discussed in prior method(s).

Then, at block 6910, the method 6900 comprises receiving a notification from the user computing entity in response to the confirmation of delivery of the parcel, the notification reporting an adverse delivery event, wherein the adverse delivery event is one or more of an incorrect serviceable point, an incorrect micro-location of the serviceable point, an incorrect delivery date, an incorrect delivery time window, an incorrect parcel, or an incorrect consignee. The notification may be generated and communicated as discussed in prior method(s). In one embodiment, the notification from the user computing entity reporting the adverse delivery event for the parcel further comprises a user input instruction, wherein the user input instruction provides a request for placement of the parcel at a micro-location of the serviceable point. In embodiments wherein a notification reporting an adverse delivery event is received, method 6900 further comprises determining a time period that elapsed between receipt of the notification that the parcel was dis-engaged with the parcel carrying mechanism and receipt of the notification reporting the adverse delivery event. In such an embodiment, when the time period that elapsed is under a predefined threshold, the method 6900 initiates a mitigation action that includes retrieving the parcel from the serviceable point using the UAV, for example. However, when the time period that elapsed meets or exceeds the predefined threshold, the method 6900 may initiate a mitigation action that includes scheduling retrieval of the parcel from the serviceable point at a future date and time. The scheduling of parcel retrieval and scheduling of mitigation actions may be performed as discussed in prior method(s).

Based on the notification reporting an adverse delivery event, the method 6900 may further comprise receiving user input from the user computing entity that specifies a new serviceable point for subsequent delivery of the parcel. In some instances, the user input that specifies a new serviceable point may be received concurrently with, or as a portion of the notification reporting the adverse delivery event. Alternatively, the user input that specifies a new serviceable point may be received subsequent to the notification reporting an adverse delivery event. In an instance where a new serviceable point is specified to otherwise identified, the method 6900 may determine to retrieve the parcel from the serviceable point. Then, for example, the method 6900 may receive a notification from the UAV that indicates the parcel is engaged with the parcel carrier, in embodiment. As such, the UAV has taken physical possession of the parcel and may subsequently transport the parcel to the new serviceable point, for example. In such an embodiment, the method 6900 comprises determining that the UAV is navigating to the new serviceable point. The method 6900 further comprises receiving a notification that the parcel is dis-engaged with the parcel carrying mechanism of the UAV in order to release the parcel at the new serviceable point. In yet further embodiments, the method 6900 comprises receiving one or more of a new photo or new video captured by the camera of the UAV, the one or more of the new photo or the new video indicative of the release of the parcel at the new serviceable point. For example, the UAV computing entity records the pick-up of the parcel via the camera such that the UAV computing entity may communicate video, still photo, and/or a live video feed of the parcel being picked up at the serviceable point (see, e.g., "N. Parcel Pick-Up Operations at Pick-Up Point"). In one such embodiment, the method 6900 communicates a confirmation of delivery of the parcel at the new serviceable point to the user computing entity, wherein the confirmation includes the one or more of the new photo or the new video of the parcel as released at the new serviceable point, for example.

Figure 70:
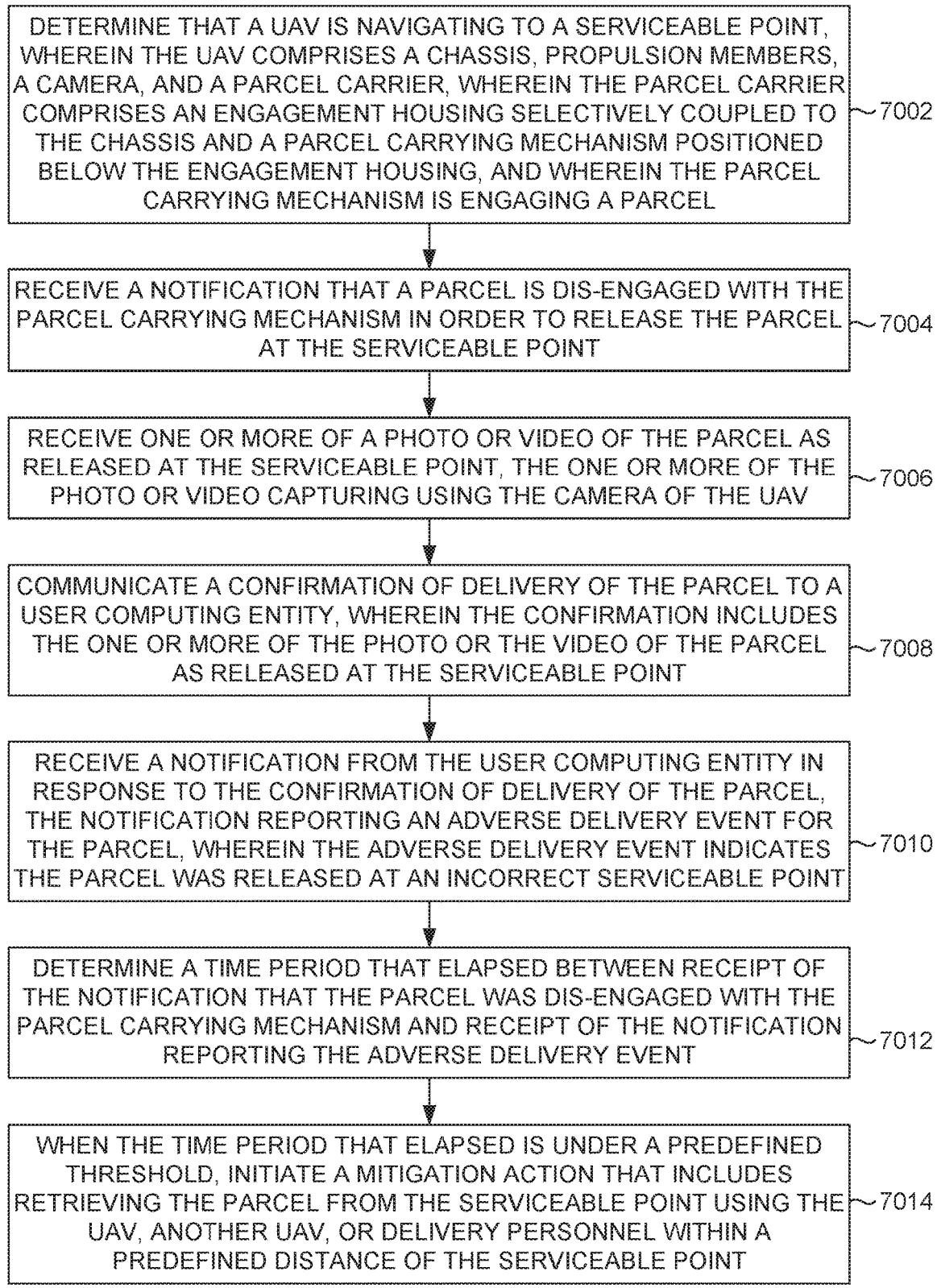
FIG. 70 schematically depicts a flowchart illustrating operations and processes that can be used in accordance with various embodiments shown and described herein.

FIG. 70 provides an exemplary method 7000 in accordance with the present invention. The method 7000 may be performed by way of the enhanced parcel delivery system. Some or all of the following aspects of the method 700 may be performed as previously described above, and as such, those aspects are not further described below for brevity. In embodiments, the method 7000 comprises determining that a UAV is navigating to a serviceable point, wherein the UAV comprising a chassis, propulsion members, a camera, and a parcel carrier, wherein the parcel carrier comprises an engagement housing selectively coupled to the chassis and a parcel carrying mechanism positioned below the engagement housing, and wherein the parcel carrying mechanism is engaging a parcel, as shown at block 7002.

At block 7004, the method 7000 comprises receiving a notification that a parcel is dis-engaged with the parcel carrying mechanism in order to release the parcel at the serviceable point. The method 7000 continues at block 7006 by receiving one or more of a photo or video of the parcel as released at the serviceable point, the one or more of the photo or video captured using the camera of the UAV. The method 7000 further comprises communicating a confirmation of delivery of the parcel to a user computing entity, wherein the confirmation includes the one or more of the photo or the video of the parcel as released at the serviceable point, shown at block 7008. In accordance with embodiments, the method 7000 comprises receiving a notification from the user computing entity in response to the confirmation of delivery of the parcel, the notification reporting an adverse delivery event for the parcel, wherein the adverse delivery event indicates the parcel was released at an incorrect serviceable point, depicted at block 7010. And at block 7012, the method 7000 comprises determining a time period that has elapsed between receipt of the notification that the parcel was dis-engaged with the parcel carrying mechanism and receipt of the notification reporting the adverse delivery event.

As shown at block 7014, when the time period that elapsed is under a predefined threshold, the method 7000 further comprises initiating a mitigation action that includes retrieving the parcel from the serviceable point using the UAV, another UAV, a delivery vehicle, or delivery personnel within a predefined distance of the serviceable point. However, when the time period that elapsed meets or exceeds the predefined threshold, the method 7000 may initiate a mitigation action that includes scheduling a subsequent delivery of the parcel to another serviceable point, for example, after retrieval of the delivered parcel. In some instances, when the time period that elapsed meets or exceeds the predefined threshold, the method 700 initiates a mitigation action that is retrieved from an account associated with the parcel. For example, the enhanced parcel delivery system may identify an account associated with the parcel and/or a consignee and retrieve, from said account, user preferences as to which or what mitigation actions should be implemented for an adverse delivery event.

Additionally or alternatively, embodiments of the invention using one or more of the previously-described methods may be combined with pre-delivery methods previously described, and the additional methods described hereinafter.

Figure 71:
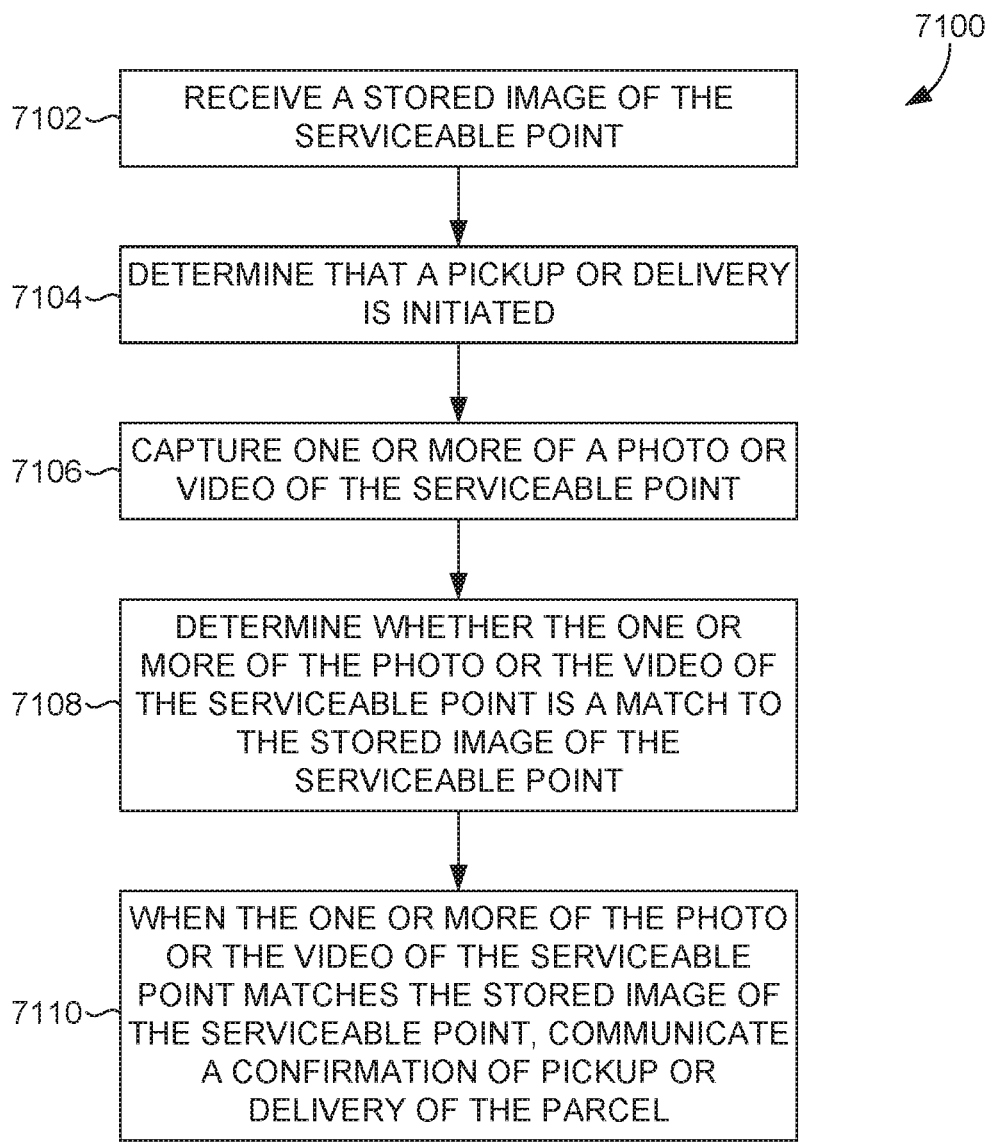
FIG. 71 schematically depicts a flowchart illustrating operations and processes that can be used in accordance with various embodiments shown and described herein.

FIG. 71 provides an exemplary method 7100 in accordance with the present invention. The method 7100 may be performed by way of the enhanced parcel delivery system. At block 7102, the method 7100 comprises receiving a stored image of the serviceable point. In some embodiments, the stored image of the serviceable point comprises a micro-location at the serviceable point. The micro-location of the serviceable point depicted in the stored image visually indicates the micro-location where a parcel is to be retrieved from at the serviceable point, in some instances. Additionally or alternatively, the micro-location of the serviceable point depicted in the stored image visually indicates the micro-location where a parcel is to be delivered to at the serviceable point, in some instances. As used herein, a micro-location refers to a specific localized physical area within the serviceable point for which placement of the parcel is desired or expected, for example, such as placement on a porch, placement under a protective overhead structure such as a portico, placement within an enclosure such as a "screened-in" porch, theft prevention placement such as behind vegetation flanking a front door or at a door in the rear of the house, and the like.

In some embodiments, the stored image of the serviceable point includes a user-input annotation. For example, the stored image may include a user-input annotation comprising a circle drawn around a micro-location of the serviceable point within the image, in order to indicate the user desires pickup from or delivery to the micro-location indicated visually by the circle. In some embodiments, an account of a user may store an image with an annotation that is specific to delivery of a parcel and may store the same image with a different annotation that is specific to pickup of a parcel. In one embodiments, an account of a user may store an image with an annotation that is specific to delivery of a parcel and may store a different image with another annotation that is specific to pickup of a parcel. Annotations may include shapes, lines, words, arrows, numbers, letters, words, symbols, animations, and other user inputs that may be electronically "drawn" onto an image of the serviceable point, for example. In one example, the stored image may include a user-input annotation comprising an "X" drawn over a micro-location of the serviceable point (e.g., drawn over only a portion of the image) within the image, in order to indicate the user does not desire that parcels be delivered to that micro-location indicated visually by the "X" (e.g., an X crosses out an area having high street visibility at the serviceable point that is or may be prone to "porch piracy" and theft). The user annotated image may be stored in a user's account with a parcel carrier, for example.

Accordingly, the stored image may be received, for example, from an account associated with a particular parcel, a particular user or consignee, and/or a particular user computing entity. One exemplary account is a My Choice™ customer account. The stored image may have been captured during a previous pickup or delivery, or the stored image may have been captured and uploaded by a user to the account. For example, a customer may capture one or more photos and/or one or more videos of the serviceable point and any microlocation(s) using a user device, upload the photo(s) and/or video(s) to their specific My Choice™ customer account, digitally annotate the photo(s) and/or video(s) by "drawing" on the image(s) to indicate one or more microlocations where parcel pickup and/or parcel delivery are desired (i.e., annotations may be input either before or after upload), and then the annotated images(s) are stored in User Preferences in their specific My Choice™ customer account. The user may further provide an expiration date for a user-provided image, in one embodiment. For example, the user may input a specific day, month, and/or year for which the image is considered "expired," as being out of date or having reduced accuracy. As such, the method 7100 may comprise storing the image of the serviceable point in association with an account corresponding to the user computing entity, such that the image may be subsequently provided for any number of parcel pickups and deliveries involving the serviceable point. The stored image may be stored in an account corresponding to the user computing entity, wherein the account is stored by the centralized computing entity and/or by the parcel carrier computing entity. Generally, the stored image may be stored in the "cloud," in memory of the centralized computing entity, the parcel carrier computing entity, the vehicle computing entity, the user computing entity, the UAV computing entity, and/or the mobile carrier computing entity, in embodiments. The stored image may be received by the delivery vehicle computing entity, for example, and routed to the vehicle computing entity, the UAV computing entity, a user computing entity, and/or mobile carrier computing entity, in an embodiment. The stored image may be received by the vehicle computing entity, user computing entity, and/or the mobile carrier computing entity through the centralized computing entity, the parcel carrier computing entity, and/or the mobile carrier computing entity, in an embodiment. The stored image may be received by the UAV computing entity, for example, through the centralized computing entity, the parcel carrier computing entity, and/or the mobile carrier computing entity, in another embodiment. The vehicle computing entity, the UAV computing entity, the user computing entity, and/or the mobile carrier computing entity may receive the stored image based on the stored image being linked to an address specified as a serviceable point within a particular delivery route in advance of performance of the delivery route, for example. In another example, the vehicle computing entity, the UAV computing entity, the user computing entity and/or the mobile carrier computing entity may receive the stored image based on the stored image being linked to an address specified as a serviceable point within a particular delivery route that is being performed and which is currently underway, for example. In some embodiments, the stored image is communicated by the enhanced parcel delivery system from user preferences stored in a My Choice™ customer account, when a parcel to be picked up or delivery is associated with the My Choice™ customer account, an address associated with the My Choice™ customer account, and/or a user identifier associated with the My Choice™ customer account.

The method 7100 comprises determining that a pickup or delivery is initiated, as shown at block 7104. In some embodiments, determining that a pickup or delivery is initiated comprises a determination that delivery personnel is arriving or has arrived at the serviceable point, that a delivery vehicle is arriving or has arrived at the serviceable point, or that a UAV is arriving or has arrived at the serviceable point. The determination of initiation may be based on geolocation information, time and date information, an existing delivery route, and/or delivery personnel input. In some instances, determining that a pickup or delivery is initiated comprises recognizing when the current geolocation of a delivery vehicle, a mobile device (e.g., user computing entity or mobile carrier computing entity), or a UAV, for example, is approaching, aligns with, or matches geolocation information stored as metadata in the stored image that was received. In some embodiments, the stored image is received in response to the determination that pickup or delivery is initiated. In another embodiment, the stored image is received by the vehicle computing entity, the UAV computing entity, the user computing entity, and/or the mobile carrier computing entity when the current location of the vehicle, a mobile device, or the UAV are within a predefined distance threshold of a serviceable point that is associated with and/or is depicted in the stored image. As such, the stored image may be received at or very close in time to the pickup or delivery.

Additionally or alternatively, determining that a pickup or delivery is initiated comprises determining that an electronic authentication or "handshake" is successful between the vehicle computing entity, the user computing entity, and/or the mobile carrier computing entity and a user computing device at the serviceable location, or between a UAV and a user computing device at the serviceable location. For example, the vehicle computing entity, the user computing entity, and/or the mobile carrier computing entity may wirelessly transmit an authentication request to an electronic doorbell or home security system, for example, at the serviceable point. The authentication request is an inquiry that, when received by the electronic doorbell or home security system, may trigger the electronic doorbell or home security system to transmit a response back to the vehicle computing entity, the UAV computing entity, the user computing entity, and/or the mobile carrier computing entity that verifies (or does not verify) the street address of the serviceable point, in one example. In other examples, the response may verify that the serviceable point is linked to a specific consignee of the parcel, may verify that a unique identifier that is linked to the parcel being delivered or picked up is recognized by the electronic doorbell or home security system, or otherwise confirm that the parcel pickup or delivery is accurate and/or that the parcel is being delivered to an accurate serviceable location. Additionally or alternatively, the authentication request is an inquiry that, when received by an electronic locking mechanism, may trigger the electronic locking mechanism to verify the parcel pickup or delivery, and then unlock or unsecure a point of entry, for example, allowing delivery personnel and/or the UAV access to an interior or secured location at the serviceable point for parcel pickup or parcel delivery. The authentication request may include a security access code, which may be reusable or limited to a single use to gaining access to the secured location, for example.

The method 7100 further comprises capturing one or more of a photo or video of the serviceable point, as depicted at block 7106. In some embodiments, the one or more of the photo or the video of the serviceable point is captured by a camera of a UAV or a camera of a mobile device (e.g., user computing entity, mobile carrier computing entity). Additionally or alternatively, the one or more of the photo or the video captured may visually depict that the parcel has been delivered at a micro-location of the serviceable point, as was visually depicted in the stored image, in some embodiments. In some instances, metadata of the stored image may be used to determine a distance and/or a vantage point from which the one or more of a photo or video of the serviceable point should be captured via a mobile device or a UAV. For example, a mobile device may issue a series of audible sounds that increase in frequency and/or pitch as the current geolocation information of the mobile device approaches a geolocation stored as metadata in the stored image (e.g., the mobile device within a delivery vehicle increases frequency of sound issuances as the delivery vehicle is navigating nearer and nearer to the next serviceable point). In another example, a UAV may be piloted to align the current geolocation information of the UAV with the geolocation information stored as metadata in the stored image, and then, the UAV may capture the one or more of the photo or the video from that geolocation.

At block 7108, the method 7100 continues by determining whether the one or more of the photo or the video of the serviceable point is a match to the stored image of the serviceable point. In an embodiment, the enhanced parcel delivery system, a mobile device, or a UAV determine whether the one or more of the photo or video capturing the released parcel at a microlocation, for example, matches a microlocation indicated by annotation(s) in the stored image. In embodiments, the stored image is a reference image. Generally, the stored reference image(s) is/are associated or linked to the target serviceable point as stored in a database, and/or are associated or linked to a geographic (e.g., longitude and latitude, GPS) location used to define the target serviceable point. The stored reference image(s) may have been previously captured on a prior pickup or delivery to the serviceable point and stored in the database with metadata that include the GPS location data concurrently captured with the stored reference image(s). Additionally or alternatively, in instances wherein there are multiple stored images associated with one serviceable point, the multiple images may be aggregated and/or otherwise combined to create a composite image that serves as a reference image of the serviceable point. Generating and storing one composite image for each serviceable point instead of storing multiple images for each serviceable point, for example, reduces memory usage in the database and improves resource allocation in the database. A composite image may be generated from one or more images captured by a UAV and/or a mobile device.

The one or more of the photo and/or video may be matched by identifying, within the image data of the photo and/or video, elements (e.g., shapes, colors, sizes of elements within the image relative to one another, spacing of elements within the image relative to one another, angles), structures (e.g., roof, porch, stoop, door, window, stairs, fence, wrought iron, window shutters), textures (e.g., concrete, brick, natural stone, siding, tiles), and/or alphanumeric characters (e.g., house numbers, mailbox numbers, a sequence of alphanumeric characters such as an address number or a "Welcome" doormat). Then, the method 7100 may be determine whether the elements, structures, textures, and and/or alphanumeric characters may be identified or recognized within the stored reference image(s) and/or a stored composite image. For example, the method 7100 may recognize the outlines, shapes, and/or colors of a house structure and each subcomponent of that house structure, such as a front door, a roof, windows, an attached garage, a garage door, a light fixture over the front door. It will be understood that the discussion of a house and apartment building are merely examples and are not limiting in any way, as the serviceable point may include a townhome, a recreational vehicle, a trailer home, a retail storefront, a hotel, or any building structure. The method 7100 may identify the relative locations of the house subcomponents relative to one another. Then, the method 7100 may determine whether the stored image associated with the serviceable point includes the same or similar outlines, shapes, and/or colors of a house structure and each subcomponent of that house structure. Three-dimensional modeling or virtual reality modeling may be used during matching in order to correct and/or account for differences in a distance and/or a vantage point of the captured one or more photos and/or video relative to the distance and vantage point of the stored image(s) being matched.

Additionally or alternatively, metadata of the one or more photo or video may be matched to metadata that is associated with and stored with the stored image in the database. Metadata matching or metadata alignment may be used alone, or may be used to verify the outcome of the image matching, in various embodiments. For example, when the geolocation information stored as metadata of the one or more photo or video is at or within a predefined distance threshold or tolerance threshold of the geolocation information stored as metadata of the stored image, the metadata may be determined to be aligned or matched. Additionally or alternatively, a mobile device or UAV at the serviceable point for pickup or delivery may wirelessly connect with a local device at the serviceable point. In one embodiment, the connection may be used to verify that the mobile device or UAV is located at the appropriate or desired serviceable point. In some embodiments, the connection may be used to verify the outcome of the image matching and/or to verify the outcome of metadata matching.

Additionally or alternatively, a convoluted neural network may be leveraged to account for changes to the appearance of the serviceable point, for example, when determining whether the captured photo and/or video are a match to a stored image. For example, regarding a serviceable point, the colors of exterior paint color a house or apartment building, the colors of architectural features of a house or apartment building (e.g., shutters, front door, roof shingles, trim), and/or the colors of landscaping features at the serviceable point (e.g., lack of foliage in winter, autumn leaf color changes, spring flowering) may be changed from time to time, or from season to season. Further, regarding a serviceable point, the colors of a house or apartment building, architectural features, and/or landscaping features may appear to be visually different depending on lighting changes or lighting fluctuations resulting from weather conditions (e.g., sunny conditions, overcast or cloudy conditions, stormy and rainy conditions, foggy conditions), time of day or night, and seasons (e.g., time of sunrise and sunset being affected by seasonality). Even further, regarding a serviceable point, the appearance of the house or apartment building may fluctuate and/or be obscured by the addition of a mailbox, the addition or removal of fencing, and/or holiday decorations, for example.

As such, using one or more of the various characteristics described above, the enhanced parcel delivery system, a mobile device, or a UAV determine whether the one or more of the photo or video capturing the released parcel at a microlocation, for example, matches a microlocation indicated by annotation(s) in the stored image. When the one or more of the photo or the video of the serviceable point matches the stored image of the serviceable point does not match the stored image, the method 7100 may comprise communicating a validation request to a user computing entity, wherein the validation request includes the one or more of the photo or the video of the serviceable point and a prompt requesting the user to confirm the accuracy or inaccuracy of the one or more of the photo or the video of the serviceable point. In one example, the validation provides a user of the user computing entity the capability of confirming that the photo or the video of the serviceable point is an accurate delivery point. For example, the user may visually review the one or more of the photo or the video captured (e.g., via the user computing entity and/or an account) and confirm that the photo or the video is an accurate photo or video of the serviceable point for the pickup or delivery. In another example, the validation request provides delivery personnel, via a vehicle computing entity and/or a mobile device, the capability of confirming that the photo or the video of the serviceable point is an accurate delivery point and thus override a computer-based determination that the photo or the video of the serviceable point does not match the stored image. To illustrate, a delivery driver is generally able to recognize a match even when a house or landscaping has been remodeled or seasonal decorations added. In such an example, the delivery personnel-provided override of a computer-based determination that the photo or the video of the serviceable point does not match the stored image is communicated to a centralized computing entity as feedback, wherein the centralized computing entity may store and use the photo or the video as a reference image for subsequent visits to the serviceable point.

When the one or more of the photo or the video of the serviceable point matches the stored image of the serviceable point, the method 7100 may link the one or more of the photo or the video to an address associated with the serviceable point and/or geolocation information associated with the serviceable point in the database. The method 7100 may store the one or more of the photo or the video, as linked, in the database. As such, the stored image in the database may be updated, for example, with each visit to the serviceable point. In some instances, the one or more of the photo or video may be combined or aggregated into a stored composite image that is associated with an address of the serviceable point and/or geolocation information of the serviceable point in the database. Thus, a composite reference image stored in the database may be updated with each visit to the serviceable point, for example.

When the one or more of the photo or the video of the serviceable point matches the stored image of the serviceable point, the method 7100 comprises communicating a confirmation of pickup or delivery of the parcel, as shown at block 7110. In an embodiment, the confirmation of pickup or delivery of the parcel includes the one or more of the photo or the video of the serviceable point. In some instances, for example, when the one or more of the photo or the video of the serviceable point is captured using a camera of the mobile device, the confirmation of pickup or delivery of the parcel includes the one or more of the photo or the video captured at the serviceable point. In another instances, for example, when one or more of the photo or the video of the serviceable point is captured using a camera of a UAV, the confirmation of pickup or delivery of the parcel includes the one or more of the photo or the video captured at the serviceable point.

In further embodiments, the method 7100 comprises receiving a notification from the user computing entity in response to the confirmation of pickup or delivery, the notification reporting an adverse delivery event. The adverse delivery event is one or more of an incorrect serviceable point, an incorrect micro-location of the serviceable point, an incorrect delivery date, an incorrect delivery time window, an incorrect parcel, or an incorrect consignee, in some embodiments.

Figure 72:
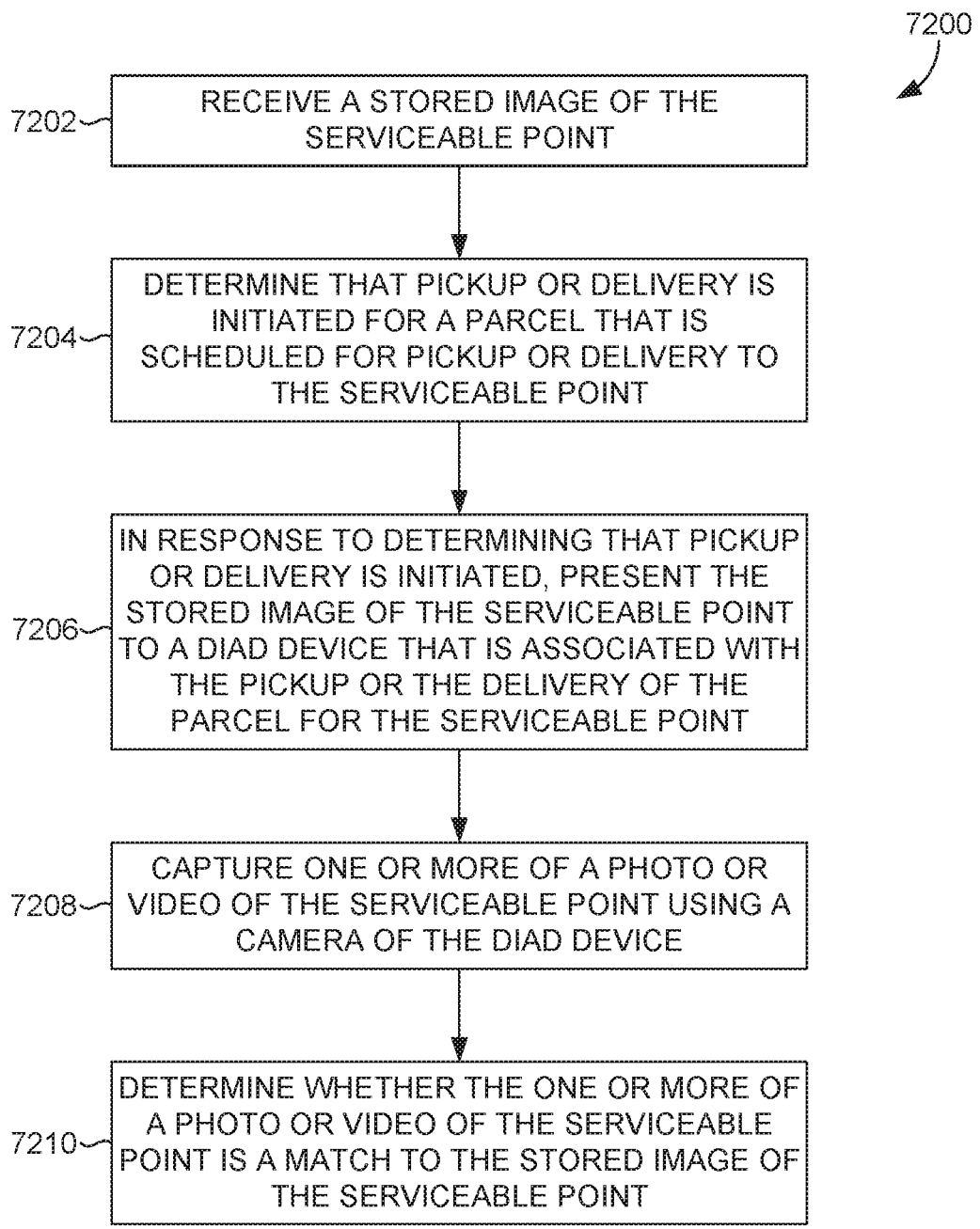
FIG. 72 schematically depicts a flowchart illustrating operations and processes that can be used in accordance with various embodiments shown and described herein.

FIG. 72 provides an exemplary method 7200 in accordance with the present invention. Some or all of the following aspects of the method 7200 may be performed as previously described above, and as such, those aspects are not further described below for brevity. The method 7200 may be performed by way of the enhanced parcel delivery system. At block 7202, the method 7200 comprises receiving a stored image of the serviceable point. At block 7204, the method 7200 comprises determining that pickup or delivery is initiated for a parcel that is scheduled for pickup or delivery to the serviceable point. In response to determining that pickup or delivery is initiated, the method 7200 comprises presenting the stored image of the serviceable point at a mobile device that is associated with the pickup or the delivery of the parcel for the serviceable point, as shown at block 7206. Continuing to block 7210, the method 7200 further comprises capturing one or more of a photo or video of the serviceable point using a camera of the mobile device. Continuing, the method 7200 comprises determining whether the one or more of a photo or video of the serviceable point is a match to the stored image of the serviceable point, as shown at block 7210. In one embodiment, the method 7200 further comprises, in response to determining that the one or more of a photo or video of the serviceable point matches the stored image of the serviceable point, presenting a validation of the serviceable point at a mobile device to indicate pickup of the parcel from the serviceable point is correct. In an instance of parcel pickup, for example, the method 7200 may determine that pickup of the parcel is complete and communicate a confirmation of pickup of the parcel to a user computing entity in response to determining that pickup of the parcel is complete, wherein the confirmation of pickup of the parcel comprises the one or more of the photo or the video captured using the camera of the mobile device.

In another example, in response to determining that the one or more of a photo or video of the serviceable point matches the stored image of the serviceable point, the method 7200 presents a validation of the serviceable point to the mobile device indicating delivery of the parcel to the serviceable point is correct. In an instance of parcel delivery, the method 7200 may determine that delivery of the parcel is complete and communicate a confirmation of delivery of the parcel to a user computing entity in response to determining that delivery of the parcel is complete, wherein the confirmation of delivery of the parcel comprises the one or more of the photo or the video captured using the camera of the mobile device.

Additionally, the method 7200 may provide a notification that pickup or delivery of the parcel at the serviceable point is complete, subsequent to determining that the one or more of the photo or the video of the serviceable point matches the stored image of the serviceable point, in an embodiment. For example, a UAV or a mobile device may provide the notification to a central computing entity, a delivery vehicle computing entity, and/or a parcel carrier computing entity (see, e.g., "D. Exemplary Central Computing Entity," "D. Exemplary Delivery Vehicle Computing Entity," and "E. Exemplary Parcel Carrier Computing Entity"). In one example, the method 7200 comprises communicating a confirmation of pickup or delivery of the parcel to a user computing entity in response to providing the notification that pickup or delivery of the parcel at the serviceable point is complete, wherein the confirmation of pickup or delivery of the parcel comprises the one or more of the photo or the video.

In an instance where a micro-location of the serviceable point is depicted in the stored image to visually indicate the micro-location is where the parcel is to be retrieved from at the serviceable point, the method 7200 further comprises receiving a notification of pickup of the parcel from the micro-location. For example, the notification indicates that pickup is complete. In another instance where a micro-location of the serviceable point is depicted in the stored image to visually indicate the micro-location where the parcel is to be delivered at the serviceable point, the method 7200 further comprises receiving a notification of delivery of the parcel at the micro-location. In the example, the notification indicates that delivery is complete.

In further embodiments, the method 7200 comprises presenting a validation of the serviceable point to the mobile device indicating delivery of the parcel to the serviceable point is correct, in response to determining that the one or more of a photo or video of the serviceable point matches the stored image of the serviceable point. In one such embodiment, the method 7200 further determines whether (or determines that) delivery of the parcel is complete. Then, the method 7200 communicates a confirmation of delivery of the parcel to a user computing entity in response to determining that delivery of the parcel is complete, wherein the confirmation of delivery of the parcel comprises the one or more of the photo or the video captured using the camera of the mobile device.

Figure 73:
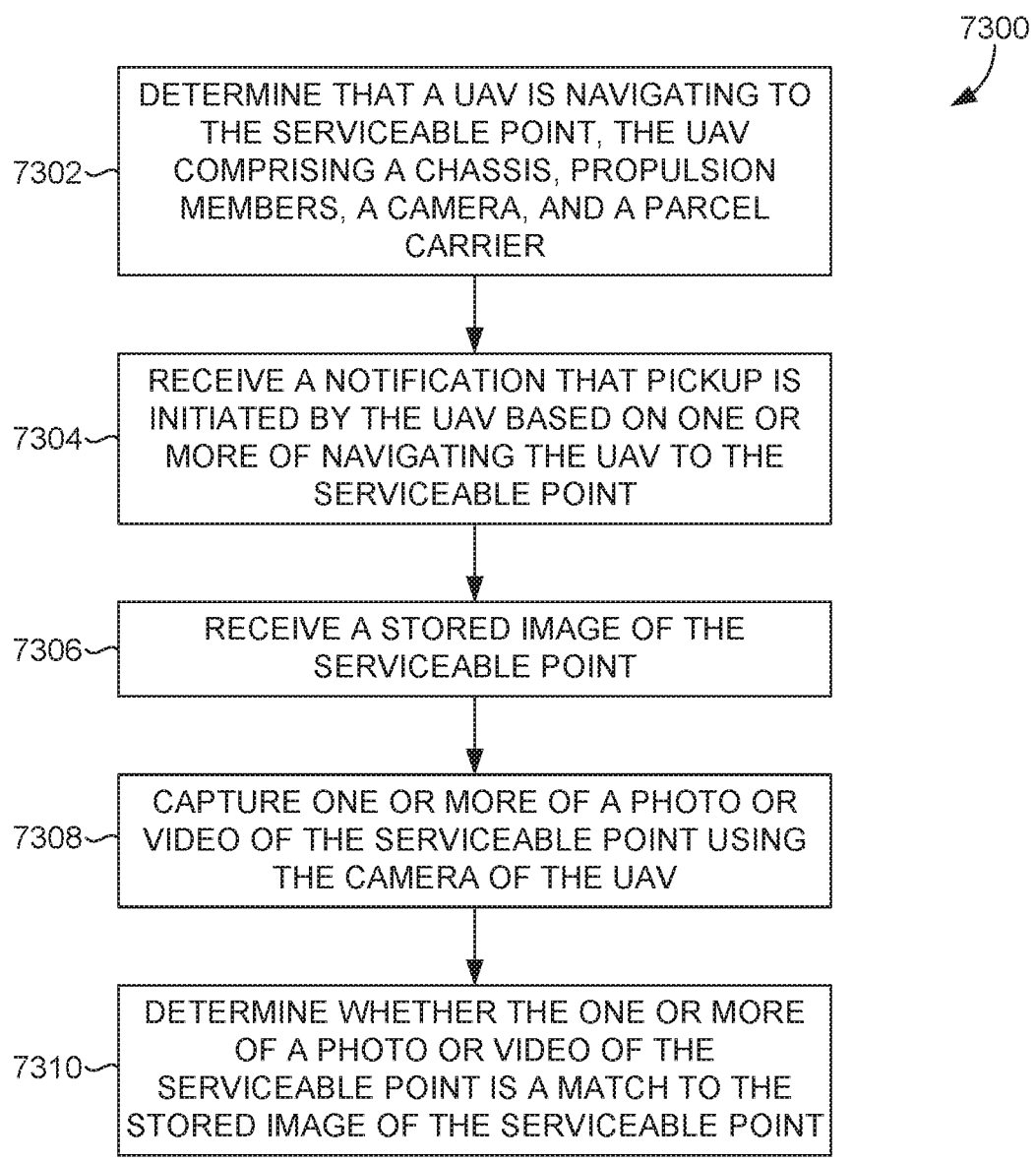
FIG. 73 schematically depicts a flowchart illustrating operations and processes that can be used in accordance with various embodiments shown and described herein.

FIG. 73 provides an exemplary method 7300 in accordance with the present invention. Some or all of the following aspects of the method 7300 may be performed as previously described above, and as such, those aspects are not further described below for brevity. The method 7300 may be performed by way of the enhanced parcel delivery system. At block 7302, the method 7300 comprises determining that a UAV is navigating to the serviceable point, the UAV comprising a chassis, propulsion members, a camera, and a parcel carrier. The method 7300 further comprises receiving a notification that pickup is initiated by the UAV based on one or more of navigating the UAV to the serviceable point, as shown at block 7304. The method 7300 comprises receiving a stored image of the serviceable point, depicted at block 7306.

At block 7308, the method 7300 comprises capturing one or more of a photo or video of the serviceable point using the camera of the UAV. The method 7300 continues at block 7310 by determining whether the one or more of a photo or video of the serviceable point is a match to the stored image of the serviceable point. In an embodiment of parcel pickup, in response to determining that the one or more of the photo or the video of the serviceable point matches the stored image of the serviceable point, the method 7300 comprises engaging the parcel using the parcel carrying mechanism of the UAV. In such an embodiment, the method 1300 may further comprise determining that the UAV is navigating from the serviceable point to a UAV support mechanism. Then, in accordance with the method 7300, a confirmation of pickup of the parcel may be communicated to a user computing entity, wherein the confirmation of pickup of the parcel comprises the one or more of the photo or the video captured using the camera of the UAV.

In an embodiment of parcel delivery, the method 7300 comprises dis-engaging the parcel from the parcel carrier in order to release the parcel at the serviceable point in response to determining that the one or more of a photo or video of the serviceable point matches the stored image of the serviceable point. In such an embodiment, the method 7300 may further comprise determining that the UAV is navigating from the serviceable point to a UAV support mechanism subsequent to dis-engaging the parcel. Then, in accordance with the method 7300, a confirmation of delivery of the parcel is communicated to a user computing entity, wherein the confirmation of pickup of the parcel comprises the one or more of the photo or the video captured using the camera of the UAV. Subsequent to communicating a confirmation of delivery of the parcel, the method 7300 may further comprises receiving a notification from the user computing entity, the notification reporting an adverse delivery event. In such embodiments, the previously-described methods may be implemented to undertake mitigation action(s), for example.

Many modifications and other embodiments of the inventions set forth herein will come to mind to one skilled in the art to which these inventions pertain having the benefit of the teachings presented in the foregoing descriptions and the associated drawings. For example, various embodiments may be configured to associate a plurality of assets with a particular sort location. In such embodiments, a sort employee may scan a plurality of asset identifiers (e.g., sequentially) before transporting the plurality of items to a sort location. Thereafter, the plurality of assets may be associated with the proximate sort location according to the features and methods described herein. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. One or more non-transitory computer-readable media having computer instructions stored thereon for execution by one or more processors, wherein execution of the computer instructions via the one or more processors results in a method, the method comprising:

receiving a notification that a parcel is dis-engaged from a UAV in order to be released at a serviceable point, wherein the notification includes an image depicting release of the parcel at the serviceable point as captured by the UAV; and communicating a confirmation of delivery of the parcel to a user computing entity in response to the notification wherein the confirmation includes the image and a user-selectable option for reporting an adverse delivery event.

2. The media of claim 1, further comprising receiving a subsequent notification from the user computing entity, the notification reporting the adverse delivery event.

3. The media of claim 2, wherein the adverse delivery event is one or more of an incorrect serviceable point, an incorrect micro-location of the serviceable point, an incorrect delivery date, an incorrect delivery time window, an incorrect parcel, or an incorrect consignee.

4. The media of claim 2, wherein the user-selectable option is a request for a user to confirm accuracy of delivery of the parcel.

5. The media of claim 4, wherein selection of the user-selectable option at the user computer entity initiates communication of the subsequent notification reporting the adverse delivery event.

6. The media of claim 2, further comprising recognizing a default mitigation action to be initiated for the adverse delivery event.

7. The media of claim 2, further comprising:
identifying a type of adverse event specified in the subsequent notification;
recognizing a mitigation action that is specific to the type of adverse event identified; and
initiating the recognized mitigation action.

8. The media of claim 7, wherein the recognized mitigation action includes scheduling delivery of the parcel to a micro-location at the serviceable point or scheduling delivery of the parcel to another serviceable point.

9. The media of claim 7, wherein the recognized mitigation action includes retrieving the parcel from the serviceable point using the UAV, and wherein the media further comprises:
determining that the UAV is navigating to the serviceable point,
receiving a third notification that the previously-released parcel is engaged with a parcel carrier; and
determining that the UAV is navigating from the serviceable point to the UAV support mechanism.

10. One or more non-transitory computer-readable media having computer instructions stored thereon for execution by one or more processors, wherein execution of the computer instructions via the one or more processors results in a method, the method comprising:
receiving a first notification that a parcel is dis-engaged by a UAV in order to release the parcel at a serviceable point, wherein the first notification includes one or more images depicting release of the parcel at the serviceable point as captured by the UAV;
communicating a confirmation of delivery of the parcel to a user computing entity in response to the first notification that the parcel is disengaged, wherein the confirmation includes the one or more images and a user-selectable option for reporting an adverse delivery event; and
receiving a second notification from the user computing entity in response to the confirmation of delivery of the parcel, the second notification reporting the adverse delivery event.

11. The media of claim 10, further comprising:
determining a time period that elapsed between receipt of the first notification that the parcel was dis-engaged with the parcel carrying mechanism and receipt of the second notification reporting the adverse delivery event; and
when the time period that elapsed is under a predefined threshold, initiating a mitigation action that includes retrieving the parcel from the serviceable point using the UAV.

12. The media of claim 11, further comprising when the time period that elapsed meets or exceeds the predefined threshold, initiating the mitigation action that includes scheduling retrieval of the parcel from the serviceable point at a future date and time.

13. The media of claim 10, further comprising:
receiving user input from the user computing entity that specifies a new serviceable point for subsequent delivery of the parcel;
determining to retrieve the parcel from the serviceable point;
receiving a third notification from the UAV that the parcel is engaged with a parcel carrying mechanism in order to be released at the serviceable point;
determining that the UAV is navigating to the new serviceable point; and
receiving a fourth notification that the parcel is dis-engaged with the parcel carrying mechanism of the UAV in order to release the parcel at the new serviceable point.

14. One or more non-transitory computer-readable media having computer instructions stored thereon for execution by one or more processors, wherein execution of the computer instructions via the one or more processors results in a method, the method comprising:
receiving a stored image of a serviceable point;
receiving a first notification that a parcel is dis-engaged with a parcel carrying mechanism in order to be released at the serviceable point;
capturing one or more of a photo or video depicting release of the parcel at the serviceable point;
determining whether the one or more of the photo or the video is a match to the stored image of the serviceable point;
when the one or more of the photo or the video matches the stored image of the serviceable point, communicating a confirmation of delivery of the parcel, wherein the confirmation of delivery of the parcel includes the one or more of the photo or the video and a user-selectable option for reporting an adverse delivery event; and
receiving a second notification from a user computing entity in response to the confirmation of delivery, the second notification reporting and identifying the adverse delivery event.

15. The media of claim 14, wherein the stored image of the serviceable point comprises a micro-location at the serviceable point.

16. The media of claim 14, wherein the one or more of the photo or the video of the serviceable point is captured using a camera of a mobile device.

17. The media of claim 14, wherein the one or more of the photo or the video of the serviceable point is captured using a camera of a UAV.

18. The media of claim 17, wherein the adverse delivery event is identified as an incorrect serviceable point, an incorrect micro-location of the serviceable point, an incorrect delivery date, an incorrect delivery time window, an incorrect parcel, or an incorrect consignee.

* * * * *